US011949611B2

(12) United States Patent
Murakami et al.

(10) Patent No.: US 11,949,611 B2
(45) Date of Patent: *Apr. 2, 2024

(54) TRANSMITTING METHOD, RECEIVING METHOD, TRANSMITTING APPARATUS, AND RECEIVING APPARATUS

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,522

(22) Filed: Jan. 5, 2023

(65) Prior Publication Data

US 2023/0163904 A1 May 25, 2023

Related U.S. Application Data

(63) Continuation of application No. 15/580,988, filed as application No. PCT/JP2016/002648 on Jun. 1, 2016, now Pat. No. 11,581,995.

(Continued)

(30) Foreign Application Priority Data

May 10, 2016 (JP) ................................. 2016-094779

(51) Int. Cl.
*H04L 5/00* (2006.01)
*H04J 1/02* (2006.01)
(Continued)

(52) U.S. Cl.
CPC .............. *H04L 5/0044* (2013.01); *H04J 1/02* (2013.01); *H04J 3/02* (2013.01); *H04L 1/0075* (2013.01);
(Continued)

(58) Field of Classification Search
None
See application file for complete search history.

(56) References Cited

U.S. PATENT DOCUMENTS

2007/0176676 A1* 8/2007 Pratt ................... H04L 27/2601
342/357.395
2009/0042579 A1 2/2009 Kitajima
(Continued)

FOREIGN PATENT DOCUMENTS

EP 2 597 805 5/2013
JP 2009-44397 2/2009
(Continued)

OTHER PUBLICATIONS

International Search Report (ISR) dated Aug. 16, 2016 in International (PCT) Application No. PCT/JP2016/002648.
(Continued)

*Primary Examiner* — Ajit Patel
*Assistant Examiner* — Liem H. Nguyen
(74) *Attorney, Agent, or Firm* — Wenderoth, Lind & Ponack, L.L.P.

(57) ABSTRACT

Provided are a frame configuring unit configured to configure a frame using a plurality of orthogonal frequency-division multiplexing (OFDM) symbols, by allocating time resources and frequency resources to a plurality of transmission data, and a transmitter which transmits the frame. The frame includes a first period in which a preamble which includes information on a frame configuration of the frame is transmitted, a second period in which a plurality of
(Continued)

transmission data are transmitted by time division, a third period in which a plurality of transmission data are transmitted by frequency division, and a fourth period in which a plurality of transmission data are transmitted by time division and frequency division.

3 Claims, 66 Drawing Sheets

Related U.S. Application Data

(60) Provisional application No. 62/180,761, filed on Jun. 17, 2015.

(51) Int. Cl.
  *H04J 3/02* (2006.01)
  *H04J 11/00* (2006.01)
  *H04L 1/00* (2006.01)
  *H04L 27/26* (2006.01)

(52) U.S. Cl.
  CPC ...... *H04L 27/265* (2013.01); *H04L 27/26522* (2021.01); *H04J 11/00* (2013.01); *H04J 2011/0016* (2013.01); *H04L 5/0007* (2013.01); *H04L 5/0053* (2013.01)

(56) References Cited

U.S. PATENT DOCUMENTS

| | | | | |
|---|---|---|---|---|
| 2011/0257706 | A1* | 10/2011 | Karr | A61N 1/37276 607/60 |
| 2013/0044725 | A1 | 2/2013 | Chun et al. | |
| 2013/0265494 | A1* | 10/2013 | Mourad | H04N 21/6131 348/571 |
| 2014/0029509 | A1* | 1/2014 | Murakami | H04B 1/0096 370/315 |
| 2014/0314177 | A1* | 10/2014 | Choi | H04L 27/34 375/349 |
| 2015/0146608 | A1* | 5/2015 | Kim | H04L 1/0057 370/312 |
| 2016/0242177 | A1* | 8/2016 | Seok | H04L 69/322 |
| 2017/0048092 | A1 | 2/2017 | Murakami et al. | |
| 2020/0059387 | A1* | 2/2020 | Murakami | H04L 5/0048 |

FOREIGN PATENT DOCUMENTS

| | | |
|---|---|---|
| JP | 2013-526211 | 6/2013 |
| WO | 2011/142555 | 11/2011 |
| WO | 2012-018164 | 2/2012 |
| WO | 2015/162886 | 10/2015 |

OTHER PUBLICATIONS

R. G. Gallagher, "Low-Density Parity-Check Codes", IRE Transactions on Information Theory, pp. 21-28, 1962.
Be Lu, et al., "Performance Analysis and Design Optimization of LDPC-Coded MIMO OFDM Systems", IEEE Transactions on Signal Processing, vol. 52, No. 2, pp. 348-361, Feb. 2004.
Catherine Douillard, et al., "Turbo Codes With Rate-m/M+1) Constituent Convolutional Codes", IEEE Transactions on Communications, vol. 53, No. 10, pp. 1630-1638, Oct. 2005.
Claude Berrou, "The Ten-Year-Old Turbo Codes are Entering into Service", IEEE Communications Magazine, pp. 110-116, Aug. 2003.
DVB Document A122, "Frame structure channel coding and modulation for a second generation digital terrestrial television broadcasting system (DVB-T2)", pp. 1-158, Jun. 2008.
David J. C. MacKay, "Good Error-Correcting Codes Based on Very Sparse Matrices", IEEE Transactions On Information Theory, vol. 45, No. 2, pp. 399-431, Mar. 1999.
Siavash M. Alamouti, "A Simple Transmit Diversity Technique for Wireless Communications", IEEE Journal On Select Areas in Communications, vol. 16, No. 8, pp. 1451-1458, Oct. 1998.
Vahid Tarokh, et al., "Space-Time Block Coding for Wireless Communications: Performance Results", IEEE Journal On Selected Areas in Communications, vol. 17, No. 3, pp. 451-460, Mar. 1999.
Extended European Search Report dated May 17, 2018 in European Application No. 16811202.7.

* cited by examiner

FIG. 55
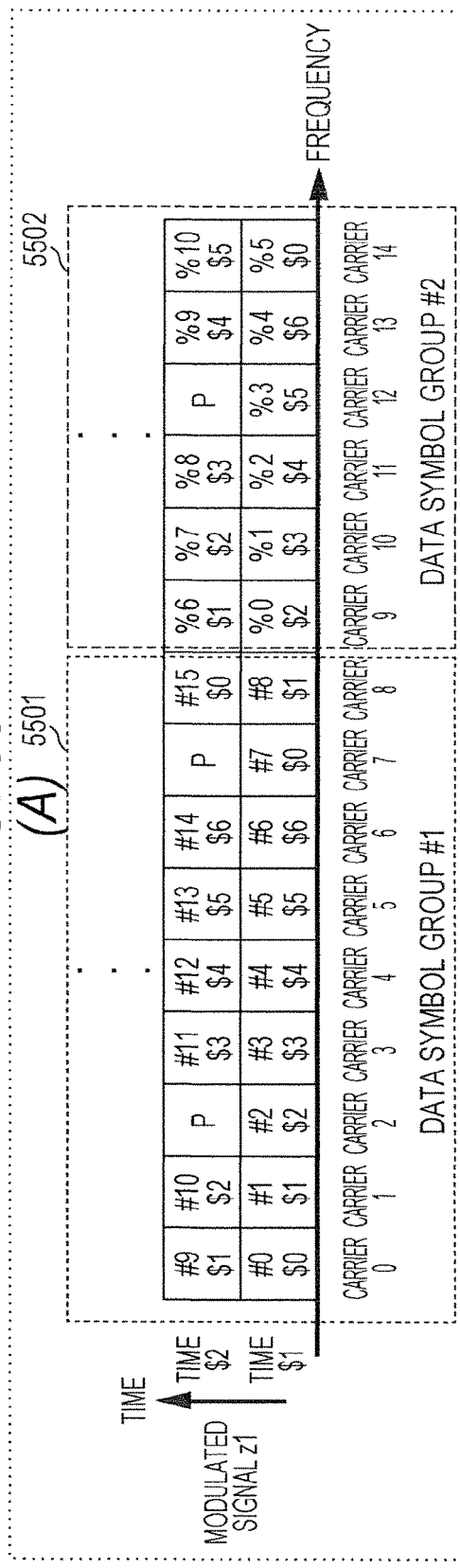
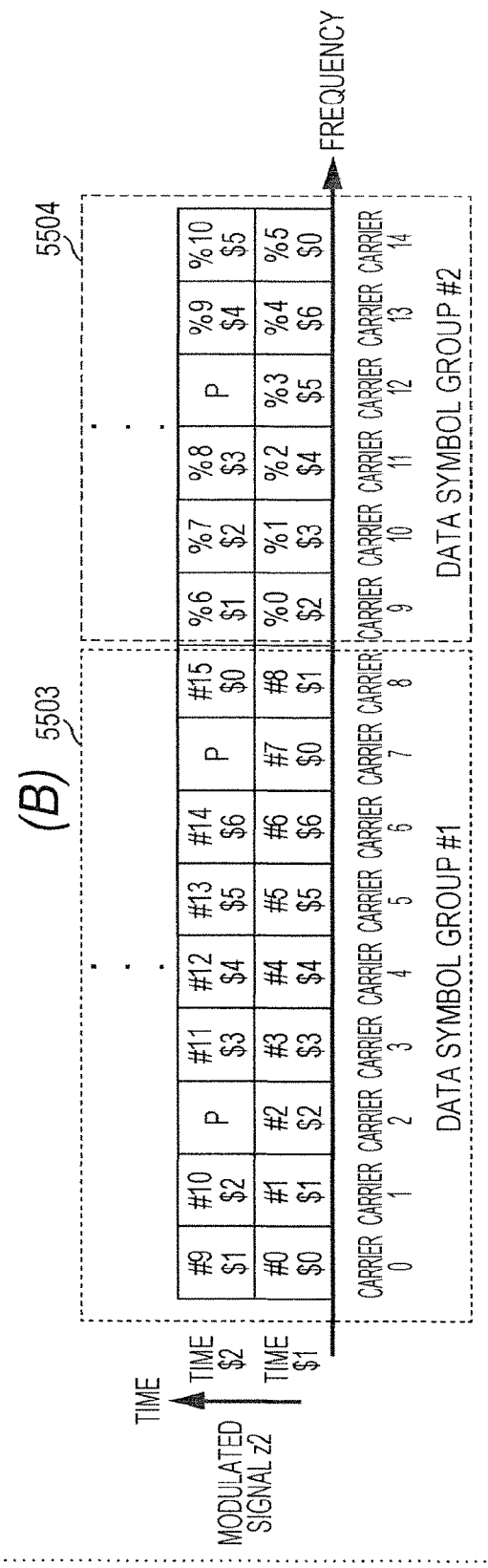

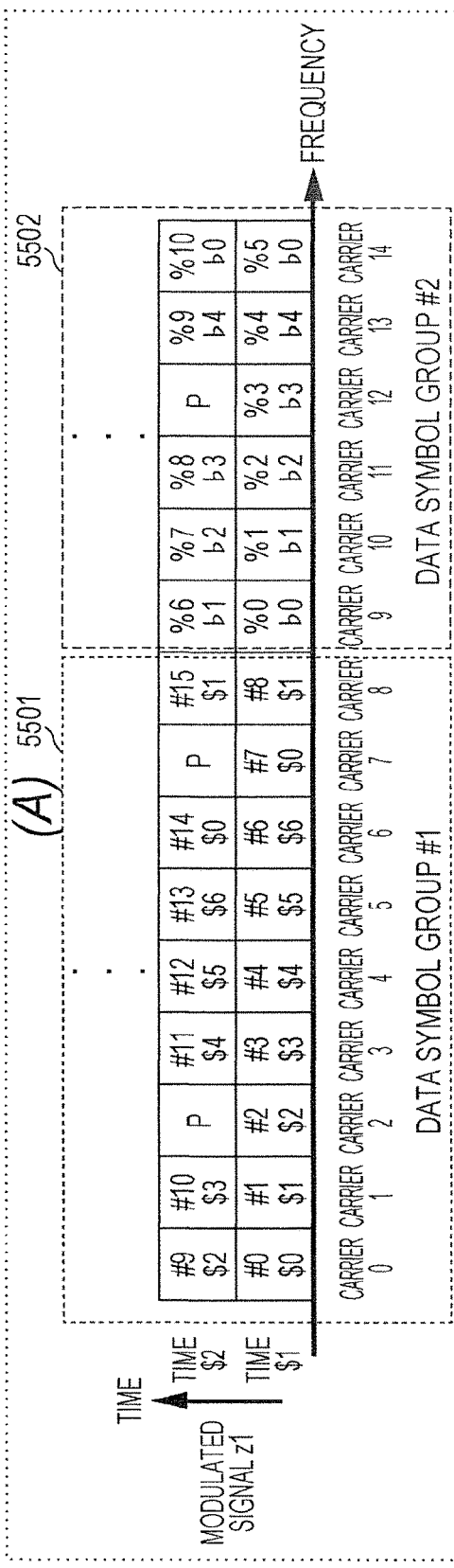
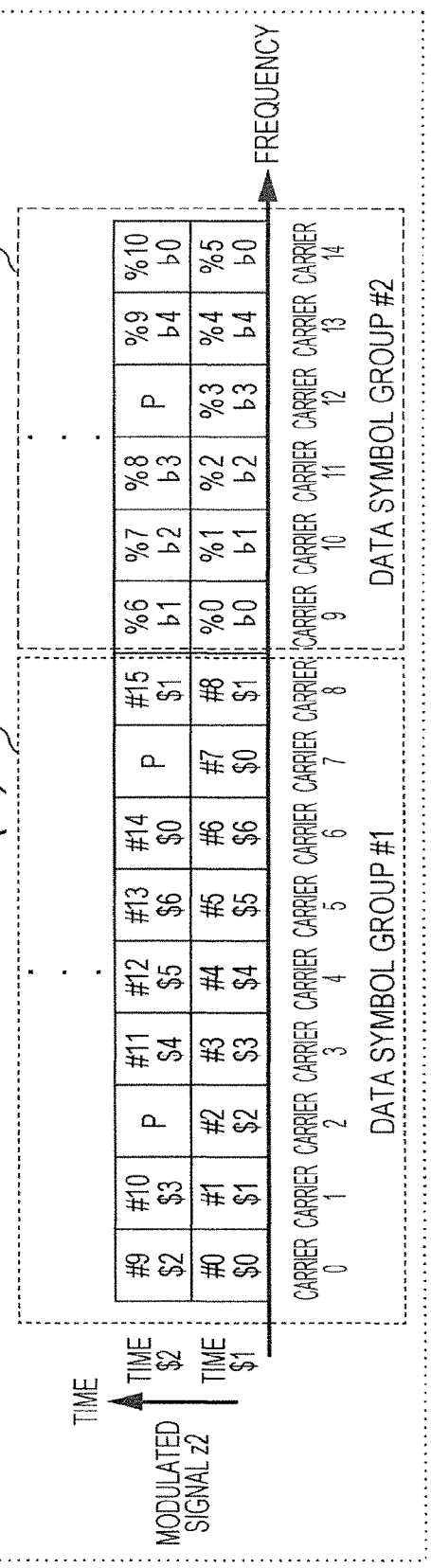
FIG. 56

TRANSMITTING METHOD, RECEIVING METHOD, TRANSMITTING APPARATUS, AND RECEIVING APPARATUS

TECHNICAL FIELD

The present disclosure relates to a transmitting method, a receiving method, a transmitting apparatus and a receiving apparatus.

BACKGROUND ART

The DVB-T2 standard is an example of a digital broadcasting standard in which orthogonal frequency division multiplexing (OFDM) is used (see Non-Patent Literature (NPL) 5).

In digital broadcasting according to, for instance, the DVB-T2 standard, a frame in which a plurality of data streams are multiplexed by time division is configured, and data is transmitted on a frame-by-frame basis.

CITATION LIST

Non-Patent Literature

NPL 1: R. G. Gallager, "Low-density parity-check codes," IRE Trans. Inform. Theory, IT-8, pp. 21-28, 1962.
NPL 2: "Performance analysis and design optimization of LDPC-coded MIMO OFDM systems" IEEE Trans. Signal Processing, vol. 52, no. 2, pp. 348-361, February 2004.
NPL 3: C. Douillard, and C. Berrou, "Turbo codes with rate−m/(m+1) constituent convolutional codes," IEEE Trans. Commun., vol. 53, no. 10, pp. 1630-1638, October 2005.
NPL 4: C. Berrou, "The ten-year-old turbo codes are entering into service," IEEE Communication Magazine, vol. 41, no. 8, pp. 110-116, August 2003.
NPL 5: DVB Document A122, Frame structure, channel coding and modulation for a second generation digital terrestrial television broadcasting system (DVB-T2), June 2008.
NPL 6: D. J. C. Mackay, "Good error-correcting codes based on very sparse matrices," IEEE Trans. Inform. Theory, vol. 45, no. 2, pp 399-431, March 1999.
NPL 7: S. M. Alamouti, "A simple transmit diversity technique for wireless communications," IEEE J. Select. Areas Commun., vol. 16, no. 8, pp. 1451-1458, October 1998.
NPL 8: V. Tarokh, H. Jafrkhani, and A. R. Calderbank, "Space-time block coding for wireless communications: Performance results," IEEE J. Select. Areas Commun., vol. 17, no. 3, no. 3, pp. 451-460, March 1999.

SUMMARY OF THE INVENTION

Technical Problem

The non-limiting exemplary embodiments of the present disclosure provide a transmitting method, a receiving method, a transmitting apparatus, and a receiving apparatus which allow communication using a flexible frame configuration.

Solutions to Problem

A transmitting method according to an aspect of the present disclosure is a transmitting method executed by a transmitting apparatus which transmits a plurality of transmission data using an orthogonal frequency-division multiplexing (OFDM) method, and includes: configuring a frame by allocating time resources and frequency resources to the plurality of transmission data; and transmitting the frame. When configuring a frame, the frame is configured so as to include a first period in which a preamble which includes information on a frame configuration of the frame is transmitted, a second period in which a plurality of transmission data are transmitted by time division, a third period in which a plurality of transmission data are transmitted by frequency division, and a fourth period in which a plurality of transmission data are transmitted by time division and frequency division.

In the transmitting method, when configuring a frame, in the fourth period, the frame may be configured so as to include a time at which first transmission data and second transmission data are transmitted by frequency division, and a frequency at which the first transmission data and third transmission data are transmitted by time division.

A receiving method according to an aspect of the present disclosure is a receiving method executed by a receiving apparatus which receives a plurality of transmission data transmitted using an orthogonal frequency-division multiplexing (OFDM) method, and includes: receiving a frame in which time resources and frequency resources are allocated to the plurality of transmission data such that the frame includes a first period in which a preamble is transmitted, a second period in which a plurality of transmission data are transmitted by time division, a third period in which a plurality of transmission data are transmitted by frequency division, and a fourth period in which a plurality of transmission data are transmitted by time division and frequency division; obtaining information on a frame configuration of the frame from the preamble; and demodulating, based on the information on the frame configuration, at least one of the plurality of transmission data transmitted in the second period, the plurality of transmission data transmitted in the third period, and the plurality of transmission data transmitted in the fourth period.

In the receiving method, when receiving a frame, in the fourth period, a frame may be received, the frame being configured to include a time at which first transmission data and second transmission data are transmitted by frequency division, and a frequency at which the first transmission data and third transmission data are transmitted by time division.

A transmitting apparatus according to an aspect of the present disclosure is a transmitting apparatus which transmits a plurality of transmission data using an orthogonal frequency-division multiplexing (OFDM) method, and includes: a frame configuring unit configured to configure a frame by allocating time resources and frequency resources to the plurality of transmission data, and a transmitter which transmits the frame. The frame configuring unit is configured to configure a frame such that the frame includes a first period in which a preamble which includes information on a frame configuration of the frame is transmitted, a second period in which a plurality of transmission data are transmitted by time division, a third period in which a plurality of transmission data are transmitted by frequency division, and a fourth period in which a plurality of transmission data are transmitted by time division and frequency division.

In the transmitting apparatus, in the fourth period, the frame configuring unit may be configured to configure a frame such that the frame includes a time at which first transmission data and second transmission data are transmitted by frequency division, and a frequency at which the first transmission data and third transmission data are transmitted by time division.

A receiving apparatus according to an aspect of the present disclosure is a receiving apparatus which receives a plurality of transmission data transmitted using an orthogonal frequency-division multiplexing (OFDM) method, and includes: a receiver which receives a frame in which time resources and frequency resources are allocated to the plurality of transmission data such that the frame includes a first period in which a preamble is transmitted, a second period in which a plurality of transmission data are transmitted by time division, a third period in which a plurality of transmission data are transmitted by frequency division, and a fourth period in which a plurality of transmission data are transmitted by time division and frequency division; a preamble processor which obtains information on a frame configuration of the frame from the preamble; and a demodulator which demodulates, based on the information on the frame configuration, at least one of the plurality of transmission data transmitted in the second period, the plurality of transmission data transmitted in the third period, and the plurality of transmission data transmitted in the fourth period.

In the receiving apparatus, in the fourth period, the receiver may receive a frame configured so as to include a time at which first transmission data and second transmission data are transmitted by frequency division, and a frequency at which the first transmission data and third transmission data are transmitted by time division.

A transmitting method according to an aspect of the present disclosure is a transmitting method executed by a transmitting apparatus which transmits a plurality of transmission data using an orthogonal frequency-division multiplexing (OFDM) method, and includes: configuring a frame by allocating time resources and frequency resources to the plurality of transmission data; and transmitting the frame. When configuring a frame, a frame is configured, the frame including a first area in which a preamble that includes information on a frame configuration of the frame is arranged, a second area in which a plurality of transmission data are arranged by time division, a third area in which a plurality of transmission data are arranged by frequency division, and a fourth area in which a plurality of transmission data are arranged by time division and frequency division.

A receiving method according to an aspect of the present disclosure is a receiving method executed by a receiving apparatus which receives a plurality of transmission data transmitted using an orthogonal frequency-division multiplexing (OFDM) method, and includes: receiving a frame which includes a first area in which a preamble is arranged, a second area in which a plurality of transmission data are arranged by time division, a third area in which a plurality of transmission data are arranged by frequency division, and a fourth area in which a plurality of transmission data are arranged by time division and frequency division; obtaining information on a frame configuration of the frame from the preamble; and demodulating, based on the information on the frame configuration, at least one of the plurality of transmission data transmitted in the second area of the frame, the plurality of transmission data transmitted in the third area of the frame, and the plurality of transmission data transmitted in the fourth area of the frame.

A transmitting apparatus according to an aspect of the present disclosure is a transmitting apparatus which transmits a plurality of transmission data using an orthogonal frequency-division multiplexing (OFDM) method, and includes: a frame configuring unit configured to configure a frame by allocating time resources and frequency resources to the plurality of transmission data; and a transmitter which transmits the frame. The frame configuring unit is configured to configure a frame which includes a first area in which a preamble that includes information on a frame configuration of the frame is arranged, a second area in which a plurality of transmission data are arranged by time division, a third area in which a plurality of transmission data are arranged by frequency division, and a fourth area in which a plurality of transmission data are arranged by time division and frequency division A receiving apparatus according to an aspect of the present disclosure is a receiving apparatus which receives a plurality of transmission data transmitted using an orthogonal frequency-division multiplexing (OFDM) method, and includes: a receiver which receives a frame which includes a first area in which a preamble is arranged, a second area in which a plurality of transmission data are arranged by time division, a third area in which a plurality of transmission data are arranged by frequency division, and a fourth area in which a plurality of transmission data are arranged by time division and frequency division; a preamble processor which obtains information on a frame configuration of the frame from the preamble; and a demodulator which demodulates, based on the information on the frame configuration, at least one of the plurality of transmission data transmitted in the second area of the frame, the plurality of transmission data transmitted in the third area of the frame, and the plurality of transmission data transmitted in the fourth area of the frame.

Such general and particular aspects may be achieved by arbitrary combinations of systems, apparatuses, and methods.

Advantageous Effects of Invention

According to the transmitting apparatus, the receiving apparatus, the transmitting method, and the receiving method according to the present disclosure, communication can be performed using a flexible frame configuration. This yields advantageous effects that high efficiency in data transmission can be achieved in a communications system and furthermore the receiving apparatus can efficiently obtain data.

Further advantages and advantageous effects according to aspects of the present disclosure are clarified from the Specification and the drawings. Such advantages and/or advantageous effects are achieved by some exemplary embodiments and features described in the Specification and illustrated in the drawings, yet not all the features are necessarily provided in order to obtain one or more features equivalent to the features described and illustrated.

BRIEF DESCRIPTION OF DRAWINGS

FIG. 55 is a view illustrating an example of the symbol arranging method.

FIG. 56 is a view illustrating an example of the symbol arranging method.

DESCRIPTION OF EMBODIMENTS (Spatial Multiplexing MIMO Method)

Conventionally, as a communication method using a multi-antenna, for example, there is a communication method which is referred to as MIMO (Multiple-Input Multiple-Output).

In multi-antenna communication which is typically MIMO, data reception quality and/or a data communication rate (per unit time) can be enhanced by modulating transmission data of one or more sequences and simultaneously transmitting the respective modulated signals from different antennas by using the same frequency (common frequency).

Figure 62:
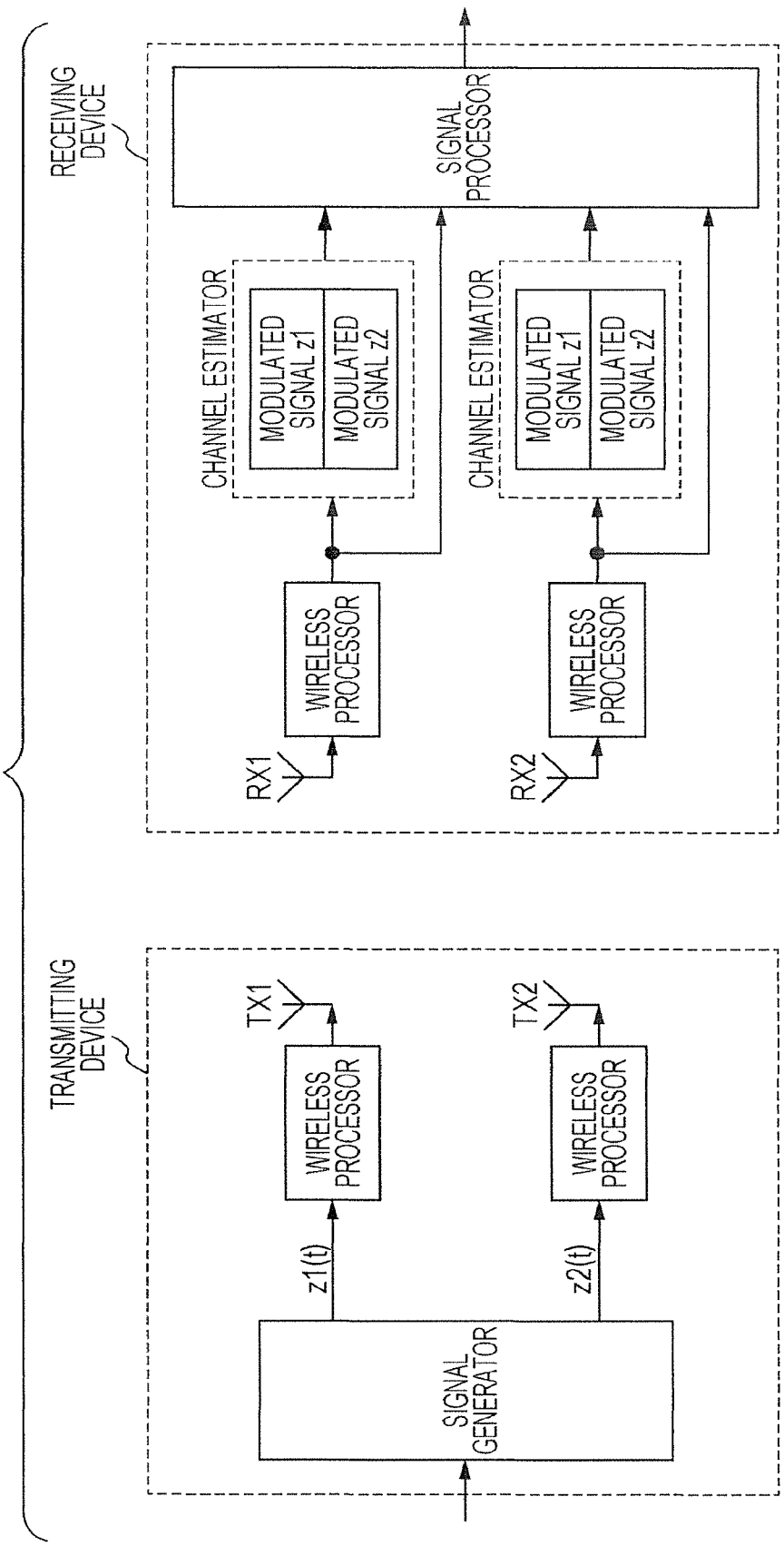
FIG. 62 is a view illustrating an example of a schematic view of an MIMO system.

FIG. 62 is a view explaining an outline of a spatial multiplexing MIMO method. The MIMO method in FIG. 62 indicates an example of configurations of a transmitting apparatus and a receiving apparatus in a case where a number of transmitting antennas is 2 (TX1 and TX2), a number of receiving antennas (RX1 and RX2) is 2 and a number of transmission modulated signals (transmission streams) is 2.

The transmitting apparatus has a signal generator and a wireless processor. The signal generator performs communication channel coding on data, performs MIMO precoding processing, and generates two transmission signals $z1(t)$ and $z2(t)$ which can be transmitted simultaneously by using the same frequency (common frequency). The wireless processor multiplexes individual transmission signals in a frequency direction as necessary, that is, converts the transmission signals into multi-carriers (for example, an OFDM (Orthogonal Frequency Division Multiplexing) method), and also inserts a pilot signal for estimation by a receiving apparatus of a transmission channel distortion, a frequency offset, a phase distortion and the like. (However, the pilot signal may estimate other distortions and the like, and the receiving apparatus may also use the pilot signal for signal detection. Note that a mode of using the pilot signal in the receiving apparatus is not limited to this mode.) The two transmitting antennas use the two transmitting antennas (TX1 and TX2) to transmit $z1(t)$ and $z2(t)$.

The receiving apparatus includes the receiving antennas (RX1 and RX2), a wireless processor, a channel fluctuation estimator and a signal processor. The receiving antenna (RX1) receives signals transmitted from the two transmitting antennas (TX1 and TX2) of the transmitting apparatus. The channel fluctuation estimator estimates a channel fluctuation value by using a pilot signal, and supplies a channel fluctuation estimation value to the signal processor. The signal processor restores data contained in $z1(t)$ and $z2(t)$ based on channel values estimated as signals received at the two receiving antennas, and obtains the data as one piece of received data. However, the received data may be a hard determination value of "0" or "1" or may be a soft determination value such as log likelihood or a log likelihood ratio.

Moreover, various coding methods such as turbo codes (for example, Duo-Binary Turbo codes) and LDPC (Low-Density Parity-Check) codes are used as coding methods (NPLs 1 to 6 and the like).

First Exemplary Embodiment

Figure 1:
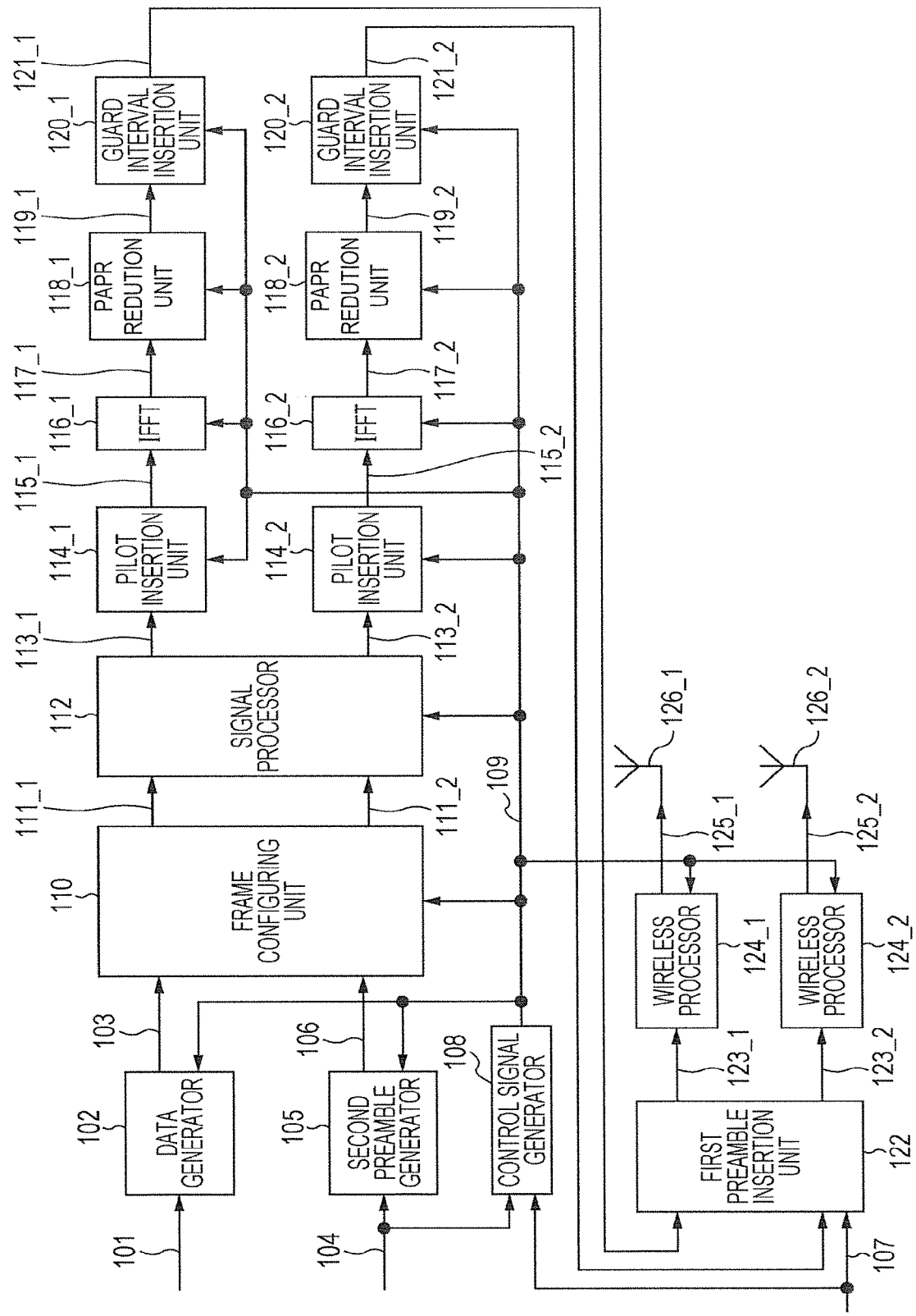
FIG. 1 is a view illustrating an example of a configuration of a transmitting apparatus.

FIG. 1 is an example of a configuration of a transmitting apparatus (of, for example, a broadcast station) in the present exemplary embodiment.

Data generator 102 receives an input of transmission data 10801, and control signal 109. Data generator 102 performs error correction coding and mapping which is based on a modulating method, based on information such as information of error correction coding contained in control signal 109 and information of the modulating method contained in control signal 109. Data generator 102 outputs data transmission (quadrature) baseband signal 103.

Second preamble generator 105 receives an input of second preamble transmission data 104, and control signal 109. Second preamble generator 105 performs error correction coding and mapping which is based on a modulating method, based on information such as information of error correction of a second preamble contained in control signal 109 and information of the modulating method contained in control signal 109. Second preamble generator 105 outputs second preamble (quadrature) baseband signal 106.

Control signal generator 108 receives an input of first preamble transmission data 107, and second preamble transmission data 104. Control signal generator 108 outputs as control signal 109 information of a method for transmitting each symbol (a selected transmitting method including an error correction code, a coding rate of the error correction code, a modulating method, a block length, a frame configuration and a transmitting method for regularly switching precoding matrices, a method for inserting a pilot symbol, information or the like of IFFT (Inverse Fast Fourier Transform) (or inverse Fourier transform)/FFT (Fast Fourier Transform) (or Fourier transform), information of a method for reduction a PAPR (Peak to Average Power Ratio) and information of a method for inserting a guard interval).

Frame configuring unit 110 receives an input of data transmission (quadrature) baseband signal 103, second preamble (quadrature) baseband signal 106, and control signal 109. Frame configuring unit 110 performs rearrangement in a frequency axis and a time axis based on information of a frame configuration contained in the control signal. Frame configuring unit 110 outputs (quadrature) baseband signal 111_1 of stream 1 according to the frame configuration (a signal obtained after mapping, that is, a baseband signal based on a modulating method to be used), and (quadrature) baseband signal 111_2 of stream 2 according to the frame configuration (a signal obtained after mapping, that is, a baseband signal based on a modulating method to be used).

Signal processor 112 receives an input of baseband signal 111_1 of stream 1, baseband signal 111_2 of stream 2, and control signal 109. Signal processor 112 outputs modulated signal 1 (113_1) obtained after signal processing based on a transmitting method contained in control signal 109 and modulated signal 2 (113_2) obtained after the signal processing based on a transmitting method contained in control signal 109.

Note that in the signal processor, for example, an MIMO transmitting method using precoding and phase change (the MIMO transmitting method may also be an MIMO transmitting method which does not perform phase change) (referred to as an MIMO method here), an MISO (Multiple-Input Single-Output) transmitting method using space time block codes (space frequency block codes) (referred to as an MISO method here), and an SISO (Single-Input Single-Output) (or SIMO (Single-Input Multiple-Output)) transmitting method for transmitting a modulated signal of one stream from one antenna (however, there is also a case where a modulated signal of one stream is transmitted from a plurality of antennas in the SISO method and the SIMO method). An operation of signal processor 112 will be described in detail below.

Pilot insertion unit 114_1 receives an input of modulated signal 1 (113_1) obtained after signal processing, and control signal 109. Pilot insertion unit 114_1 inserts a pilot symbol to modulated signal 1 (113_1) obtained after the signal processing, based on information contained in control signal 109 and related to a method for inserting the pilot symbol. Pilot insertion unit 114_1 outputs modulated signal 115_1 obtained after the pilot symbol insertion.

Pilot insertion unit 114_2 receives an input of modulated signal 2 (113_2) obtained after signal processing, and control signal 109. Pilot insertion unit 114_2 inserts a pilot symbol to modulated signal 2 (113_2) obtained after the signal processing, based on information contained in control signal 109 and related to a method for inserting the pilot symbol. Pilot insertion unit 114_2 outputs modulated signal 115_2 obtained after the pilot symbol insertion.

IFFT (Inverse Fast Fourier Transform) unit 116_1 receives an input of modulated signal 115_1 obtained after the pilot symbol insertion, and control signal 109. IFFT unit 116_1 performs IFFT based on information of an IFFT method contained in control signal 109. IFFT unit 116_1 outputs signal 117_1 obtained after the IFFT.

IFFT unit 116_2 receives an input of modulated signal 115_2 obtained after the pilot symbol insertion, and control signal 109. IFFT unit 116_2 performs IFFT based on information of the IFFT method contained in control signal 109. IFFT unit 116_2 outputs signal 117_2 obtained after the IFFT.

PAPR reduction unit 118_1 receives an input of signal 117_1 obtained after the IFFT, and control signal 109. PAPR reduction unit 118_1 performs processing for PAPR reduction on signal 117_1 obtained after the IFFT based on information contained in control signal 109 and related to the PAPR reduction. PAPR reduction unit 118_1 outputs signal 119_1 obtained after the PAPR reduction.

PAPR reduction unit 118_2 receives an input of signal 117_2 obtained after the IFFT, and control signal 109. PAPR reduction unit 118_2 performs processing for PAPR reduction on signal 117_2 obtained after the IFFT based on information contained in control signal 109 and related to the PAPR reduction. PAPR reduction unit 118_2 outputs signal 119_2 obtained after the PAPR reduction.

Guard interval insertion unit 120_1 receives an input of signal 119_1 obtained after the PAPR reduction, and control signal 109. Guard interval insertion unit 120_1 inserts a guard interval to signal 119_1 obtained after the PAPR reduction, based on information contained in control signal 109 and related to a guard interval insertion method. Guard interval insertion unit 1201 outputs signal 121_1 obtained after the guard interval insertion.

Guard interval insertion unit 120_2 receives an input of signal 119_2 obtained after the PAPR reduction, and control signal 109. Guard interval insertion unit 120_2 inserts a guard interval to signal 119_2 obtained after the PAPR reduction, based on information contained in control signal 109 and related to a guard interval insertion method. Guard interval insertion unit 1202 outputs signal 121_2 obtained after the guard interval insertion.

First preamble insertion unit 122 receives an input of signal 121_1 obtained after the guard interval insertion, signal 1212 obtained after the guard interval insertion, and first preamble transmission data 107. First preamble insertion unit 122 generates a first preamble signal from first preamble transmission data 107. First preamble insertion unit 122 adds the first preamble to signal 121_1 obtained after the guard interval insertion. First preamble insertion unit 122 adds the first preamble to signal 123_1 obtained after the addition of the first preamble, and signal 121_2 obtained after the guard interval insertion. First preamble insertion unit 122 outputs signal 123_2 obtained after the addition of the first preamble. Note that the first preamble signal may be added to both of signal 123_1 obtained after the addition of the first preamble and signal 123_2 obtained after addition of the first preamble, and also may be added to any one of signal 123_1 obtained after the addition of the first preamble and signal 123_2 obtained after addition of the first preamble. When the first preamble signal is added to one of signal 123_1 and signal 123_2, the signal to which the first preamble is not added includes a zero signal as a baseband signal in a section in which the signal to which the first preamble is added is added.

Wireless processor 124_1 receives an input of signal 123_1 obtained after the addition of the first preamble. Wireless processor 1241 performs processing such as frequency conversion and amplification on signal 123_1. Wireless processor 124_1 outputs transmission signal 125_1. Then, transmission signal 125_1 is output as a radio wave from antenna 126_1.

Wireless processor 124_2 receives an input of signal 123_2 obtained after the addition of the first preamble. Wireless processor 1242 performs processing such as frequency conversion and amplification on signal 123_2. Wireless processor 124_2 outputs transmission signal 125_2. Then, transmission signal 1252 is output as a radio wave from antenna 126_2.

Note that in the present exemplary embodiment, the MIMO transmitting method using precoding and phase change, the MISO (Multiple-Input Single-Output) transmitting method using space time block codes (or space frequency block codes) and the SISO (Single-Input Single-Output) (or SIMO (Single-Input Single-Output)) transmitting method are used as described above (details will be described below).

FIGS. 2 to 6 are examples of frame configurations of a modulated signal to be transmitted by the above-described transmitting apparatus. Characteristics of each frame configuration will be described below.

Figure 2:
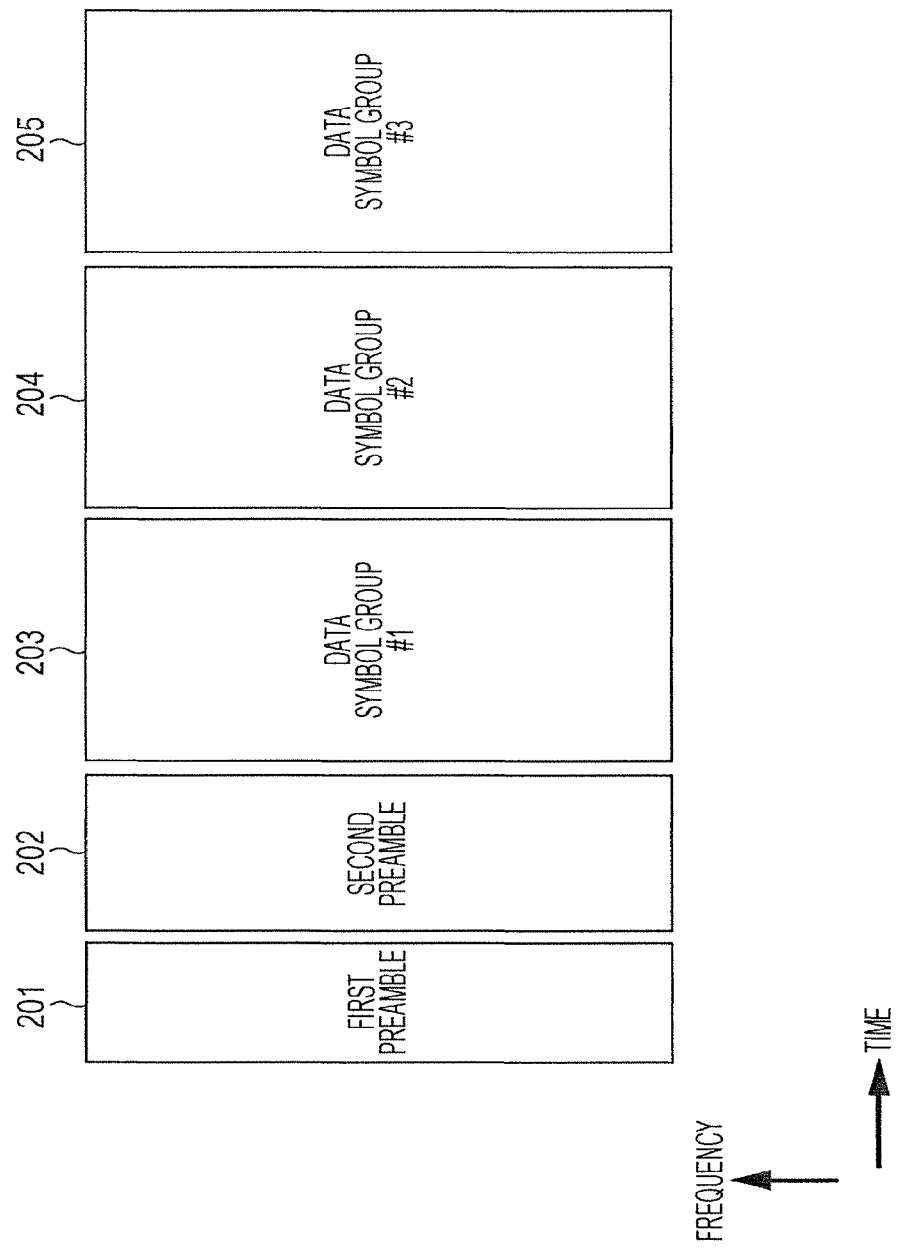
FIG. 2 is a view illustrating an example of a frame configuration.

FIG. 2 illustrates an example of a first frame configuration. In FIG. 2, a vertical axis indicates a frequency, and a horizontal axis indicates time. Then, since a transmitting method using a multi-carrier such as an OFDM method is used, there is a plurality of carriers on the vertical axis frequency.

FIG. 2 illustrates first preamble 201, second preamble 202, data symbol group #1 203, data symbol group #2 204, and data symbol group #3 205.

First, the data symbol groups will be described.

A data symbol group may be allocated per video/audio stream. For example, symbols for transmitting a first video/audio stream are of data symbol group #1 (203), symbols for transmitting a second video/audio stream are of data symbol group #2 (204), and symbols for transmitting a third video/audio stream are of data symbol group #3 (205). This point is not limited to FIG. 2, and the same also applies to FIGS. 3, 4, 5 and 6. This point is not limited to FIG. 2, and the same also applies to FIGS. 3, 4, 5 and 6.

Moreover, for example, PLP (Physical Layer Pipe) in a standard such as DVB-T2 (a second generation digital terrestrial television broadcasting system) may also be referred to as a data symbol group. That is, in FIG. 2, data symbol group #1 (203) may be referred to as PLP #1, data symbol group #2 (204) may be referred to as PLP #2, and data symbol group #3 (205) may be referred to as PLP #3. This point is not limited to FIG. 2, and the same also applies to FIGS. 3, 4, 5 and 6.

First preamble 201 and second preamble 202 include, for example, a symbol for performing frequency synchronization and time synchronization (for example, a PSK (Phase Shift Keying) symbol having signal point arrangement in an in-phase I-quadrature Q plane known in the transmitting apparatus and the receiving apparatus), a pilot symbol for estimation by the receiving apparatus of a channel fluctuation (for example, a PSK (Phase Shift Keying) symbol having signal point arrangement in an in-phase I-quadrature Q plane known in the transmitting apparatus and the receiving apparatus), a symbol for transmitting transmitting method information of each data symbol group (information for identifying the SISO method, the MISO method and the MIMO method), a symbol for transmitting information related to an error correction code of each data symbol group (for example, a code length and a coding rate), a symbol for transmitting information related to a method for modulating each data symbol (in a case of the MISO method or the MIMO method, since there is a plurality of streams, a plurality of modulating methods is specified), a symbol for transmitting transmitting method information of the first and second preambles, a symbol for transmitting information related to an error correction code of the first and second preambles, a symbol for transmitting information related to a method for modulating the first and second preambles, a symbol for transmitting information related to a method for inserting a pilot symbol, and a symbol for transmitting information related to a method for suppressing a PAPR. This point is not limited to FIG. 2, and the same also applies to FIGS. 3, 4, 5 and 6.

Characteristic points in FIG. 2 are such that a data symbol group is subjected to temporal division and is transmitted.

Note that in FIG. 2, a symbol for transmitting a pilot symbol or control information may be inserted to a data symbol group. Moreover, a data symbol group may also be a symbol group based on the MIMO (transmitting) method and the MISO (transmitting) method (as a matter of course, the data symbol group may be a symbol group of the SISO (SIMO) method). In this case, at the same time and the same (common) frequency, a plurality of streams (s1 and s2 described below) is transmitted. (In this case, at the same time and the same (common) frequency, a plurality of modulated signals is transmitted from a plurality of (different) antennas.) Then, this point is not limited to FIG. 2, and the same also applies to FIGS. 3, 4, 5 and 6.

Figure 3:
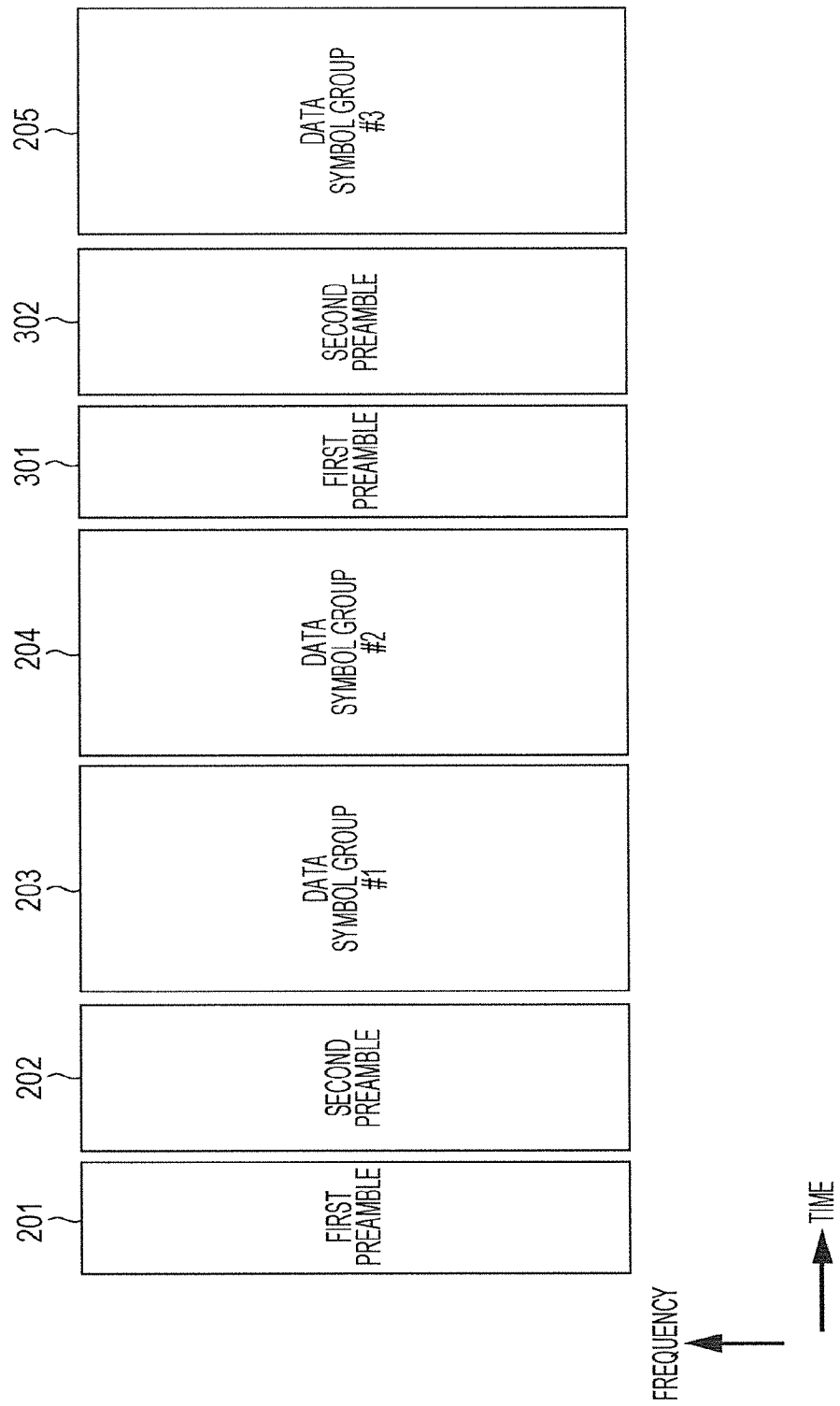
FIG. 3 is a view illustrating an example of a frame configuration.

Next, FIG. 3 will be described. FIG. 3 illustrates an example of a second frame configuration. In FIG. 3, a vertical axis indicates a frequency, and a horizontal axis indicates time. Then, since a transmitting method using a multi-carrier such as an OFDM method is used, there is a plurality of carriers on the vertical axis frequency. Note that the same elements as the elements in FIG. 2 are assigned the same reference numerals in FIG. 3, and operate in the same way as in FIG. 2.

Characteristic points in FIG. 3 are such that first preamble 301 and second preamble 302 are inserted (temporarily) between data symbol group #2 (204) and data symbol group #3 (205). That is, when a symbol group formed with a "first preamble, a second preamble and a data symbol group" is referred to as a group, there are a first group (the first preamble, the second preamble, data symbol group #1 and data symbol group #2) and a second group (the first preamble, the second preamble and data symbol group #3), and configurations of the data symbol group contained in the first group and of the data symbol group contained in the second group are different.

In such a case, for example, a video/audio to be transmitted with data symbol group #1 and a video/audio to be transmitted with data symbol group #2 are different in coding compressibility of a video/audio, but may be the same "video/audio." In this way, there is an advantage that the receiving apparatus can obtain a desired "video/audio" with high quality by a method as simple as selecting "whether to demodulate data symbol group #1 or demodulate data symbol group #2," and that since a preamble can be made common in this case, control information transmission efficiency can be enhanced.

(However, contrarily, the video/audio to be transmitted with data symbol group #1 and the video/audio to be transmitted with data symbol #2 may be different).

Moreover, it becomes easy to make the transmitting method for transmitting data symbol group #1 the same as a transmitting method for transmitting data symbol group #2, and to make a transmitting method for transmitting data symbol group #3 different from the transmitting method for transmitting data symbol group #1 (the transmitting method for transmitting data symbol group #2).

(Although described below, a pilot symbol is inserted to a data symbol group. In this case, a pilot symbol inserting method is different per transmitting method (since a number of modulated signals to be transmitted may be different). Consequently, when a data symbol group is gathered per transmitting method, there is a possibility that a decrease in transmission efficiency owing to insertion of the pilot symbol can be prevented).

Figure 4:
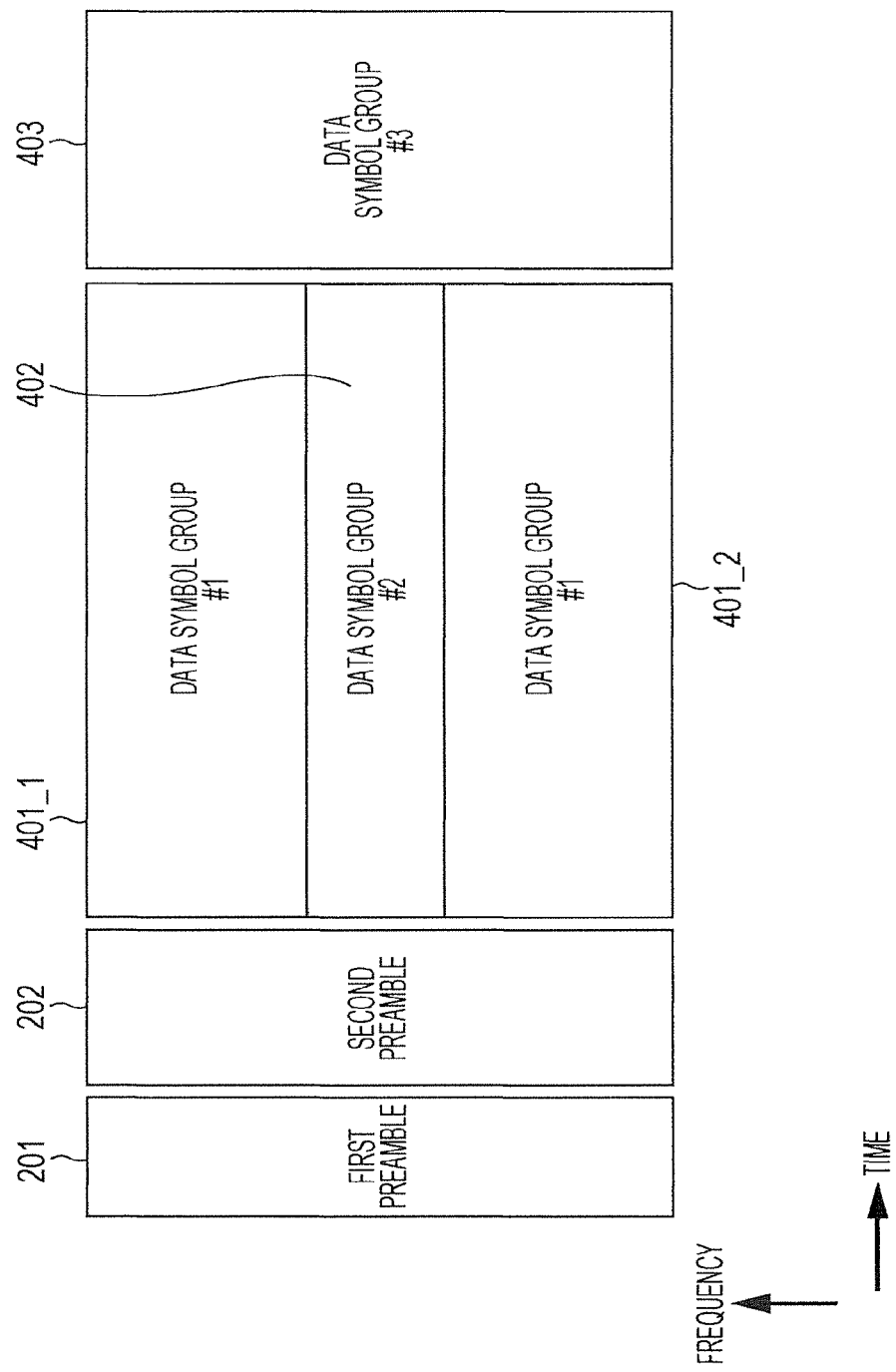
FIG. 4 is a view illustrating an example of a frame configuration.

Next, FIG. 4 will be described. FIG. 4 illustrates an example of a third frame configuration. In FIG. 4, a vertical axis indicates a frequency, and a horizontal axis indicates time. Then, since a transmitting method using a multi-carrier such as an OFDM method is used, there is a plurality of carriers on the vertical axis frequency. Note that elements operating in the same way as in FIG. 2 are assigned the same reference numerals in FIG. 4, and operate in the same way as in FIG. 2.

Characteristic points in FIG. 4 are such that data symbol group #1 and data symbol group #2 are subjected to frequency division, and that in addition, "data symbol group #1 (401_1) and data symbol group #2 (402)" and "data symbol group #3 (403)" are subjected to temporal division. That is, data symbol groups are transmitted by using frequency division and temporal division in combination.

Figure 5:
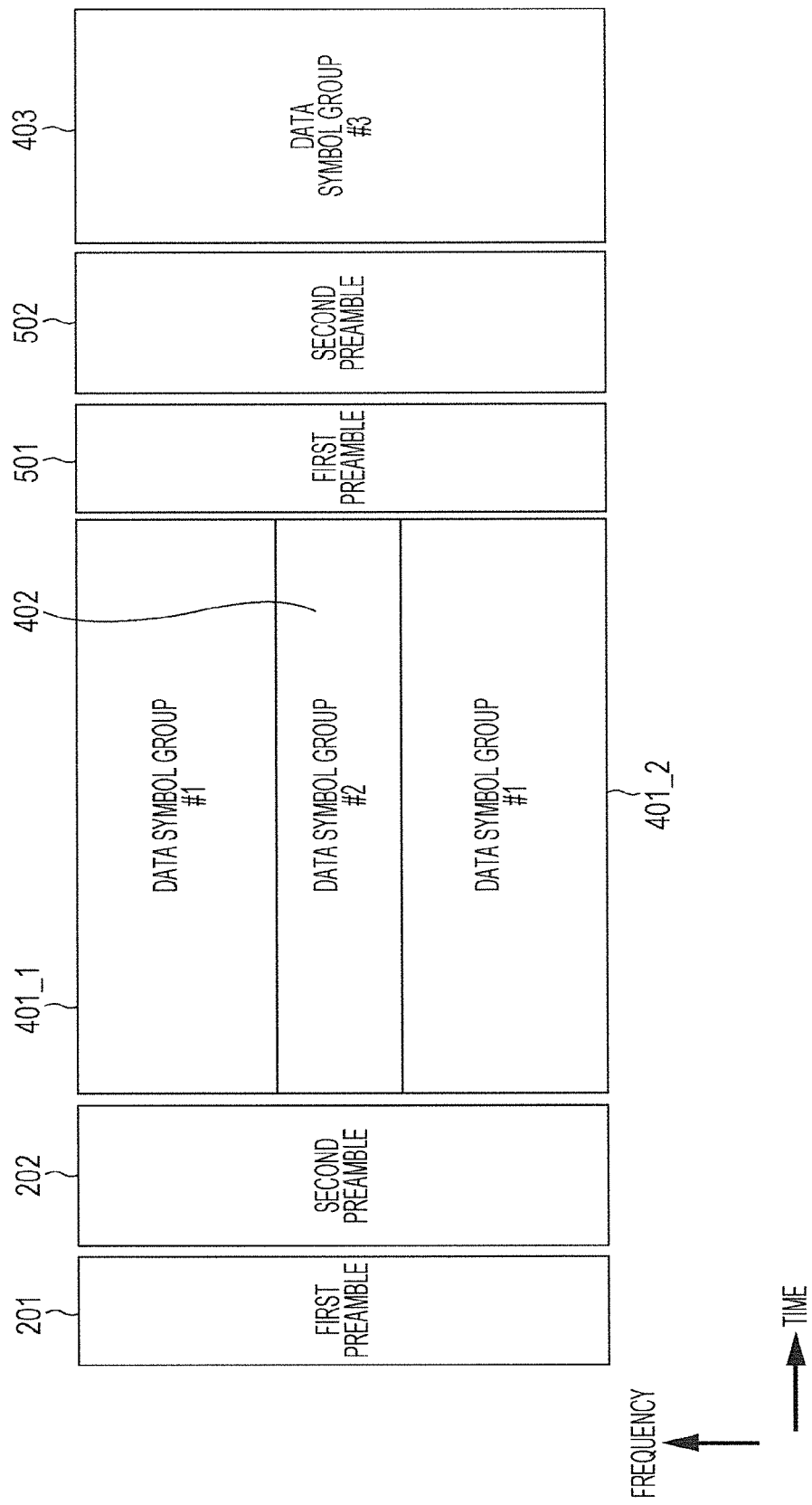
FIG. 5 is a view illustrating an example of a frame configuration.

Next, FIG. 5 will be described. FIG. 5 illustrates an example of a fourth frame configuration. In FIG. 5, a vertical axis indicates a frequency, and a horizontal axis indicates time. Then, since a transmitting method using a multi-carrier such as an OFDM method is used, there is a plurality of carriers on the vertical axis frequency. Note that elements operating in the same way as in FIGS. 2 and 4 are assigned the same reference numerals in FIG. 5, and operate in the same way as in FIGS. 2 and 4.

Characteristic points in FIG. 5 are such that, as with FIG. 4, data symbol group #1 and data symbol group #2 are subjected to frequency division, and that in addition, "data symbol group #1 (401_1) and data symbol group #2 (402)" and "data symbol group #3 (403)" are subjected to temporal division. That is, data symbol groups are transmitted by using frequency division and temporal division in combination.

In addition, characteristic points in FIG. 5 are such that first preamble 301 and second preamble 302 are inserted (temporarily) between "data symbol groups #1 (401_1 and 401_2) and data symbol #2 (402)" and data symbol group #3 (403). That is, when a symbol group formed with a "first preamble, a second preamble and a data symbol group" is referred to as a group, there are a first group (the first preamble, the second preamble, data symbol group #1 and data symbol group #2) and a second group (the first preamble, the second preamble and data symbol group #3), and configurations of the data symbol group contained in the first group and of the data symbol group contained in the second group are different.

In such a case, for example, a video/audio to be transmitted with data symbol group #1 and a video/audio to be transmitted with data symbol group #2 are different in coding compressibility of a video/audio, but may be the same "video/audio." In this way, there is an advantage that the receiving apparatus can obtain a desired "video/audio" with high quality by a method as simple as selecting "whether to demodulate data symbol group #1 or demodulate data symbol group #2," and that since a preamble can be made common in this case, control information transmission efficiency can be enhanced.

(However, contrarily, the video/audio to be transmitted with data symbol group #1 and the video/audio to be transmitted with data symbol #2 may be different).

Moreover, it becomes easy to make the transmitting method for transmitting data symbol group #1 the same as a transmitting method for transmitting data symbol group #2, and to make a transmitting method for transmitting data symbol group #3 different from the transmitting method for transmitting data symbol group #1 (the transmitting method for transmitting data symbol group #2).

(Although described below, a pilot symbol is inserted to a data symbol group. In this case, a pilot symbol inserting method is different per transmitting method (since a number of modulated signals to be transmitted may be different). Consequently, when a data symbol group is gathered per transmitting method, there is a possibility that a decrease in transmission efficiency owing to insertion of the pilot symbol can be prevented).

Figure 6:
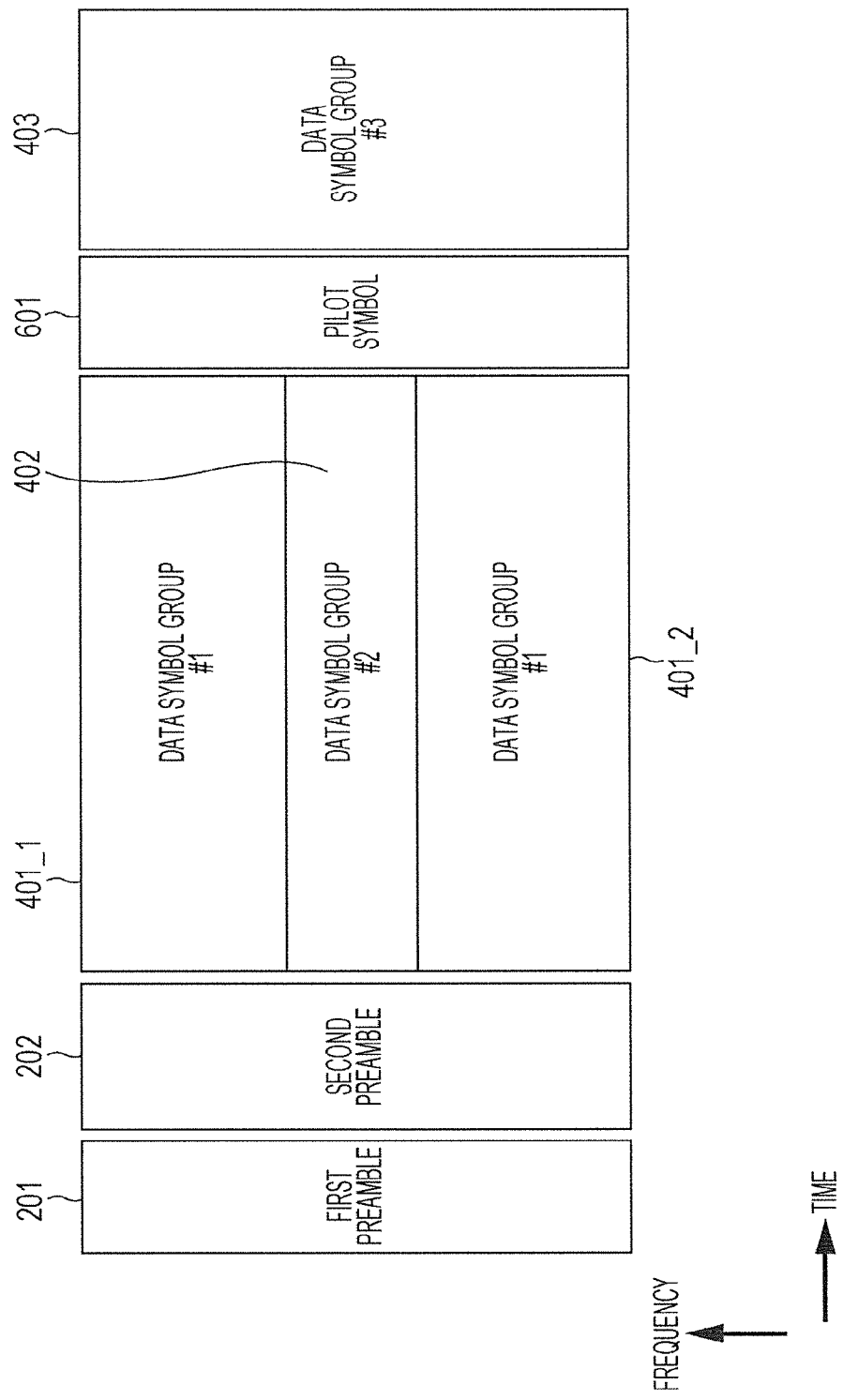
FIG. 6 is a view illustrating an example of a frame configuration.

Next, FIG. 6 will be described. FIG. 6 illustrates an example of a fifth frame configuration. In FIG. 6, a vertical axis indicates a frequency, and a horizontal axis indicates time. Then, since a transmitting method using a multi-carrier such as an OFDM method is used, there is a plurality of carriers on the vertical axis frequency. Note that elements operating in the same way as in FIGS. 2 and 4 are assigned the same reference numerals in FIG. 6, and operate in the same way as in FIGS. 2 and 4.

Characteristic points in FIG. 6 are such that, as with FIGS. 4 and 5, data symbol group #1 and data symbol group #2 are subjected to frequency division, and that in addition, "data symbol group #1 (401_1) and data symbol group #2 (402)" and "data symbol group #3 (403)" are subjected to temporal division. That is, data symbol groups are transmitted by using frequency division and temporal division in combination.

In addition, characteristic points in FIG. 6 are such that a pilot symbol is inserted (temporarily) between "data symbol groups #1 (401_1 and 401_2) and data symbol #2 (402)" and data symbol group #3 (403).

In such a case, for example, a video/audio to be transmitted with data symbol group #1 and a video/audio to be transmitted with data symbol group #2 are different in coding compressibility of a video/audio, but may be the same "video/audio." In this way, there is an advantage that the receiving apparatus can obtain a desired "video/audio" with high quality by a method as simple as selecting "whether to demodulate data symbol group #1 or demodulate data symbol group #2," and that since a preamble can be made common in this case, control information transmission efficiency can be enhanced.

(However, contrarily, the video/audio to be transmitted with data symbol group #1 and the video/audio to be transmitted with data symbol #2 may be different).

Moreover, it becomes easy to make the transmitting method for transmitting data symbol group #1 the same as a transmitting method for transmitting data symbol group #2, and to make a transmitting method for transmitting data symbol group #3 different from the transmitting method for transmitting data symbol group #1 (the transmitting method for transmitting data symbol group #2).

(Although described below, a pilot symbol is inserted to a data symbol group. In this case, a pilot symbol inserting method is different per transmitting method. Consequently (since a number of modulated signals to be transmitted may be different), when a data symbol group is gathered per transmitting method, there is a possibility that a decrease in transmission efficiency owing to insertion of the pilot symbol can be prevented).

Note that in the case of the MISO method or the MIMO method, a pilot symbol is inserted to each modulated signal to be transmitted from each transmitting antenna.

Then, the insertion of pilot symbol 601 as illustrated in FIG. 6 makes it possible for the receiving apparatus to perform highly precise channel estimation for wave detection and demodulation of each data symbol group. Moreover, when methods for transmitting data symbols are switched, the receiving apparatus needs to adjust a gain of a received signal suitable for the transmitting apparatus. However, it is possible to obtain an advantage that the gain can be adjusted easily by pilot symbol 601.

Note that in FIGS. 4, 5 and 6, for example, a video/audio to be transmitted with data symbol group #1 and a video/audio to be transmitted with data symbol group #2 are different in coding compressibility of a video/audio, but may be the same "video/audio." In this way, there is an advantage that the receiving apparatus can obtain a desired "video/audio" with high quality by a method as simple as selecting "whether to demodulate data symbol group #1 or demodulate data symbol group #2," and that since a preamble can be made common in this case, control information transmission efficiency can be enhanced (however, contrarily, the video/audio to be transmitted with data symbol group #1 and the video/audio to be transmitted with data symbol #2 may be different).

FIGS. 4, 5 and 6 illustrate the examples where a data symbol group subjected to time division is arranged after a data symbol group subjected to frequency division. However, the arrangement is not limited to this arrangement. The data symbol group subjected to frequency division may be arranged after the data symbol group subjected to time division. In this case, in the example in FIG. 5, the first preamble and the second preamble are inserted between the data symbol group subjected to time division and the data symbol group subjected to frequency division. (However, symbols other than the first preamble and the second preamble may be inserted.) Then, in the example in FIG. 6, the pilot symbol is inserted between the data symbol group subjected to time division and the data symbol group subjected to frequency division (however, symbols other than the pilot symbol may be inserted).

Characteristic points of the present exemplary embodiment will be described.

As described above, the frame configurations in FIGS. 2 to 6 have respective advantages. Hence, the transmitting apparatus selects any of the frame configurations in FIGS. 2 to 6 according to compressibility and a type of data (stream), a transmitting method combining method and a method of service to be provided to a terminal, and transmits symbols such as control information, pilot symbols and data symbols.

In order to realize the above, the transmitting apparatus (FIG. 1) may incorporate "information related to a frame configuration" for transmitting information related to a frame configuration to the receiving apparatus (terminal) in the first preamble or the second preamble.

For example, in a case where the transmitting apparatus transmits a modulated signal with the frame configuration in FIG. 2 when three bits of v0, v1 and v2 are allocated as the "information related to the frame configuration," the transmitting apparatus sets (v0, v1, v2) to (0, 0, 0) and transmits the "information related to the frame configuration."

When the transmitting apparatus transmits a modulated signal with the frame configuration in FIG. 3, the transmitting apparatus sets (v0, v1, v2) to (0, 0, 1) and transmits the "information related to the frame configuration."

When the transmitting apparatus transmits a modulated signal with the frame configuration in FIG. 4, the transmitting apparatus sets (v0, v1, v2) to (0, 1, 0) and transmits the "information related to the frame configuration."

When the transmitting apparatus transmits a modulated signal with the frame configuration in FIG. 5, the transmitting apparatus sets (v0, v1, v2) to (0, 1, 1) and transmits the "information related to the frame configuration."

When the transmitting apparatus transmits a modulated signal with the frame configuration in FIG. 5, the transmitting apparatus sets (v0, v1, v2) to (1, 0, 0) and transmits the "information related to the frame configuration."

Then, the receiving apparatus can learn an outline of a frame configuration of a modulated signal transmitted by the transmitting apparatus, from the "information related to the frame configuration."

As described above, the data symbol group is a symbol of any of the SISO (or SIMO) method, the MISO method and the MIMO method. The MISO method and the MIMO method will be described in particular below.

The MISO (transmitting) method using space time block codes (space frequency block codes) will be described.

A configuration in a case where signal processor 112 in FIG. 1 performs a transmitting method using space time block codes will be described with reference to FIG. 7.

Mapper 702 receives an input of data signal (data obtained after error correction coding) 701 and control signal 706. Mapper 702 performs mapping based on information contained in control signal 706 and related to a modulating method. Mapper 702 outputs signal 703 obtained after the mapping. For example, signal 703 obtained after the mapping is arranged in order of s0, s1, s2, s3, . . . , s(2i), s(2i+1), . . . (i is an integer equal to or more than 0).

MISO (Multiple Input Multiple Output) processor 704 receives an input of signal 703 obtained after the mapping and control signal 706. MISO processor 704 outputs signals 705A and 705B obtained after MISO processing in a case where control signal 706 instructs transmission by the MISO method. For example, signal 705A obtained after the MISO processing is of s0, s1, s2, s3, . . . , s(2i), s(2i+1), . . . , and signal 705B obtained after the MISO processing is of $-s1^*$, $s0^*$, $-s3^*$, $s2^*$ . . . , $-s(2i+1)^*$, $s(2i)^*$, . . . . Note that "*" means a complex conjugate (for example, $s0^*$ is a complex conjugate of s0).

In this case, signals 705A and 705B obtained after the MISO processing correspond to modulated signal 1 (113_1) obtained after signal processing in FIG. 1, and modulated signal 2 (113_2) obtained after signal processing, respectively. Note that a method of space time block codes is not limited to the above.

Then, modulated signal 1 (113_1) obtained after the signal processing is subjected to predetermined processing, and is transmitted as a radio wave from antenna 126_1. Moreover, modulated signal 1 (113_2) obtained after the signal processing is subjected to predetermined processing, and is transmitted as a radio wave from antenna 126_2.

Figure 7:
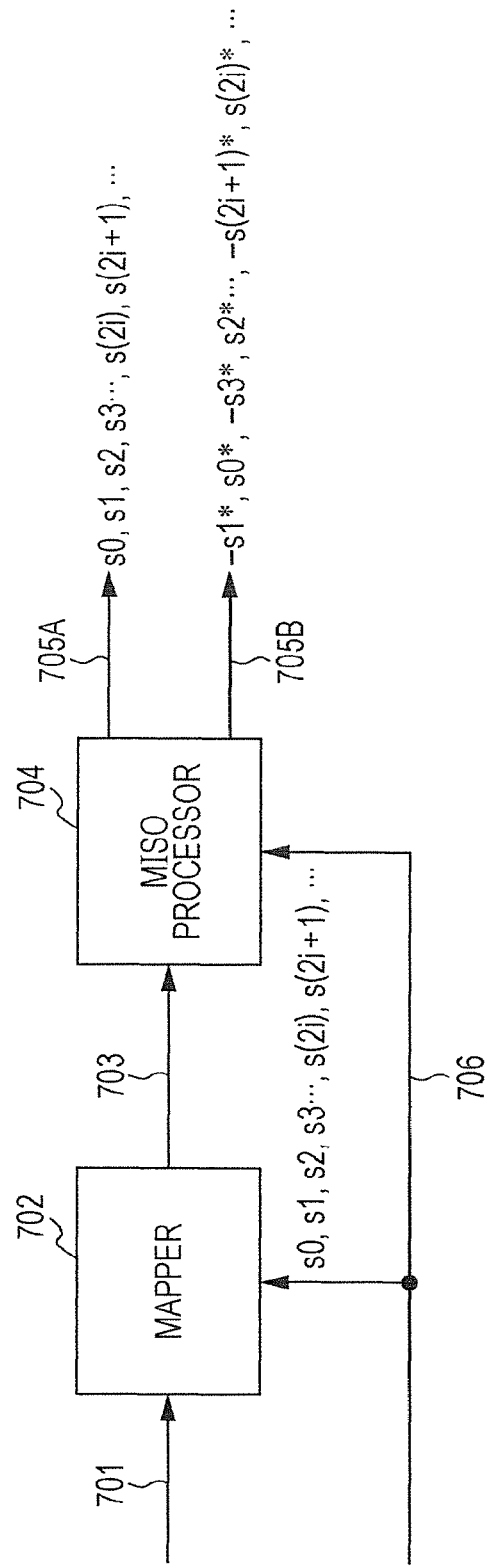
FIG. 7 is a view illustrating an example of a configuration in a case where a transmitting method using space time block codes is performed.
Figure 8:
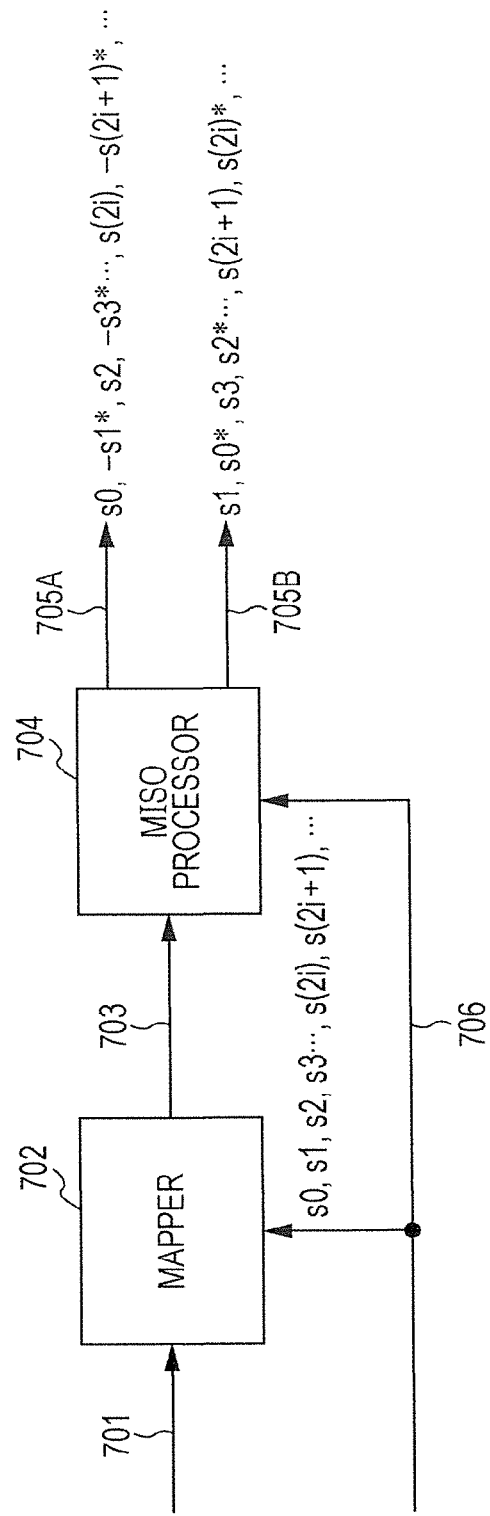
FIG. 8 is a view illustrating an example of a configuration in a case where the transmitting method using space time block codes is performed.

FIG. 8 is a configuration in a case where a transmitting method using space time block codes different from the configuration in FIG. 7 is performed.

Mapper 702 receives an input of data signal (data obtained after error correction coding) 701 and control signal 706. Mapper 702 performs mapping based on information contained in control signal 706 and related to a modulating method. Mapper 702 outputs signal 703 obtained after the mapping. For example, signal 703 obtained after the mapping is arranged in order of s0, s1, s2, s3, . . . , s(2i), s(2i+1), . . . (i is an integer equal to or more than 0).

MISO (Multiple Input Multiple Output) processor 704 receives an input of signal 703 obtained after the mapping and control signal 706. MISO processor 704 outputs signals 705A and 705B obtained after MISO processing in a case where control signal 706 instructs transmission by the MISO method. For example, signal 705A obtained after the MISO processing is of s0, $-s1^*$, s2, $-s3^*$, . . . , s(2i), $-s(2i+1)^*$, . . . , and signal 705B obtained after the MISO processing is of s1, $s0^*$, s3, $s2^*$ . . . , s(2i+1), $s(2i)^*$, . . . . Note that "*" means a complex conjugate (for example, $s0^*$ is a complex conjugate of s0).

In this case, signals 705A and 705B obtained after the MISO processing correspond to modulated signal 1 (113_1) obtained after signal processing in FIG. 1, and modulated signal 2 (113_2) obtained after signal processing, respectively. Note that a method of space time block codes is not limited to the above.

Then, modulated signal 1 (113_1) obtained after the signal processing is subjected to predetermined processing, and is transmitted as a radio wave from antenna 126_1. Moreover, modulated signal 1 (113_2) obtained after the signal processing is subjected to predetermined processing, and is transmitted as a radio wave from antenna 126_2.

Next, an MIMO method to which precoding, phase change and power change are applied will be described as an example of the MIMO method (however, the method for transmitting a plurality of streams from a plurality of antennas is not limited to this method, and the present exemplary embodiment can also be carried out by another method).

A configuration in a case where signal processor 112 in FIG. 1 performs a transmitting method using the MIMO method will be described with reference to FIGS. 9 to 17.

Figure 9:
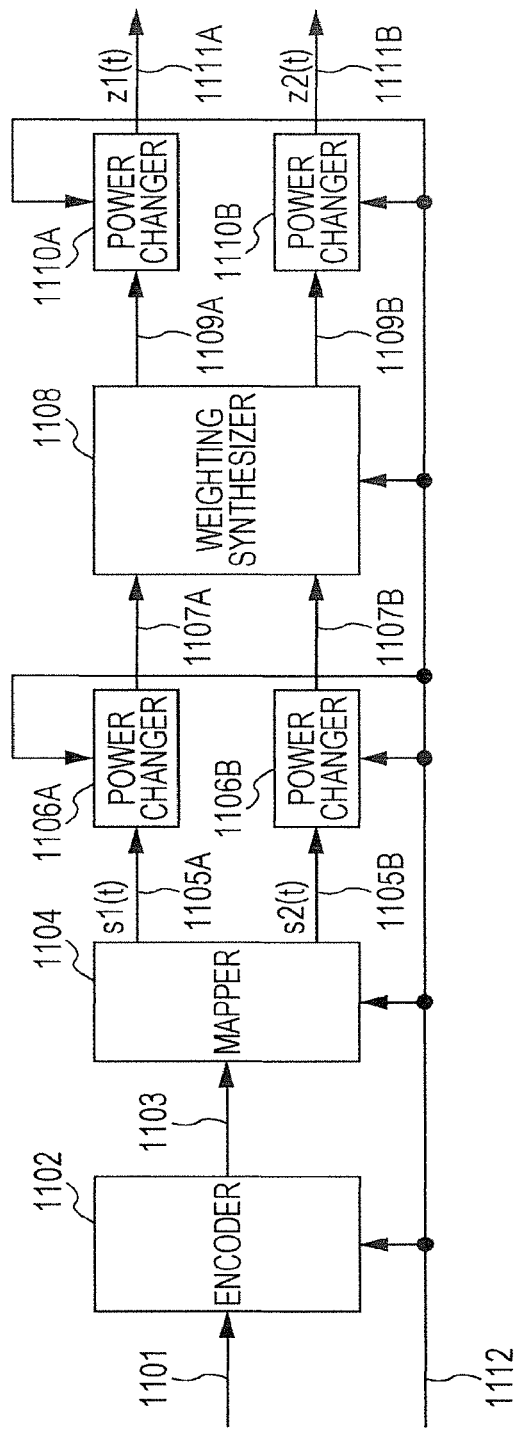
FIG. 9 is a view illustrating an example of a configuration in a case where a transmitting method using an MIMO method is performed.

Encoder 1102 in FIG. 9 receives an input of information 1101, and control signal 1112. Encoder 1102 performs encoding based on information of a coding rate and a code length (block length) contained in control signal 1112. Encoder 1102 outputs encoded data 1103.

Mapper 1104 receives an input of encoded data 1103, and control signal 1112. Then, it is assumed that control signal 1112 specifies transmission of two streams as a transmitting method. In addition, it is assumed that control signal 1112 specifies modulating method α and modulating method β as modulating methods of the two streams, respectively. Note that modulating method α is a modulating method for modulating x-bit data, and modulating method β is a modulating method for modulating y-bit data (for example, the modulating method is a modulating method for modulating 4-bit data in a case of 16QAM (16 Quadrature Amplitude Modulation), and a modulating method for modulating 6-bit data in a case of 64QAM (64 Quadrature Amplitude Modulation)).

Then, mapper 1104 modulates the x-bit data of x+y-bit data by modulating method α, generates and outputs baseband signal $s_1(t)$ (1105A), and also modulates the remaining y-bit data by modulating method β, and outputs baseband signal $s_2(t)$ (1105B) (note that FIG. 9 illustrates one mapper, but as another configuration, there may separately be a mapper for generating $s_1(t)$ and a mapper for generating $s_2(t)$. In this case, encoded data 1103 is sorted to the mapper for generating $s_1(t)$ and the mapper for generating $s_2(t)$).

Note that $s_1(t)$ and $s_2(t)$ are expressed by complex numbers (however, $s_1(t)$ and $s_2(t)$ may be any of complex numbers and actual numbers), and t represents time. Note that when a transmitting method using multi-carriers such as OFDM (Orthogonal Frequency Division Multiplexing) is used, each of $s_1$ and $s_2$ can also be considered as a function of frequency f like $s_1(f)$ and $s_2(f)$ or as a function of time t and frequency f like $s_1(t, f)$ and $s_2(t, f)$.

A baseband signal, a precoding matrix, phase change and the like will be described below as a function of time t, but may be considered as a function of frequency f and a function of time t and frequency f.

Hence, there is also a case where a baseband signal, a precoding matrix, phase change and the like are described as a function of symbol number i. However, in this case, a baseband signal, a precoding matrix, phase change and the like only need to be considered as a function of time t, a function of frequency f and a function of time t and frequency f. That is, a symbol and a baseband signal may be generated and arranged in a time axis direction, and may be generated and arranged in a frequency axis direction. Moreover, a symbol and a baseband signal may be generated and arranged in the time axis direction and the frequency axis direction.

Power changer 1106A (power adjuster 1106A) receives an input of baseband signal $s_1(t)$ (1105A), and control signal 1112. Power changer 1106A sets actual number $P_1$ based on control signal 1112. Power changer 1106A outputs $P_1 \times s_1(t)$ as signal 1107A obtained after power change (note that $P_1$ is assumed to be an actual number, but may be a complex number).

Similarly, power changer 1106B (power adjuster 1106B) receives an input of baseband signal $s_2(t)$ (1105B), and control signal 512. Power changer 1106B sets actual number $P_2$. Power changer 1106B outputs $P_2 \times s_2(t)$ as signal 1107B obtained after power change (note that $P_2$ is assumed to be an actual number, but may be a complex number).

Weighting synthesizer 1108 receives an input of signal 1107A obtained after the power change, signal 1107B obtained after the power change, and control signal 1112. Weighting synthesizer 1108 sets precoding matrix F (or F(i)) based on control signal 1112. Weighting synthesizer 1108 performs the following arithmetic operation, assuming that a slot number (symbol number) is i.

[Equation 1]

$$\begin{pmatrix} u_1(i) \\ u_2(i) \end{pmatrix} = F \begin{pmatrix} P_1 \times s_1(i) \\ P_2 \times s_2(i) \end{pmatrix} = \begin{pmatrix} a(i) & b(i) \\ c(i) & d(i) \end{pmatrix} \begin{pmatrix} P_1 \times s_1(i) \\ P_2 \times s_2(i) \end{pmatrix} = \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix} \quad (1)$$

Here, a(i), b(i), c(i) and d(i) can be expressed by complex numbers (or may be actual numbers), and three or more of a(i), b(i), c(i) and d(i) should not be 0 (zero). Note that a precoding matrix may be a function of i or may not be the function of i. Then, when a precoding matrix is the function of i, the precoding matrices are switched according to a slot number (symbol number).

Then, weighting synthesizer 1108 outputs $u_1(i)$ in equation (1) as signal 1109A obtained after weighting synthesis. Weighting synthesizer 1108 outputs $u_2(i)$ in equation (1) as signal 1109B obtained after the weighting synthesis.

Power changer 1110A receives an input of signal 1109A ($u_1(i)$) obtained after the weighting synthesis, and control signal 512. Power changer 1110A sets actual number $Q_1$ based on control signal 1112. Power changer 1110A outputs $Q_1 \times u_1(t)$ as signal 1111A ($z_1(i)$) obtained after power change (note that $Q_1$ is assumed to be an actual number, but may be a complex number).

Similarly, power changer 1110B receives an input of signal 1109B ($u_2(i)$) obtained after the weighting synthesis, and control signal 1112. Power changer 1110B sets actual number $Q_2$ based on control signal 512. Power changer 1110B outputs $Q_2 \times u_2(t)$ as signal 1111B ($z_2(i)$) obtained after the power change (note that $Q_2$ is assumed to be an actual number, but may be a complex number).

Hence, the following equation holds.

[Equation 2]

$$\begin{pmatrix} z_1(i) \\ z_2(i) \end{pmatrix} = \begin{pmatrix} Q_1 & 0 \\ 0 & Q_2 \end{pmatrix} F \begin{pmatrix} P_1 \times s_1(i) \\ P_2 \times s_2(i) \end{pmatrix} = \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} P_1 \times s_1(i) \\ P_2 \times s_2(i) \end{pmatrix} = \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix} \quad (2)$$

Next, a method for transmitting two streams different from the transmitting method in FIG. 9 will be described with reference to FIG. 10. Note that elements operating in the same way as in FIG. 9 are assigned the same reference numerals in FIG. 10.

Phase changer 1161 receives an input of signal 1109B obtained after weighting synthesis of $u_2(i)$ in equation (1), and control signal 1112. Phase changer 1161 changes a phase of signal 1109B obtained after the weighting synthesis of $u_2(i)$ in equation (1) based on control signal 1112. Hence, a signal obtained after the phase change of signal 1109B obtained after the weighting synthesis of $u_2(i)$ in equation (1) is expressed by $e^{j\theta(i)} \times u_2(i)$. Phase changer 1161 outputs $e^{j\theta(i)} \times u_2(i)$ as signal 1162 obtained after the phase change (j is a unit of an imaginary number). Note that a value of a phase to be changed is a portion characterized by being the function of i like θ(i).

Figure 10:
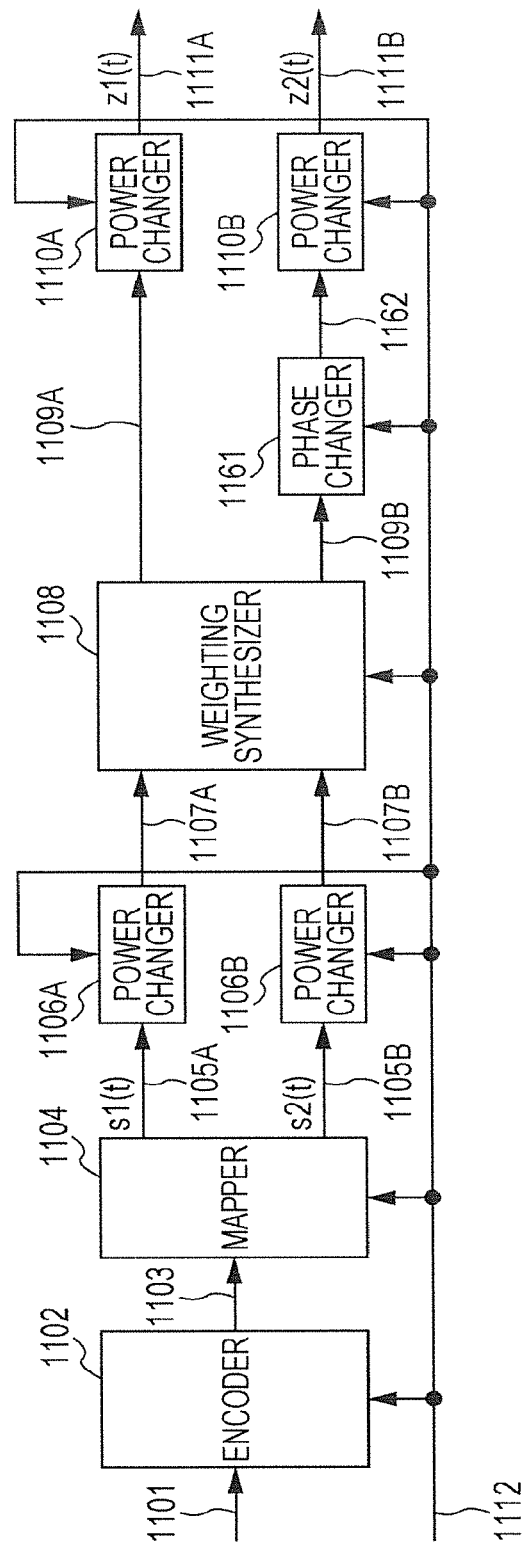
FIG. 10 is a view illustrating an example of a configuration in a case where the transmitting method using the MIMO method is performed.

Then, power changers 1110A and 1110B in FIG. 10 each perform power change of an input signal. Hence, output $z_1(i)$ and output $z_2(i)$ of respective power changers 1110A and 1110B in FIG. 10 are expressed by the following equation.

[Equation 3]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} F \begin{pmatrix} P_1 \times s_1(i) \\ P_2 \times s_2(i) \end{pmatrix} = \quad (3)$$

$$= \begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} P_1 \times s_1(i) \\ P_2 \times s_2(i) \end{pmatrix} =$$

$$= \begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix}$$

Figure 11:
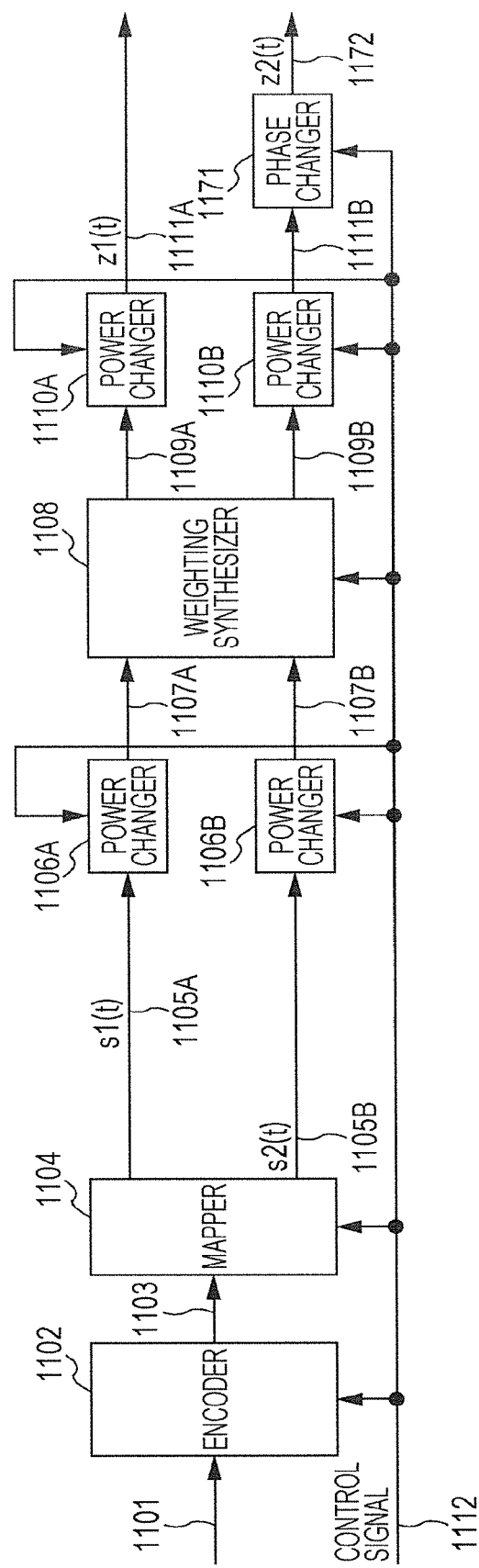
FIG. 11 is a view illustrating an example of a configuration in a case where the transmitting method using the MIMO method is performed.

Note that as a method for realizing equation (3), there is FIG. 11 as a configuration different from the configuration in FIG. 10. A difference between FIGS. 10 and 11 is that the power changer and the phase changers are switched in order. (Functions themselves of changing power and changing phases are not changed.) In this case, $z_1(i)$ and $z_2(i)$ are expressed by the following equation.

[Equation 4]

$$\begin{pmatrix} z_1(i) \\ z_2(i) \end{pmatrix} = \begin{pmatrix} 1 & 0 \\ 0 & e^{j\theta(i)} \end{pmatrix} \begin{pmatrix} Q_1 & 0 \\ 0 & Q_2 \end{pmatrix} F \begin{pmatrix} P_1 \times s_1(i) \\ P_2 \times s_2(i) \end{pmatrix} = \quad (4)$$

$$= \begin{pmatrix} 1 & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} P_1 \times s_1(i) \\ P_2 \times s_2(i) \end{pmatrix} =$$

$$= \begin{pmatrix} 1 & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix}$$

When value $\theta(i)$ of a phase to be changed in equation (3) and equation (4) is set such that, for example, $\theta(i+1)-\theta(i)$ is a fixed value, the receiving apparatus is highly likely to obtain good data reception quality in radio wave propagation environment in which a direct wave is dominant. However, how to give value $\theta(i)$ of a phase to be changed is not limited to this example.

The case where there are some of (or all of) the power changers is described as an example with reference to FIGS. 9 to 11. However, there can also be considered a case where some of the power changers do not exist.

For example, when there are neither power changer 1106A (power adjuster 1106A) nor power changer 1106B (power adjuster 1106B) in FIG. 9, $z_1(i)$ and $z_2(i)$ are expressed as follows.

[Equation 5]

$$\begin{pmatrix} z_1(i) \\ z_2(i) \end{pmatrix} = \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} s_1(i) \\ s_2(i) \end{pmatrix} \quad (5)$$

Moreover, when there are neither power changer 1110A (power adjuster 1110A) nor power changer 1110B (power adjuster 1110B) in FIG. 9, $z_1(i)$ and $z_2(i)$ are expressed as follows.

[Equation 6]

$$\begin{pmatrix} z_1(i) \\ z_2(i) \end{pmatrix} = \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix} \quad (6)$$

Moreover, when there are neither power changer 1106A (power adjuster 1106A), nor power changer 1106B (power adjuster 1106B), nor power changer 1110A (power adjuster 1110A) nor power changer 1110B (power adjuster 1110B) in FIG. 9, $z_1(i)$ and $z_2(i)$ are expressed as follows.

[Equation 7]

$$\begin{pmatrix} z_1(i) \\ z_2(i) \end{pmatrix} = \begin{pmatrix} a(i) & b(i) \\ c(i) & d(i) \end{pmatrix} \begin{pmatrix} s_1(i) \\ s_2(i) \end{pmatrix} \quad (7)$$

Moreover, when there are neither power changer 1106A (power adjuster 1106A) nor power changer 1106B (power adjuster 1106B) in FIG. 10 or 11, $z_1(i)$ and $z_2(i)$ are expressed as follows.

[Equation 8]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} s_1(i) \\ s_2(i) \end{pmatrix} = \quad (8)$$

$$= \begin{pmatrix} 1 & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} s_1(i) \\ s_2(i) \end{pmatrix}$$

Moreover, when there are neither power changer 1110A (power adjuster 1110A) nor power changer 1110B (power adjuster 1110B) in FIG. 10 or 11, $z_1(i)$ and $z_2(i)$ are expressed as follows.

[Equation 9]

$$\begin{pmatrix} z_1(i) \\ z_2(i) \end{pmatrix} = \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} s_1(i) \\ s_2(i) \end{pmatrix} \quad (9)$$

Moreover, when there are neither power changer 1106A (power adjuster 1106A), nor power changer 1106B (power adjuster 1106B), nor power changer 1110A (power adjuster 1110A) nor power changer 1110B (power adjuster 1110B) in FIG. 10 or 11, $z_1(i)$ and $z_2(i)$ are expressed as follows.

[Equation 10]

$$\begin{pmatrix} z_1(i) \\ z_2(i) \end{pmatrix} = \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} s_1(i) \\ s_2(i) \end{pmatrix} \quad (10)$$

Next, a method for transmitting two streams different from the transmitting methods in FIGS. 9 to 11 will be described with reference to FIG. 12. Note that elements operating in the same way as in FIGS. 9 to 11 are assigned the same reference numerals in FIG. 12, and will not be described.

Figure 12:
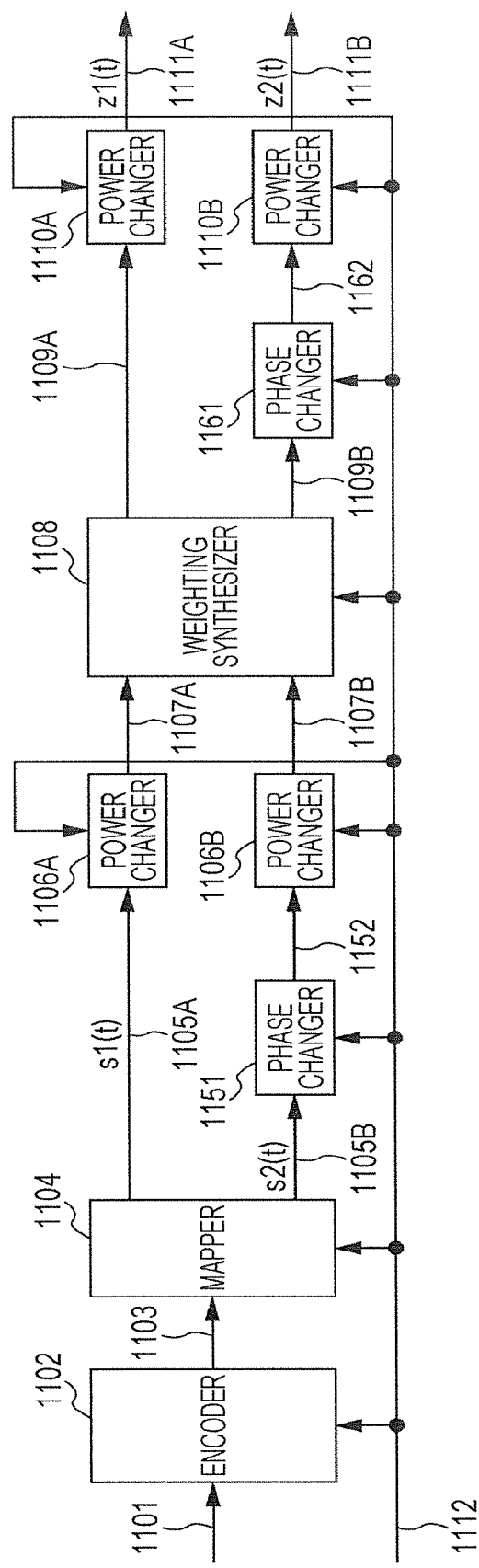
FIG. 12 is a view illustrating an example of a configuration in a case where the transmitting method using the MIMO method is performed.

Characteristic points in FIG. 12 are such that phase changer 1151 is inserted.

Phase changer 1151 receives an input of baseband signal $s_2(i)$ (1105B), and control signal 1112. Phase changer 1151 changes a phase of baseband signal $s_2(i)$ (1105B) based on control signal 1112. In this case, a phase change value is $e^{j\lambda(i)}$ (j is a unit of an imaginary number). Note that a value of a phase to be changed is a portion characterized by being a function of i like $\lambda(i)$.

Then, as considered in the same way as equation (1) to equation (10), $z_1(i)$ and $z_2(i)$ which are output signals in FIG. 12 are expressed by the following equation.

[Equation 11]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} F \begin{pmatrix} P_1 & 0 \\ 0 & P_2 \end{pmatrix} \begin{pmatrix} 1 & 0 \\ 0 & e^{j\theta(i)} \end{pmatrix} \begin{pmatrix} s_1(i) \\ s_2(i) \end{pmatrix} =$$
$$\begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} 1 & 0 \\ 0 & e^{j\theta(i)} \end{pmatrix} \begin{pmatrix} s_1(i) \\ s_2(i) \end{pmatrix}$$ (11)

Note that as a method for realizing equation (11), there is a configuration of switching power changer 1106B and phase changer 1151 in order as a configuration different from the configuration in FIG. 12. (Functions themselves of changing power and changing phases are not changed.) In this case, $z_1(i)$ and $z_2(i)$ are expressed by the following equation.

[Equation 12]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} F \begin{pmatrix} 1 & 0 \\ 0 & e^{j\theta(i)} \end{pmatrix} \begin{pmatrix} P_1 & 0 \\ 0 & P_2 \end{pmatrix} \begin{pmatrix} s_1(i) \\ s_2(i) \end{pmatrix} =$$
$$\begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} 1 & 0 \\ 0 & e^{j\theta(i)} \end{pmatrix} \begin{pmatrix} P_1 & 0 \\ 0 & P_2 \end{pmatrix} \begin{pmatrix} s_1(i) \\ s_2(i) \end{pmatrix}$$ (12)

As a matter of course, $z_1(i)$ of equation (11) and $z_1(i)$ of equation (12) are equal, and $z_2(i)$ of equation (11) and $z_2(i)$ of equation (12) are equal.

Figure 13:
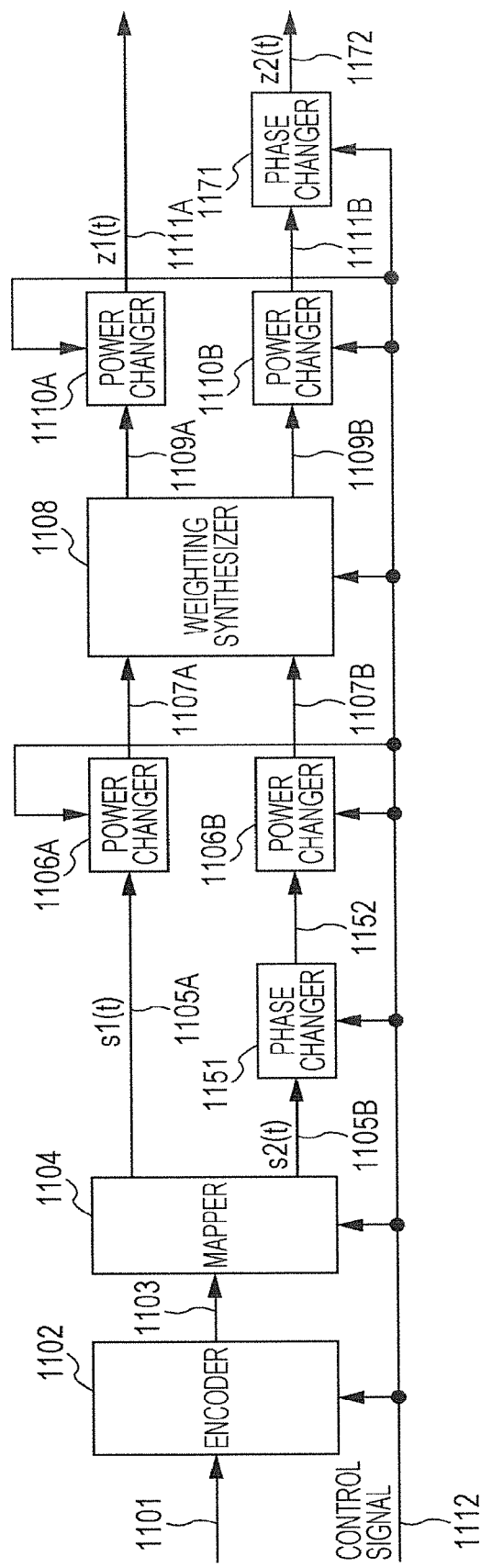
FIG. 13 is a view illustrating an example of a configuration in a case where the transmitting method using the MIMO method is performed.

FIG. 13 is another configuration which can realize the same processing as the processing in FIG. 12. Note that elements operating in the same way as in FIGS. 9 to 12 are assigned the same reference numerals in FIG. 13, and will not be described. Then, a difference between FIGS. 12 and 13 is that order in which power changer 1110B and phase changer 1161 are switched in FIG. 12 is order in FIG. 13 (functions themselves of changing power and changing phases are not changed).

Then, as considered in the same way as equation (1) to equation (12), $z_1(i)$ and $z_2(i)$ which are output signals in FIG. 13 are expressed by the following equation.

[Equation 13]

$$\begin{pmatrix} z_1(i) \\ z_2(i) \end{pmatrix} = \begin{pmatrix} 1 & 0 \\ 0 & e^{j\theta(i)} \end{pmatrix} \begin{pmatrix} Q_1 & 0 \\ 0 & Q_2 \end{pmatrix} F \begin{pmatrix} P_1 & 0 \\ 0 & P_2 \end{pmatrix} \begin{pmatrix} 1 & 0 \\ 0 & e^{j\theta(i)} \end{pmatrix} \begin{pmatrix} s_1(i) \\ s_2(i) \end{pmatrix} =$$
$$\begin{pmatrix} 1 & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} P_1 & 0 \\ 0 & P_2 \end{pmatrix} \begin{pmatrix} 1 & 0 \\ 0 & e^{j\theta(i)} \end{pmatrix} \begin{pmatrix} s_1(i) \\ s_2(i) \end{pmatrix}$$ (13)

Note that as a method for realizing equation (13), there is a configuration of switching power changer 1106B and phase changer 1151 in order as a configuration different from the configuration in FIG. 13. (Functions themselves of changing power and changing phases are not changed). In this case, $z_1(i)$ and $z_2(i)$ are expressed by the following equation.

[Equation 14]

$$\begin{pmatrix} z_1(i) \\ z_2(i) \end{pmatrix} = \begin{pmatrix} 1 & 0 \\ 0 & e^{j\theta(i)} \end{pmatrix} \begin{pmatrix} Q_1 & 0 \\ 0 & Q_2 \end{pmatrix} F \begin{pmatrix} 1 & 0 \\ 0 & e^{j\lambda(i)} \end{pmatrix} \begin{pmatrix} P_1 & 0 \\ 0 & P_2 \end{pmatrix} \begin{pmatrix} s_1(i) \\ s_2(i) \end{pmatrix}$$ (14)
$$= \begin{pmatrix} 1 & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} 1 & 0 \\ 0 & e^{j\lambda(i)} \end{pmatrix}$$
$$\begin{pmatrix} P_1 & 0 \\ 0 & P_2 \end{pmatrix} \begin{pmatrix} s_1(i) \\ s_2(i) \end{pmatrix}$$

As a matter of course, $z_1(i)$ of equation (11), $z_1(i)$ of equation (12), $z_1(i)$ of equation (13) and $z_1(i)$ of equation (14) are equal, and $z_2(i)$ of equation (11), $z_2(i)$ of equation (12), $z_2(i)$ of equation (13) and $z_2(i)$ of equation (14) are equal.

Next, a method for transmitting two streams different from the transmitting methods in FIGS. 9 to 13 will be described with reference to FIG. 14. Note that elements operating in the same way as in FIGS. 9 to 13 are assigned the same reference numerals in FIG. 14, and will not be described.

Figure 14:
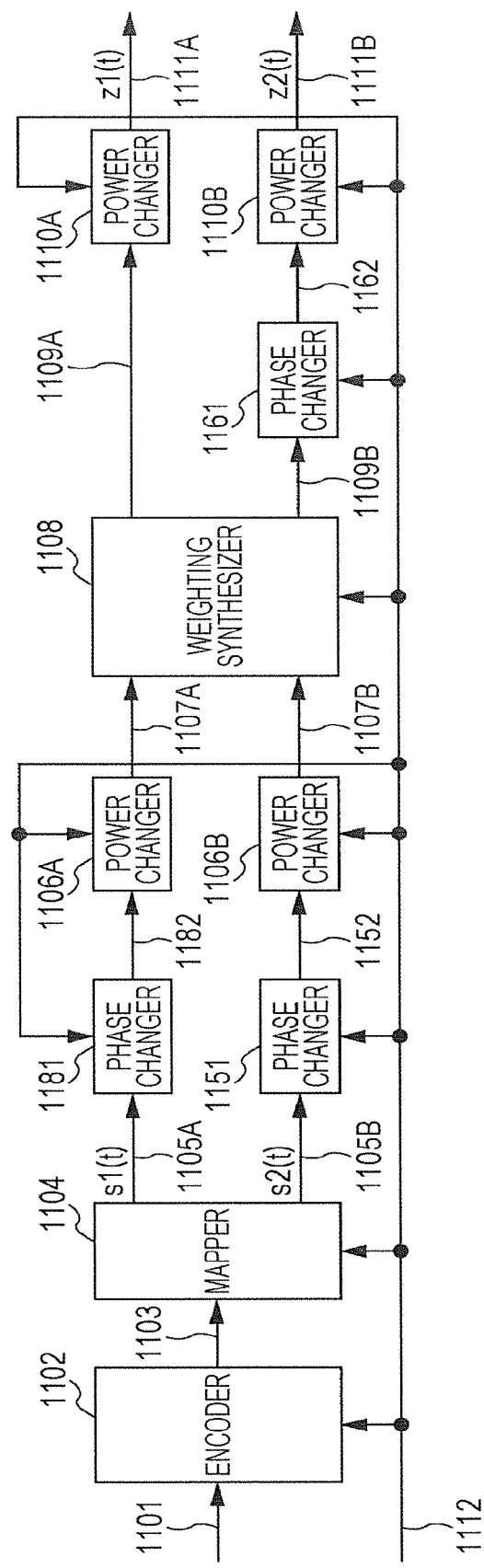
FIG. 14 is a view illustrating an example of a configuration in a case where the transmitting method using the MIMO method is performed.

Characteristic points in FIG. 14 are such that phase changer 1181 and phase changer 1151 are inserted.

Phase changer 1151 receives an input of baseband signal $s_2(i)$ (1105B), and control signal 1112. Phase changer 1151 changes a phase of baseband signal $s_2(i)$ (1105B) based on control signal 1112. In this case, a phase change value is $e^{j\lambda(i)}$ (j is a unit of an imaginary number). Note that a value of a phase to be changed is a portion characterized by being a function of i like $\lambda(i)$.

Moreover, phase changer 1181 receives an input of baseband signal $s_1(i)$ (1105A), and control signal 1112. Phase changer 1181 changes a phase of baseband signal $s_1(i)$ (1105A) based on control signal 1112. In this case, a phase change value is $e^{j\delta(i)}$ is a unit of an imaginary number). Note that a value of a phase to be changed is a portion characterized by being a function of i like $\delta(i)$.

Then, as considered in the same way as equation (1) to equation (14), $z_1(i)$ and $z_2(i)$ which are output signals in FIG. 14 are expressed by the following equation.

[Equation 15]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} F \begin{pmatrix} P_1 & 0 \\ 0 & P_2 \end{pmatrix} \begin{pmatrix} e^{j\delta(i)} & 0 \\ 0 & e^{j\lambda(i)} \end{pmatrix} \begin{pmatrix} s_1(i) \\ s_2(i) \end{pmatrix}$$ (15)
$$= \begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} P_1 & 0 \\ 0 & P_2 \end{pmatrix}$$
$$\begin{pmatrix} e^{j\delta(i)} & 0 \\ 0 & e^{j\lambda(i)} \end{pmatrix} \begin{pmatrix} s_1(i) \\ s_2(i) \end{pmatrix}$$

Note that as a method for realizing equation (15), there is a configuration of switching power changer 1106B and phase changer 1151 in order and of switching power changer 1106A and phase changer 1181 in order as a configuration different from the configuration in FIG. 14. (Functions themselves of changing power and changing phases are not changed). In this case, $z_1(i)$ and $z_2(i)$ are expressed by the following equation.

[Equation 16]

$$\begin{pmatrix} z_1(i) \\ z_2(i) \end{pmatrix} = \begin{pmatrix} Q_1 & 0 \\ 0 & Q_2 \end{pmatrix} \begin{pmatrix} 1 & 0 \\ 0 & e^{j\theta(i)} \end{pmatrix} F \begin{pmatrix} e^{j\delta(i)} & 0 \\ 0 & e^{j\lambda(i)} \end{pmatrix} \begin{pmatrix} P_1 & 0 \\ 0 & P_2 \end{pmatrix} \begin{pmatrix} s_1(i) \\ s_2(i) \end{pmatrix}$$ (16)
$$= \begin{pmatrix} Q_1 & 0 \\ 0 & Q_2 \end{pmatrix} \begin{pmatrix} 1 & 0 \\ 0 & e^{j\theta(i)} \end{pmatrix} \begin{pmatrix} a(i) & b(i) \\ c(i) & d(i) \end{pmatrix} \begin{pmatrix} e^{j\delta(i)} & 0 \\ 0 & e^{j\lambda(i)} \end{pmatrix}$$
$$\begin{pmatrix} P_1 & 0 \\ 0 & P_2 \end{pmatrix} \begin{pmatrix} s_1(i) \\ s_2(i) \end{pmatrix}$$

As a matter of course, $z_1(i)$ of equation (15) and $z_1(i)$ of equation (16) are equal, and $z_2(i)$ of equation (15) and $z_2(i)$ of equation (16) are equal.

Figure 15:
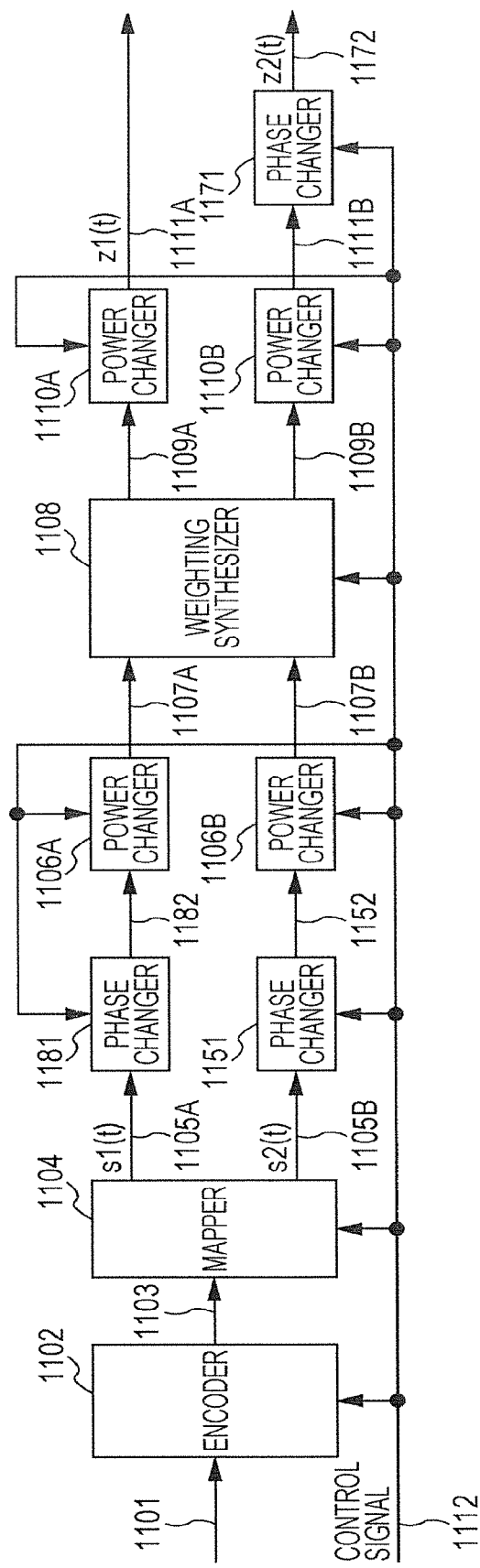
FIG. 15 is a view illustrating an example of a configuration in a case where the transmitting method using the MIMO method is performed.

FIG. 15 is another configuration which can realize the same processing as the processing in FIG. 14. Note that elements operating in the same way as in FIGS. 9 to 14 are assigned the same reference numerals in FIG. 15, and will not be described. Then, a difference between FIGS. 14 and 15 is that order in which power changer 1110B and phase changer 1161 are switched in FIG. 14 is order in FIG. 15 (functions themselves of changing power and changing phases are not changed).

Then, as considered in the same way as equation (1) to equation (16), $z_1(i)$ and $z_2(i)$ which are output signals in FIG. 15 are expressed by the following equation.

[Equation 17]

$$\begin{pmatrix}z_1(i)\\z_2(i)\end{pmatrix}=\begin{pmatrix}1 & 0\\0 & e^{j\theta(i)}\end{pmatrix}\begin{pmatrix}Q_1 & 0\\0 & Q_2\end{pmatrix}F\begin{pmatrix}P_1 & 0\\0 & P_2\end{pmatrix}\begin{pmatrix}e^{j\delta(i)} & 0\\0 & e^{j\lambda(i)}\end{pmatrix}\begin{pmatrix}s_1(i)\\s_2(i)\end{pmatrix} \quad (17)$$
$$=\begin{pmatrix}1 & 0\\0 & e^{j\theta(i)}\end{pmatrix}\begin{pmatrix}Q_1 & 0\\0 & Q_2\end{pmatrix}\begin{pmatrix}a(i) & b(i)\\c(i) & d(i)\end{pmatrix}\begin{pmatrix}P_1 & 0\\0 & P_2\end{pmatrix}$$
$$\begin{pmatrix}e^{j\delta(i)} & 0\\0 & e^{j\lambda(i)}\end{pmatrix}\begin{pmatrix}s_1(i)\\s_2(i)\end{pmatrix}$$

Note that as a method for realizing equation (17), there is a configuration of switching power changer 1106B and phase changer 1151 in order and of switching power changer 1106A and phase changer 1181 in order as a configuration different from the configuration in FIG. 15. (Functions themselves of changing power and changing phases are not changed.) In this case, $z_1(i)$ and $z_2(i)$ are expressed by the following equation.

[Equation 18]

$$\begin{pmatrix}z_1(i)\\z_2(i)\end{pmatrix}=\begin{pmatrix}1 & 0\\0 & e^{j\theta(i)}\end{pmatrix}\begin{pmatrix}Q_1 & 0\\0 & Q_2\end{pmatrix}F\begin{pmatrix}e^{j\delta(i)} & 0\\0 & e^{j\lambda(i)}\end{pmatrix}\begin{pmatrix}P_1 & 0\\0 & P_2\end{pmatrix}\begin{pmatrix}s_1(i)\\s_2(i)\end{pmatrix} \quad (18)$$
$$=\begin{pmatrix}1 & 0\\0 & e^{j\theta(i)}\end{pmatrix}\begin{pmatrix}Q_1 & 0\\0 & Q_2\end{pmatrix}\begin{pmatrix}a(i) & b(i)\\c(i) & d(i)\end{pmatrix}\begin{pmatrix}e^{j\delta(i)} & 0\\0 & e^{j\lambda(i)}\end{pmatrix}$$
$$\begin{pmatrix}P_1 & 0\\0 & P_2\end{pmatrix}\begin{pmatrix}s_1(i)\\s_2(i)\end{pmatrix}$$

As a matter of course, $z_1(i)$ of equation (15), $z_1(i)$ of equation (16), $z_1(i)$ of equation (17) and $z_1(i)$ of equation (18) are equal, and $z_2(i)$ of equation (15), $z_2(i)$ of equation (16), $z_2(i)$ of equation (17) and $z_2(i)$ of equation (18) are equal.

Next, a method for transmitting two streams different from the transmitting methods in FIGS. 9 to 15 will be described with reference to FIG. 16. Note that elements operating in the same way as in FIGS. 9 to 15 are assigned the same reference numerals in FIG. 16, and will not be described.

Figure 16:
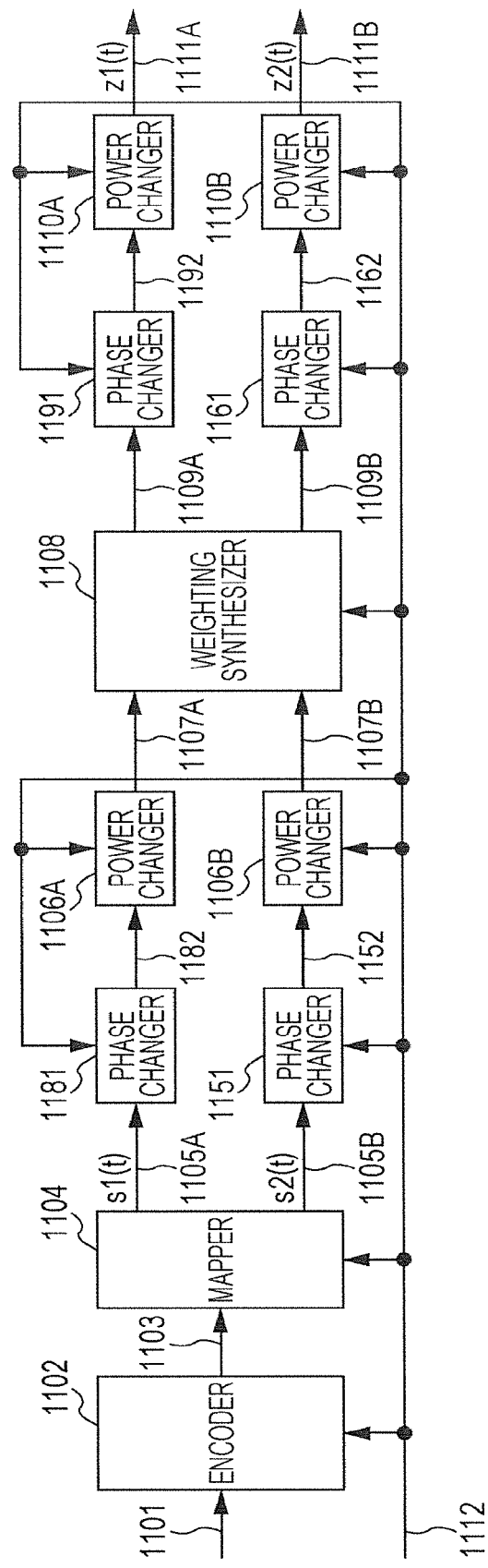
FIG. 16 is a view illustrating an example of a configuration in a case where the transmitting method using the MIMO method is performed.

Characteristic points in FIG. 16 are such that phase changer 1181, phase changer 1151, phase changer 1110A and phase changer 1110B are inserted.

Phase changer 1151 receives an input of baseband signal $s_2(i)$ (1105B), and control signal 1112. Phase changer 1151 changes a phase of baseband signal $s_2(i)$ (1105B) based on control signal 1112. In this case, a phase change value is $e^{j\lambda(i)}$ (j is a unit of an imaginary number). Note that a value of a phase to be changed is a portion characterized by being a function of i like $\lambda(i)$.

Moreover, phase changer 1181 receives an input of baseband signal $s_1(i)$ (1105A), and control signal 1112. Phase changer 1181 changes a phase of baseband signal $s_1(i)$ (1105A) based on control signal 1112. In this case, a phase change value is $e^{j\delta(i)}$ is a unit of an imaginary number). Note that a value of a phase to be changed is a portion characterized by being a function of i like $\lambda(i)$.

Phase changer 1161 performs phase change on an input signal. A phase change value in this case is $\theta(i)$. Similarly, phase changer 1191 performs phase change on an input signal. A phase change value in this case is $\omega(i)$.

Then, as considered in the same way as equation (1) to equation (18), $z_1(i)$ and $z_2(i)$ which are output signals in FIG. 16 are expressed by the following equation.

[Equation 19]

$$\begin{pmatrix}z_1(i)\\z_2(i)\end{pmatrix}=\begin{pmatrix}Q_1 & 0\\0 & Q_2\end{pmatrix}\begin{pmatrix}e^{j\omega(i)} & 0\\0 & e^{j\theta(i)}\end{pmatrix}F\begin{pmatrix}P_1 & 0\\0 & P_2\end{pmatrix}\begin{pmatrix}e^{j\delta(i)} & 0\\0 & e^{j\lambda(i)}\end{pmatrix}\begin{pmatrix}s_1(i)\\s_2(i)\end{pmatrix} \quad (19)$$
$$=\begin{pmatrix}Q_1 & 0\\0 & Q_2\end{pmatrix}\begin{pmatrix}e^{j\omega(i)} & 0\\0 & e^{j\theta(i)}\end{pmatrix}\begin{pmatrix}a(i) & b(i)\\c(i) & d(i)\end{pmatrix}\begin{pmatrix}P_1 & 0\\0 & P_2\end{pmatrix}\begin{pmatrix}e^{j\delta(i)} & 0\\0 & e^{j\lambda(i)}\end{pmatrix}$$
$$\begin{pmatrix}s_1(i)\\s_2(i)\end{pmatrix}$$

Note that as a method for realizing equation (19), there is a configuration of switching power changer 1106B and phase changer 1151 in order and of switching power changer 1106A and phase changer 1181 in order as a configuration different from the configuration in FIG. 16. (Functions themselves of changing power and changing phases are not changed.) In this case, $z_1(i)$ and $z_2(i)$ are expressed by the following equation.

[Equation 20]

$$\begin{pmatrix}z_1(i)\\z_2(i)\end{pmatrix}=\begin{pmatrix}Q_1 & 0\\0 & Q_2\end{pmatrix}\begin{pmatrix}e^{j\omega(i)} & 0\\0 & e^{j\theta(i)}\end{pmatrix}F\begin{pmatrix}e^{j\delta(i)} & 0\\0 & e^{j\lambda(i)}\end{pmatrix}\begin{pmatrix}P_1 & 0\\0 & P_2\end{pmatrix}\begin{pmatrix}s_1(i)\\s_2(i)\end{pmatrix} \quad (20)$$
$$=\begin{pmatrix}Q_1 & 0\\0 & Q_2\end{pmatrix}\begin{pmatrix}e^{j\omega(i)} & 0\\0 & e^{j\theta(i)}\end{pmatrix}\begin{pmatrix}a(i) & b(i)\\c(i) & d(i)\end{pmatrix}\begin{pmatrix}e^{j\delta(i)} & 0\\0 & e^{j\lambda(i)}\end{pmatrix}\begin{pmatrix}P_1 & 0\\0 & P_2\end{pmatrix}$$
$$\begin{pmatrix}s_1(i)\\s_2(i)\end{pmatrix}$$

As a matter of course, $z_1(i)$ of equation (19) and $z_1(i)$ of equation (20) are equal, and $z_2(i)$ of equation (19) and $z_2(i)$ of equation (20) are equal.

Figure 17:
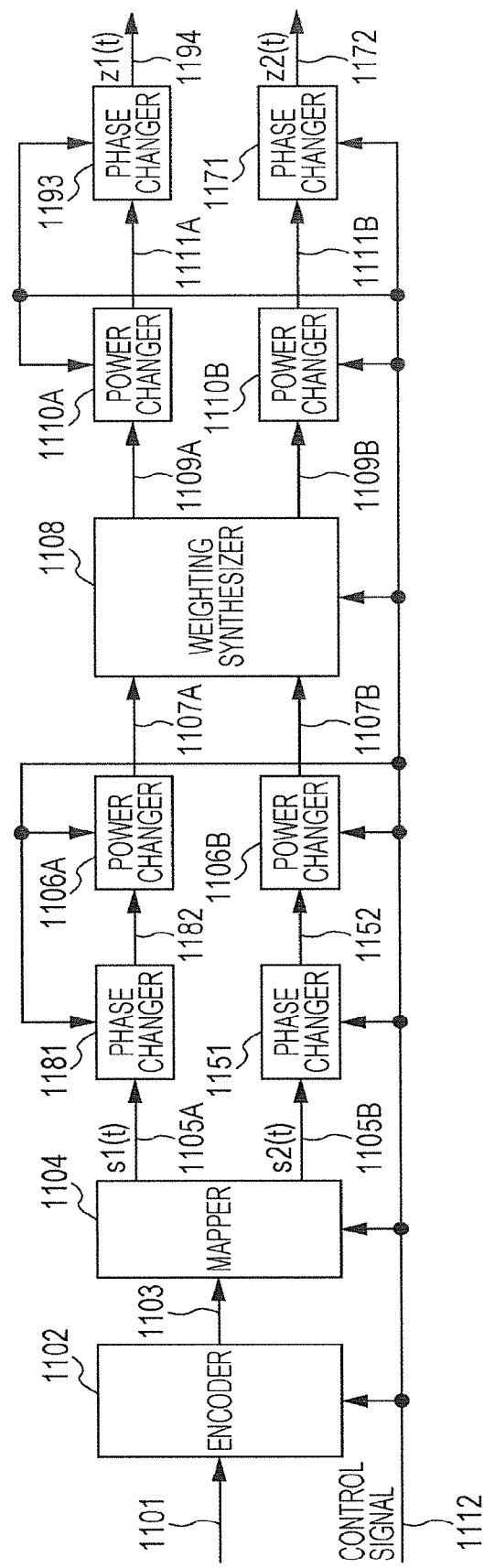
FIG. 17 is a view illustrating an example of a configuration in a case where the transmitting method using the MIMO method is performed.

FIG. 17 is another configuration which can realize the same processing as the processing in FIG. 16. Note that elements operating in the same way as in FIGS. 9 to 16 are assigned the same reference numerals in FIG. 17, and will not be described. Then, a difference between FIGS. 16 and 17 is that order in which power changer 1110B and phase changer 1161 are switched in FIG. 14 and order in which power changer 1110A and phase changer 1191 are switched in FIG. 14 are order in FIG. 17 (functions themselves of changing power and changing phases are not changed).

Then, as considered in the same way as equation (1) to equation (20), $z_1(i)$ and $z_2(i)$ which are output signals in FIG. 17 are expressed by the following equation.

[Equation 21]

$$\begin{pmatrix}z_1(i)\\z_2(i)\end{pmatrix}=\begin{pmatrix}e^{j\omega(i)} & 0\\0 & e^{j\theta(i)}\end{pmatrix}\begin{pmatrix}Q_1 & 0\\0 & Q_2\end{pmatrix}F\begin{pmatrix}P_1 & 0\\0 & P_2\end{pmatrix}\begin{pmatrix}e^{j\delta(i)} & 0\\0 & e^{j\lambda(i)}\end{pmatrix}\begin{pmatrix}s_1(i)\\s_2(i)\end{pmatrix} \quad (21)$$
$$=\begin{pmatrix}e^{j\omega(i)} & 0\\0 & e^{j\theta(i)}\end{pmatrix}\begin{pmatrix}Q_1 & 0\\0 & Q_2\end{pmatrix}\begin{pmatrix}a(i) & b(i)\\c(i) & d(i)\end{pmatrix}\begin{pmatrix}P_1 & 0\\0 & P_2\end{pmatrix}$$
$$\begin{pmatrix}e^{j\delta(i)} & 0\\0 & e^{j\lambda(i)}\end{pmatrix}\begin{pmatrix}s_1(i)\\s_2(i)\end{pmatrix}$$

Note that as a method for realizing equation (21), there is a configuration of switching power changer 1106B and phase changer 1151 in order and of switching power changer 1106A and phase changer 1181 in order as a configuration different from the configuration in FIG. 17. (Functions themselves of changing power and changing phases are not changed.) In this case, $z_1(i)$ and $z_2(i)$ are expressed by the following equation.

[Equation 22]

$$\begin{pmatrix} z_1(i) \\ z_2(i) \end{pmatrix} = \begin{pmatrix} e^{j\omega(i)} & 0 \\ 0 & e^{j\theta(i)} \end{pmatrix} \begin{pmatrix} Q_1 & 0 \\ 0 & Q_2 \end{pmatrix} F \begin{pmatrix} e^{j\delta(i)} & 0 \\ 0 & e^{j\lambda(i)} \end{pmatrix} \begin{pmatrix} P_1 & 0 \\ 0 & P_2 \end{pmatrix} \begin{pmatrix} s_1(i) \\ s_2(i) \end{pmatrix} \quad (22)$$

$$= \begin{pmatrix} e^{j\omega(i)} & 0 \\ 0 & e^{j\theta(i)} \end{pmatrix} \begin{pmatrix} Q_1 & 0 \\ 0 & Q_2 \end{pmatrix} \begin{pmatrix} a(i) & b(i) \\ c(i) & d(i) \end{pmatrix} \begin{pmatrix} e^{j\delta(i)} & 0 \\ 0 & e^{j\lambda(i)} \end{pmatrix}$$

$$\begin{pmatrix} P_1 & 0 \\ 0 & P_2 \end{pmatrix} \begin{pmatrix} s_1(i) \\ s_2(i) \end{pmatrix}$$

As a matter of course, $z_1(i)$ of equation (19), $z_1(i)$ of equation (20), $z_1(i)$ of equation (21) and $z_1(i)$ of equation (22) are equal, and $z_2(i)$ of equation (19), $z_2(i)$ of equation (20), $z_2(i)$ of equation (21) and $z_2(i)$ of equation (22) are equal.

Matrix F for weighting synthesis (precoding) is described above. However, each exemplary embodiment herein can also be carried out by using precoding matrix F (or F(i)) described below.

[Equation 23]

$$F = \begin{pmatrix} \beta \times e^{j0} & \beta \times \alpha \times e^{j0} \\ \beta \times \alpha \times e^{j0} & \beta \times e^{j\pi} \end{pmatrix} \text{ or } \quad (23)$$

[Equation 24]

$$F = \frac{1}{\sqrt{\alpha^2+1}} \begin{pmatrix} e^{j0} & \alpha \times e^{j0} \\ \alpha \times e^{j0} & e^{j\pi} \end{pmatrix} \text{ or } \quad (24)$$

[Equation 25]

$$F = \begin{pmatrix} \beta \times e^{j0} & \beta \times \alpha \times e^{j\pi} \\ \beta \times \alpha \times e^{j0} & \beta \times e^{j0} \end{pmatrix} \text{ or } \quad (25)$$

[Equation 26]

$$F = \frac{1}{\sqrt{\alpha^2+1}} \begin{pmatrix} e^{j0} & \alpha \times e^{j\pi} \\ \alpha \times e^{j0} & e^{j0} \end{pmatrix} \text{ or } \quad (26)$$

[Equation 27]

$$F = \begin{pmatrix} \beta \times \alpha \times e^{j0} & \beta \times e^{j\pi} \\ \beta \times e^{j0} & \beta \times \alpha \times e^{j0} \end{pmatrix} \text{ or } \quad (27)$$

[Equation 28]

$$F = \frac{1}{\sqrt{\alpha^2+1}} \begin{pmatrix} \alpha \times e^{j0} & e^{j\pi} \\ e^{j0} & \alpha \times e^{j0} \end{pmatrix} \text{ or } \quad (28)$$

[Equation 29]

$$F = \begin{pmatrix} \beta \times \alpha \times e^{j0} & \beta \times e^{j0} \\ \beta \times e^{j0} & \beta \times \alpha \times e^{j\pi} \end{pmatrix} \text{ or } \quad (29)$$

[Equation 30]

$$F = \frac{1}{\sqrt{\alpha^2+1}} \begin{pmatrix} \alpha \times e^{j0} & e^{j0} \\ e^{j0} & \alpha \times e^{j\pi} \end{pmatrix} \quad (30)$$

Note that in equation (23), equation (24), equation (25), equation (26), equation (27), equation (28), equation (29), and equation (30), α may be an actual number or may be an imaginary number, and β may be an actual number or may be an imaginary number. However, α is not 0 (zero). Then, β is not 0 (zero), either.

Alternatively

[Equation 31]

$$F = \begin{pmatrix} \beta \times \cos\theta & \beta \times \sin\theta \\ \beta \times \sin\theta & -\beta \times \cos\theta \end{pmatrix} \text{ or } \quad (31)$$

[Equation 32]

$$F = \begin{pmatrix} \cos\theta & \sin\theta \\ \sin\theta & -\cos\theta \end{pmatrix} \text{ or } \quad (32)$$

[Equation 33]

$$F = \begin{pmatrix} \beta \times \cos\theta & -\beta \times \sin\theta \\ \beta \times \sin\theta & \beta \times \cos\theta \end{pmatrix} \text{ or } \quad (33)$$

[Equation 34]

$$F = \begin{pmatrix} \cos\theta & -\sin\theta \\ \sin\theta & \cos\theta \end{pmatrix} \text{ or } \quad (34)$$

[Equation 35]

$$F = \begin{pmatrix} \beta \times \sin\theta & -\beta \times \cos\theta \\ \beta \times \cos\theta & \beta \times \sin\theta \end{pmatrix} \text{ or } \quad (35)$$

[Equation 36]

$$F = \begin{pmatrix} \sin\theta & -\cos\theta \\ \cos\theta & \sin\theta \end{pmatrix} \text{ or } \quad (36)$$

[Equation 37]

$$F = \begin{pmatrix} \beta \times \sin\theta & \beta \times \cos\theta \\ \beta \times \cos\theta & -\beta \times \sin\theta \end{pmatrix} \text{ or } \quad (37)$$

[Equation 38]

$$F = \begin{pmatrix} \sin\theta & \cos\theta \\ \cos\theta & -\sin\theta \end{pmatrix} \quad (38)$$

Note that in equation (31), equation (33), equation (35) and equation (37), β may be an actual number or may be an imaginary number. However, β is not 0 (zero).

Alternatively

[Equation 39]

$$F(i) = \begin{pmatrix} \beta \times e^{j\theta_{11}(i)} & \beta \times \alpha \times e^{j(\theta_{11}(i)+\lambda)} \\ \beta \times \alpha \times e^{j\theta_{21}(i)} & \beta \times e^{j(\theta_{21}(i)+\lambda+\pi)} \end{pmatrix} \text{ or } \quad (39)$$

[Equation 40]

$$F(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \text{ or } \quad (40)$$

[Equation 41]

$$F(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \text{ or } \quad (41)$$

[Equation 42]

$$F(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix} \text{ or } \quad (42)$$

[Equation 43]

$$F(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times e^{j(\theta_{21}+\lambda(i)+\pi)} \end{pmatrix} \text{ or } \quad (43)$$

-continued

[Equation 44]
$$F(i) = \frac{1}{\sqrt{\alpha^2+1}}\begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix} \text{ or } \quad (44)$$

[Equation 45]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \text{ or } \quad (45)$$

[Equation 46]
$$F(i) = \frac{1}{\sqrt{\alpha^2+1}}\begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix} \text{ or } \quad (46)$$

[Equation 47]
$$F(i) = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \text{ or } \quad (47)$$

[Equation 48]
$$F(i) = \frac{1}{\sqrt{\alpha^2+1}}\begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \text{ or } \quad (48)$$

[Equation 49]
$$F(i) = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix} \text{ or } \quad (49)$$

[Equation 50]
$$F(i) = \frac{1}{\sqrt{\alpha^2+1}}\begin{pmatrix} \alpha \times e^{j\theta_{21}} & e^{j(\theta_{21}+\lambda+\pi)} \\ e^{j\theta_{11}} & \alpha \times e^{j(\theta_{11}+\lambda)} \end{pmatrix} \quad (50)$$

Here, each of $\theta_{11}(i)$, $\theta_{21}(i)$ and $\lambda(i)$ is a function of i (a function of time, a function of a frequency or a function of time and a frequency), $\lambda$ is a fixed value, $\alpha$ may be an actual number or may be an imaginary number, and $\beta$ may be an actual number or may be an imaginary number. However, $\alpha$ is not 0 (zero). Then, $\beta$ is not 0 (zero), either.

Alternatively

[Equation 51]
$$F = \begin{pmatrix} \beta & 0 \\ 0 & \beta \end{pmatrix} \text{ or } \quad (51)$$

[Equation 52]
$$F = \begin{pmatrix} \beta & 0 \\ 0 & -\beta \end{pmatrix} \text{ or } \quad (52)$$

[Equation 53]
$$F = \begin{pmatrix} \beta & 0 \\ 0 & \beta \times e^{j\theta(i)} \end{pmatrix} \text{ or } \quad (53)$$

[Equation 54]
$$F = \begin{pmatrix} \beta & 0 \\ 0 & -\beta \times e^{j\theta(i)} \end{pmatrix} \text{ or } \quad (54)$$

[Equation 55]
$$F = \begin{pmatrix} -\beta & 0 \\ 0 & \beta \times e^{j\theta(i)} \end{pmatrix} \quad (55)$$

Here, $\theta(i)$ is a function of i (a function of time, a function of a frequency or a function of time and a frequency), and $\beta$ may be an actual number or may be an imaginary number. However, $\beta$ is not 0 (zero), either.

Moreover, each exemplary embodiment herein can also be carried out by using a precoding matrix other than these matrices.

In addition, there may be a method for performing precoding without performing the above-described phase change, to generate a modulated signal and transmit the modulated signal from the transmitting apparatus. In this case, there can be considered an example where $z_1(i)$ and $z_2(i)$ are expressed by the following equation.

[Equation 56]
$$\begin{pmatrix} z_1(i) \\ z_2(i) \end{pmatrix} = \begin{pmatrix} Q_1 & 0 \\ 0 & Q_2 \end{pmatrix} F \begin{pmatrix} P_1 & 0 \\ 0 & P_2 \end{pmatrix} \begin{pmatrix} s_1(i) \\ s_2(i) \end{pmatrix} \quad (56)$$

[Equation 57]
$$\begin{pmatrix} z_1(i) \\ z_2(i) \end{pmatrix} = \begin{pmatrix} Q_1 & 0 \\ 0 & Q_2 \end{pmatrix} F \begin{pmatrix} P_1 & 0 \\ 0 & P_2 \end{pmatrix} \begin{pmatrix} s_1(i) \\ s_2(i) \end{pmatrix} \quad (57)$$

[Equation 58]
$$\begin{pmatrix} z_1(i) \\ z_2(i) \end{pmatrix} = F \begin{pmatrix} P_1 & 0 \\ 0 & P_2 \end{pmatrix} \begin{pmatrix} s_1(i) \\ s_2(i) \end{pmatrix} \quad (58)$$

[Equation 59]
$$\begin{pmatrix} z_1(i) \\ z_2(i) \end{pmatrix} = \begin{pmatrix} Q_1 & 0 \\ 0 & Q_2 \end{pmatrix} F \begin{pmatrix} s_1(i) \\ s_2(i) \end{pmatrix} \quad (59)$$

[Equation 60]
$$\begin{pmatrix} z_1(i) \\ z_2(i) \end{pmatrix} = F \begin{pmatrix} s_1(i) \\ s_2(i) \end{pmatrix} \quad (60)$$

Then, $z_1(i)$ (or $z_1(i)$ of equation (56), $z_1(i)$ of equation (57), $z_1(i)$ of equation (58), $z_1(i)$ of equation (59) or $z_1(i)$ of equation (60)) obtained in FIGS. 9 to 17 corresponds to 113_1 in FIG. 1. $z_2(i)$ (or $z_2(i)$ of equation (56), $z_2(i)$ of equation (57), $z_2(i)$ of equation (58), $z_2(i)$ of equation (59) or $z_2(i)$ of equation (60)) obtained in FIGS. 9 to 17 corresponds to 113_2 in FIG. 1.

FIGS. 18 to 22 illustrate examples of a method for arranging $z_1(i)$ and $z_2(i)$ generated in FIGS. 9 to 17.

Figure 18:
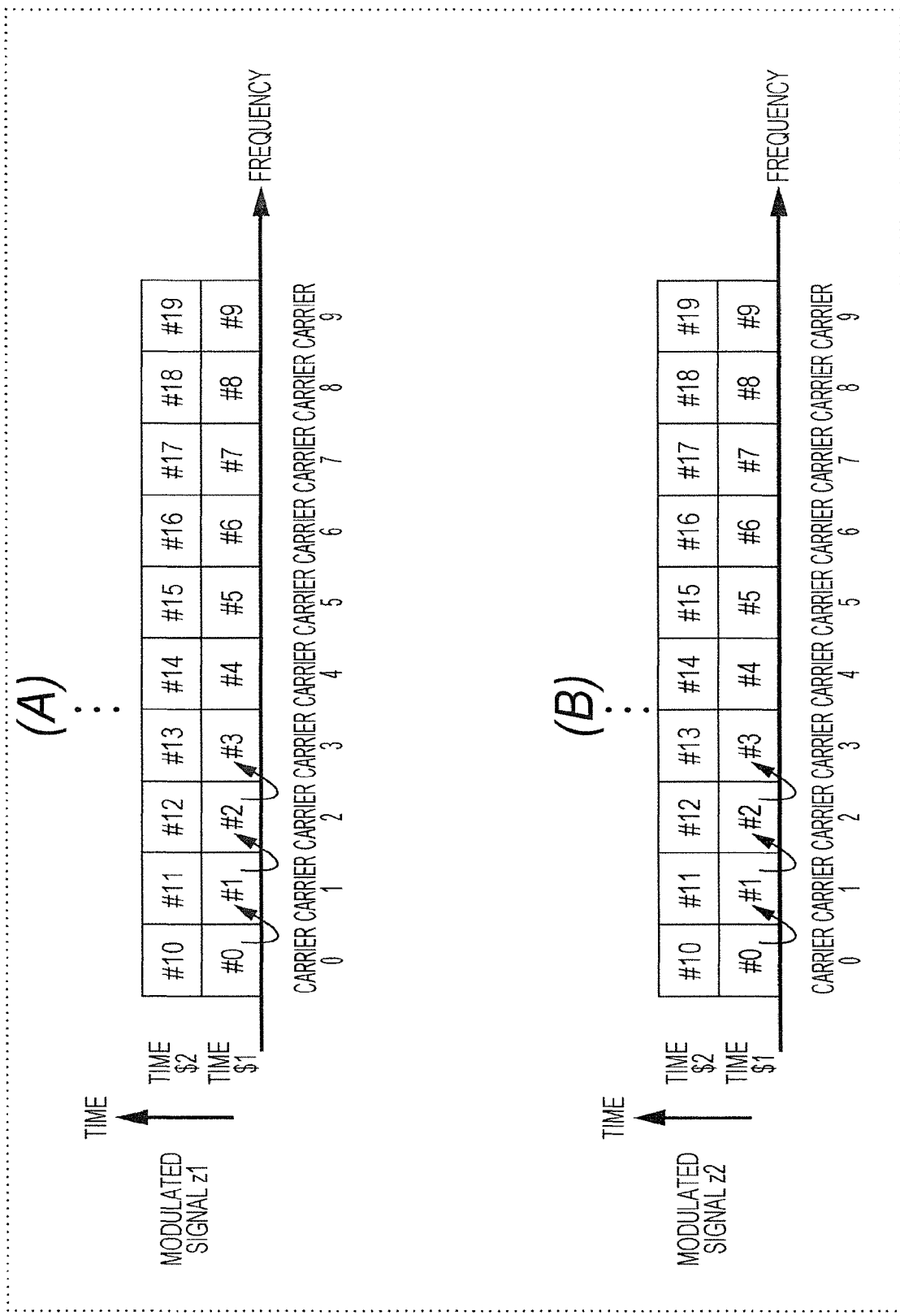
FIG. 18 is a view illustrating an example of a symbol arranging method.

Part (A) of FIG. 18 illustrates a method for arranging $z_1(i)$, and (B) of FIG. 18 illustrates a method for arranging $z_2(i)$. In each of (A) and (B) of FIG. 18, a vertical axis indicates time, and a horizontal axis indicates a frequency.

Part (A) of FIG. 18 will be described. First, when $z_1(0)$, $z_1(1)$, $z_1(2)$, $z_1(3)$, ... corresponding to i=0, 1, 2, 3, ... are generated, $z_1(0)$ is arranged at carrier 0 and time 1,
$z_1(1)$ is arranged at carrier 1 and time 1,
$z_1(2)$ is arranged at carrier 2 and time 1,
...
$z_1(10)$ is arranged at carrier 0 and time 2,
$z_1(11)$ is arranged at carrier 1 and time 2,
$z_1(12)$ is arranged at carrier 2 and time 2, and Similarly, when $z_2(0)$, $z_2(1)$, $z_2(2)$, $z_2(3)$, ... corresponding to i=0, 1, 2, 3, ... are generated in (B) of FIG. 18, $z_2(0)$ is arranged at carrier 0 and time 1,
$z_2(1)$ is arranged at carrier 1 and time 1,
$z_2(2)$ is arranged at carrier 2 and time 1,
...
$z_2(10)$ is arranged at carrier 0 and time 2,
$z_2(11)$ is arranged at carrier 1 and time 2,
$z_2(12)$ is arranged at carrier 2 and time 2, and
...

In this case, $z_1(a)$ and $z_2(a)$ in a case of i=a are transmitted from the same frequency and from the same time. Then, FIG. 18 illustrates examples of a case where generated $z_1(i)$ and $z_2(i)$ are preferentially arranged in the frequency axis direction.

Figure 19:
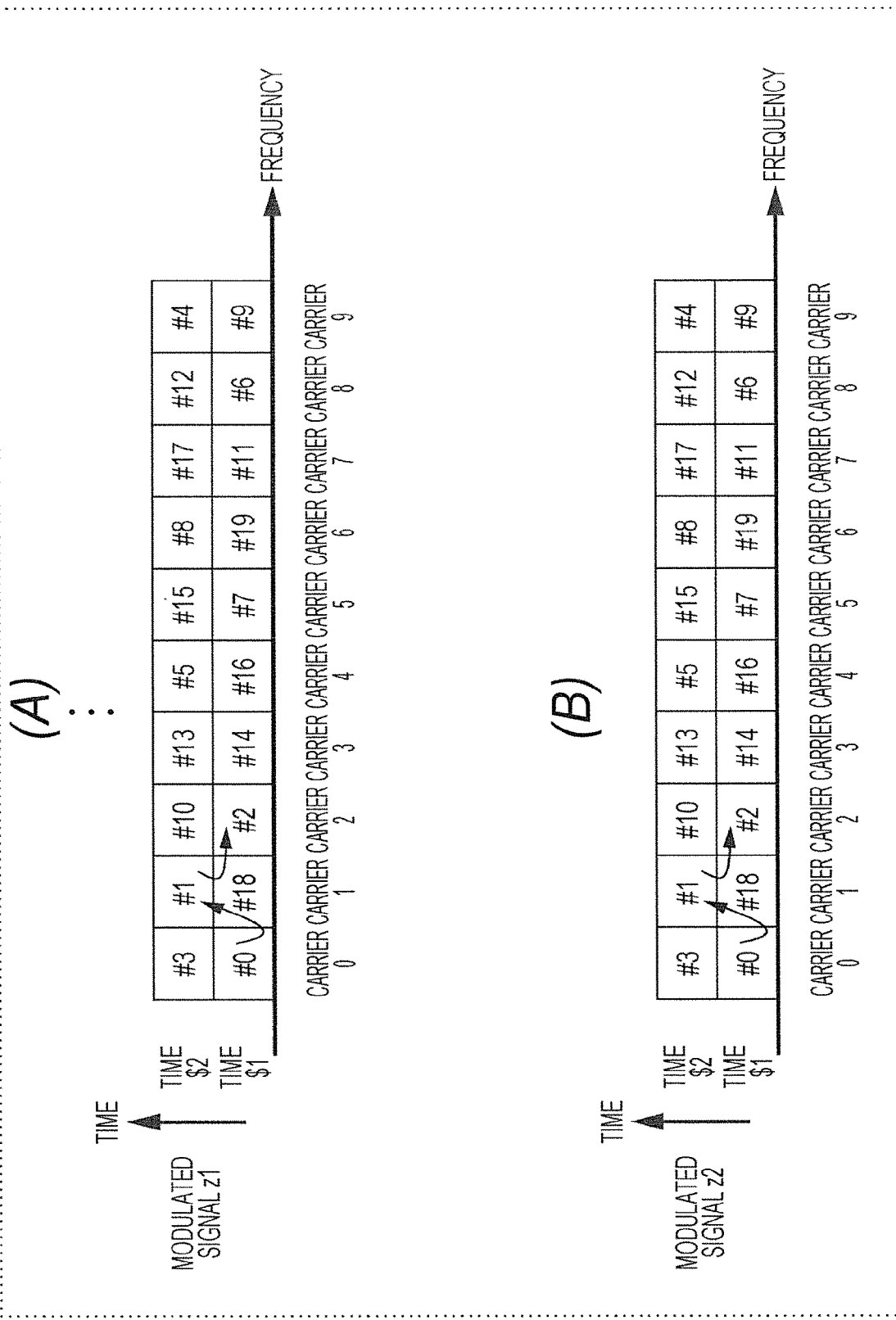
FIG. 19 is a view illustrating an example of the symbol arranging method.

Part (A) of FIG. 19 illustrates a method for arranging $z_1(i)$, and (B) of FIG. 19 illustrates a method for arranging $z_2(i)$. In each of (A) and (B) of FIG. 19, a vertical axis indicates time, and a horizontal axis indicates a frequency.

Part (A) of FIG. 19 will be described. First, when $z_1(0)$, $z_1(1)$, $z_1(2)$, $z_1(3)$, . . . corresponding to i=0, 1, 2, 3, . . . are generated,
$z_1(0)$ is arranged at carrier 0 and time 1,
$z_1(1)$ is arranged at carrier 1 and time 2,
$z_1(2)$ is arranged at carrier 2 and time 1,
. . .
$z_1(10)$ is arranged at carrier 2 and time 2,
$z_1(11)$ is arranged at carrier 7 and time 1,
$z_1(12)$ is arranged at carrier 8 and time 2, and
. . . .

Similarly, when $z_2(0)$, $z_2(1)$, $z_2(2)$, $z_2(3)$, . . . corresponding to i=0, 1, 2, 3, . . . are generated in (B) of FIG. 19,
$z_2(0)$ is arranged at carrier 0 and time 1,
$z_2(1)$ is arranged at carrier 1 and time 2,
$z_2(2)$ is arranged at carrier 2 and time 1,
. . .
$z_2(10)$ is arranged at carrier 2 and time 2,
$z_2(11)$ is arranged at carrier 7 and time 1,
$z_2(12)$ is arranged at carrier 8 and time 2, and
. . .

In this case, $z_1(a)$ and $z_2(a)$ in a case of i=a are transmitted from the same frequency and from the same time. Then, FIG. 19 illustrates examples of a case where generated $z_1(i)$ and $z_2(i)$ are randomly arranged in the frequency axis and time axis directions.

Figure 20:
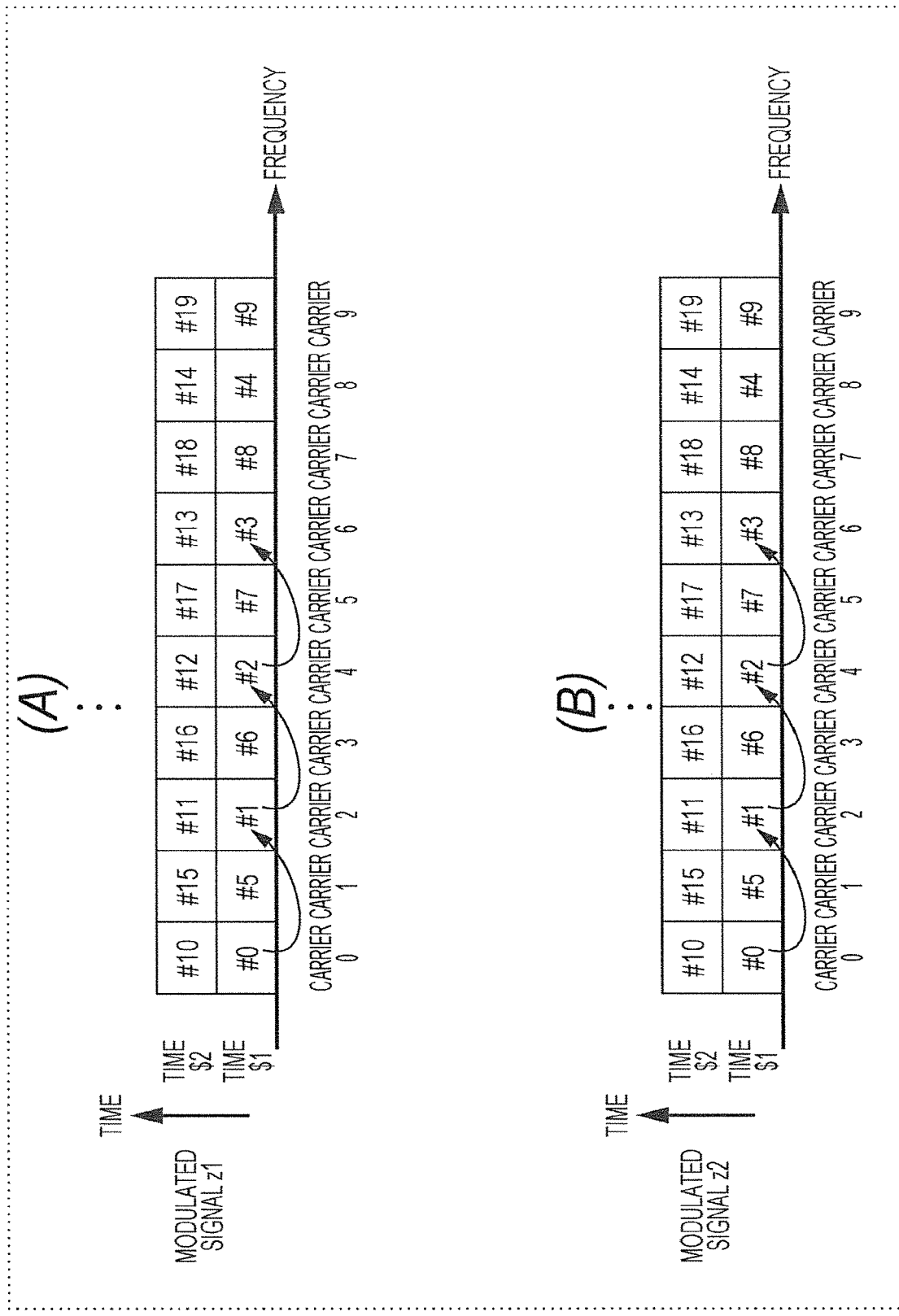
FIG. 20 is a view illustrating an example of the symbol arranging method.

Part (A) of FIG. 20 illustrates a method for arranging $z_1(i)$, and (B) of FIG. 20 illustrates a method for arranging $z_2(i)$. In each of (A) and (B) of FIG. 20, a vertical axis indicates time, and a horizontal axis indicates a frequency.

Part (A) of FIG. 20 will be described. First, when $z_1(0)$, $z_1(1)$, $z_1(2)$, $z_1(3)$, . . . corresponding to i=0, 1, 2, 3, . . . are generated,
$z_1(0)$ is arranged at carrier 0 and time 1,
$z_1(1)$ is arranged at carrier 2 and time 1,
$z_1(2)$ is arranged at carrier 4 and time 1,
. . .
$z_1(10)$ is arranged at carrier 0 and time 2,
$z_1(11)$ is arranged at carrier 2 and time 2,
$z_1(12)$ is arranged at carrier 4 and time 2, and
. . .

Similarly, when $z_2(0)$, $z_2(1)$, $z_2(2)$, $z_2(3)$, . . . corresponding to i=0, 1, 2, 3, . . . are generated in (B) of FIG. 20,
$z_2(0)$ is arranged at carrier 0 and time 1,
$z_2(1)$ is arranged at carrier 2 and time 1,
$z_2(2)$ is arranged at carrier 4 and time 1,
. . .
$z_2(10)$ is arranged at carrier 0 and time 2,
$z_2(11)$ is arranged at carrier 2 and time 2,
$z_2(12)$ is arranged at carrier 4 and time 2, and
. . . .

In this case, $z_1(a)$ and $z_2(a)$ in a case of i=a are transmitted from the same frequency and from the same time. Then, FIG. 20 illustrates examples of a case where generated $z_1(i)$ and $z_2(i)$ are preferentially arranged in the frequency axis direction.

Figure 21:
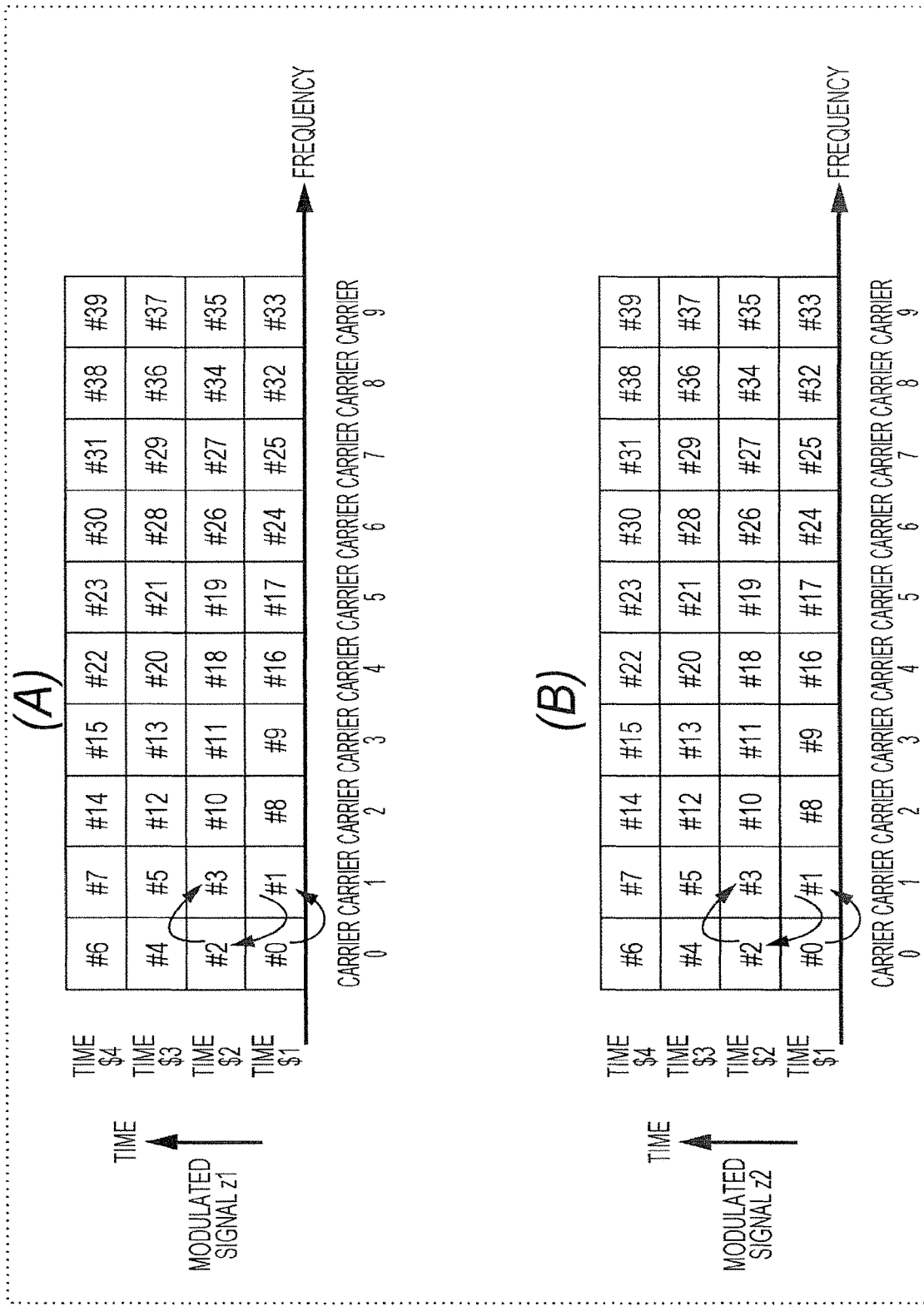
FIG. 21 is a view illustrating an example of the symbol arranging method.

Part (A) of FIG. 21 illustrates a method for arranging $z_1(i)$, and (B) of FIG. 21 illustrates a method for arranging $z_2(i)$. In each of (A) and (B) of FIG. 21, a vertical axis indicates time, and a horizontal axis indicates a frequency.

Part (A) of FIG. 21 will be described. First, when $z_1(0)$, $z_1(1)$, $z_1(2)$, $z_1(3)$, . . . corresponding to i=0, 1, 2, 3, . . . are generated,
$z_1(0)$ is arranged at carrier 0 and time 1,
$z_1(1)$ is arranged at carrier 1 and time 1,
$z_1(2)$ is arranged at carrier 0 and time 2,
. . .
$z_1(10)$ is arranged at carrier 2 and time 2,
$z_1(11)$ is arranged at carrier 3 and time 2,
$z_1(12)$ is arranged at carrier 2 and time 3, and
. . .

Similarly, when $z_2(0)$, $z_2(1)$, $z_2(2)$, $z_2(3)$, . . . corresponding to i=0, 1, 2, 3, . . . are generated in (B) of FIG. 21,
$z_2(0)$ is arranged at carrier 0 and time 1,
$z_2(1)$ is arranged at carrier 1 and time 1,
$z_2(2)$ is arranged at carrier 0 and time 2,
. . .
$z_2(10)$ is arranged at carrier 2 and time 2,
$z_2(11)$ is arranged at carrier 3 and time 2,
$z_2(12)$ is arranged at carrier 2 and time 3, and
. . .

In this case, $z_1(a)$ and $z_2(a)$ in a case of i=a are transmitted from the same frequency and from the same time. Then, FIG. 21 illustrates examples of a case where generated $z_1(i)$ and $z_2(i)$ are arranged in the time and frequency axis directions.

Figure 22:
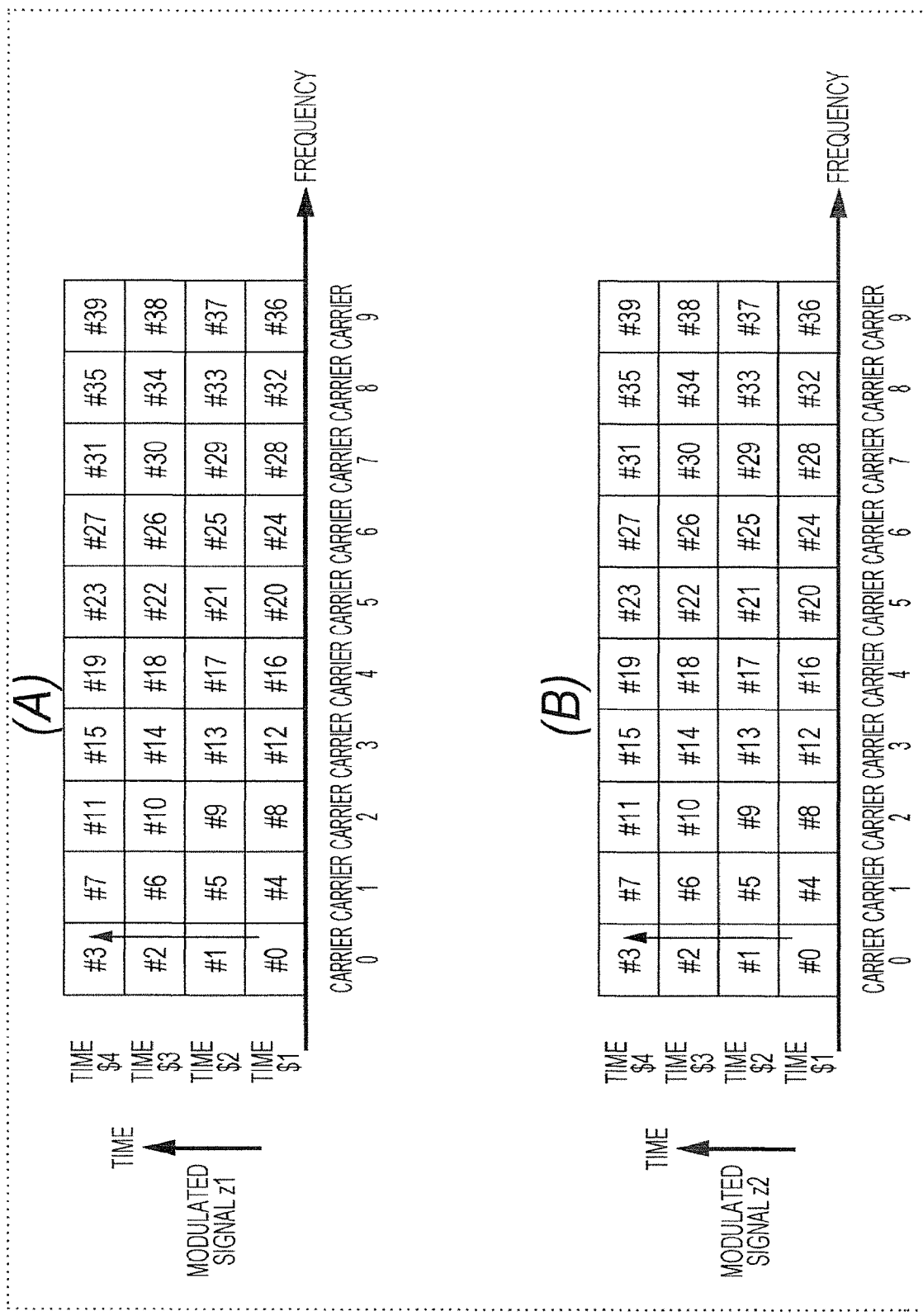
FIG. 22 is a view illustrating an example of the symbol arranging method.

Part (A) of FIG. 22 illustrates a method for arranging $z_1(i)$, and (B) of FIG. 22 illustrates a method for arranging $z_2(i)$. In each of (A) and (B) of FIG. 22, a vertical axis indicates time, and a horizontal axis indicates a frequency.

Part (A) of FIG. 22 will be described. First, when $z_1(0)$, $z_1(1)$, $z_1(2)$, $z_1(3)$, . . . corresponding to i=0, 1, 2, 3, . . . are generated,
$z_1(0)$ is arranged at carrier 0 and time 1,
$z_1(1)$ is arranged at carrier 0 and time 2,
$z_1(2)$ is arranged at carrier 0 and time 3,
. . .
$z_1(10)$ is arranged at carrier 2 and time 3,
$z_1(11)$ is arranged at carrier 2 and time 4,
$z_1(12)$ is arranged at carrier 3 and time 1, and
. . .

Similarly, when $z_2(0)$, $z_2(1)$, $z_2(2)$, $z_2(3)$, . . . corresponding to i=0, 1, 2, 3, . . . are generated in (B) of FIG. 22,
$z_2(0)$ is arranged at carrier 0 and time 1,
$z_2(1)$ is arranged at carrier 0 and time 2,
$z_2(2)$ is arranged at carrier 0 and time 3,
. . .
$z_2(10)$ is arranged at carrier 2 and time 3,
$z_2(11)$ is arranged at carrier 2 and time 4,
$z_2(12)$ is arranged at carrier 3 and time 1, and
. . .

In this case, $z_1(a)$ and $z_2(a)$ in a case of i=a are transmitted from the same frequency and from the same time. Then, FIG. 22 illustrates examples of a case where generated $z_1(i)$ and $z_2(i)$ are preferentially arranged in the time axis direction.

The transmitting apparatus may arrange symbols by any method of the methods in FIGS. 18 to 22 and symbol arranging methods other than the methods in FIGS. 18 to 22 (FIGS. 18 to 22 are only examples of symbol arrangement).

Figure 23:
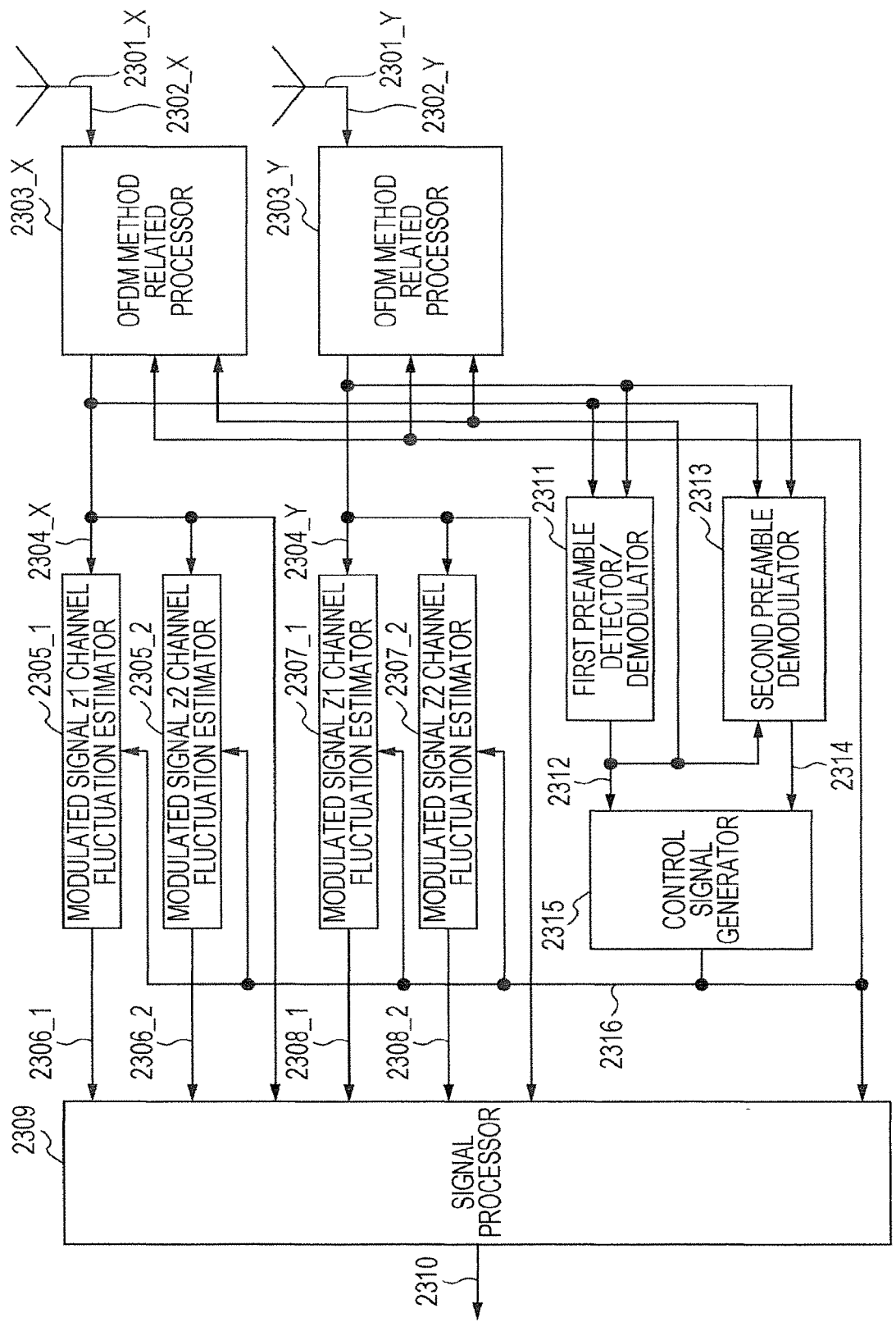
FIG. 23 is a view illustrating an example of a configuration of a receiving apparatus.

FIG. 23 is a configuration example of a receiving apparatus (terminal) which receives a modulated signal transmitted by the transmitting apparatus in FIG. 1.

In FIG. 23, OFDM method related processor 2303_X receives an input of received signal 2302_X received at antenna 2301_X. OFDM method related processor 2303_X performs reception side signal processing for the OFDM method. OFDM method related processor 2303_X outputs signal 2304_X obtained after the signal processing. Similarly, OFDM method related processor 2303_Y receives an input of received signal 2302_Y received at antenna 2301_Y. OFDM method related processor 2303_Y performs reception side signal processing for the OFDM method. OFDM method related processor 2303_Y outputs signal 2304_Y obtained after the signal processing.

First preamble detector/decoder 2311 receives an input of signals 2304_X and 2304_Y obtained after the signal processing. First preamble detector/decoder 2311 performs signal detection and time-frequency synchronization by detecting a first preamble, and simultaneously obtains control information contained in the first preamble (by performing demodulation and error correction decoding) and outputs first preamble control information 2312.

Second preamble demodulator 2313 receives an input of signals 2304_X and 2304_Y obtained after the signal processing, and first preamble control information 2312. Second preamble demodulator 2313 performs signal processing based on first preamble control information 2312. Second preamble demodulator 2313 performs demodulation (error correction decoding). Second preamble demodulator 2313 outputs second preamble control information 2314.

Control information generator 2315 receives an input of first preamble control information 2312, and second preamble control information 2314. Control information generator 2315 bundles control information (related to a receiving operation) and outputs the control information as control signal 2316. Then, control signal 2316 is input to each unit as illustrated in FIG. 23.

Modulated signal $z_1$ channel fluctuation estimator 2305_1 receives an input of signal 2304_X obtained after the signal processing, and control signal 2316. Modulated signal $z_1$ channel fluctuation estimator 2305_1 estimates a channel fluctuation between an antenna from which the transmitting apparatus has transmitted modulated signal $z_1$ and receiving antenna 2301_X by using a pilot symbol or the like contained in signal 2304_X obtained after the signal processing, and outputs channel estimation signal 2306_1.

Modulated signal $z_2$ channel fluctuation estimator 2305_2 receives an input of signal 2304_X obtained after the signal processing, and control signal 2316. Modulated signal $z_2$ channel fluctuation estimator 2305_2 estimates a channel fluctuation between an antenna from which the transmitting apparatus has transmitted modulated signal $z_2$ and receiving antenna 2301_X by using a pilot symbol or the like contained in signal 2304_X obtained after the signal processing, and outputs channel estimation signal 2306_2.

Modulated signal $z_1$ channel fluctuation estimator 2307_1 receives an input of signal 2304_Y obtained after the signal processing, and control signal 2316. Modulated signal $z_1$ channel fluctuation estimator 2307_1 estimates a channel fluctuation between an antenna from which the transmitting apparatus has transmitted modulated signal $z_1$ and receiving antenna 2301_Y by using a pilot symbol or the like contained in signal 2304_Y obtained after the signal processing, and outputs channel estimation signal 2308_1.

Modulated signal $z_2$ channel fluctuation estimator 2307_2 receives an input of signal 2304_Y obtained after the signal processing, and control signal 2316. Modulated signal $z_2$ channel fluctuation estimator 2307_2 estimates a channel fluctuation between an antenna from which the transmitting apparatus has transmitted modulated signal $z_2$ and receiving antenna 2301_Y by using a pilot symbol or the like contained in signal 2304_Y obtained after the signal processing, and outputs channel estimation signal 2308_2.

Signal processor 2309 receives an input of signals 2306_1, 2306_2, 2308_1, 23082, 2304_X and 2304_Y, and control signal 2316. Signal processor 2309 performs demodulation and decoding processing based on information such as a transmitting method, a modulating method, an error correction coding method, a coding rate of error correction coding and a block size of an error correction code contained in control signal 2316. Signal processor 2309 outputs received data 2310. In this case, other wave detection (demodulation)/decoding are performed based on the above-described transmitting method.

Note that the receiving apparatus extracts a necessary symbol from control signal 2316, and performs demodulation (including signal demultiplexing and signal wave detection) and error correction decoding. Moreover, a configuration of the receiving apparatus is not limited to this configuration.

As described above, there is an advantage that flexible video information and flexible broadcast service can be provided to the receiving apparatus (viewer) by enabling the transmitting apparatus to select any frame configuration of the frame configurations in FIGS. 2 to 6. Moreover, there are the advantages as described above in the frame configurations in FIGS. 2 to 6, respectively. Hence, the transmitting apparatus may use a single frame configuration of the frame configurations in FIGS. 2 to 6, and, in this case, it is possible to obtain the effect described above.

Moreover, when the transmitting apparatus selects any of the frame configurations in FIGS. 2 to 6, for example, when the transmitting apparatus is installed in a certain area, frame configurations may be switched by setting any of the frame configurations in FIGS. 2 to 6 when the transmitting apparatus is installed and regularly reviewing the setting, or a method for selecting the frame configurations in FIGS. 2 to 6 per frame transmission may be employed. As for a frame configuration selecting method, any selection may be performed.

Note that in the frame configurations in FIGS. 2 to 6, another symbol (for example, a pilot symbol and a null symbol (an in-phase component of the symbol is 0 (zero, and a quadrature component is 0 (zero)))) may be inserted to the first preamble. Similarly, a symbol such as a pilot symbol and a null symbol (an in-phase component of the symbol is 0 (zero, and a quadrature component is 0 (zero))) may be inserted to a second preamble. Moreover, a preamble is configured with the first preamble and the second preamble. However, the preamble configuration is not limited to this configuration. The preamble may be configured with the first preamble (first preamble group) alone or may be configured with two or more preambles (preamble groups). Note that in regard to the preamble configuration, the same also applies to frame configurations of other exemplary embodiments.

Then, the data symbol group is indicated in the frame configurations in FIGS. 2 to 6. However, another symbol (for example, a pilot symbol, a null symbol (an in-phase component of the symbol is 0 (zero, and a quadrature component is 0 (zero))), and a control information symbol) may be inserted. Note that in this regard, the same also applies to frame configurations of other exemplary embodiments.

Moreover, another symbol (for example, a pilot symbol, a null symbol (an in-phase component of the symbol is 0 (zero, and a quadrature component is 0 (zero))), a control information symbol and a data symbol) may be inserted to the pilot symbol in FIG. 6. Note that in this regard, the same also applies to frame configurations of other exemplary embodiments.

Second Exemplary Embodiment

The first exemplary embodiment describes the case where the transmitting apparatus selects any of the frame configurations in FIGS. 2 to 6 (or uses any of the frames in FIGS. 2 to 6). The present exemplary embodiment will describe an example of the method for configuring the first preamble and the second preamble described in the first exemplary embodiment, in the transmitting apparatus described in the first exemplary embodiment.

As described in the first exemplary embodiment, the transmitting apparatus (FIG. 1) may incorporate "information related to a frame configuration" for transmitting information related to a frame configuration to the receiving apparatus (terminal) in the first preamble or the second preamble, to transmit the "information related to the frame configuration."

For example, in a case where the transmitting apparatus transmits a modulated signal with the frame configuration in FIG. 2 when three bits of v0, v1 and v2 are allocated as the "information related to the frame configuration," the transmitting apparatus sets (v0, v1, v2) to (0, 0, 0) and transmits the "information related to the frame configuration."

When the transmitting apparatus transmits a modulated signal with the frame configuration in FIG. 3, the transmitting apparatus sets (v0, v1, v2) to (0, 0, 1) and transmits the "information related to the frame configuration."

When the transmitting apparatus transmits a modulated signal with the frame configuration in FIG. 4, the transmitting apparatus sets (v0, v1, v2) to (0, 1, 0) and transmits the "information related to the frame configuration."

When the transmitting apparatus transmits a modulated signal with the frame configuration in FIG. 5, the transmitting apparatus sets (v0, v1, v2) to (0, 1, 1) and transmits the "information related to the frame configuration."

When the transmitting apparatus transmits a modulated signal with the frame configuration in FIG. 5, the transmitting apparatus sets (v0, v1, v2) to (1, 0, 0) and transmits the "information related to the frame configuration."

The receiving apparatus can learn an outline of a frame configuration of a modulated signal transmitted by the transmitting apparatus, from the "information related to the frame configuration."

Further, the transmitting apparatus (FIG. 1) transmits control information related to a method for transmitting each data symbol group, control information related to a method for modulating each data symbol group (or a set of modulating methods), and control information related to a code length (block length) and a coding rate of an error correction code to be used in each data symbol group, and further transmits information related to a method for configuring a data symbol group in each frame configuration. An example of the method for configuring these pieces of control information will be described below.

A case where the transmitting apparatus (FIG. 1) selects the frame configuration in FIG. 2 or 3 is assumed, that is, it is assumed that the transmitting apparatus (FIG. 1) sets (v0, v1, v2) to (0, 0, 0) or (0, 0, 1) and transmits (v0, v1, v2). In this case, control information related to a method for transmitting data symbol group #j is a(j, 0) and a(j, 1).

In this case, when the method for transmitting data symbol group #(j=K) is of single stream transmission (SISO (SIMO) transmission), the transmitting apparatus sets a(K, 0)=0 and a(K, 1)=0 and transmits a(K, 0) and a(K, 1).

When the method for transmitting data symbol group #(j=K) is of space time block codes (or space frequency block codes) (MISO transmission), the transmitting apparatus sets a(K, 0)=1 and a(K, 1)=0 and transmits a(K, 0) and a(K, 1).

When the method for transmitting data symbol group #(j=K) is MIMO method #1, the transmitting apparatus sets a(K, 0)=0 and a(K, 1)=1 and transmits a(K, 0) and a(K, 1).

When the method for transmitting data symbol group #(j=K) is MIMO method #2, the transmitting apparatus sets a(K, 0)=1 and a(K, 1)=1 and transmits a(K, 0) and a(K, 1).

Note that MIMO method #1 and MIMO method #2 are different methods and are any method of the above-described MIMO methods. Moreover, here, MIMO method #1 and MIMO method #2 are used. However, the MIMO method which the transmitting apparatus can select may be of one type or may be of two or more types.

In FIGS. 2 and 3, since there are data symbol group #1, data symbol group #2 and data symbol group #3, the transmitting apparatus transmits a(1, 0), a(1, 1), a(2, 0), a(2, 1), a(3, 0) and a(3, 1).

A case where the transmitting apparatus (FIG. 1) selects the frame configuration in FIG. 2 or 3 is assumed, that is, it is assumed that the transmitting apparatus (FIG. 1) sets (v0, v1, v2) to (0, 0, 0) or (0, 0, 1) and transmits (v0, v1, v2). In this case, control information related to a method for modulating data symbol group j is b(j, 0) and b(j, 1).

In this case, a definition described below is made. In a case where the transmitting method is of single stream transmission (SISO (SIMO) transmission), for example, in a case where a(K, 0)=0 and a(K, 1)=0 are set in data symbol #(j=K), when b(K, 0)=0 and b(K, 1)=0 hold, the transmitting apparatus sets a data symbol modulating method to QPSK.

When b(K, 0)=1 and b(K, 1)=0 hold, the transmitting apparatus sets the data symbol modulating method to 16QAM.

When b(K, 0)=0 and b(K, 1)=1 hold, the transmitting apparatus sets the data symbol modulating method to 64QAM.

When b(K, 0)=1 and b(K, 1)=1 hold, the transmitting apparatus sets the data symbol modulating method to 256QAM.

In a case where the transmitting method is of space time block codes (or space frequency block codes) (MISO transmission), or is MIMO method #1 or MIMO method #2, for example, in a case where a(K, 0)=1 and a(K, 1)=0, a(K, 0)=0 and a(K, 1)=1 or a(K, 0)=1 and a(K, 1)=1 are set in data symbol #(j=K), when b(K, 0)=0 and b(K, 1)=0 hold, the transmitting apparatus sets the data symbol modulating method to QPSK in stream 1 and 16QAM in stream 2.

When b(K, 0)=1 and b(K, 1)=0 hold, the transmitting apparatus sets the data symbol modulating method to 16QAM in stream 1 and 16QAM in stream 2.

When b(K, 0)=0 and b(K, 1)=1 hold, the transmitting apparatus sets the data symbol modulating method to 16QAM in stream 1 and 64QAM in stream 2.

When b(K, 0)=1 and b(K, 1)=1 hold, the transmitting apparatus sets the data symbol modulating method to 64QAM in stream 1 and 64QAM in stream 2.

Note that the modulating method is not limited to the above-described modulating methods. For example, the modulating method may include a modulating method such as an APSK method, non-uniform QAM and non-uniform mapping. The modulating method will be described in detail below.

In FIGS. 2 and 3, since there are data symbol group #1, data symbol group #2 and data symbol group #3, the transmitting apparatus transmits b(1, 0), b(1, 1), b(2, 0), b(2, 1), b(3, 0) and b(3, 1).

A case where the transmitting apparatus (FIG. 1) selects the frame configuration in FIG. 2 or 3 is assumed, that is, it is assumed that the transmitting apparatus (FIG. 1) sets (v0, v1, v2) to (0, 0, 0) or (0, 0, 1) and transmits (v0, v1, v2). In this case, control information related to a coding method of an error correction code of data symbol group #j is c(j, 0) and c(j, 1).

In this case, when an error correction coding method of data symbol group #(j=K) is of an error correction code of A and a code length of a, the transmitting apparatus sets c(K, 0)=0 and c(K, 1)=0 and transmits c(K, 0) and c(K, 1).

When an error correction coding method of data symbol group #(j=K) is of the error correction code of A and a code length of p, the transmitting apparatus sets c(K, 0)=1 and c(K, 1)=0 and transmits c(K, 0) and c(K, 1).

When an error correction coding method of data symbol group #(j=K) is of an error correction code of B and the code length of a, the transmitting apparatus sets c(K, 0)=0 and c(K, 1)=1 and transmits c(K, 0) and c(K, 1).

When an error correction coding method of data symbol group #(j=K) is of the error correction code of B and the code length of 3, the transmitting apparatus sets c(K, 0)=1 and c(K, 1)=1 and transmits c(K, 0) and c(K, 1).

Note that the setting of the error correction code is not limited to the two settings, and the transmitting apparatus only needs to be able to set one or more types of error correction codes. The setting of the code length is not limited to the two settings, and the transmitting apparatus only needs to be able to set two or more code lengths.

In FIGS. 2 and 3, since there are data symbol group #1, data symbol group #2 and data symbol group #3, the transmitting apparatus transmits c(1, 0), c(1, 1), c(2, 0), c(2, 1), c(3, 0) and c(3, 1).

A case where the transmitting apparatus (FIG. 1) selects the frame configuration in FIG. 2 or 3 is assumed, that is, it is assumed that the transmitting apparatus (FIG. 1) sets (v0, v1, v2) to (0, 0, 0) or (0, 0, 1) and transmits (v0, v1, v2). In this case, control information related to a coding rate of the error correction code of data symbol group #j is d(j, 0) and d(j, 1).

In this case, when the coding rate of the error correction code of data symbol group #(j=K) is 1/2, the transmitting apparatus sets d(K, 0)=0 and d(K, 1)=0 and transmits d(K, 0) and d(K, 1).

When the coding rate of the error correction code of data symbol group #(j=K) is 2/3, the transmitting apparatus sets d(K, 0)=1 and d(K, 1)=0 and transmits d(K, 0) and d(K, 1).

When the coding rate of the error correction code of data symbol group #(j=K) is 3/4, the transmitting apparatus sets d(K, 0)=0 and d(K, 1)=1 and transmits d(K, 0) and d(K, 1).

When the coding rate of the error correction code of data symbol group #(j=K) is 4/5, the transmitting apparatus sets d(K, 0)=1 and d(K, 1)=1 and transmits d(K, 0) and d(K, 1).

Note that the setting of the coding rate of the error correction code is not limited to the four settings, and the transmitting apparatus only needs to be able to set one or more types of coding rates of the error correction code.

In FIGS. 2 and 3, since there are data symbol group #1, data symbol group #2 and data symbol group #3, the transmitting apparatus transmits d(1, 0), d(1, 1), d(2, 0), d(2, 1), d(3, 0) and d(3, 1).

A case where the transmitting apparatus (FIG. 1) selects the frame configuration in FIG. 2 or 3 is assumed, that is, it is assumed that the transmitting apparatus (FIG. 1) sets (v0, v1, v2) to (0, 0, 0) or (0, 0, 1) and transmits (v0, v1, v2). In this case, information related to a number of symbols in a frame of data symbol group #j is e(j, 0) and e(j, 1).

In this case, when the number of symbols in the frame of data symbol group #(j=K) is of 256 symbols, the transmitting apparatus sets e(K, 0)=0 and e(K, 1)=0 and transmits e(K, 0) and e(K, 1).

When the number of symbols in the frame of data symbol group #(j=K) is of 512 symbols, the transmitting apparatus sets e(K, 0)=1 and e(K, 1)=0 and transmits e(K, 0) and e(K, 1).

When the number of symbols in the frame of data symbol group #0=K) is of 1024 symbols, the transmitting apparatus sets e(K, 0)=0 and e(K, 1)=1 and transmits e(K, 0) and e(K, 1).

When the number of symbols in the frame of data symbol group #0=K) is of 2048 symbols, the transmitting apparatus sets e(K, 0)=1 and e(K, 1)=1 and transmits e(K, 0) and e(K, 1).

Note that the setting of the number of symbols is not limited to the four settings, and the transmitting apparatus only needs to be able to set one or more types of the number of symbols.

In FIGS. 2 and 3, since there are data symbol group #1, data symbol group #2 and data symbol group #3, the transmitting apparatus transmits e(1, 0), e(1, 1), e(2, 0), e(2, 1), e(3, 0) and e(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2). In this case, control information related to a method for transmitting data symbol group #j is a(j, 0) and a(j, 1).

In this case, when the method for transmitting data symbol group #(j=K) is of single stream transmission (SISO (SIMO) transmission), the transmitting apparatus sets a(K, 0)=0 and a(K, 1)=0 and transmits a(K, 0) and a(K, 1).

When the method for transmitting data symbol group #(j=K) is of space time block codes (or space frequency block codes) (MISO transmission), the transmitting apparatus sets a(K, 0)=1 and a(K, 1)=0 and transmits a(K, 0) and a(K, 1).

When the method for transmitting data symbol group #(j=K) is MIMO method #1, the transmitting apparatus sets a(K, 0)=0 and a(K, 1)=1 and transmits a(K, 0) and a(K, 1).

When the method for transmitting data symbol group #(j=K) is MIMO method #2, the transmitting apparatus sets a(K, 0)=1 and a(K, 1)=1 and transmits a(K, 0) and a(K, 1).

Note that MIMO method #1 and MIMO method #2 are different methods and are any method of the above-described MIMO methods. Moreover, here, MIMO method #1 and MIMO method #2 are used. However, the MIMO method which the transmitting apparatus can select may be of one type or may be of two or more types.

In FIGS. 4, 5 and 6, since there are data symbol group #1, data symbol group #2 and data symbol group #3, the transmitting apparatus transmits a(1, 0), a(1, 1), a(2, 0), a(2, 1), a(3, 0) and a(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2). In this case, control information related to a method for modulating data symbol group j is b(j, 0) and b(j, 1).

In this case, a definition described below is made. In a case where the transmitting method is of single stream transmission (SISO (SIMO) transmission), for example, in a case where a(K, 0)=0 and a(K, 1)=0 are set in data symbol #(j=K), when b(K, 0)=0 and b(K, 1)=0 hold, the transmitting apparatus sets a data symbol modulating method to QPSK.

When b(K, 0)=1 and b(K, 1)=0 hold, the transmitting apparatus sets the data symbol modulating method to 16QAM.

When b(K, 0)=0 and b(K, 1)=1 hold, the transmitting apparatus sets the data symbol modulating method to 64QAM.

When b(K, 0)=1 and b(K, 1)=1 hold, the transmitting apparatus sets the data symbol modulating method to 256QAM.

In a case where the transmitting method is of space time block codes (or space frequency block codes) (MISO transmission), or is MIMO method #1 or MIMO method #2, for example, in a case where a(K, 0)=1 and a(K, 1)=0, a(K, 0)=0 and a(K, 1)=1 or a(K, 0)=1 and a(K, 1)=1 are set in data symbol #(j=K), when b(K, 0)=0 and b(K, 1)=0 hold, the transmitting apparatus sets the data symbol modulating method to QPSK in stream 1 and 16QAM in stream 2.

When b(K, 0)=1 and b(K, 1)=0 hold, the transmitting apparatus sets the data symbol modulating method to 16QAM in stream 1 and 16QAM in stream 2.

When b(K, 0)=0 and b(K, 1)=1 hold, the transmitting apparatus sets the data symbol modulating method to 16QAM in stream 1 and 64QAM in stream 2.

When b(K, 0)=1 and b(K, 1)=1 hold, the transmitting apparatus sets the data symbol modulating method to 64QAM in stream 1 and 64QAM in stream 2.

Note that the modulating method is not limited to the above-described modulating methods. For example, the modulating method may include a modulating method such as an APSK method, non-uniform QAM and non-uniform mapping. The modulating method will be described in detail below.

In FIGS. 4, 5 and 6, since there are data symbol group #1, data symbol group #2 and data symbol group #3, the transmitting apparatus transmits b(1, 0), b(1, 1), b(2, 0), b(2, 1), b(3, 0) and b(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2). In this case, control information related to a coding method of an error correction code of data symbol group #j is c(j, 0) and c(j, 1).

In this case, when an error correction coding method of data symbol group #(j=K) is of an error correction code of A and a code length of a, the transmitting apparatus sets c(K, 0)=0 and c(K, 1)=0 and transmits c(K, 0) and c(K, 1).

When an error correction coding method of data symbol group #(j=K) is of the error correction code of A and a code length of 3, the transmitting apparatus sets c(K, 0)=1 and c(K, 1)=0 and transmits c(K, 0) and c(K, 1).

When an error correction coding method of data symbol group #(j=K) is of an error correction code of B and the code length of a, the transmitting apparatus sets c(K, 0)=0 and c(K, 1)=1 and transmits c(K, 0) and c(K, 1).

When an error correction coding method of data symbol group #(j=K) is of the error correction code of B and a code length of 3, the transmitting apparatus sets c(K, 0)=1 and c(K, 1)=1 and transmits c(K, 0) and c(K, 1).

Note that the setting of the error correction code is not limited to the two settings, and the transmitting apparatus only needs to be able to set one or more types of error correction codes. The setting of the code length is not limited to the two settings, and the transmitting apparatus only needs to be able to set two or more code lengths.

In FIGS. 4, 5 and 6, since there are data symbol group #1, data symbol group #2 and data symbol group #3, the transmitting apparatus transmits c(1, 0), c(1, 1), c(2, 0), c(2, 1), c(3, 0) and c(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2). In this case, control information related to a coding rate of the error correction code of data symbol group #j is d(j, 0) and d(j, 1).

In this case, when the coding rate of the error correction code of data symbol group #(j=K) is 1/2, the transmitting apparatus sets d(K, 0)=0 and d(K, 1)=0 and transmits d(K, 0) and d(K, 1).

When the coding rate of the error correction code of data symbol group #(j=K) is 2/3, the transmitting apparatus sets d(K, 0)=1 and d(K, 1)=0 and transmits d(K, 0) and d(K, 1).

When the coding rate of the error correction code of data symbol group #(j=K) is 3/4, the transmitting apparatus sets d(K, 0)=0 and d(K, 1)=1 and transmits d(K, 0) and d(K, 1).

When the coding rate of the error correction code of data symbol group #(j=K) is 4/5, the transmitting apparatus sets d(K, 0)=1 and d(K, 1)=1 and transmits d(K, 0) and d(K, 1).

Note that the setting of the coding rate of the error correction code is not limited to the four settings, and the transmitting apparatus only needs to be able to set two or more types of coding rates of the error correction code.

In FIGS. 4, 5 and 6, since there are data symbol group #1, data symbol group #2 and data symbol group #3, the transmitting apparatus transmits d(1, 0), d(1, 1), d(2, 0), d(2, 1), d(3, 0) and d(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmit (v0, v1, v2).

In this case, when there is a mix of a plurality of data symbol groups in a certain time interval like data symbol group #1 and data symbol group #2 of the frames in FIGS. 4, 5 and 6, this time interval can be set. (A unit time in the time interval in which there is the mix of a plurality of data symbol groups may be referred to as an OFDM symbol.) Information related to this time interval is f(0) and f(1).

In this case, when this time interval is of 128 OFDM symbols, the transmitting apparatus sets f(0)=0 and f(1)=0 and transmits f(0) and f(1).

When this time interval is of 256 OFDM symbols, the transmitting apparatus sets f(0)=1 and f(1)=0 and transmits f(0) and f(1).

When this time interval is of 512 OFDM symbols, the transmitting apparatus sets f(0)=0 and f(1)=1 and transmits f(0) and f(1).

When this time interval is of 1024 OFDM symbols, the transmitting apparatus sets f(0)=1 and f(1)=0 and transmits f(0) and f(1).

Note that the setting of the time interval is not limited to the four settings, and the transmitting apparatus only needs to be able to set two or more types of the time intervals.

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2).

In this case, when there is no other data symbol group in a certain time interval like data symbol group #3 in FIG. 4, 5 or 6 (however, for example, when there is data symbol group #4 immediately after data symbol group #3, there may be a mix of data symbols of data symbol group #3 and data symbols of data symbol group #4 in a certain time interval at a portion at which data symbol group #3 and data symbol group # are adjacent.), information related to the number of symbols in a frame of data symbol group #j is e(j, 0) and e(j, 1).

When the number of symbols in the frame of data symbol group #0=K) is of 256 symbols, the transmitting apparatus sets e(K, 0)=0 and e(K, 1)=0 and transmits e(K, 0) and e(K, 1).

When the number of symbols in the frame of data symbol group #(j=K) is of 512 symbols, the transmitting apparatus sets e(K, 0)=1 and e(K, 1)=0 and transmits e(K, 0) and e(K, 1).

When the number of symbols in the frame of data symbol group #0=K) is of 1024 symbols, the transmitting apparatus sets e(K, 0)=0 and e(K, 1)=1 and transmits e(K, 0) and e(K, 1).

When the number of symbols in the frame of data symbol group #0=K) is of 2048 symbols, the transmitting apparatus sets e(K, 0)=1 and e(K, 1)=1 and transmits e(K, 0) and e(K, 1).

Note that the setting of the number of symbols is not limited to the four settings, and the transmitting apparatus only needs to be able to set two or more types of the number of symbols.

In FIGS. 4, 5 and 6, since data symbol group #3 corresponds to the above, the transmitting apparatus transmits e(3, 0) and e(3, 1).

A case where the transmitting apparatus (FIG. 1) selects the frame configuration in FIG. 4, 5, or 6 is assumed, that is, it is assumed that the transmitting apparatus (FIG. 1) sets (v0, v1, v2) to (0, 1, 0), (0, 1, 1) or (1, 0, 0) and transmits (v0, v1, v2).

In this case, when there is a mix of a plurality of data symbol groups in a certain time interval like data symbol group #1 and data symbol group #2 of the frames in FIGS. 4, 5 and 6, a number of carriers to be used by each data symbol group can be set.

In this case, information related to the number of carriers is g(0) and g(1). For example, a total number of carriers is of 512 carriers.

When the number of carriers of a first data symbol group is of 480 carriers and the number of carriers of a second symbol group is of 32 carriers among the two data symbol groups, the transmitting apparatus sets g(0)=0 and g(1)=0 and transmits g(0) and g(1).

When the number of carriers of the first data symbol group is of 448 carriers and the number of carriers of the second symbol group is of 64 carriers among the two data symbol groups, the transmitting apparatus sets g(0)=1 and g(1)=0 and transmits g(0) and g(1).

When the number of carriers of the first data symbol group is of 384 carriers and the number of carriers of the second symbol group is of 128 carriers among the two data symbol groups, the transmitting apparatus sets g(0)=0 and g(1)=1 and transmits g(0) and g(1).

When the number of carriers of the first data symbol group is of 256 carriers and the number of carriers of the second symbol group is of 256 carriers among the two data symbol groups, the transmitting apparatus sets g(0)=1 and g(1)=1 and transmits g(0) and g(1).

Note that the setting of the number of carriers is not limited to the four settings, and the transmitting apparatus only needs to be able to set two or more types of the number of carriers.

The case where there is a mix of two data symbol groups is described with reference to FIGS. 4 to 6 as an example of a case where there is a mix of a plurality of data symbol groups in a certain time interval. However, there may be a mix of three or more data symbol groups. This point will be described with reference to FIGS. 24, 25 and 26.

Figure 24:
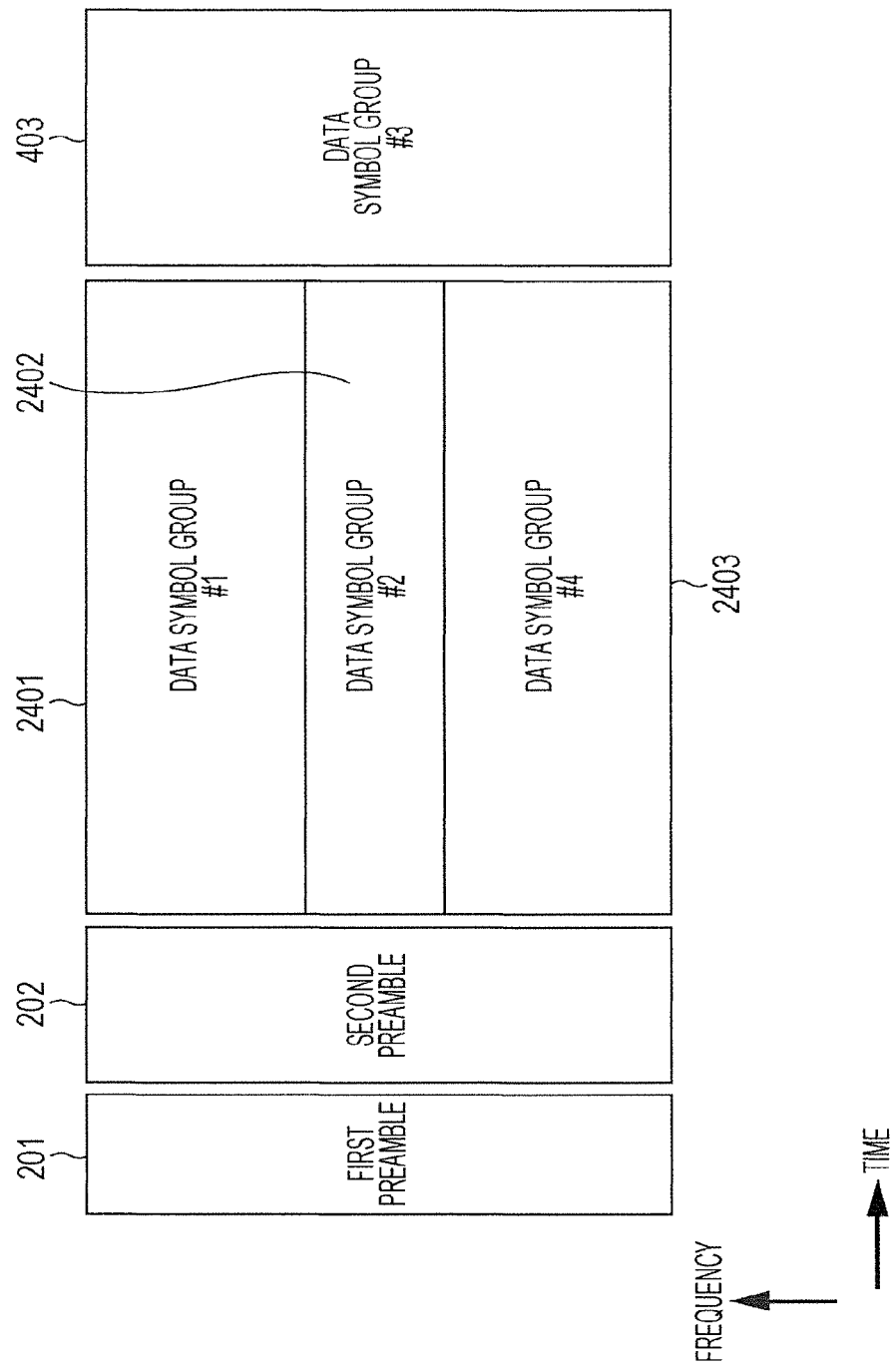
FIG. 24 is a view illustrating an example of a frame configuration.

FIG. 24 illustrates an example of a frame configuration in a case where there are three data symbol groups in a certain time interval, in contrast to FIG. 4. Elements operating in the same way as in FIG. 4 are assigned the same reference numerals in FIG. 24 and will not be described.

FIG. 24 illustrates data symbol group #1 2401, data symbol group #2 2402, and data symbol group #4 2403, and there are data symbol group #1, data symbol group #2 and data symbol group #4 in a certain time interval.

Figure 25:
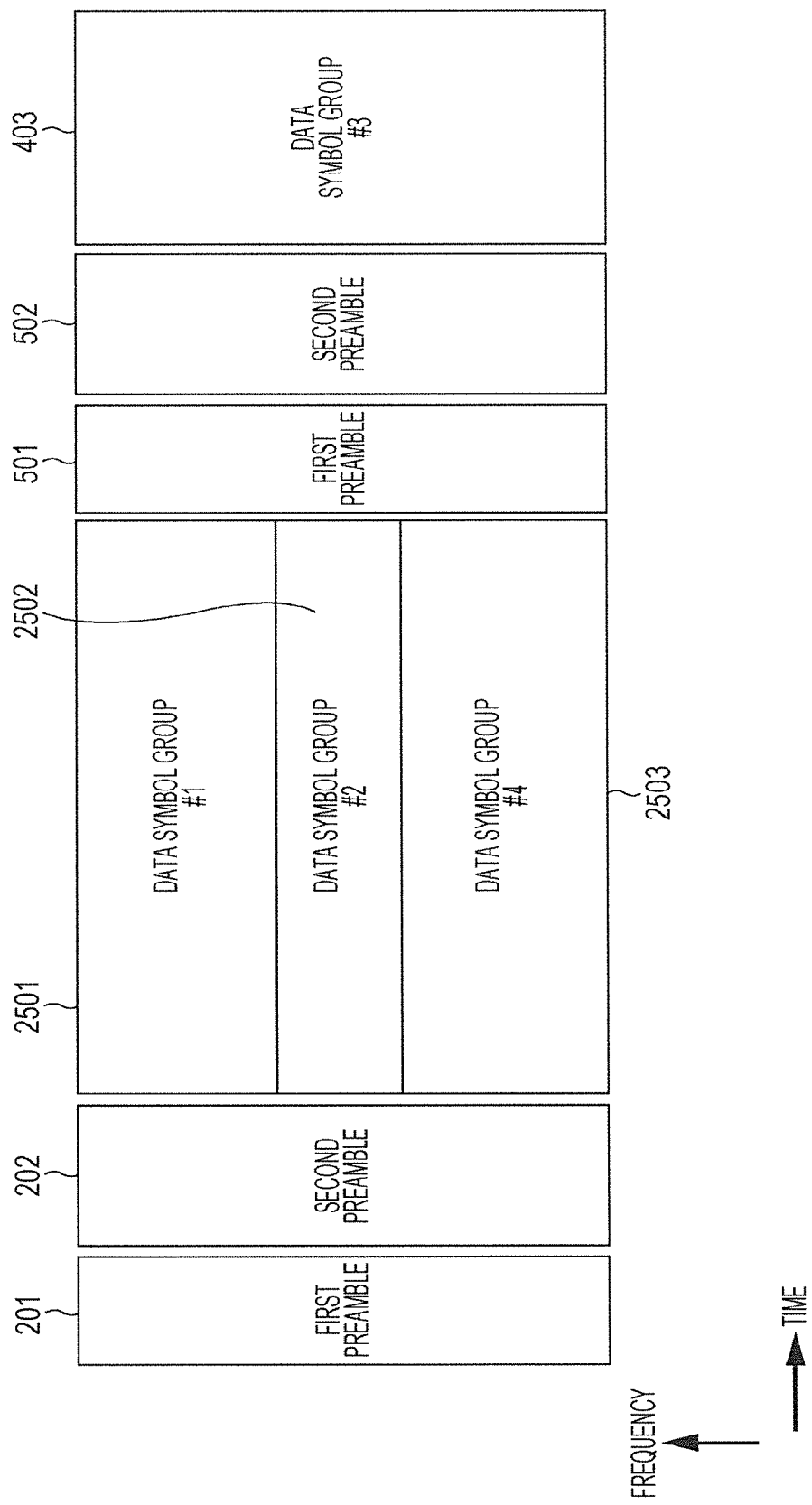
FIG. 25 is a view illustrating an example of a frame configuration.

FIG. 25 illustrates an example of a frame configuration in a case where there are three data symbol groups in a certain time interval, in contrast to FIG. 5. Elements operating in the same way as in FIG. 5 are assigned the same reference numerals in FIG. 25 and will not be described.

FIG. 25 illustrates data symbol group #1 2501, data symbol group #2 2502, and data symbol group #5 2503, and there are data symbol group #1, data symbol group #2 and data symbol group #4 in a certain time interval.

Figure 26:
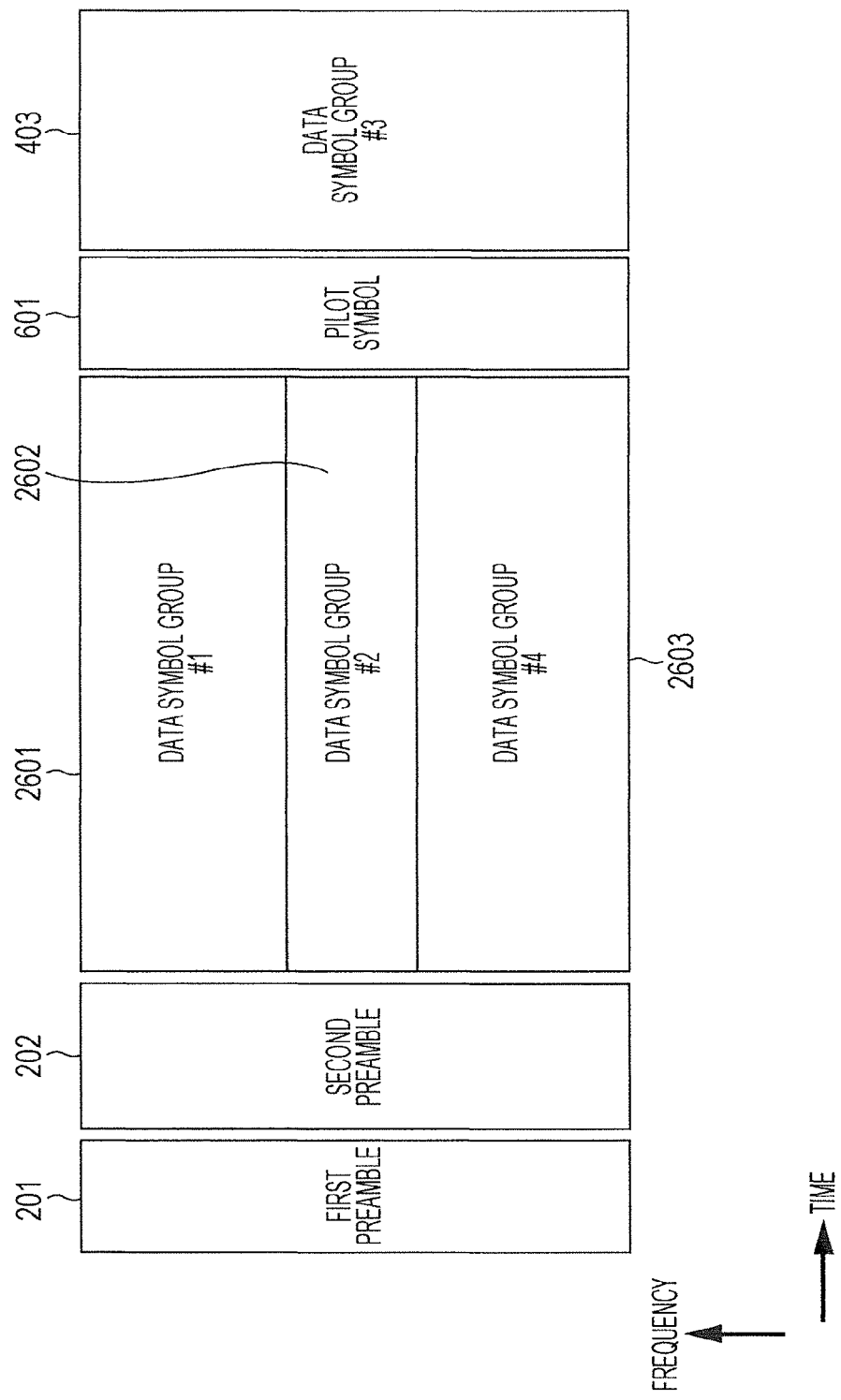
FIG. 26 is a view illustrating an example of a frame configuration.

FIG. 26 illustrates an example of a frame configuration in a case where there are three data symbol groups in a certain time interval, in contrast to FIG. 6. Elements operating in the same way as in FIG. 6 are assigned the same reference numerals in FIG. 26 and will not be described.

FIG. 26 illustrates data symbol group #1 2601, data symbol group #2 2602, and data symbol group #4 2603, and there are data symbol group #1, data symbol group #2 and data symbol group #4 in a certain time interval.

The transmitting apparatus in FIG. 1 may be able to select the frame configurations in FIGS. 24 to 26. Moreover, a frame configuration where there are four or more data symbol groups in a certain time interval, in contrast to FIGS. 4 to 6 and 24 to 26 may be employed.

FIGS. 24, 25 and 26 illustrate the examples where a data symbol group subjected to time division is arranged after a data symbol group subjected to frequency division. However, the arrangement is not limited to this arrangement. The data symbol group subjected to frequency division may be arranged after the data symbol group subjected to time division. In this case, in the example in FIG. 25, the first preamble and the second preamble are inserted between the data symbol group subjected to time division and the data symbol group subjected to frequency division. (However, symbols other than the first preamble and the second preamble may be inserted.) Then, in the example in FIG. 26, the pilot symbol is inserted between the data symbol group subjected to time division and the data symbol group subjected to frequency division (however, symbols other than the pilot symbol may be inserted).

Note that in a case where the transmitting apparatus (FIG. 1) transmits a modulated signal with the frame configuration in FIG. 24 when the transmitting apparatus incorporates "information related to a frame configuration" for transmitting information related to a frame configuration to the receiving apparatus (terminal) in the first preamble or the second preamble and transmits the "information related to the frame configuration," for example, when three bits of v0, v1 and v2 are allocated as the "information related to the frame configuration," the transmitting apparatus sets (v0, v1, v2) to (1, 0, 1) and transmits the "information related to the frame configuration."

When the transmitting apparatus transmits a modulated signal with the frame configuration in FIG. 25, the transmitting apparatus sets (v0, v1, v2) to (1, 1, 0) and transmits the "information related to the frame configuration."

When the transmitting apparatus transmits a modulated signal with the frame configuration in FIG. 26, the transmitting apparatus sets (v0, v1, v2) to (1, 1, 1) and transmits the "information related to the frame configuration."

Note that in FIGS. 24, 25 and 26, a data symbol group may also be a symbol group based on the MIMO (transmitting) method and the MISO (transmitting) method (as a matter of course, the data symbol group may be a symbol group of the SISO (SIMO) method). In this case, at the same time and the same (common) frequency, a plurality of streams (s1 and s2 described below) is transmitted (in this case, at the same time and the same (common) frequency, a plurality of modulated signals is transmitted from a plurality of (different) antennas).

Then, a case where the transmitting apparatus (FIG. 1) selects the frame configuration in FIG. 24, 25, or 26 is assumed, that is, it is assumed that the transmitting apparatus (FIG. 1) sets (v0, v1, v2) to (1, 0, 1), (1, 1, 0) or (1, 1, 1) and transmits (v0, v1, v2).

In this case, when there is a mix of a plurality of data symbol groups in a certain time interval like data symbol group #1, data symbol group #2 and data symbol group #4 of the frames in FIGS. 24, 25 and 26, a number of carriers to be used by each data symbol group can be set.

In this case, information related to the number of carriers is g(0) and g(1). For example, a total number of carriers is of 512 carriers.

When the number of carriers of the first data symbol group is of 448 carriers, the number of carriers of the second symbol group is of 32 carriers and the number of carriers of a third symbol group is of 32 carriers among the two data symbol groups, the transmitting apparatus sets g(0)=0 and g(1)=0 and transmits g(0) and g(1).

When the number of carriers of the first data symbol group is of 384 carriers, the number of carriers of the second symbol group is of 64 carriers and the number of carriers of the third symbol group is of 64 carriers among the two data symbol groups, the transmitting apparatus sets g(0)=1 and g(1)=0 and transmits g(0) and g(1).

When the number of carriers of the first data symbol group is of 256 carriers, the number of carriers of the second symbol group is of 128 carriers and the number of carriers of the third symbol group is of 128 carriers among the two data symbol groups, the transmitting apparatus sets g(0)=0 and g(1)=1 and transmits g(0) and g(1).

When the number of carriers of the first data symbol group is of 480 carriers, the number of carriers of the second symbol group is of 16 carriers and the number of carriers of the third symbol group is of 16 carriers among the two data symbol groups, the transmitting apparatus sets g(0)=1 and g(1)=1 and transmits g(0) and g(1).

Note that the setting of the number of carriers is not limited to the four settings, and the transmitting apparatus only needs to be able to set one or more types of the number of carriers.

Moreover, an effect of improvement in data transmission efficiency can be obtained when in frames in which there is a mix of a "case where there is a mix of a plurality of data symbol groups in a first time interval" and a "case where there is only one data symbol group in a second time interval" as in FIGS. 4, 5, 6, 24, 25 and 26, the transmitting apparatus can separately set a carrier interval (an FFT (Fast Fourier Transform) size or a Fourier transform size) in the "case where there is the mix of a plurality of data symbol groups in the first time interval," and a carrier interval (an FFT (Fast Fourier Transform) size or a Fourier transform size) in the "case where there is only one data symbol group in the second time interval." This is because the carrier interval appropriate in terms of data transmission efficiency in the "case where there is the mix of a plurality of data symbol groups in the first time interval," and the carrier interval appropriate in terms of data transmission efficiency in the "case where there is only one data symbol group in the second time interval" are different.

Hence, control information related to a carrier interval related to the "case where there is the mix of a plurality of data symbol groups in the first time interval" is ha(0) and ha(1).

In this case, when the carrier interval is 0.25 kHz, the transmitting apparatus sets ha(0)=0 and ha(1)=0, and transmits ha(0) and ha(1).

When the carrier interval is 0.5 kHz, the transmitting apparatus sets ha(0)=1 and ha(1)=0, and transmits ha(0) and ha(1).

When the carrier interval is 1 kHz, the transmitting apparatus sets ha(0)=0 and ha(1)=1, and transmits ha(0) and ha(1).

When the carrier interval is 2 kHz, the transmitting apparatus sets ha(0)=1 and ha(1)=1, and transmits ha(0) and ha(1).

Note that the setting of the carrier interval is not limited to the four settings, and the transmitting apparatus only needs to be able to set two or more types of the carrier intervals.

Then, control information related to a carrier interval related to the "case where there is only one data symbol group in the second time interval" is hb(0) and hb(1).

In this case, when the carrier interval is 0.25 kHz, the transmitting apparatus sets hb(0)=0 and hb(1)=0, and transmits hb(0) and hb(1).

When the carrier interval is 0.5 kHz, the transmitting apparatus sets hb(0)=1 and hb(1)=0, and transmits hb(0) and hb(1).

When the carrier interval is 1 kHz, the transmitting apparatus sets hb(0)=0 and hb(1)=1, and transmits hb(0) and hb(1).

When the carrier interval is 2 kHz, the transmitting apparatus sets hb(0)=1 and hb(1)=1, and transmits hb(0) and hb(1).

Note that the setting of the carrier interval is not limited to the four settings, and the transmitting apparatus only needs to be able to set two or more types of the carrier intervals.

Here, set values of the carrier interval selectable in any of the "case where there is the mix of a plurality of data symbol groups in the first time interval" and the "case where there is only one data symbol group in the second time interval" are made the same such that the set values of the carrier interval in the "case where there is a mix of a plurality of data symbol groups in the first time interval" are 0.25 kHz, 0.5 kHz, 1 kHz and 2 kHz and the set values of the carrier interval in the "case where there is only one data symbol group in the second time interval" are 0.25 kHz, 0.5 kHz, 1 kHz and 2 kHz. However, a set of set values selectable in the "case where there is the mix of a plurality of data symbol groups in the first time interval" and a set of set values selectable in the "case where there is only one data symbol group in the second time interval" may be different. For example, the set values of the carrier interval in the "case where there is the mix of a plurality of data symbol groups in the first time interval" may be 0.25 kHz, 0.5 kHz, 1 kHz and 2 kHz, and the set values of the carrier interval in the "case where there is only one data symbol group in the second time interval" may be 0.125 kHz, 0.25 kHz, 0.5 kHz and 1 kHz (the settable values are not limited to this example).

Note that there can be considered a method for transmitting control information ha(0) and ha(1) related to the carrier interval related to the "case where there is the mix of a plurality of data symbol groups in the first time interval," and control information hb(0) and hb(1) related to the carrier interval related to the "case where there is only one data symbol group in the second time interval" with any of the first preamble and the second preamble in FIGS. 4, 5, 6, 24, 25 and 26.

For example, in FIGS. 4, 6, 24 and 26, there can be considered a method for transmitting control information ha(0) and ha(1) related to the carrier interval related to the "case where there is a mix of a plurality of data symbol groups in the first time interval," and control information hb(0) and hb(1) related to the carrier interval related to the "case where there is only one data symbol group in the second time interval" with first preamble 201 or second preamble 202.

In FIGS. 5 and 25, there can be considered a method for transmitting control information ha(0) and ha(1) related to the carrier interval related to the "case where there is the mix of a plurality of data symbol groups in the first time interval" with first preamble 201 or second preamble 202, and transmitting control information hb(0) and hb(1) related to the carrier interval related to the "case where there is only one data symbol group in the second time interval" with first preamble 501 or second preamble 502.

Moreover, as another method, in FIGS. 5 and 25, a method for transmitting a plurality of times control information ha(0) and ha(1) related to the carrier interval related to the "case where there is the mix of a plurality of data symbol groups in the first time interval," and control information hb(0) and hb(1) related to the carrier interval related to the "case where there is only one data symbol group in the second time interval," such that ha(0) and ha(1), and hb(0) and hb(1) are transmitted with "first preamble 201 or second preamble 202" and with "first preamble 501 or second preamble 502" may be employed. In this case, for example, the receiving apparatus which is to receive only data of data symbol group #1 and the receiving apparatus which is to receive only data of data symbol group # can learn situations of all frames. Consequently, it is possible to easily and stably operate both of the receiving apparatuses.

As a matter of course, the receiving apparatus (for example, FIG. 23) which receives a modulated signal transmitted by the transmitting apparatus in FIG. 1 receives the above-described control information, demodulates/decodes a data symbol group based on this control information and obtains information.

As described above, the information described in the present exemplary embodiment is transmitted as control information, and thus it is possible to obtain an effect of enabling improvement in data reception quality and improvement in data transmission efficiency and of enabling an accurate operation of the receiving apparatus.

Figure 27:
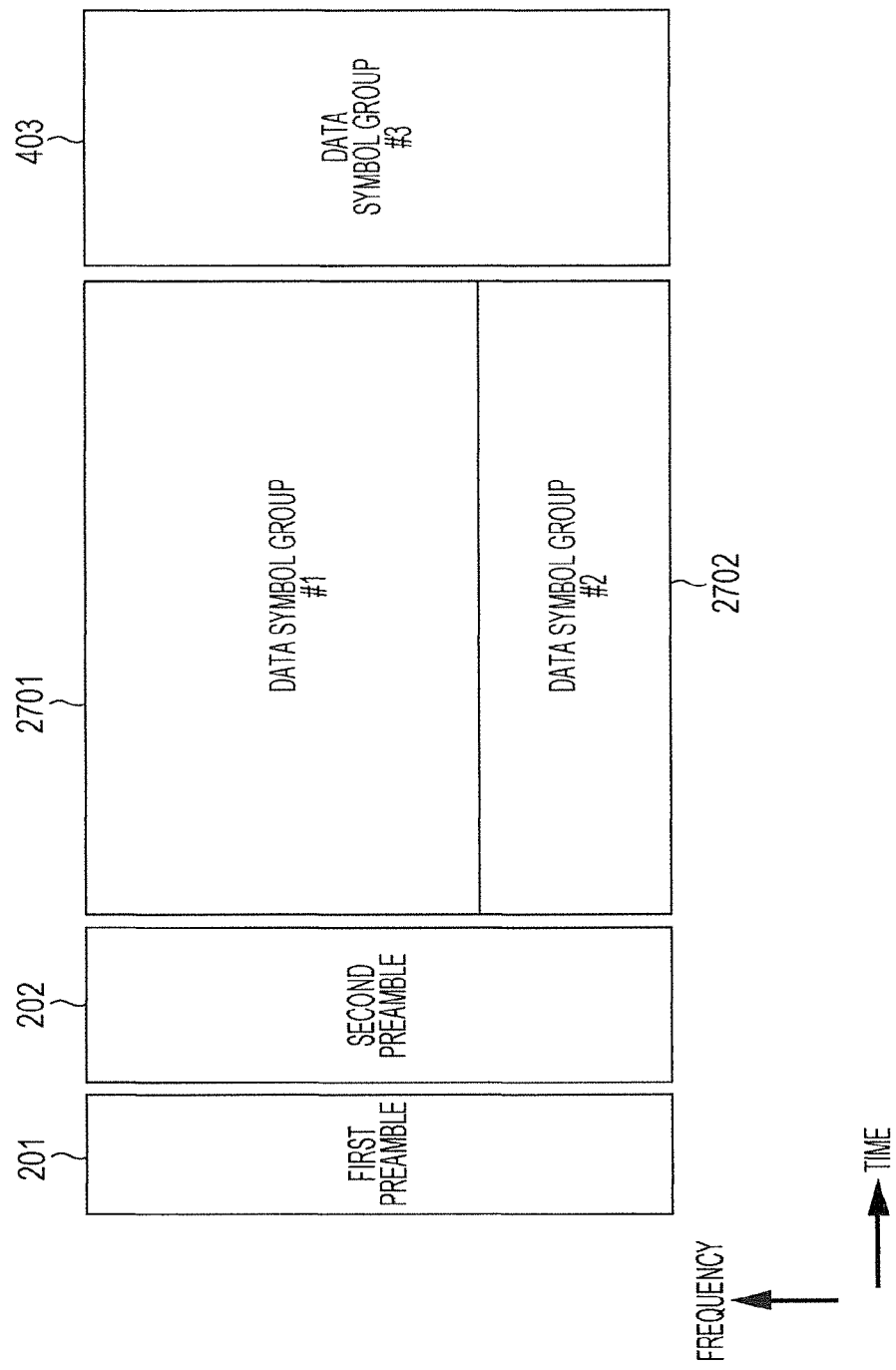
FIG. 27 is a view illustrating an example of a frame configuration.
Figure 28:
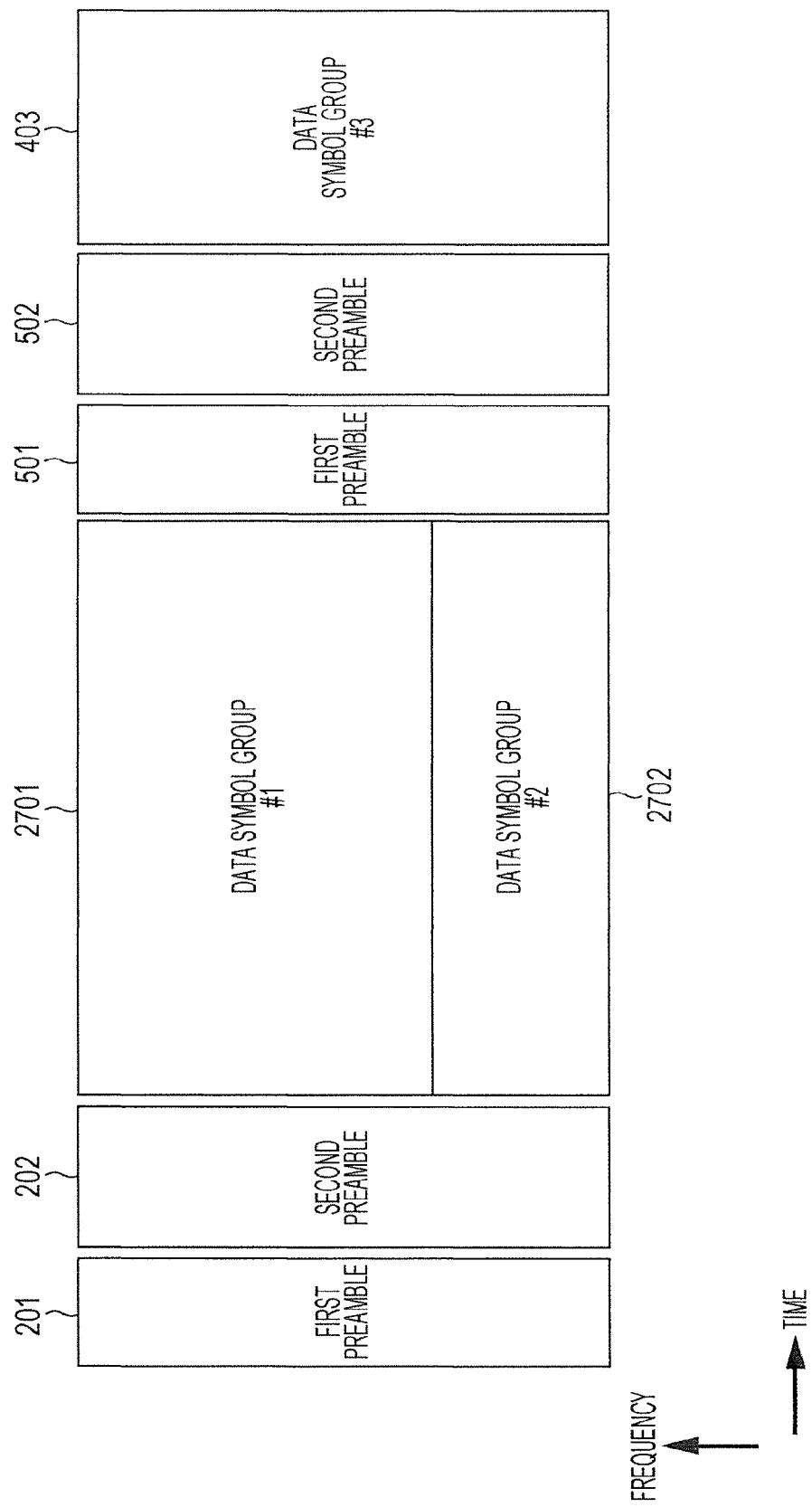
FIG. 28 is a view illustrating an example of a frame configuration.
Figure 29:
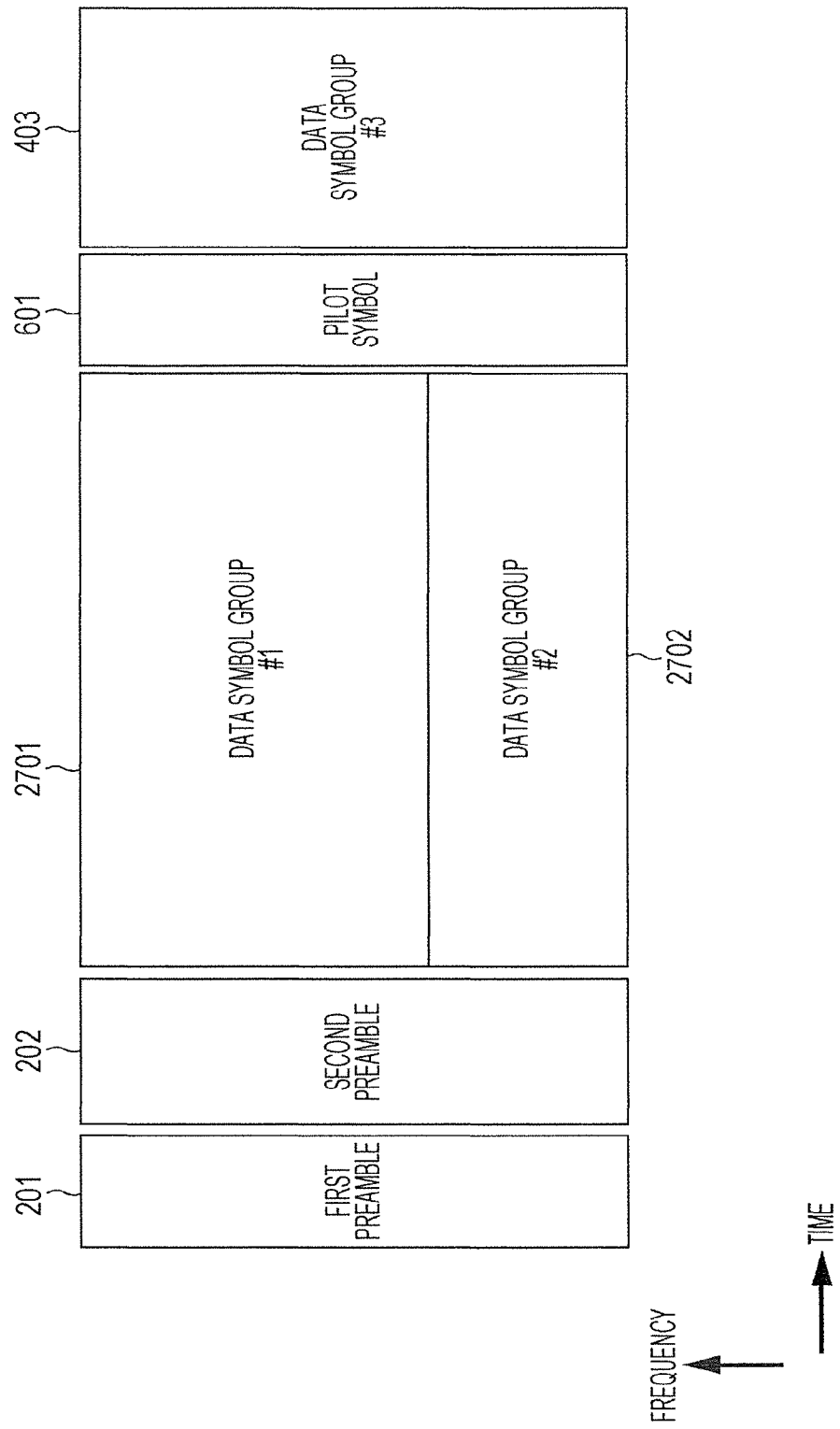
FIG. 29 is a view illustrating an example of a frame configuration.

Note that the frame configuration of a modulated signal transmitted by the transmitting apparatus in FIG. 1 is described in the first exemplary embodiment and the second exemplary embodiment with reference to FIGS. 3, 4, 5 and 6, but arrangement of data symbol group #1 and data symbol group #2 on the frequency axis in FIGS. 4, 5 and 6 is not limited to this arrangement, and for example, data symbol group #1 and data symbol group #2 may be arranged like data symbol group #1 (2701) and data symbol group #2 (2702) in FIGS. 27, 28 and 29. Note that in each of FIGS. 27, 28 and 29, a horizontal axis indicates time, and a vertical axis indicates a frequency.

Then, a method for transmitting data symbol groups #1 (401_1 and 401_2) in the frame configuration in FIG. 5 and a method for transmitting data symbol group #2 (402) may be set with first preamble 201 and/or second preamble 202. A method for transmitting data symbol group #3 (403) may be set with first preamble 501 and/or second preamble 502.

In this case, either a case where the "method for transmitting data symbol groups #1 (401_1 and 401_2) and the method for transmitting data symbol group #2 (402) are of MIMO transmission or MISO transmission" or a case where the "method for transmitting data symbol groups #1 (401_1 and 401_2) and the method for transmitting data symbol group #2 (402) are of SISO transmission (SIMO transmission)" may be selectable, and either a case where the "method for transmitting data symbol group #3 (403) is of MIMO transmission or MISO transmission" or a case where the "method for transmitting data symbol group #3 (403) is of SISO transmission (SIMO transmission)" may be selectable.

That is, a method for transmitting a plurality of data symbol groups present between a "set of the first preamble and the second preamble" and a next "set of the first preamble and the second preamble" is of either "MIMO transmission or MISO transmission" or "SISO transmission (SIMO transmission)," and in the method for transmitting a plurality of data symbol groups present between the "set of the first preamble and the second preamble" and the next "set of the first preamble and the second preamble," there is no mix of MIMO transmission and SISO transmission (SIMO transmission) and there is no mix of MISO transmission and SISO transmission (SIMO transmission).

When there is a mix of the SISO (SIMO) transmitting method and the MIMO (MISO) transmitting method, a fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

Figure 41:
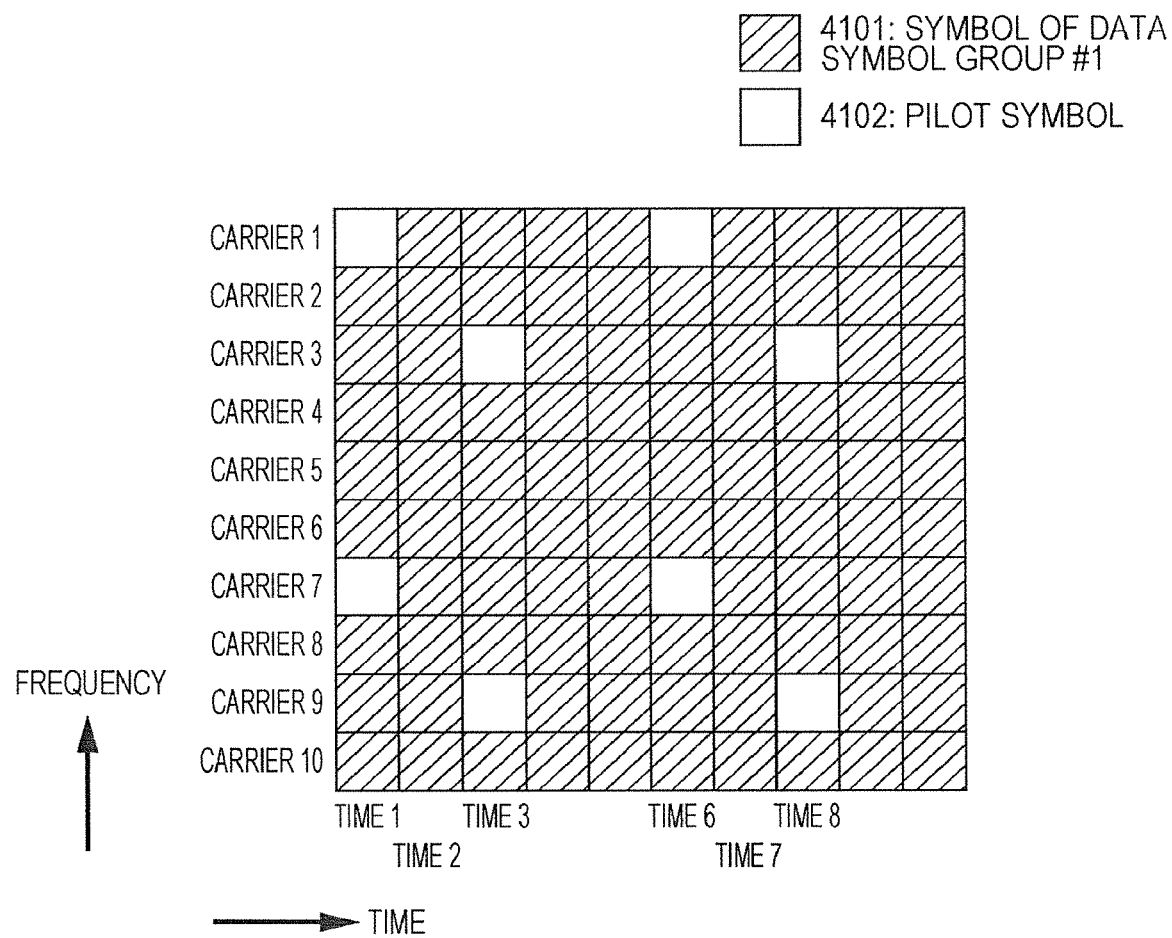
FIG. 41 is a view illustrating an insertion example of a pilot symbol to be inserted to a data symbol group.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

Figure 42:
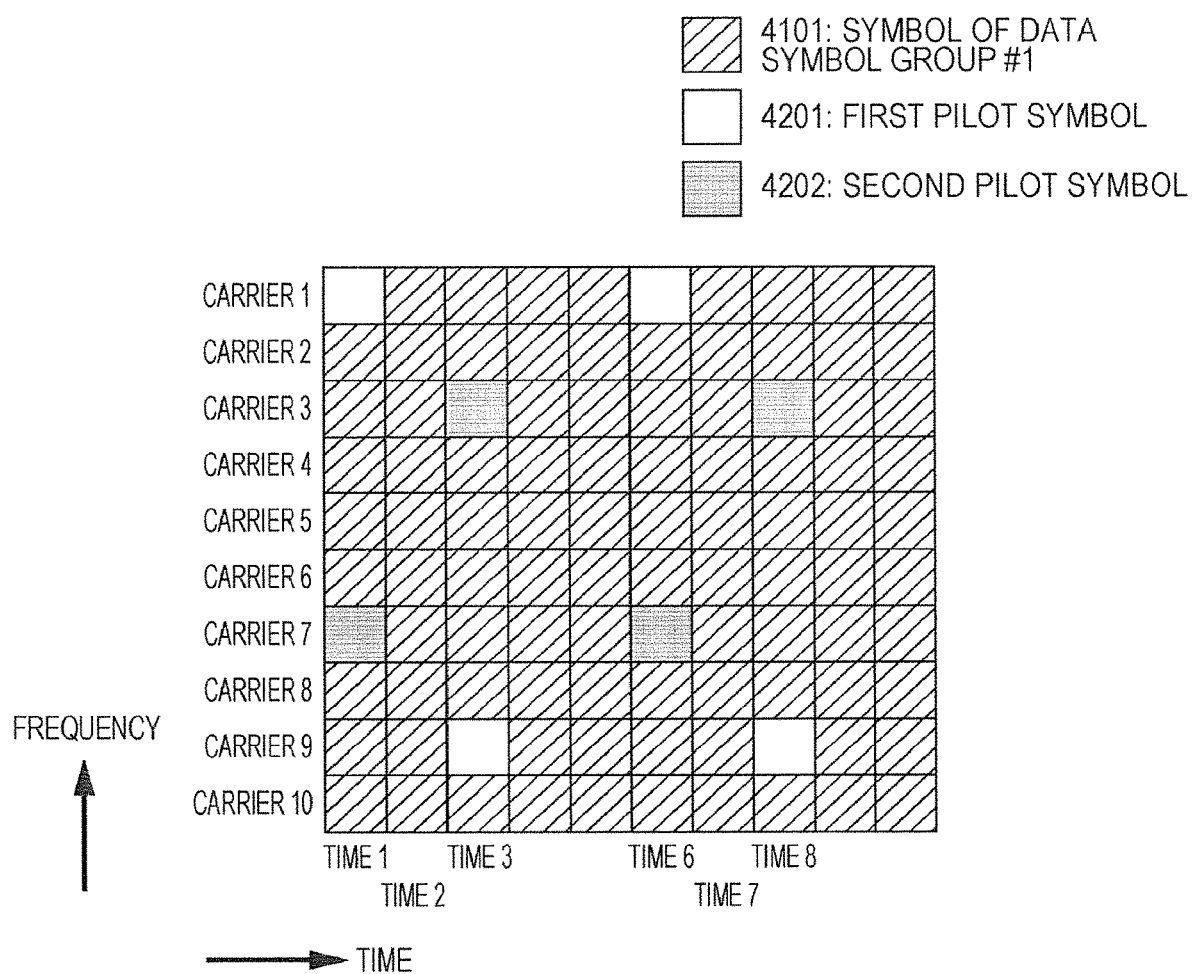
FIG. 42 is a view illustrating an insertion example of a pilot symbol to be inserted to a data symbol group.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:
First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:
First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:
First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:
First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Similarly, in the frame configuration in FIG. 25, a method for transmitting data symbol group #1 (2501), a method for transmitting data symbol group #2 (2502) and a method for transmitting data symbol group #4 (2503) may be set with first preamble 201 and/or second preamble 202, and a method for transmitting data symbol group #3 (403) may be set with first preamble 501 and/or second preamble 502.

In this case, either a case where the "method for transmitting data symbol group #1 (2501), the method for transmitting data symbol group #2 (2502) and the method for transmitting data symbol group #4 (2503) are of MIMO transmission or MISO transmission" or a case where the "method for transmitting data symbol group #1 (2501), the method for transmitting data symbol group #2 (2502) and the method for transmitting data symbol group #4 (2503) are of SISO transmission (SIMO transmission)" may be selectable, and either a case where the "method for transmitting data symbol group #3 (403) is of MIMO transmission or MISO transmission" or a case where the "method for transmitting data symbol group #3 (403) is of SISO transmission (SIMO transmission)" may be selectable.

That is, a method for transmitting a plurality of data symbol groups present between a "set of the first preamble and the second preamble" and a next "set of the first preamble and the second preamble" is of either "MIMO transmission or MISO transmission" or "SISO transmission (SIMO transmission)," and in the method for transmitting a plurality of data symbol groups present between the "set of the first preamble and the second preamble" and the next "set of the first preamble and the second preamble," there is no mix of MIMO transmission and SISO transmission (SIMO transmission) and there is no mix of MISO transmission and SISO transmission (SIMO transmission).

When there is a mix of the SISO (SIMO) transmitting method and the MIMO (MISO) transmitting method, a fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:

First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:

First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:

First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:

First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Moreover, in the frame configuration in FIG. 6, a method for transmitting data symbol groups #1 (401_1 and 401_2), a method for transmitting data symbol group #2 (402) and a method for transmitting data symbol group #3 (403) may be set with first preamble 201 and/or second preamble 202.

In this case, either a case where the "method for transmitting data symbol groups #1 (401_1 and 401_2) and the method for transmitting data symbol group #2 (402) are of MIMO transmission or MISO transmission" or a case where the "method for transmitting data symbol groups #1 (401_1 and 401_2) and the method for transmitting data symbol group #2 (402) are of SISO transmission (SIMO transmission)" may be selectable, and either a case where the "method for transmitting data symbol group #3 (403) is of MIMO transmission or MISO transmission" or a case where the "method for transmitting data symbol group #3 (403) is of SISO transmission (SIMO transmission)" may be selectable.

That is, a method for transmitting a plurality of data symbol groups present between a "set of the first preamble and the second preamble" and a "pilot symbol" is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)). Then, a method for transmitting a plurality of data symbol groups present between the "pilot symbol" and a next "set of the first preamble and the second preamble" (however, FIG. 6 does not illustrate the "set of the first preamble and the second preamble" next to the pilot symbol.) is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)).

When there is a mix of the SISO (SIMO) transmitting method and the MIMO (MISO) transmitting method, fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:
First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:
First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:
First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:
First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Similarly, a method for transmitting data symbol group #1 (2501) in the frame configuration in FIG. 26, a method for transmitting data symbol group #2 (2502), a method for transmitting data symbol group #4 (2503) and a method for transmitting data symbol group #3 (403) may be set with first preamble 201 and/or second preamble 202.

In this case, either a case where the "method for transmitting data symbol group #1 (2501), the method for transmitting data symbol group #2 (2502) and the method for transmitting data symbol group #4 (2503) are of MIMO transmission or MISO transmission" or a case where the "method for transmitting data symbol group #1 (2501), the method for transmitting data symbol group #2 (2502) and the method for transmitting data symbol group #4 (2503) are of SISO transmission (SIMO transmission)" may be selectable, and either a case where the "method for transmitting data symbol group #3 (403) is of MIMO transmission or MISO transmission" or a case where the "method for transmitting data symbol group #3 (403) is of SISO transmission (SIMO transmission)" may be selectable.

That is, a method for transmitting a plurality of data symbol groups present between a "set of the first preamble and the second preamble" and a "pilot symbol" is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)). Then, a method for transmitting a plurality of data symbol groups present between the "pilot symbol" and a next "set of the first preamble and the second preamble" (however, FIG. 6 does not illustrate the "set of the first preamble and the second preamble" next to the pilot symbol.) is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)).

When there is a mix of the SISO (SIMO) transmitting method and the MIMO (MISO) transmitting method, fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement of data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:
First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:
First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:
First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:
First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Third Exemplary Embodiment

The first exemplary embodiment and the second exemplary embodiment describe the MIMO transmitting method using precoding and phase change for transmitting a plurality of streams by using a plurality of antennas (the MIMO transmitting method may be the MIMO transmitting method which does not perform phase change), and the MISO (Multiple-Input Single-Output) transmitting method using space time block codes (or space frequency block codes) for transmitting a plurality of streams by using a plurality of antennas. An example of a method for transmitting preambles in a case where it is considered that a transmitting apparatus transmits modulated signals by these transmitting methods will be described.

The transmitting apparatus in FIG. 1 includes antenna 126_1 and antenna 126_2. In this case, as an antenna configuring method which is highly likely to be easy to demultiplex two modulated signals to be transmitted, there is a method in which "antenna 126_1 is a horizontal polarizing antenna, and antenna 126_2 is a vertical polarizing antenna,"

or

"antenna 126_1 is a vertical polarizing antenna, and antenna 126_2 is a horizontal polarizing antenna,"

or

"antenna 126_1 is a clockwise rotation round polarization antenna, and antenna 126_2 is a counterclockwise rotation round polarization antenna,"

or

"antenna 126_1 is a counterclockwise rotation round polarization antenna, and antenna 1262 is a clockwise rotation round polarization antenna."

Such an antenna configuring method will be referred to as a first antenna configuring method.

Moreover, an antenna configuring method other than the first antenna configuring method will be referred to as a second antenna configuring method. Hence, examples of the second antenna configuring method include methods in which "antenna 126_1 is a horizontal polarizing antenna, and antenna 126_2 is a horizontal polarizing antenna,"

and

"antenna 126_1 is a vertical polarizing antenna, and antenna 126_2 is a vertical polarizing antenna,"

"antenna 126_1 is a counterclockwise rotation round polarization antenna, and antenna 126_2 is a counterclockwise rotation round polarization antenna,"

and

"antenna 126_1 is a clockwise rotation round polarization antenna, and antenna 1262 is a clockwise rotation round polarization antenna."

Each transmitting apparatus (FIG. 1) is settable in the first antenna configuring method (for example, "antenna 126_1 is the horizontal polarizing antenna, and antenna 126_2 is the vertical polarizing antenna" or "antenna 126_1 is the vertical polarizing antenna, and antenna 126_2 is the horizontal polarizing antenna"), or the second antenna configuring method (for example, "antenna 126_1 is the horizontal polarizing antenna, and antenna 126_2 is the horizontal polarizing antenna" or "antenna 126_1 is the vertical polarizing antenna, and antenna 126_2 is the vertical polarizing antenna"). For example, in a broadcast system, any antenna configuring method of the first antenna configuring method and the second antenna configuring method is adopted depending on a place to install the transmitting apparatus (installation area).

In such an antenna configuring method, a method for configuring a first preamble and a second preamble in a case of the frame configuring methods, for example, in FIGS. 2 to 6, and 24 to 26 will be described.

As with the second exemplary embodiment, the transmitting apparatus transmits control information related to the antenna configuring method by using the first preamble. In this case, the information related to the antenna configuring method is m(0) and m(1).

In this case, when in two transmitting antennas of the transmitting apparatus, a first transmitting antenna is a horizontal polarizing antenna (that is, the first transmitting antenna transmits a horizontally polarized first modulated signal) and a second transmitting antenna is a horizontal polarizing antenna (that is, the second transmitting antenna transmits a horizontally polarized second modulated signal), the transmitting apparatus sets m(0)=0 and m(1)=0, and transmits m(0) and m(1).

When in the two transmitting antennas of the transmitting apparatus, the first transmitting antenna is a vertical polarizing antenna (that is, the first transmitting antenna transmits a vertically polarized first modulated signal) and the second transmitting antenna is a vertical polarizing antenna (that is, the second transmitting antenna transmits a vertically polarized second modulated signal), the transmitting apparatus sets m(0)=1 and m(1)=0, and transmits m(0) and m(1).

When in the two transmitting antennas of the transmitting apparatus, the first transmitting antenna is a horizontal polarizing antenna (that is, the first transmitting antenna transmits a horizontally polarized first modulated signal) and the second transmitting antenna is a vertical polarizing antenna (that is, the second transmitting antenna transmits a vertically polarized second modulated signal), the transmitting apparatus sets m(0)=0 and m(1)=1, and transmits m(0) and m(1).

When in the two transmitting antennas of the transmitting apparatus, the first transmitting antenna is a vertical polarizing antenna (that is, the first transmitting antenna transmits a vertically polarized first modulated signal) and the second transmitting antenna is a horizontal polarizing antenna (that is, the second transmitting antenna transmits a horizontally polarized second modulated signal), the transmitting apparatus sets m(0)=1 and m(1)=1, and transmits m(0) and m(1).

Then, the transmitting apparatus transmits m(0) and m(1) with, for example, the first preamble in the frame configuring method in FIGS. 2 to 6 and 24 to 26. Consequently, a receiving apparatus receives the first preamble and demodulates/decodes the first preamble, and thus the receiving apparatus can easily learn what polarized wave is used to transmit a modulated signal (for example, the second preamble and the data symbol group) transmitted by the transmitting apparatus. Consequently, it is possible to accurately set an antenna (including use of a polarized wave) to be used by the receiving apparatus during reception. As a result, it is possible to obtain an effect of making it possible to obtain a high reception gain (high reception field intensity) (there is also an advantage that it becomes unnecessary to perform signal processing for reception which has a small effect of obtaining a gain). Consequently, it is possible to obtain an advantage that data reception quality improves.

The above describes the point that "there is also an advantage that it becomes unnecessary to perform signal processing for reception which has a small effect of obtaining a gain." Supplemental description will be made on this point.

A case where the transmitting apparatus transmits modulated signals only with horizontally polarized waves and the receiving apparatus includes a horizontal polarizing receiving antenna and a vertical polarizing receiving antenna will be discussed. In this case, the modulated signals transmitted by the transmitting apparatus can be received at the horizontal polarizing receiving antenna of the receiving apparatus. However, the vertical polarizing receiving antenna of the receiving apparatus has very small reception field intensity of the modulated signals transmitted by the transmitting apparatus.

Hence, in such a case, when power consumed by the signal processing is considered, it is less necessary to perform an operation of performing signal processing on received signals received at the vertical polarizing receiving antenna of the receiving apparatus and obtaining data.

In view of the above, it is necessary for the transmitting apparatus to transmit "control information related to an antenna configuring method," and for the receiving apparatus to perform accurate control.

Next, a case where the transmitting apparatus includes two or more horizontal polarizing antennas (however, it does not necessarily mean that the transmitting apparatus does not include a vertical polarizing antenna.), or a case where the transmitting apparatus includes two or more vertical polarizing antennas (however, it does not necessarily mean that the transmitting apparatus does not include a horizontal polarizing antenna.) will be described.

<Case where Transmitting Apparatus Includes Two or More Horizontal Polarizing Antennas>

In this case, when the transmitting apparatus transmits a single stream (the SISO transmitting method or the SIMO transmitting method), the transmitting apparatus transmits modulated signals from one or more horizontal polarizing antennas. In consideration of this case, when the transmitting apparatus transmits the first preamble including the control information related to the antenna configuring method described above, from one or more horizontal polarizing antennas, the receiving apparatus can receive the first preamble including the control information related to the antenna configuring method with a high gain, and, consequently, can obtain high data reception quality.

Then, the receiving apparatus obtains the control information related to the antenna configuring method, and thus the receiving apparatus can learn antenna configuration with which the transmitting apparatus has transmitted the MIMO transmitting method and the MISO transmitting method.

<Case where Transmitting Apparatus Includes Two or More Vertical Polarizing Antennas>

In this case, when the transmitting apparatus transmits a single stream (the SISO transmitting method or the SIMO transmitting method), the transmitting apparatus transmits modulated signals from one or more vertical polarizing antennas. In consideration of this case, when the transmitting apparatus transmits the first preamble including the control information related to the antenna configuring method described above, from one or more vertical polarizing antennas, the receiving apparatus can receive the first preamble including the control information related to the antenna configuring method with a high gain and, consequently, can obtain high data reception quality.

Then, the receiving apparatus obtains the control information related to the antenna configuring method, and thus the receiving apparatus can learn antenna configuration with which the transmitting apparatus has transmitted the MIMO transmitting method and the MISO transmitting method.

Next, a case where the transmitting apparatus includes a horizontal polarizing antenna and a vertical polarizing antenna will be described.

In this case, when the transmitting apparatus transmits a single stream (the SISO transmitting method or the SIMO transmitting method), it can be considered that the transmitting apparatus
a first method:
transmits modulated signals from the horizontal polarizing antenna and the vertical polarizing antenna,
a second method:
transmits modulated signals from the horizontal polarizing antenna,
a third method:
transmits modulated signals from the vertical polarizing antenna.

In this case, transmission from an antenna used for transmitting the first preamble including the control information related to the antenna configuring method described above is performed by the same method as in a case of transmission from an antenna used for transmitting a single stream (the SISO transmitting method or the SIMO transmitting method).

Hence, when modulated signals are transmitted by the first method in transmission of a single stream (the SISO transmitting method or the SIMO transmitting method), the first preamble including the control information related to the antenna configuring method is transmitted from the horizontal polarizing antenna and the vertical polarizing antenna.

When modulated signals are transmitted by the second method, the first preamble including the control information related to the antenna configuring method is transmitted from the horizontal polarizing antenna.

When modulated signals are transmitted by the third method, the first preamble including the control information related to the antenna configuring method is transmitted from the vertical polarizing antenna.

In this way, there is an advantage that the receiving apparatus can receive the first preamble in the same way as in receiving data symbol groups transmitted by the SISO method (it becomes unnecessary to change a signal processing method according to a transmitting method) (it is also possible to obtain the above-described advantage).

Then, the receiving apparatus obtains the control information related to the antenna configuring method, and thus the receiving apparatus can learn antenna configuration with which the transmitting apparatus has transmitted the MIMO transmitting method and the MISO transmitting method.

As described above, the first preamble including the control information related to the antenna configuring method is transmitted, and thus the receiving apparatus can receive the first preamble with a high gain. Consequently, it is possible to obtain an effect of improvement in data symbol group reception quality, and it is possible to obtain an effect of enabling improvement in power efficiency of the receiving apparatus.

Note that the case where the control information related to the antenna configuring method is contained in the first preamble is described above as an example, but even when the control information related to the antenna configuring method is not contained in the first preamble, it is possible to obtain the same effect.

Then, the antenna used for transmitting the first preamble is highly likely to be determined during installation or maintenance of the transmitting apparatus, and a change in an antenna to be used during an operation can also be made, but such a change is less likely to be frequently made during a practical operation.

Fourth Exemplary Embodiment

The example of a frame configuration in a modulated signal to be transmitted by the transmitting apparatus in FIG. 1 is described in the above-described exemplary embodiments. A frame configuration in a modulated signal to be transmitted by the transmitting apparatus in FIG. 1 will be further described in the present exemplary embodiment.

Figure 30:
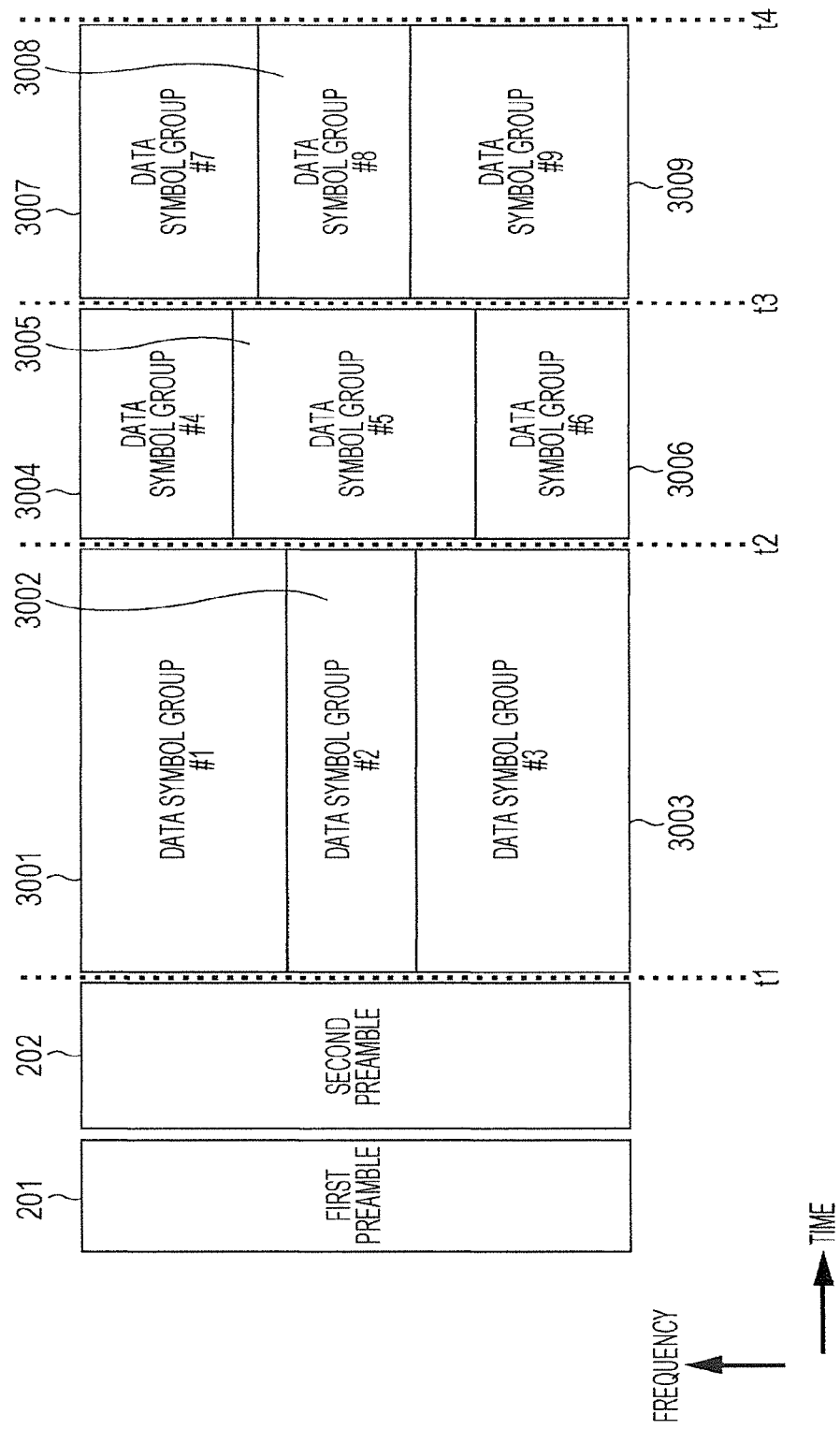
FIG. 30 is a view illustrating an example of a frame configuration.

FIG. 30 is an example of a frame configuration in a modulated signal to be transmitted by the transmitting apparatus in FIG. 1. Elements operating in the same way as in FIG. 2 are assigned the same reference numerals in FIG. 30 and will not be described. In FIG. 30, a vertical axis indicates a frequency, and a horizontal axis indicates time. Then, since a transmitting method using a multi-carrier such as an OFDM method is used, there is a plurality of carriers on the vertical axis frequency.

FIG. 30 illustrates data symbol group #1 3001, data symbol group #2 3002 and data symbol group #3 3003. There are data symbol group #1 (3001), data symbol group #2 (3002) and data symbol group #3 (3003) from time t1 to time t2, and, at every time, there is a plurality of data symbol groups.

Similarly, FIG. 30 illustrates data symbol group #4 3004, data symbol group #5 3005 and data symbol group #6 3006. There are data symbol group #4 (3004), data symbol group #5 (3005) and data symbol group #6 (3006) from time t2 and time t3, and, at every time, there is a plurality of data symbol groups.

Then, FIG. 30 illustrates data symbol group #7 3007, data symbol group #8 3008 and data symbol group #9 3009. There are data symbol group #7 (3007), data symbol group #8 (3008) and data symbol group #9 (3009) from time t3 to time t4, and, at every time, there is a plurality of data symbol groups.

In this case, a number of carriers to be used in each data symbol group can be set. The number of symbol groups existing at every time is not limited to three. There only need to be two or more symbol groups.

Note that a data symbol group may also be a symbol group based on the MIMO (transmitting) method and the MISO (transmitting) method (as a matter of course, the data symbol group may be a symbol group of the SISO (SIMO) method). In this case, at the same time and the same (common) frequency, a plurality of streams (s1 and s2 described below) is transmitted. (In this case, at the same time and the same (common) frequency, a plurality of modulated signals is transmitted from a plurality of (different) antennas.) Then, this point is not limited to FIG. 30, and the same also applies to FIGS. 31, 32, 33, 34, 35, 36, 37 and 38.

Characteristic points in FIG. 30 are such that frequency division is performed, and that there are two or more time sections in which there is a plurality of data symbol groups. Consequently, there is an effect of enabling symbol groups of different data reception quality to exist at the same time, and of enabling a flexible setting of a data transmission rate by appropriately defining data sections.

Figure 31:
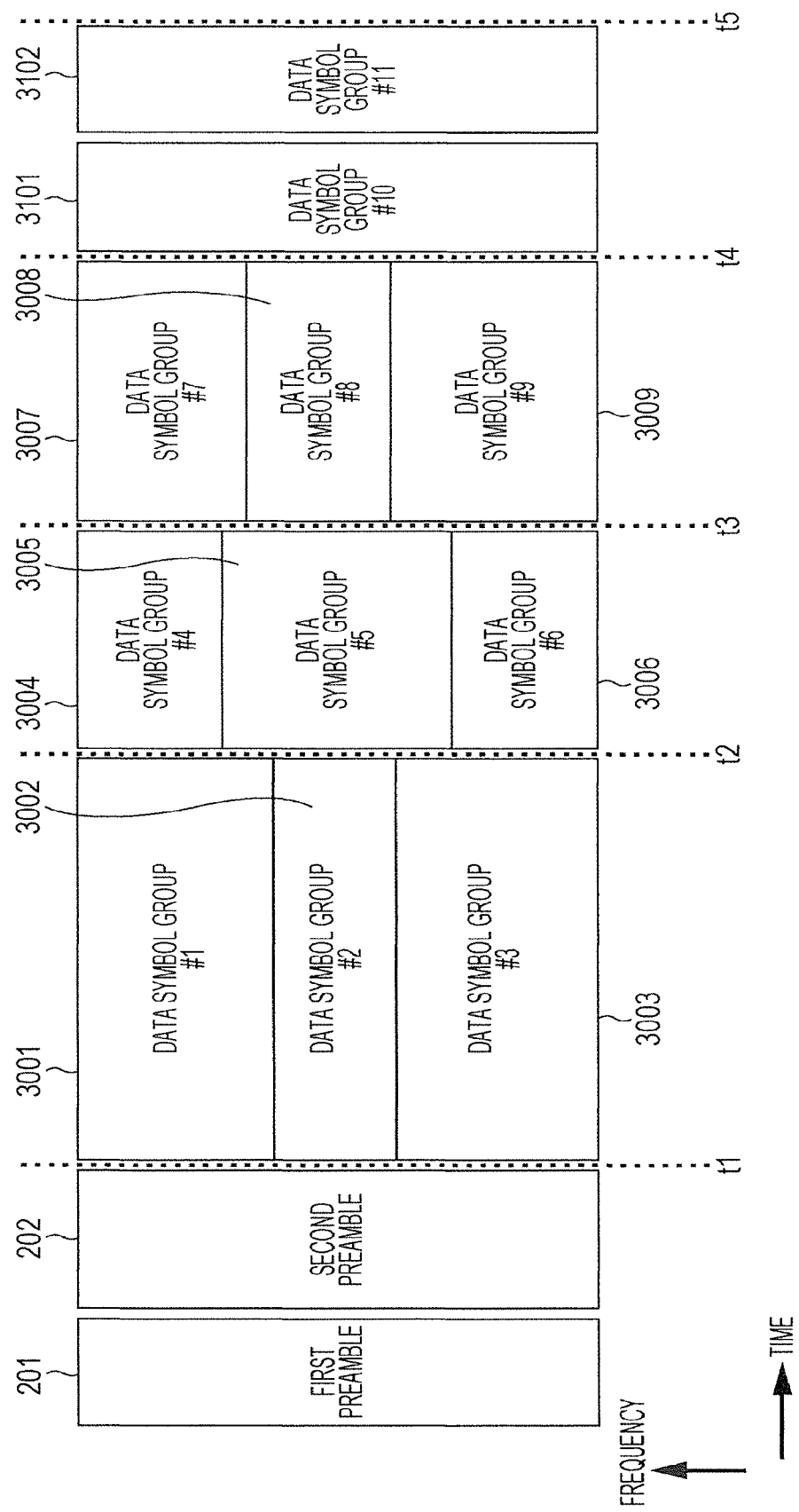
FIG. 31 is a view illustrating an example of a frame configuration.

FIG. 31 is an example of a frame configuration in a modulated signal to be transmitted by the transmitting apparatus in FIG. 1. Elements operating in the same way as in FIGS. 2 and 30 are assigned the same reference numerals in FIG. 31 and will not be described. In FIG. 31, a vertical axis indicates a frequency, and a horizontal axis indicates time. Then, since a transmitting method using a multi-carrier such as an OFDM method is used, there is a plurality of carriers on the vertical axis frequency.

FIG. 31 illustrates data symbol group #10 3101 and data symbol group #11 3102, and there are data symbol group #10 (3101) and data symbol group #11 (3102) from time t4 to time t5. In this case, temporal division is performed and there is a plurality of data symbol groups.

Characteristic points in FIG. 31 are such that frequency division is performed and there are two or more time sections in which there is a plurality of data symbol groups, and that temporal division is performed and there is a plurality of data symbols. Consequently, there is an effect of enabling symbol groups of different data reception quality to exist at the same time, and of enabling a flexible setting of a data transmission rate by appropriately defining data sections, and also of enabling a flexible setting of a data transmission rate by performing temporal division and appropriately defining data sections.

Figure 32:
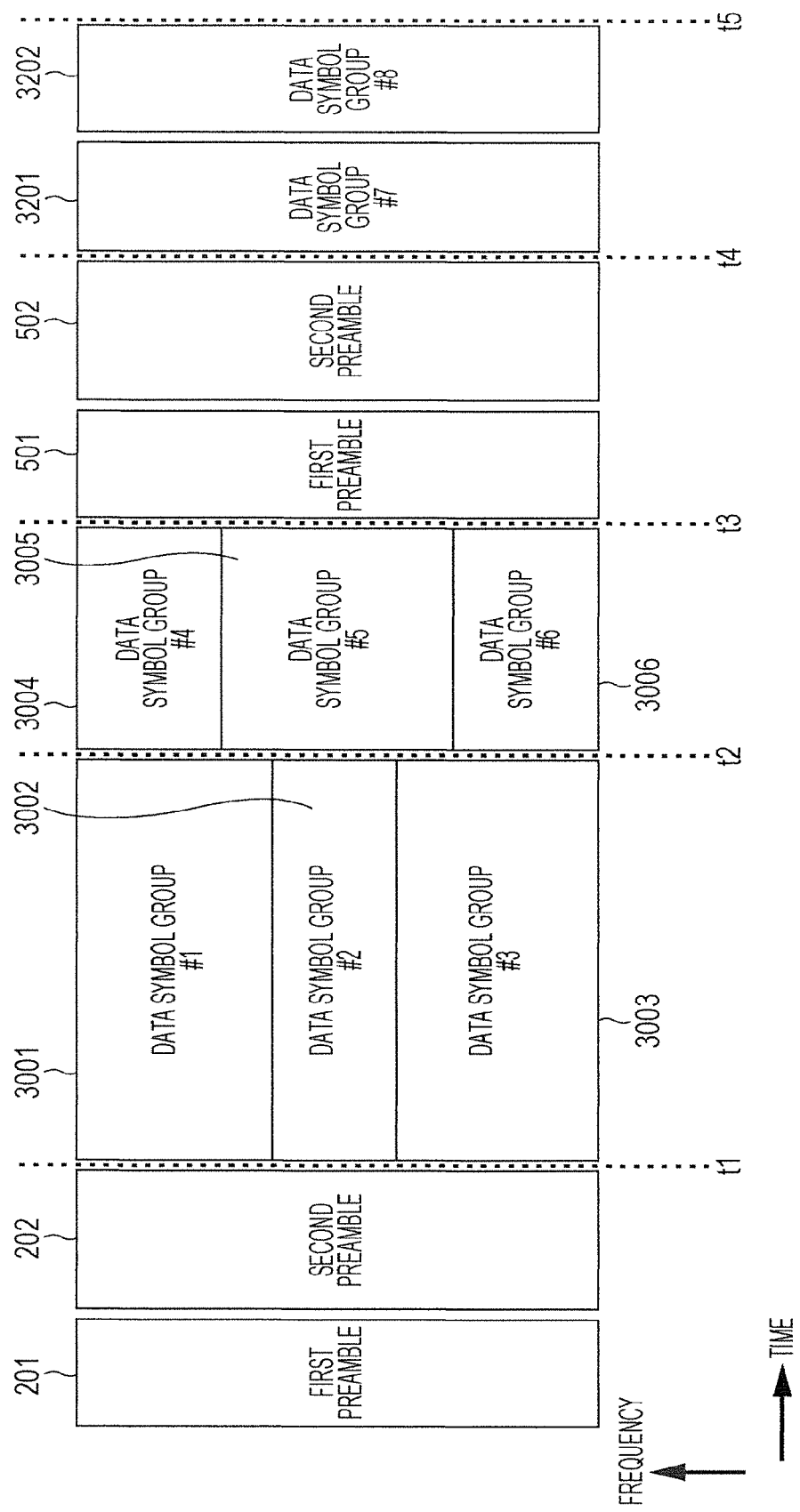
FIG. 32 is a view illustrating an example of a frame configuration.

FIG. 32 is an example of a frame configuration in a modulated signal to be transmitted by the transmitting apparatus in FIG. 1. Elements operating in the same way as FIGS. 2, 30 and 5 are assigned the same reference numerals in FIG. 32 and will not be described. In FIG. 32, a vertical axis indicates a frequency, and a horizontal axis indicates time. Then, since a transmitting method using a multi-carrier method such as an OFDM method is used, there is a plurality of carriers on the vertical axis frequency.

FIG. 32 illustrates data symbol group #7 3201 and data symbol group #8 3202, and there are data symbol group #7 (3201) and data symbol group #8 (3202) from time t4 to time t5. In this case, temporal division is performed and there is a plurality of data symbol groups.

A difference from FIG. 31 is that first preamble 501 and second preamble 502 are arranged before data symbol group #7 (3201). In this case, control information related to data symbol groups #1 to #6 subjected to frequency division (for example, a number of carriers and a time interval which are necessary for each data symbol group, a method for modulating each data symbol group, a method for transmitting each data symbol group and a method of an error correction code to be used in each data symbol group) is transmitted with first preamble (201) and/or second preamble (202) in FIG. 32. Note that the example of control information is described in the second exemplary embodiment (note that this point will be described additionally).

Then, control information related to data symbol groups #7 and #8 subjected to temporal division (for example, a number of symbols (or a time interval) which are necessary for each data symbol group, a method for modulating each data symbol group, a method for transmitting each data symbol group and a method of an error correction code to be used in each data symbol group) is transmitted with first preamble (501) and/or second preamble (502) in FIG. 32. Note that the example of control information is described in the second exemplary embodiment (note that this point will be described additionally).

When the control information is transmitted in this way, it becomes unnecessary to incorporate dedicated control information for the data symbol groups subjected to time division in first preamble 201 and second preamble 202, and also it becomes unnecessary to incorporate dedicated control information for data symbol groups subjected to frequency division in first preamble 501 and second preamble 502, and it is possible to realize data transmission efficiency of control information and simplification of control on control information of the receiving apparatus.

Characteristic points in FIG. 32 are such that frequency division is performed and there are two or more time sections in which there is a plurality of data symbol groups, and that temporal division is performed and there is a plurality of data symbols. Consequently, there is an effect of enabling symbol groups of different data reception quality to exist at the same time, and of enabling a flexible setting of a data transmission rate by appropriately defining data sections, and also of enabling a flexible setting of a data transmission rate by performing temporal division and appropriately defining data sections.

Figure 33:
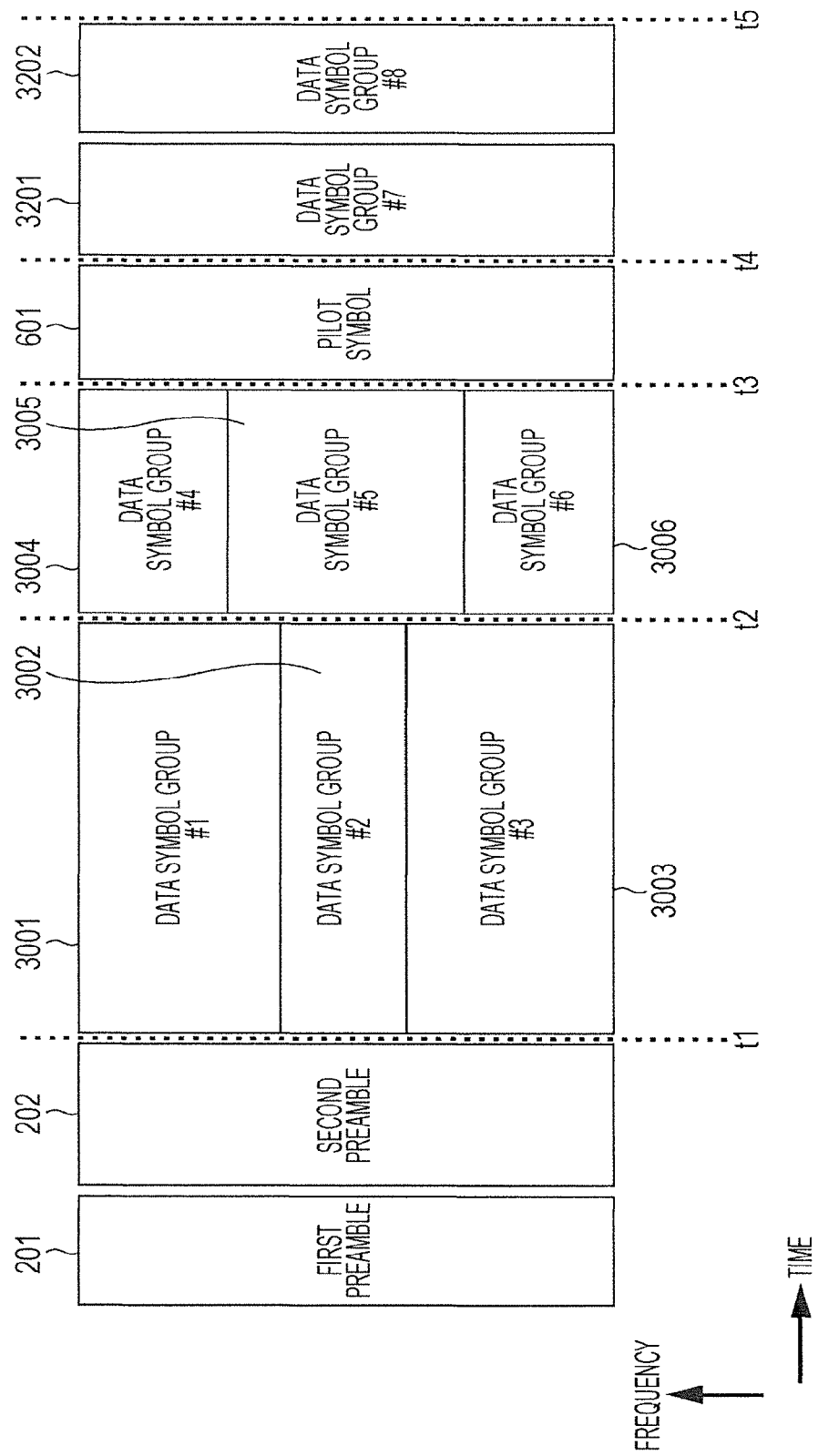
FIG. 33 is a view illustrating an example of a frame configuration.

FIG. 33 is an example of a frame configuration in a modulated signal to be transmitted by the transmitting apparatus in FIG. 1. Elements operating in the same way as in FIGS. 2, 30, 32 and 6 are assigned the same reference numerals in FIG. 33 and will not be described. In FIG. 33, a vertical axis indicates a frequency, and a horizontal axis indicates time. Then, since a transmitting method using a multi-carrier method such as an OFDM method is used, there is a plurality of carriers on the vertical axis frequency.

FIG. 33 illustrates data symbol group #7 3201 and data symbol group #8 3202, and there are data symbol group #7 (3201) and data symbol group #8 (3202) from time t4 to time t5. In this case, temporal division is performed and there is a plurality of data symbol groups.

A difference between FIGS. 30 and 31 is that pilot symbol 601 is arranged before data symbol group #7 (3201). In this case, an advantage in a case of arranging pilot symbol 601 is as described in the first exemplary embodiment.

Characteristic points in FIG. 33 are such that frequency division is performed and there are two or more time sections in which there is a plurality of data symbol groups, and that temporal division is performed and there is a plurality of data symbols. Consequently, there is an effect of enabling symbol groups of different data reception quality to exist at the same time, and of enabling a flexible setting of a data transmission rate by appropriately defining data sections, and also of enabling a flexible setting of a data transmission rate by performing temporal division and appropriately defining data sections.

Figure 34:
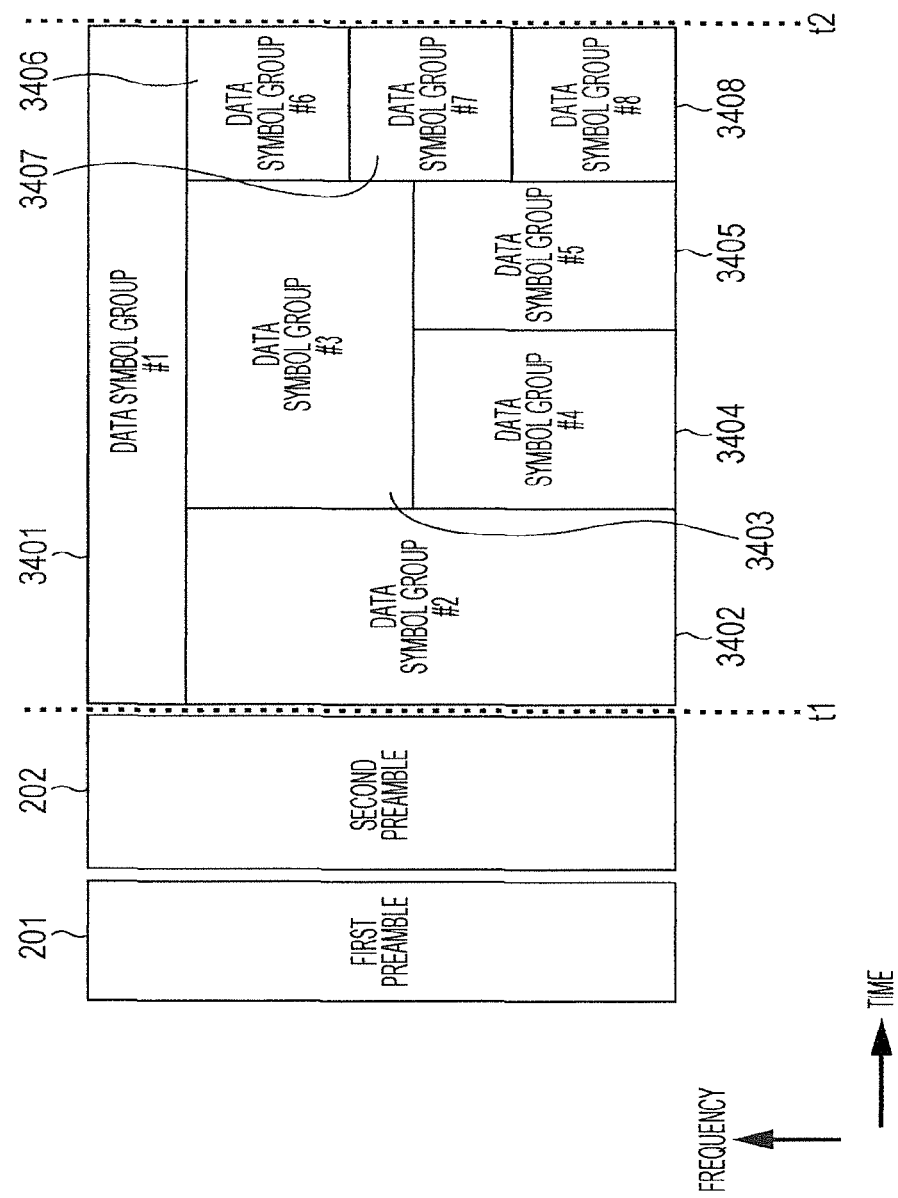
FIG. 34 is a view illustrating an example of a frame configuration.

FIG. 34 is an example of a frame configuration in a modulated signal to be transmitted by the transmitting apparatus in FIG. 1. Elements operating in the same way as FIG. 2 are assigned the same reference numerals in FIG. 34 and will not be described. In FIG. 34, a vertical axis indicates a frequency, and a horizontal axis indicates time. Then, since a transmitting method using a multi-carrier method such as an OFDM method is used, there is a plurality of carriers on the vertical axis frequency.

FIG. 34 illustrates data symbol group #1 3401, data symbol group #2 3402, data symbol group #3 3403, data symbol group #4 3404, data symbol group #5 3405, data symbol group #6 3406, data symbol group #7 3407, and data symbol group #8 3408.

In FIG. 34, a data symbol group is arranged on a frame by using a frequency division method. Then, a difference of FIG. 34 from FIGS. 30 to 33 is that there is flexibility in a setting of a time interval between respective data symbol groups.

For example, data symbol group #1 has symbols arranged from time t1 to time t2, and has a long time interval as compared to other data symbols. Data symbol groups other than data symbol group #1 also each have a time interval flexibly set.

Characteristic points in FIG. 34 are such that frequency division is performed, and that time intervals of data symbol groups are flexibly set. Consequently, there is an effect of enabling symbol groups of different data reception quality to exist at the same time, and of enabling a flexible setting of a data transmission rate by appropriately defining data sections.

Figure 35:
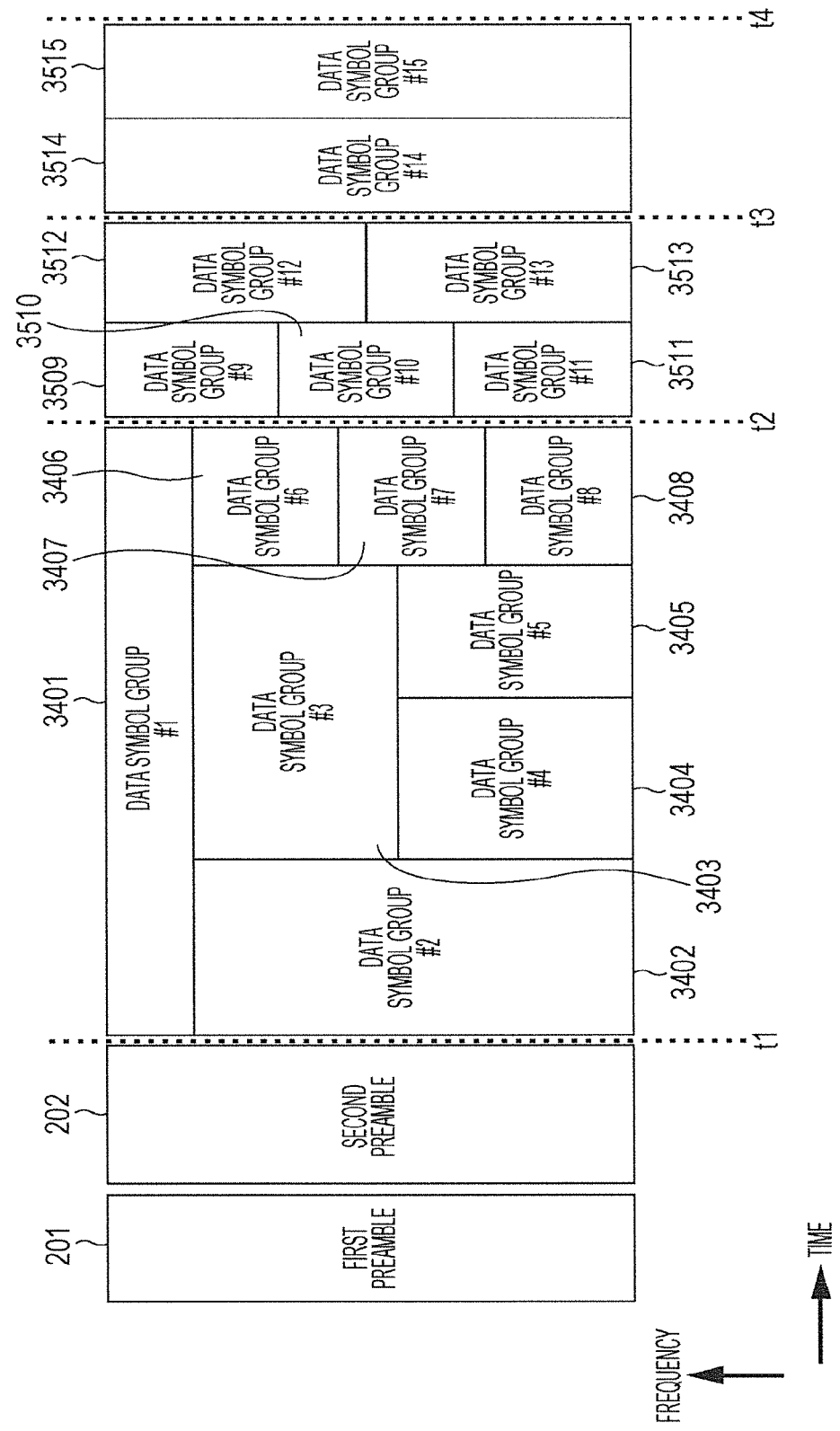
FIG. 35 is a view illustrating an example of a frame configuration.

FIG. 35 is an example of a frame configuration in a modulated signal to be transmitted by the transmitting apparatus in FIG. 1. Elements operating in the same way as FIGS. 2 and 34 are assigned the same reference numerals in FIG. 35 and will not be described. In FIG. 35, a vertical axis indicates a frequency, and a horizontal axis indicates time. Then, since a transmitting method using a multi-carrier method such as an OFDM method is used, there is a plurality of carriers on the vertical axis frequency.

FIG. 35 illustrates data symbol group #9 3509, data symbol group #10 3510, data symbol group #11 3511 and data symbol group #12 3512. Frequency division is performed, and data symbol group #9, data symbol group #10, data symbol group #11, data symbol group #12 and data symbol group #13 are transmitted between time t2 and time t3. As compared to time t1 and time t2, characteristic points are such that a time interval of data symbol group #9, a time interval of data symbol group #10, and a time interval of data symbol group #11 are equal, and a time interval of data symbol group #12, and a time interval of data symbol group #13 are equal.

FIG. 35 illustrates data symbol group #14 3514 and data symbol group #15 3515. Temporal division is performed, and data symbol group #14 and data symbol group #15 are transmitted between time t3 and time t4.

Consequently, there is an effect of enabling symbol groups of different data reception quality to exist at the same time, and of enabling a flexible setting of a data transmission rate by appropriately defining data sections and frequency sections.

Figure 36:
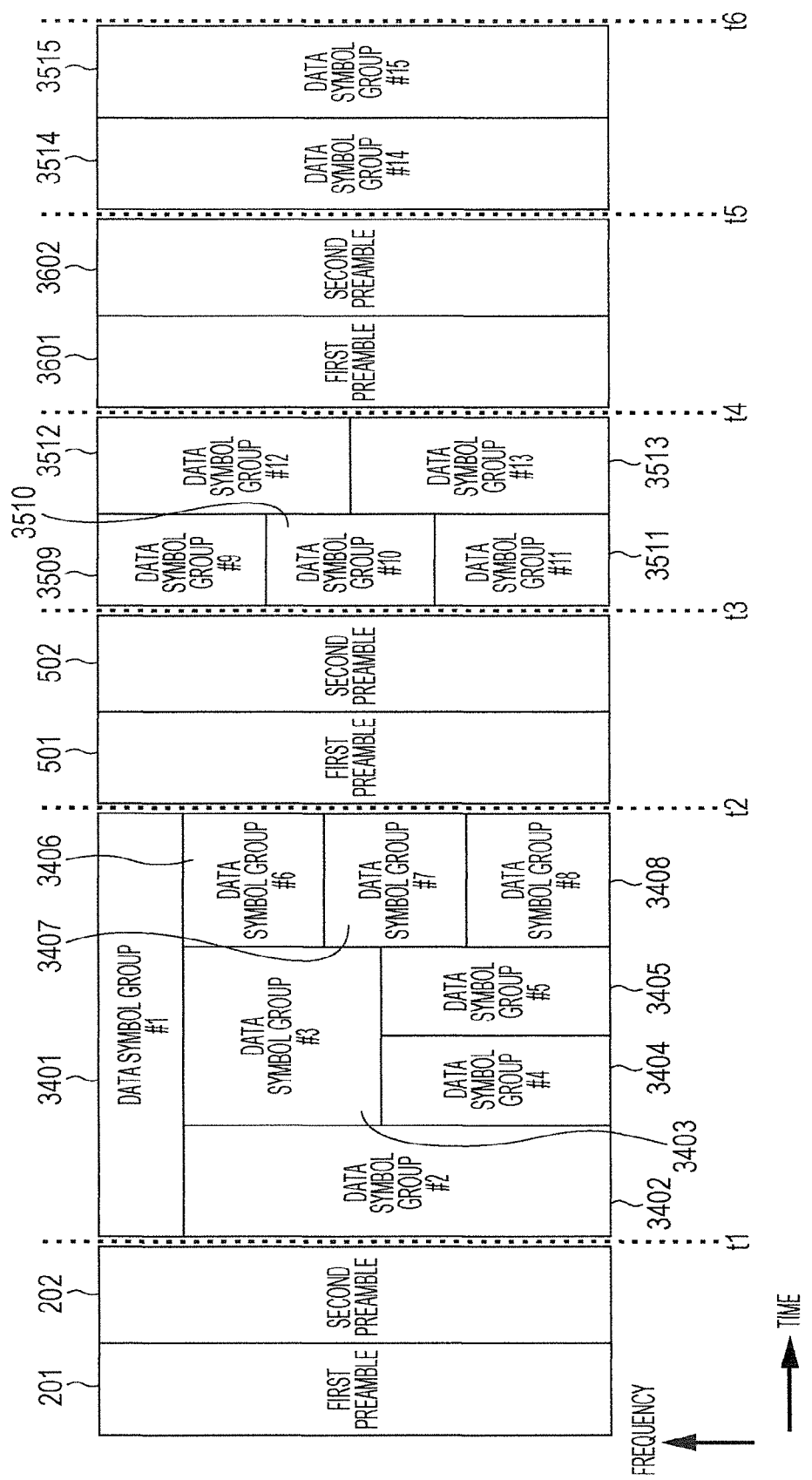
FIG. 36 is a view illustrating an example of a frame configuration.

FIG. 36 is an example of a frame configuration in a modulated signal to be transmitted by the transmitting apparatus in FIG. 1. Elements operating in the same way as FIGS. 2, 6, 34 and 35 are assigned the same reference numerals in FIG. 36 and will not be described. In FIG. 36, a vertical axis indicates a frequency, and a horizontal axis indicates time. Then, since a transmitting method using a multi-carrier method such as an OFDM method is used, there is a plurality of carriers on the vertical axis frequency.

A difference of FIG. 36 from FIG. 35 is that first preamble 501, second preamble 502, first preamble 3601 and second preamble 3602 are arranged. In this case, data symbol groups #1 to #8 and data symbol groups #9 to #13 are subjected to frequency division, and also data symbol groups #14 and #15 are subjected to time division to be arranged.

Consequently, there is an effect of enabling symbol groups of different data reception quality to exist at the same time, and of enabling a flexible setting of a data transmission rate by appropriately defining data sections and frequency sections.

In this case, control information related to data symbol groups #1 to #8 subjected to frequency division (for example, a number of carriers and a time interval which are necessary for each data symbol group, a method for modulating each data symbol group, a method for transmitting each data symbol group and a method of an error correction code to be used in each data symbol group) is transmitted with first preamble (201) and/or second preamble (202) in FIG. 36. Note that the example of control information is described in the second exemplary embodiment (note that this point will be described additionally).

Then, control information related to data symbol groups #9 to #13 subjected to frequency division (for example, a number of carriers and a time interval which are necessary for each data symbol group, a method for modulating each data symbol group, a method for transmitting each data symbol group and a method of an error correction code to be used in each data symbol group) is transmitted with first preamble (501) and/or second preamble (502) in FIG. 36. Note that the example of control information is described in the second exemplary embodiment (note that this point will be described additionally).

Moreover, control information related to data symbol groups #14 and #15 subjected to temporal division (for example, a number of symbols (or a time interval) which is necessary for each data symbol group, a method for modulating each data symbol group, a method for transmitting each data symbol group and a method of an error correction code to be used in each data symbol group) is transmitted with first preamble (3601) and/or second preamble (3602) in FIG. 36. Note that the example of control information is described in the second exemplary embodiment (note that this point will be described additionally).

When the control information is transmitted in this way, it becomes unnecessary to incorporate dedicated control information for the data symbol groups subjected to time division in first preamble 201, second preamble 202, first preamble 501 and second preamble 502, and also it becomes unnecessary to incorporate dedicated control information for data symbol groups subjected to frequency division in first preamble 3601 and second preamble 3602, and it is possible to realize data transmission efficiency of control information and simplification of control on control information of the receiving apparatus.

Figure 37:
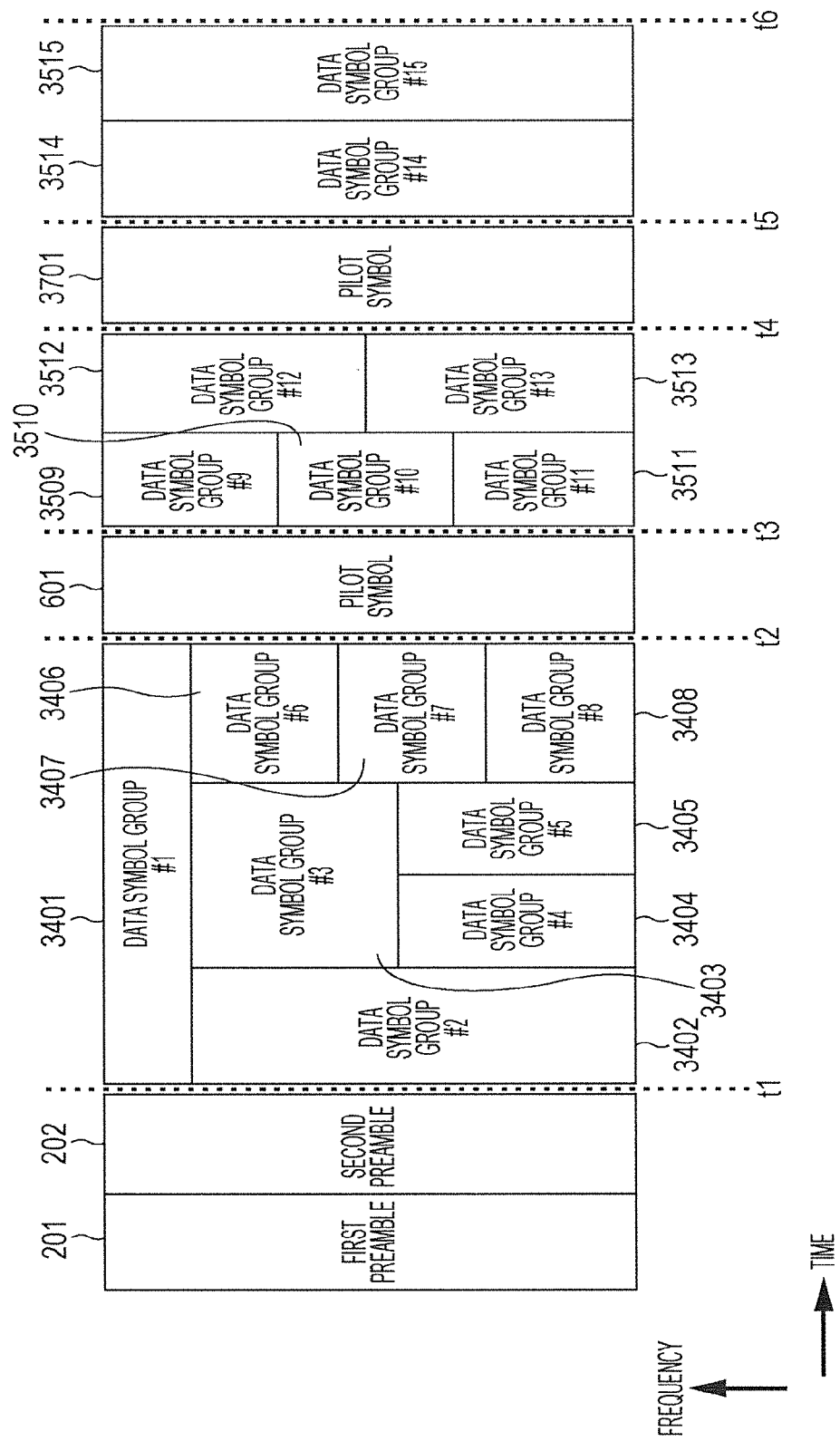
FIG. 37 is a view illustrating an example of a frame configuration.

FIG. 37 is an example of a frame configuration in a modulated signal to be transmitted by the transmitting apparatus in FIG. 1. Elements operating in the same way as FIGS. 2, 6, 34 and 35 are assigned the same reference numerals in FIG. 37 and will not be described. In FIG. 37, a vertical axis indicates a frequency, and a horizontal axis indicates time. Then, since a transmitting method using a multi-carrier method such as an OFDM method is used, there is a plurality of carriers on the vertical axis frequency.

A difference of FIG. 37 from FIGS. 35 and 36 is that pilot symbols 601 and 3701 are arranged. In this case, data symbol groups #1 to #8 and data symbol groups #9 to #13 are subjected to frequency division, and also data symbol groups #14 and #15 are subjected to time division to be arranged.

Consequently, there is an effect of enabling symbol groups of different data reception quality to exist at the same time, and of enabling a flexible setting of a data transmission rate by appropriately defining data sections and frequency sections. Moreover, an effect in a case of inserting a pilot symbol is as described in the first exemplary embodiment.

Figure 38:
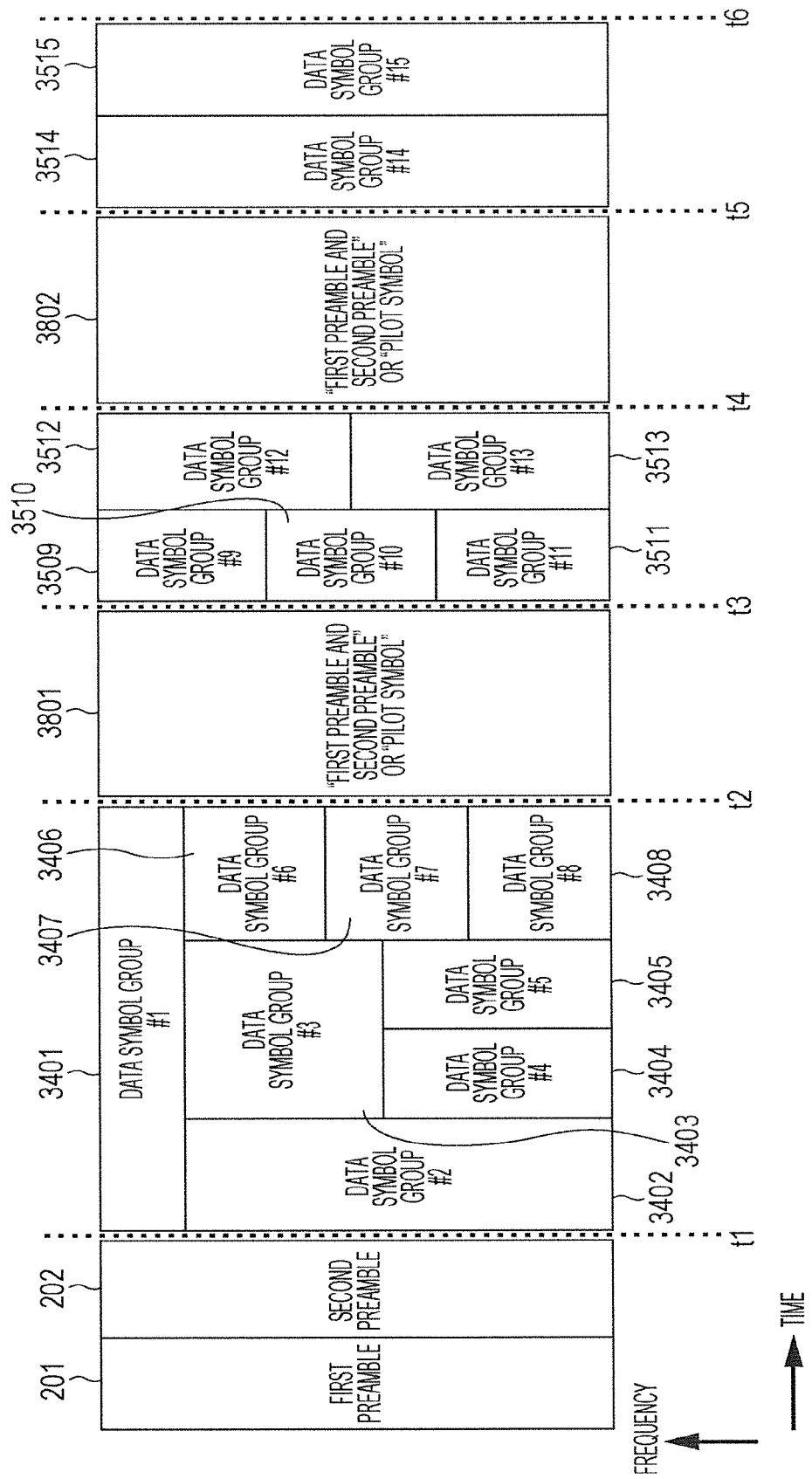
FIG. 38 is a view illustrating an example of a frame configuration.

FIG. 38 is an example of a frame configuration in a modulated signal to be transmitted by the transmitting apparatus in FIG. 1. Elements operating in the same way as FIGS. 2, 6, 34 and 35 are assigned the same reference numerals in FIG. 38 and will not be described. In FIG. 38, a vertical axis indicates a frequency, and a horizontal axis indicates time. Then, since a transmitting method using a multi-carrier method such as an OFDM method is used, there is a plurality of carriers on the vertical axis frequency.

A difference of FIG. 38 from FIGS. 35, 36 and 37 is that the "first preamble and the second preamble" or "pilot symbols" 3801 and 3802 are arranged. In this case, data symbol groups #1 to #8 and data symbol groups #9 to #13 are subjected to frequency division, and also data symbol groups #14 and #15 are subjected to time division to be arranged.

Consequently, there is an effect of enabling symbol groups of different data reception quality to exist at the same time, and of enabling a flexible setting of a data transmission rate by appropriately defining data sections and frequency sections.

Then, as illustrated in FIG. 38, the "first preamble and the second preamble" or "pilot symbols" 3801 and 3802 are inserted and, depending on a situation, the "first preamble and the second preamble" or the "pilot symbols" are switched and used. The above-described switching may be performed based on, for example, the transmitting method.

FIGS. 30 to 38 illustrate the examples where a data symbol group subjected to time division is arranged after a data symbol group subjected to frequency division. However, the arrangement is not limited to this arrangement. The data symbol group subjected to frequency division may be arranged after the data symbol group subjected to time division. In this case, in the example in FIGS. 32 and 36, the first preamble and the second preamble are inserted between the data symbol group subjected to time division and the data symbol group subjected to frequency division. (However, symbols other than the first preamble and the second preamble may be inserted.) Moreover, in the example in FIGS. 33 and 37, the pilot symbol is inserted between the data symbol group subjected to time division and the data symbol group subjected to frequency division (however, symbols other than the pilot symbol may be inserted).

In the present exemplary embodiment, the examples of the frame configuration of the modulated signal to be transmitted by the transmitting apparatus are described with reference to FIGS. 30 to 38. With reference to these figures, the above describes the point that "time division (temporal division) is performed." However, when two data symbol groups are connected, there is a portion subjected to frequency division at a seam portion. This point will be described with reference to FIG. 39.

Figure 39:
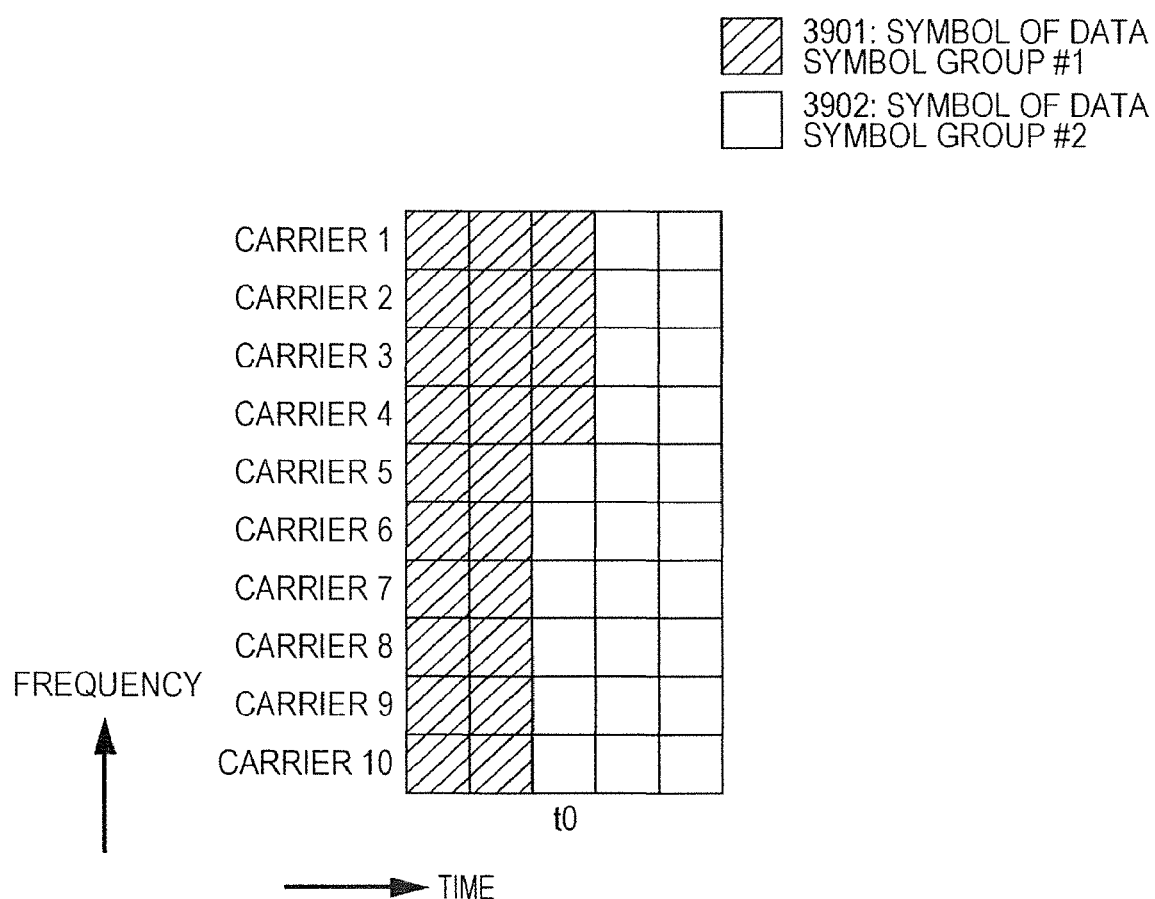
FIG. 39 is a view illustrating an example of a symbol arranging method.

FIG. 39 illustrates symbol 3901 of data symbol group #1 and symbol 3902 of data symbol group #2. As illustrated at time t0 in FIG. 39, the symbol of data symbol group #1 ends with carrier 4. In this case, the symbol of data symbol group #2 is arranged from carrier 5 at time to. Then, only a portion at time t0 is exceptionally subjected to frequency division. However, there is only the symbol of data symbol group #1 before time t0, and there is only the symbol of data symbol group #2 after time t0. At this point, time division (temporal division) is performed.

Figure 40:
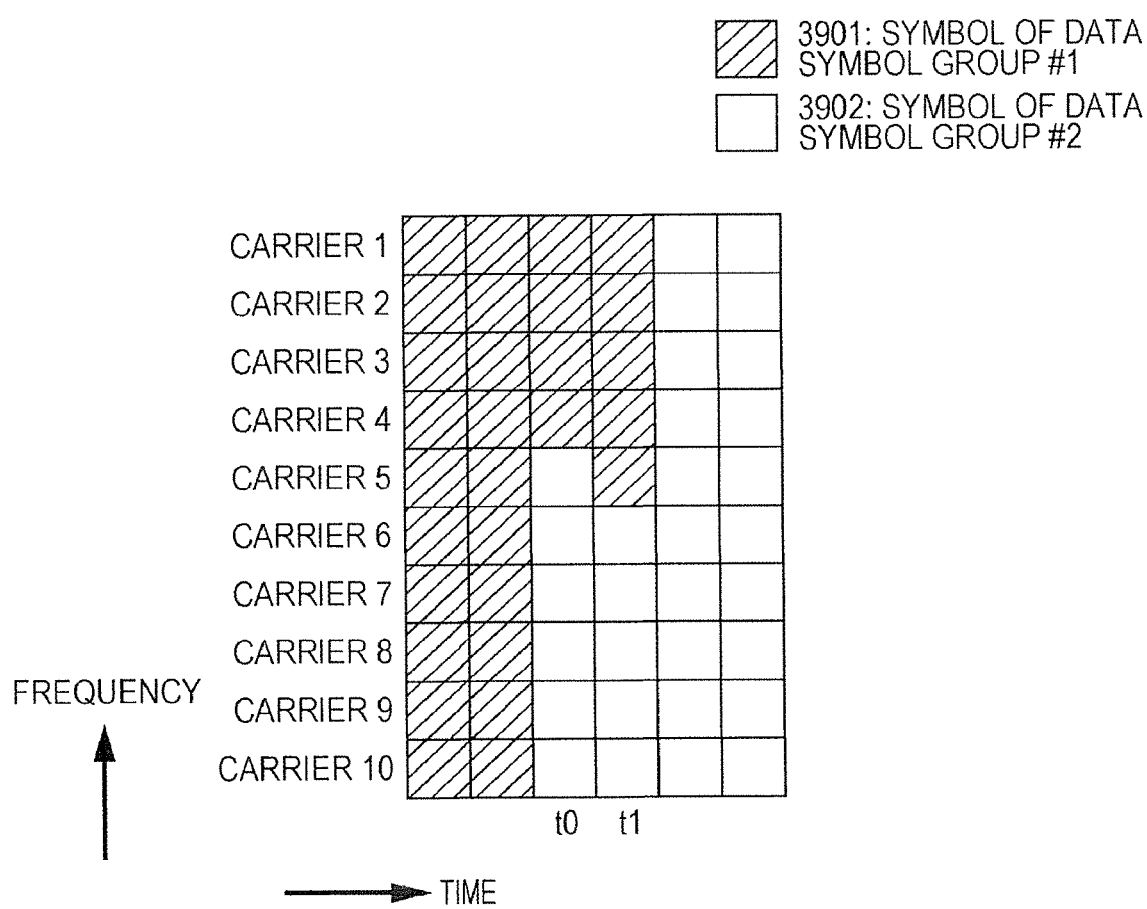
FIG. 40 is a view illustrating an example of the symbol arranging method.

FIG. 40 illustrates another example. Note that the same reference numerals as those in FIG. 39 are assigned. As illustrated at time t0 in FIG. 40, the symbol of data symbol group #1 ends with carrier 4. Then, as illustrated at time t1, the symbol of data symbol group #1 ends with carrier 5. Then, the symbol of data symbol group #2 is arranged from carrier 5 at time t0, and the symbol of data symbol group #2 is arranged from carrier 6 at time t1. Then, portions at time t0 and time t1 are exceptionally subjected to frequency division. However, there is only the symbol of data symbol group #1 before time t0, and there is only the symbol of data symbol #2 after time t1. At this point, time division (temporal division) is performed.

As illustrated in FIGS. 39 and 40, there is a case where, except for the exceptional portions, there are time at which there is no data symbol other than the symbol of data symbol group #1 (there may be a pilot symbol or the like.) and time at which there is no data symbol other than the symbol of data symbol group #2 (there may be a pilot symbol or the like.). This case will be referred to as "time division (temporal division) is performed" (hence, an exceptional time existing method is not limited to FIGS. 39 and 40).

Moreover, the "time division (temporal division) is performed" is not limited to the present exemplary embodiment, and the same interpretation also applies to the other exemplary embodiments.

As described in the first exemplary embodiment, the transmitting apparatus in FIG. 1 may select any frame configuration of the frame configurations described in the first exemplary embodiment to the third exemplary embodiment and the frame configuration described in the present exemplary embodiment, and may transmit a modulated signal (an example of the method for configuring control information of information related to a frame configuration is as described in the first exemplary embodiment).

Then, the receiving apparatus (for example, FIG. 23) which receives the modulated signal transmitted by the transmitting apparatus in FIG. 1 receives the control information described in the first exemplary embodiment, the second exemplary embodiment and the like, demodulates/decodes a data symbol group based on this control information and obtains information. As a result, the information described herein is transmitted as control information, and thus it is possible to obtain an effect of enabling improvement in data reception quality and improvement in data transmission efficiency and of enabling an accurate operation of the receiving apparatus.

The method for transmitting data symbol groups #1 to #6 in the frame configuration in FIG. 32 may be set with first preamble 201 and/or second preamble 202. The method for transmitting data symbol groups #7 and #8 may be set with first preamble 501 and/or second preamble 502.

In this case, either a case where the "method for transmitting data symbol groups #1 to #6 is of MIMO transmission or MISO transmission" or a case where the "method for transmitting data symbol groups #1 to #6 is of SISO transmission (SIMO transmission)" may be selectable, and either a case where the "method for transmitting data symbol groups #7 and #8 is of MIMO transmission or MISO transmission" or a case where the "method for transmitting data symbol groups #7 and #8 is of SISO transmission (SIMO transmission)" may be selectable.

That is, a method for transmitting a plurality of data symbol groups present between a "set of the first preamble and the second preamble" and a next "set of the first preamble and the second preamble" is of either "MIMO transmission or MISO transmission" or "SISO transmission (SIMO transmission)," and in the method for transmitting a plurality of data symbol groups present between the "set of the first preamble and the second preamble" and the next "set of the first preamble and the second preamble," there is no mix of MIMO transmission and SISO transmission (SIMO transmission) and there is no mix of MISO transmission and SISO transmission (SIMO transmission).

When there is a mix of the SISO (SIMO) transmitting method and the MIMO (MISO) transmitting method, a fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:

First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:

First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:

First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:

First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Similarly, the method for transmitting data symbol groups #1 to #8 in the frame configuration in FIG. 36 may be set with first preamble 201 and/or second preamble 202. The method for transmitting data symbol groups #9 to #13 may be set with first preamble 501 and/or second preamble 502. The method for transmitting data symbol groups #14 and #15 may be set with first preamble 3601 and/or second preamble 3602.

In this case, either a case where the "method for transmitting data symbol groups #1 to #8 is of MIMO transmission or MISO transmission" or a case where the "method for transmitting data symbol groups #1 to #8 is of SISO transmission (SIMO transmission)" may be selectable, and either a case where the "method for transmitting data symbol groups #9 to #13 is of MIMO transmission or MISO transmission" or a case where the "method for transmitting data symbol groups #9 to #13 is of SISO transmission (SIMO transmission)" may be selectable, and either a case where the "method for transmitting data symbol groups #14 and #15 is of MIMO transmission or MISO transmission" or a case where the "method for transmitting data symbol groups #14 and #15 is of SISO transmission (SIMO transmission)" may be selectable.

That is, a method for transmitting a plurality of data symbol groups present between a "set of the first preamble and the second preamble" and a next "set of the first preamble and the second preamble" is of either "MIMO transmission or MISO transmission" or "SISO transmission (SIMO transmission)," and in the method for transmitting a plurality of data symbol groups present between the "set of the first preamble and the second preamble" and the next "set of the first preamble and the second preamble," there is no mix of MIMO transmission and SISO transmission (SIMO transmission) and there is no mix of MISO transmission and SISO transmission (SIMO transmission).

When there is a mix of the SISO (SIMO) transmitting method and the MIMO (MISO) transmitting method, fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:
First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:
First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:
First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:
First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Moreover, the method for transmitting data symbol groups #1 to #8 in the frame configuration in FIG. 33 may be set with first preamble 201 and/or second preamble 202.

In this case, either a case where the "method for transmitting data symbol groups #1 to #6 is of MIMO transmission or MISO transmission" or a case where the "method for transmitting data symbol groups #1 to #6 is of SISO transmission (SIMO transmission)" may be selectable, and either a case where the "method for transmitting data symbol groups #7 and #8 is of MIMO transmission or MISO transmission" or a case where the "method for transmitting data symbol groups #7 and #8 is of SISO transmission (SIMO transmission)" may be selectable.

That is, a method for transmitting a plurality of data symbol groups present between a "set of the first preamble and the second preamble" and a "pilot symbol" is of either "MIMO transmission or MISO transmission" or "SISO transmission (SIMO transmission)" (there is no mix of MIMO transmission and SISO transmission (SIMO transmission) and there is no mix of MISO transmission SISO transmission (SIMO transmission)). Then, a method for transmitting a plurality of data symbol groups present between the "pilot symbol" and a next "set of the first preamble and the second preamble" (however, FIG. 33 does not illustrate the "set of the first preamble and the second preamble" next to the pilot symbol.) is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)).

When there is a mix of the SISO (SIMO) transmitting method and the MIMO (MISO) transmitting method, fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:

First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:

First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:

First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:

First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Similarly, the method for transmitting data symbol groups #1 to #15 in the frame configuration in FIG. 37 may be set with first preamble 201 and/or second preamble 202.

In this case, either a case where the "method for transmitting data symbol groups #1 to #8 is of MIMO transmission or MISO transmission" or a case where the "method for transmitting data symbol groups #1 to #8 is of SISO transmission (SIMO transmission)" may be selectable, and either a case where the "method for transmitting data symbol groups #9 to #13 is of MIMO transmission or MISO transmission" or a case where the "method for transmitting data symbol groups #9 to #13 is of SISO transmission (SIMO transmission)" may be selectable, and either a case where the "method for transmitting data symbol groups #14 and #15 is of MIMO transmission or MISO transmission" or a case where the "method for transmitting data symbol groups #14 and #15 is of SISO transmission (SIMO transmission)" may be selectable.

That is, a method for transmitting a plurality of data symbol groups present between a "set of the first preamble and the second preamble" and a "pilot symbol" is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)). Then, a method for transmitting a plurality of data symbol groups present between the "pilot symbol" and a next "set of the first preamble and the second preamble" (however, FIG. 37 does not illustrate the "set of the first preamble and the second preamble" next to the pilot symbol.) is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)).

Moreover, a method for transmitting a plurality of data symbol groups present between a "pilot symbol" and a "pilot symbol" is of either "MIMO transmission or MISO transmission" or "SISO transmission (SIMO transmission)" (there is no mix of MIMO transmission and SISO transmission (SIMO transmission) and there is no mix of MISO transmission and SISO transmission (SIMO transmission)).

When there is a mix of the SISO (SIMO) transmitting method and the MIMO (MISO) transmitting method, fluctuation of received field intensity increases in the receiving apparatus. For this reason, there is a quantization error that is likely to occur during AD (Analog-to-Digital) conversion, and consequently, data reception quality may deteriorate. However, the above-described way increases a possibility that an effect of suppression of occurrence of such a phenomenon and improvement in data reception quality can be obtained.

However, the present disclosure is not limited to the above.

Moreover, in association with the above-described switching of the transmitting methods, methods for inserting a pilot symbol to be inserted to a data symbol group are also switched, and there is also an advantage from a viewpoint of improvement in data transmission efficiency (because there is no mix of the SISO (SIMO) transmitting method and the MIMO (MISO) transmitting method). (When there is a mix of the SISO (SIMO) transmitting method and the MIMO (MISO) transmitting method, there is a possibility that frequency of inserting a pilot symbol becomes excessive and that the data transmission efficiency decreases.) Note that a configuration of a pilot symbol to be inserted to a data symbol group is as follows.

A "pilot symbol to be inserted to a data symbol group during SISO transmission" and a "pilot symbol to be inserted to a data symbol group during MIMO transmission or MISO transmission" are different in a pilot symbol configuring method. This point will be described with reference to the figures. FIG. 41 illustrates an insertion example of the "pilot symbol to be inserted to the data symbol group during SISO transmission." Note that in FIG. 41, a horizontal axis indicates time, and a vertical axis indicates a frequency. FIG. 41 illustrates symbol 4101 of data symbol group #1, and pilot symbol 4102. In this case, data is transmitted with symbol 4101 of data symbol group #1. Pilot symbol 4102 is a symbol for performing frequency offset estimation, frequency synchronization, time synchronization, signal detection and channel estimation (radio wave propagation environment estimation) in the receiving apparatus. Pilot symbol 4102 is configured with, for example, a PSK (Phase Shift Keying) symbol (pilot symbol 4102 is highly likely to need to be a PSK symbol) which is known in the transmitting apparatus and the receiving apparatus.

FIG. 42 illustrates an insertion example of the "pilot symbol to be inserted to the data symbol group during MIMO transmission or MISO transmission." Note that in FIG. 42, a horizontal axis indicates time, and a vertical axis indicates a frequency. "During MIMO transmission or MISO transmission," modulated signals are transmitted from two antennas, respectively. Here, the modulated signals are referred to as modulated signal #1 and modulated signal #2. FIG. 42 illustrates an insertion example of a pilot symbol of modulated signal #1 and an insertion example of a pilot symbol of modulated signal #2 in combination.

Example 1

Case of Modulated Signal #1:
First pilot symbol 4201 for modulated signal #1 and second pilot symbol 4202 for modulated signal #1 are inserted as illustrated in FIG. 42. Both of first pilot symbol 4201 for modulated signal #1 and second pilot symbol 4202 for modulated signal #1 are PSK symbols.

Case of Modulated Signal #2:
First pilot symbol 4201 for modulated signal #2 and second pilot symbol 4202 for modulated signal #2 are inserted as illustrated in FIG. 42. Both of first pilot symbol 4201 for modulated signal #2 and second pilot symbol 4202 for modulated signal #2 are PSK symbols.

Then, "first pilot symbol 4201 for modulated signal #1 and second pilot symbol 4202 for modulated signal #1" and "first pilot symbol 4201 for modulated signal #2 and second pilot symbol 4202 for modulated signal #2" are orthogonal (a correlation is zero) at a certain cycle.

Example 2

Case of Modulated Signal #1:
First pilot symbol 4201 for modulated signal #1 and second pilot symbol 4202 for modulated signal #1 are inserted as illustrated in FIG. 42. First pilot symbol 4201 for modulated signal #1 is a PSK symbol. Second pilot symbol 4202 for modulated signal #1 is a null symbol (in-phase component I is 0 (zero) and quadrature component Q is 0 (zero)) (hence, second pilot symbol 4202 for modulated signal #1 may not be referred to as a pilot symbol).

Case of Modulated Signal #2:
First pilot symbol 4201 for modulated signal #2 and second pilot symbol 4202 for modulated signal #2 are inserted as illustrated in FIG. 42. Second pilot symbol 4201 for modulated signal #2 is a PSK symbol. First pilot symbol 4202 for modulated signal #2 is a null symbol (in-phase component I is 0 (zero) and quadrature component Q is 0 (zero)) (hence, first pilot symbol 4202 for modulated signal #2 may not be referred to as a pilot symbol).

Fifth Exemplary Embodiment

The frame of a modulated signal to be transmitted by the transmitting apparatus in FIG. 1 is described in the fourth exemplary embodiment with reference to FIGS. 30 to 38. In each of FIGS. 30 to 38, the frame is configured in a case where a data symbol group is subjected to frequency division and in a case where a data symbol group is subjected to time division (temporal division). In this case, it is necessary to accurately transmit frequency resources (carriers) and time resources to be used by each data symbol group to a receiving apparatus.

In the present exemplary embodiment, an example of a method for configuring control information related to a frequency (frequency resources) and time (time resources) to be used by each data symbol group in a case of the frame configurations in FIGS. 30 to 38 will be described. Note that the frame configurations in FIGS. 30 to 38 are only examples, and detailed requirements of frame configurations are as described in the fourth exemplary embodiment.

<Case where Frequency Division is Performed>

An example of a method for generating control information related to frequency resources and time resources to be used by each data symbol group in a case where frequency division is performed will be described.

Figure 43:
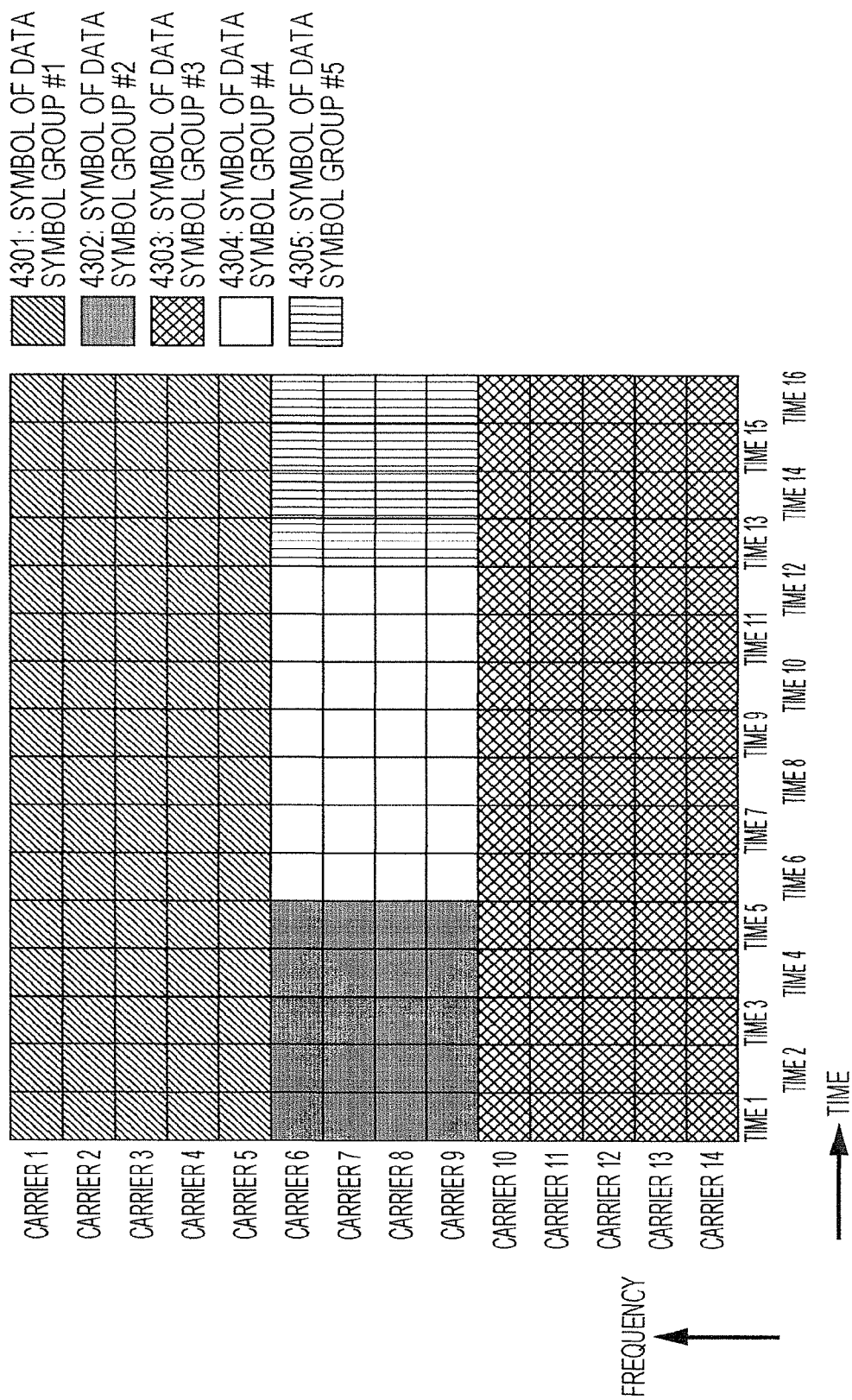
FIG. 43 is a view illustrating an example of the symbol arranging method.

FIG. 43 illustrates an example in a case where a data symbol group is subjected to frequency division in a frame of a modulated signal to be transmitted by the transmitting apparatus in FIG. 1. In FIG. 43, a vertical axis indicates a frequency, and a horizontal axis indicates time. Note that as with the first exemplary embodiment to the fourth exemplary embodiment, a data symbol group may be of symbols of any method of an SISO method (SIMO method), an MIMO method and an MISO method.

FIG. 43 illustrates symbol 4301 of data symbol group #1. Data symbol group #1 (4301) is transmitted by using carrier 1 to carrier 5 and by using time 1 to time 16 (however, a first index of a carrier is assumed to be "carrier 1" but is not limited to "carrier 1," and also a first index of time is assumed to be "time 1" but is not limited to "time 1").

FIG. 43 illustrates symbol 4302 of data symbol group #2. Data symbol group #2 (4302) is transmitted by using carrier 6 to carrier 9 and by using time 1 to time 5.

FIG. 43 illustrates symbol 4303 of data symbol group #3. Data symbol group #3 (4303) is transmitted by using carrier 10 to carrier 14 and by using time 1 to time 16.

FIG. 43 illustrates symbol 4304 of data symbol group #4. Data symbol group #4 (4304) is transmitted by using carrier 6 to carrier 9 and by using time 6 to time 12.

FIG. 43 illustrates symbol 4305 of data symbol group #5. Data symbol group #5 (4305) is transmitted by using carrier 6 to carrier 9 and by using time 13 to time 16.

First Example

An example of control information related to a frequency and time to be used by each data symbol group in this case will be described.

Control information related to a default position of a carrier to be used by data symbol group #j is m(j, 0), m(j, 1), m(j, 2) and m(j, 3), control information related to a number of carriers to be used by data symbol group #j is n(j, 0), n(j, 1), n(j, 2) and n(j, 3), control information related to a default position of time to be used by data symbol group #j is o(j, 0), o(j, 1), o(j, 2) and o(j, 3), and control information related to a number of pieces of time to be used by data symbol group #j is p(j, 0), p(j, 1), p(j, 2) and p(j, 3).

In this case, when a default position of a carrier to be used by data symbol group #(j=K) is "carrier 1," the transmitting apparatus sets m(K, 0)=0, m(K, 1)=0, m(K, 2)=0 and m(K, 3)=0, and transmits m(K, 0), m(K, 1), m(K, 2) and m(K, 3).

When the default position of the carrier to be used by data symbol group #(j=K) is "carrier 2," the transmitting apparatus sets m(K, 0)=1, m(K, 1)=0, m(K, 2)=0 and m(K, 3)=0, and transmits m(K, 0), m(K, 1), m(K, 2) and m(K, 3).

When the default position of the carrier to be used by data symbol group #(j=K) is "carrier 3," the transmitting apparatus sets m(K, 0)=0, m(K, 1)=1, m(K, 2)=0 and m(K, 3)=0, and transmits m(K, 0), m(K, 1), m(K, 2) and m(K, 3).

When the default position of the carrier to be used by data symbol group #(j=K) is "carrier 4," the transmitting apparatus sets m(K, 0)=1, m(K, 1)=1, m(K, 2)=0 and m(K, 3)=0, and transmits m(K, 0), m(K, 1), m(K, 2) and m(K, 3).

When the default position of the carrier to be used by data symbol group #(j=K) is "carrier 5," the transmitting apparatus sets m(K, 0)=0, m(K, 1)=0, m(K, 2)=1 and m(K, 3)=0, and transmits m(K, 0), m(K, 1), m(K, 2) and m(K, 3).

When the default position of the carrier to be used by data symbol group #(j=K) is "carrier 6," the transmitting apparatus sets m(K, 0)=1, m(K, 1)=0, m(K, 2)=1 and m(K, 3)=0, and transmits m(K, 0), m(K, 1), m(K, 2) and m(K, 3).

When the default position of the carrier to be used by data symbol group #(j=K) is "carrier 7," the transmitting apparatus sets m(K, 0)=0, m(K, 1)=1, m(K, 2)=1 and m(K, 3)=0, and transmits m(K, 0), m(K, 1), m(K, 2) and m(K, 3).

When the default position of the carrier to be used by data symbol group #(j=K) is "carrier 8," the transmitting apparatus sets m(K, 0)=1, m(K, 1)=1, m(K, 2)=1 and m(K, 3)=0, and transmits m(K, 0), m(K, 1), m(K, 2) and m(K, 3).

When the default position of the carrier to be used by data symbol group #(j=K) is "carrier 9," the transmitting apparatus sets m(K, 0)=0, m(K, 1)=0, m(K, 2)=0 and m(K, 3)=1, and transmits m(K, 0), m(K, 1), m(K, 2) and m(K, 3).

When the default position of the carrier to be used by data symbol group #(j=K) is "carrier 10," the transmitting apparatus sets m(K, 0)=1, m(K, 1)=0, m(K, 2)=0 and m(K, 3)=1, and transmits m(K, 0), m(K, 1), m(K, 2) and m(K, 3).

When the default position of the carrier to be used by data symbol group #(j=K) is "carrier 11," the transmitting apparatus sets m(K, 0)=0, m(K, 1)=1, m(K, 2)=0 and m(K, 3)=1, and transmits m(K, 0), m(K, 1), m(K, 2) and m(K, 3).

When the default position of the carrier to be used by data symbol group #(j=K) is "carrier 12," the transmitting apparatus sets m(K, 0)=1, m(K, 1)=1, m(K, 2)=0 and m(K, 3)=1, and transmits m(K, 0), m(K, 1), m(K, 2) and m(K, 3).

When the default position of the carrier to be used by data symbol group #(j=K) is "carrier 13," the transmitting apparatus sets m(K, 0)=0, m(K, 1)=0, m(K, 2)=1 and m(K, 3)=1, and transmits m(K, 0), m(K, 1), m(K, 2) and m(K, 3).

When the default position of the carrier to be used by data symbol group #(j=K) is "carrier 14," the transmitting apparatus sets m(K, 0)=1, m(K, 1)=0, m(K, 2)=1 and m(K, 3)=1, and transmits m(K, 0), m(K, 1), m(K, 2) and m(K, 3).

When the default position of the carrier to be used by data symbol group #(j=K) is "carrier 15," the transmitting apparatus sets m(K, 0)=0, m(K, 1)=1, m(K, 2)=1 and m(K, 3)=1, and transmits m(K, 0), m(K, 1), m(K, 2) and m(K, 3).

When the default position of the carrier to be used by data symbol group #(j=K) is "carrier 16," the transmitting apparatus sets m(K, 0)=1, m(K, 1)=1, m(K, 2)=1 and m(K, 3)=1, and transmits m(K, 0), m(K, 1), m(K, 2) and m(K, 3).

When a number of carriers to be used by data symbol group #(j=K) is of 1 carrier, the transmitting apparatus sets n(K, 0)=0, n(K, 1)=0, n(K, 2)=0 and n(K, 3)=0, and transmits n(K, 0), n(K, 1), n(K, 2) and n(K, 3).

When the number of carriers to be used by data symbol group #(j=K) is of 2 carriers, the transmitting apparatus sets n(K, 0)=1, n(K, 1)=0, n(K, 2)=0 and n(K, 3)=0, and transmits n(K, 0), n(K, 1), n(K, 2) and n(K, 3).

When the number of carriers to be used by data symbol group #(j=K) is of 3 carriers, the transmitting apparatus sets n(K, 0)=0, n(K, 1)=1, n(K, 2)=0 and n(K, 3)=0, and transmits n(K, 0), n(K, 1), n(K, 2) and n(K, 3).

When the number of carriers to be used by data symbol group #(j=K) is of 4 carriers, the transmitting apparatus sets n(K, 0)=1, n(K, 1)=1, n(K, 2)=0 and n(K, 3)=0, and transmits n(K, 0), n(K, 1), n(K, 2) and n(K, 3).

When the number of carriers to be used by data symbol group #(j=K) is of 5 carriers, the transmitting apparatus sets n(K, 0)=0, n(K, 1)=0, n(K, 2)=1 and n(K, 3)=0, and transmits n(K, 0), n(K, 1), n(K, 2) and n(K, 3).

When the number of carriers to be used by data symbol group #(j=K) is of 6 carriers, the transmitting apparatus sets n(K, 0)=1, n(K, 1)=0, n(K, 2)=1 and n(K, 3)=0, and transmits n(K, 0), n(K, 1), n(K, 2) and n(K, 3).

When the number of carriers to be used by data symbol group #(j=K) is of 7 carriers, the transmitting apparatus sets n(K, 0)=0, n(K, 1)=1, n(K, 2)=1 and n(K, 3)=0, and transmits n(K, 0), n(K, 1), n(K, 2) and n(K, 3).

When the number of carriers to be used by data symbol group #(j=K) is of 8 carriers, the transmitting apparatus sets n(K, 0)=1, n(K, 1)=1, n(K, 2)=1 and n(K, 3)=0, and transmits n(K, 0), n(K, 1), n(K, 2) and n(K, 3).

When the number of carriers to be used by data symbol group #(j=K) is of 9 carriers, the transmitting apparatus sets n(K, 0)=0, n(K, 1)=0, n(K, 2)=0 and n(K, 3)=1, and transmits n(K, 0), n(K, 1), n(K, 2) and n(K, 3).

When the number of carriers to be used by data symbol group #(j=K) is, of 10 carriers the transmitting apparatus sets n(K, 0)=1, n(K, 1)=0, n(K, 2)=0 and n(K, 3)=1, and transmits n(K, 0), n(K, 1), n(K, 2) and n(K, 3).

When the number of carriers to be used by data symbol group #(j=K) is, of 11 carriers the transmitting apparatus sets n(K, 0)=0, n(K, 1)=1, n(K, 2)=0 and n(K, 3)=1, and transmits n(K, 0), n(K, 1), n(K, 2) and n(K, 3).

When the number of carriers to be used by data symbol group #(j=K) is of 12 carriers, the transmitting apparatus sets n(K, 0)=1, n(K, 1)=1, n(K, 2)=0 and n(K, 3)=1, and transmits n(K, 0), n(K, 1), n(K, 2) and n(K, 3).

When the number of carriers to be used by data symbol group #(j=K) is of 13 carriers, the transmitting apparatus sets n(K, 0)=0, n(K, 1)=0, n(K, 2)=1 and n(K, 3)=1, and transmits n(K, 0), n(K, 1), n(K, 2) and n(K, 3).

When the number of carriers to be used by data symbol group #(j=K) is of 14 carriers, the transmitting apparatus sets n(K, 0)=1, n(K, 1)=0, n(K, 2)=1 and n(K, 3)=1, and transmits n(K, 0), n(K, 1), n(K, 2) and n(K, 3).

When the number of carriers to be used by data symbol group #(j=K) is of 15 carriers, the transmitting apparatus sets n(K, 0)=0, n(K, 1)=1, n(K, 2)=1 and n(K, 3)=1, and transmits n(K, 0), n(K, 1), n(K, 2) and n(K, 3).

When the number of carriers to be used by data symbol group #(j=K) is of 16 carriers, the transmitting apparatus sets n(K, 0)=1, n(K, 1)=1, n(K, 2)=1 and n(K, 3)=1, and transmits n(K, 0), n(K, 1), n(K, 2) and n(K, 3).

When a default position of time to be used by data symbol group #(j=K) is "time 1," the transmitting apparatus sets o(K, 0)=0, o(K, 1)=0, o(K, 2)=0 and o(K, 3)=0, and transmits o(K, 0), o(K, 1), o(K, 2) and o(K, 3).

When the default position of the time to be used by data symbol group #0=K) is "time 2," the transmitting apparatus sets o(K, 0)=1, o(K, 1)=0, o(K, 2)=0 and o(K, 3)=0, and transmits o(K, 0), o(K, 1), o(K, 2) and o(K, 3).

When the default position of the time to be used by data symbol group #(j=K) is "time 3," the transmitting apparatus sets o(K, 0)=0, o(K, 1)=1, o(K, 2)=0 and o(K, 3)=0, and transmits o(K, 0), o(K, 1), o(K, 2) and o(K, 3).

When the default position of the time to be used by data symbol group #(j=K) is "time 4," the transmitting apparatus sets o(K, 0)=1, o(K, 1)=1, o(K, 2)=0 and o(K, 3)=0, and transmits o(K, 0), o(K, 1), o(K, 2) and o(K, 3).

When the default position of the time to be used by data symbol group #(j=K) is "time 5," the transmitting apparatus sets o(K, 0)=0, o(K, 1)=0, o(K, 2)=1 and o(K, 3)=0, and transmits o(K, 0), o(K, 1), o(K, 2) and o(K, 3).

When the default position of the time to be used by data symbol group #(j=K) is "time 6," the transmitting apparatus sets o(K, 0)=1, o(K, 1)=0, o(K, 2)=1 and o(K, 3)=0, and transmits o(K, 0), o(K, 1), o(K, 2) and o(K, 3).

When the default position of the time to be used by data symbol group #(j=K) is "time 7," the transmitting apparatus sets o(K, 0)=0, o(K, 1)=1, o(K, 2)=1 and o(K, 3)=0, and transmits o(K, 0), o(K, 1), o(K, 2) and o(K, 3).

When the default position of the time to be used by data symbol group #0=K) is "time 8," the transmitting apparatus sets o(K, 0)=1, o(K, 1)=1, o(K, 2)=1 and o(K, 3)=0, and transmits o(K, 0), o(K, 1), o(K, 2) and o(K, 3).

When the default position of the time to be used by data symbol group #(j=K) is "time 9," the transmitting apparatus sets o(K, 0)=0, o(K, 1)=0, o(K, 2)=0 and o(K, 3)=1, and transmits o(K, 0), o(K, 1), o(K, 2) and o(K, 3).

When the default position of the time to be used by data symbol group #(j=K) is "time 10," the transmitting apparatus sets o(K, 0)=1, o(K, 1)=0, o(K, 2)=0 and o(K, 3)=1, and transmits o(K, 0), o(K, 1), o(K, 2) and o(K, 3).

When the default position of the time to be used by data symbol group #(j=K) is "time 11," the transmitting apparatus sets o(K, 0)=0, o(K, 1)=1, o(K, 2)=0 and o(K, 3)=1, and transmits o(K, 0), o(K, 1), o(K, 2) and o(K, 3).

When the default position of the time to be used by data symbol group #(j=K) is "time 12," the transmitting apparatus sets o(K, 0)=1, o(K, 1)=1, o(K, 2)=0 and o(K, 3)=1, and transmits o(K, 0), o(K, 1), o(K, 2) and o(K, 3).

When the default position of the time to be used by data symbol group #(j=K) is "time 13," the transmitting apparatus sets o(K, 0)=0, o(K, 1)=0, o(K, 2)=1 and o(K, 3)=1, and transmits o(K, 0), o(K, 1), o(K, 2) and o(K, 3).

When the default position of the time to be used by data symbol group #0=K) is "time 14," the transmitting apparatus sets o(K, 0)=1, o(K, 1)=0, o(K, 2)=1 and o(K, 3)=1, and transmits o(K, 0), o(K, 1), o(K, 2) and o(K, 3).

When the default position of the time to be used by data symbol group #0=K) is "time 15," the transmitting apparatus sets o(K, 0)=0, o(K, 1)=1, o(K, 2)=1 and o(K, 3)=1, and transmits o(K, 0), o(K, 1), o(K, 2) and o(K, 3).

When the default position of the time to be used by data symbol group #0=K) is "time 16," the transmitting apparatus sets o(K, 0)=1, o(K, 1)=1, o(K, 2)=1 and o(K, 3)=1, and transmits o(K, 0), o(K, 1), o(K, 2) and o(K, 3).

When a number of pieces of time to be used by data symbol group #(j=K) is 1, the transmitting apparatus sets p(K, 0)=0, p(K, 1)=0, p(K, 2)=0 and p(K, 3)=0, and transmits p(K, 0), p(K, 1), p(K, 2) and p(K, 3).

When the number of pieces of time to be used by data symbol group #(j=K) is 2, the transmitting apparatus sets p(K, 0)=1, p(K, 1)=0, p(K, 2)=0 and p(K, 3)=0, and transmits p(K, 0), p(K, 1), p(K, 2) and p(K, 3).

When the number of pieces of time to be used by data symbol group #(j=K) is 3, the transmitting apparatus sets p(K, 0)=0, p(K, 1)=1, p(K, 2)=0 and p(K, 3)=0, and transmits p(K, 0), p(K, 1), p(K, 2) and p(K, 3).

When the number of pieces of time to be used by data symbol group #(j=K) is 4, the transmitting apparatus sets p(K, 0)=1, p(K, 1)=1, p(K, 2)=0 and p(K, 3)=0, and transmits p(K, 0), p(K, 1), p(K, 2) and p(K, 3).

When the number of pieces of time to be used by data symbol group #(j=K) is 5, the transmitting apparatus sets p(K, 0)=0, p(K, 1)=0, p(K, 2)=1 and p(K, 3)=0, and transmits p(K, 0), p(K, 1), p(K, 2) and p(K, 3).

When the number of pieces of time to be used by data symbol group #(j=K) is 6, the transmitting apparatus sets p(K, 0)=1, p(K, 1)=0, p(K, 2)=1 and p(K, 3)=0, and transmits p(K, 0), p(K, 1), p(K, 2) and p(K, 3).

When the number of pieces of time to be used by data symbol group #0=K) is 7, the transmitting apparatus sets p(K, 0)=0, p(K, 1)=1, p(K, 2)=1 and p(K, 3)=0, and transmits p(K, 0), p(K, 1), p(K, 2) and p(K, 3).

When the number of pieces of time to be used by data symbol group #0=K) is 8, the transmitting apparatus sets p(K, 0)=1, p(K, 1)=1, p(K, 2)=1 and p(K, 3)=0, and transmits p(K, 0), p(K, 1), p(K, 2) and p(K, 3).

When the number of pieces of time to be used by data symbol group #(=K) is 9, the transmitting apparatus sets p(K, 0)=0, p(K, 1)=0, p(K, 2)=0 and p(K, 3)=1, and transmits p(K, 0), p(K, 1), p(K, 2) and p(K, 3).

When the number of pieces of time to be used by data symbol group #0=K) is 10, the transmitting apparatus sets p(K, 0)=1, p(K, 1)=0, p(K, 2)=0 and p(K, 3)=1, and transmits p(K, 0), p(K, 1), p(K, 2) and p(K, 3).

When the number of pieces of time to be used by data symbol group #0=K) is 11, the transmitting apparatus sets p(K, 0)=0, p(K, 1)=1, p(K, 2)=0 and p(K, 3)=1, and transmits p(K, 0), p(K, 1), p(K, 2) and p(K, 3).

When the number of pieces of time to be used by data symbol group #0=K) is 12, the transmitting apparatus sets p(K, 0)=1, p(K, 1)=1, p(K, 2)=0 and p(K, 3)=1, and transmits p(K, 0), p(K, 1), p(K, 2) and p(K, 3).

When the number of pieces of time to be used by data symbol group #(=K) is 13, the transmitting apparatus sets p(K, 0)=0, p(K, 1)=0, p(K, 2)=1 and p(K, 3)=1, and transmits p(K, 0), p(K, 1), p(K, 2) and p(K, 3).

When the number of pieces of time to be used by data symbol group #0=K) is 14, the transmitting apparatus sets p(K, 0)=1, p(K, 1)=0, p(K, 2)=1 and p(K, 3)=1, and transmits p(K, 0), p(K, 1), p(K, 2) and p(K, 3).

When the number of pieces of time to be used by data symbol group #0=K) is 15, the transmitting apparatus sets p(K, 0)=0, p(K, 1)=1, p(K, 2)=1 and p(K, 3)=1, and transmits p(K, 0), p(K, 1), p(K, 2) and p(K, 3).

When the number of pieces of time to be used by data symbol group #(j=K) is 16, the transmitting apparatus sets p(K, 0)=1, p(K, 1)=1, p(K, 2)=1 and p(K, 3)=1, and transmits p(K, 0), p(K, 1), p(K, 2) and p(K, 3).

Next, data symbol group #3 will be described as an example.

Data symbol group #3 (4303) is transmitted by using carrier 10 to carrier 14 and by using time 1 to time 16.

As a result, a default position of a carrier is carrier 10. Hence, the transmitting apparatus sets m(3, 0)=1, m(3, 1)=0, m(3, 2)=0 and m(3, 3)=1, and transmits m(3, 0), m(3, 1), m(3, 2) and m(3, 3).

Moreover, a number of carriers to be used is 5. Hence, the transmitting apparatus sets n(3, 0)=0, n(3, 1)=0, n(3, 2)=1 and n(3, 3)=0, and transmits n(3, 0), n(3, 1), n(3, 2) and n(3, 3).

A default position of time is time 1. Hence, the transmitting apparatus sets o(3, 0)=0, o(3, 1)=0, o(3, 2)=0 and o(3, 3)=0, and transmits o(3, 0), o(3, 1), o(3, 2) and o(3, 3).

Moreover, a number of pieces of time to be used is 16. Hence, the transmitting apparatus sets p(3, 0)=1, p(3, 1)=1, p(3, 2)=1 and p(3, 3)=1, and transmits p(3, 0), p(3, 1), p(3, 2) and p(3, 3).

Second Example

Figure 44:
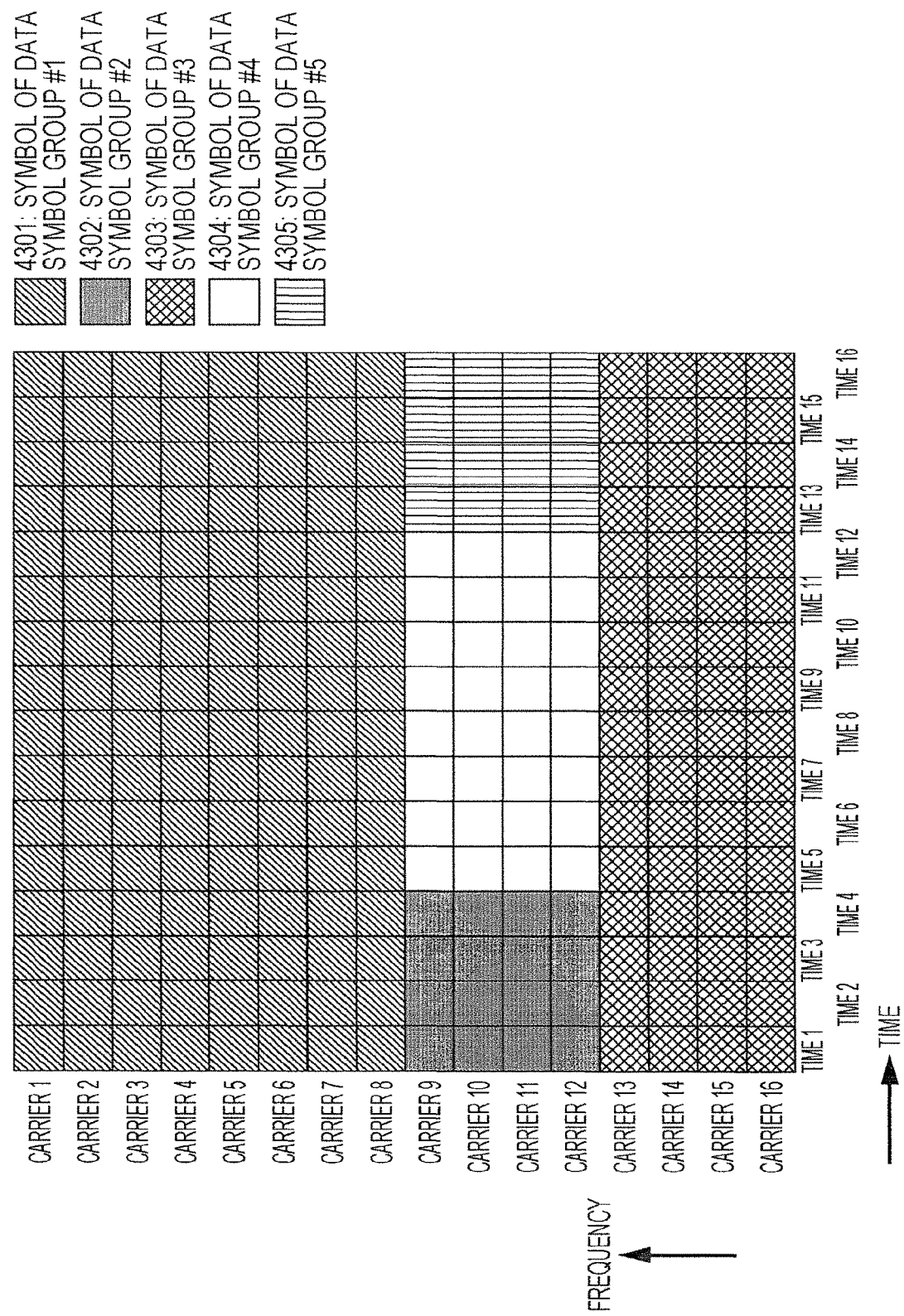
FIG. 44 is a view illustrating an example of the symbol arranging method.

FIG. 44 illustrates an example in a case where a data symbol group is subjected to frequency division in a frame configuration of a modulated signal to be transmitted by the transmitting apparatus in FIG. 1. Elements common to those in FIG. 43 are assigned the same reference numerals in FIG. 44. Moreover, in FIG. 44, a vertical axis indicates a frequency, and a horizontal axis indicates time. Note that as with the first exemplary embodiment to the fourth exemplary embodiment, a data symbol group may be of symbols of any method of an SISO method (SIMO method), an MIMO method and an MISO method.

A difference of FIG. 44 from FIG. 43 is that each data symbol group has, for example, a number of carriers of 4×A (A is an integer equal to or more than 1) (the number of carriers to be used by each data symbol group is a multiple of 4 (but, except 0 (zero))), and has a number of pieces of time of 4×B (B is a natural number equal to or more than 1) (the number of pieces of time to be used by each data symbol group is a multiple of 4 (but, except 0 (zero))). However, the number of carriers to be used by each data symbol group is not limited to a multiple of 4, and may be a multiple of C (C is an integer equal to or more than 2) except 0 (zero). Moreover, the number of pieces of time to be used by each data symbol group is not limited to a multiple of 4, and may be a multiple of D (D is an integer equal to or more than 2) except 0 (zero).

FIG. 44 illustrates symbol 4301 of data symbol group #1. Data symbol group #1 (4301) is transmitted by using carrier 1 to carrier 8 (by using 8 (a multiple of 4) carriers) and by using time 1 to time 16 (the number of pieces of time is 16, a multiple of 4) (however, a first index of a carrier is assumed to be "carrier 1" but is not limited to "carrier 1," and also a first index of time is assumed to be "time 1" but is not limited to "time 1").

FIG. 44 illustrates symbol 4302 of data symbol group #2. Data symbol group #2 (4302) is transmitted by using carrier 9 to carrier 12 (by using 4 (a multiple of 4) carriers) and by using time 1 to time 4 (the number of pieces of time is 4, a multiple of 4).

FIG. 44 illustrates symbol 4303 of data symbol group #3. Data symbol group #3 (4303) is transmitted by using carrier 13 to carrier 16 (by using 4 (a multiple of 4) carriers) and by using time 1 to time 16 (the number of pieces of time is 16, a multiple of 4).

FIG. 44 illustrates symbol 4304 of data symbol group #4. Data symbol group #4 (4304) is transmitted by using carrier 9 to carrier 12 (by using 4 (a multiple of 4) carriers) and by using time 5 to time 12 (the number of pieces of time is 8, a multiple of 4).

FIG. 44 illustrates symbol 4305 of data symbol group #5. Data symbol group #5 (4305) is transmitted by using carrier 9 to carrier 12 (by using 4 (a multiple of 4) carriers) and by using time 13 to time 16 (the number of pieces of time is 4, a multiple of 4).

When each data symbol group is allocated to a frame according to such rules, it is possible to reduce a number of bits of the above-described "control information related to the default position of the carrier to be used by data symbol group #j,"

a number of bits of the above-described "control information related to the number of carriers to be used by data symbol group #j,"

a number of bits of the above-described "control information related to the default position of the time to be used by data symbol group #j," and a number of bits of the above-described "control information related to the number of pieces of time to be used by data symbol group #j," and it is possible to improve data (information) transmission efficiency.

In this case, it is possible to define the control information as follows.

The control information related to the default position of the carrier to be used by data symbol group #j is m(j, 0) and m(j, 1), the control information related to the number of carriers to be used by data symbol group #j is n(j, 0) and n(j, 1), the control information related to the default position of the time to be used by data symbol group #j is o(j, 0) and o(j, 1), and the control information related to the number of pieces of time to be used by data symbol group #j is p(j, 0) and p(j, 1).

In this case, when a default position of a carrier to be used by data symbol group #(j=K) is "carrier 1," the transmitting apparatus sets m(K, 0)=0 and m(K, 1)=0, and transmits m(K, 0) and m(K, 1).

When the default position of the carrier to be used by data symbol group #(j=K) is "carrier 5," the transmitting apparatus sets m(K, 0)=1 and m(K, 1)=0, and transmits m(K, 0) and m(K, 1).

When the default position of the carrier to be used by data symbol group #(j=K) is "carrier 9," the transmitting apparatus sets m(K, 0)=0 and m(K, 1)=1, and transmits m(K, 0) and m(K, 1).

When the default position of the carrier to be used by data symbol group #(j=K) is "carrier 13," the transmitting apparatus sets m(K, 0)=1 and m(K, 1)=1, and transmits m(K, 0) and m(K, 1).

When a number of carriers to be used by data symbol group #(j=K) is of 4 carriers, the transmitting apparatus sets n(K, 0)=0 and n(K, 1)=0, and transmits n(K, 0) and n(K, 1).

When the number of carriers to be used by data symbol group #(j=K) is of 8 carriers, the transmitting apparatus sets n(K, 0)=1 and n(K, 1)=0, and transmits n(K, 0) and n(K, 1).

When the number of carriers to be used by data symbol group #(j=K) is of 12 carriers, the transmitting apparatus sets n(K, 0)=0 and n(K, 1)=1, and transmits n(K, 0) and n(K, 1).

When the number of carriers to be used by data symbol group #(j=K) is of 16 carriers, the transmitting apparatus sets n(K, 0)=1 and n(K, 1)=1, and transmits n(K, 0) and n(K, 1).

When a default position of time to be used by data symbol group #(j=K) is "time 1," the transmitting apparatus sets o(K, 0)=0 and o(K, 1)=0, and transmits o(K, 0) and o(K, 1).

When the default position of the time to be used by data symbol group #(j=K) is "time 5," the transmitting apparatus sets o(K, 0)=1 and o(K, 1)=0, and transmits o(K, 0) and o(K, 1).

When the default position of the time to be used by data symbol group #(j=K) is "time 9," the transmitting apparatus sets o(K, 0)=0 and o(K, 1)=1, and transmits o(K, 0) and o(K, 1).

When the default position of the time to be used by data symbol group #(j=K) is "time 13," the transmitting apparatus sets o(K, 0)=1 and o(K, 1)=1, and transmits o(K, 0) and o(K, 1).

When a number of pieces of time to be used by data symbol group #(j=K) is 4, the transmitting apparatus sets p(K, 0)=0 and p(K, 1)=0, and transmits p(K, 0) and p(K, 1).

When the number of pieces of time to be used by data symbol group #(j=K) is 8, the transmitting apparatus sets p(K, 0)=1 and p(K, 1)=0, and transmits p(K, 0) and p(K, 1).

When the number of pieces of time to be used by data symbol group #0=K) is 12, the transmitting apparatus sets p(K, 0)=0 and p(K, 1)=1, and transmits p(K, 0) and p(K, 1).

When the number of pieces of time to be used by data symbol group #(j=K) is 16, the transmitting apparatus sets p(K, 0)=1 and p(K, 1)=1, and transmits p(K, 0) and p(K, 1).

Next, data symbol group #4 will be described as an example.

FIG. 44 illustrates symbol 4304 of data symbol group #4, and data symbol group #4 (4304) is transmitted by using carrier 9 to carrier 12 (by using 4 (a multiple of 4) carriers) and by using time 5 to time 12 (the number of pieces of time is 8, a multiple of 4).

As a result, a default position of a carrier is carrier 9. Hence, the transmitting apparatus sets m(3, 0)=0 and m(3, 1)=1, and transmits m(3, 0) and m(3, 1).

Moreover, a number of carriers to be used is 4. Hence, the transmitting apparatus sets n(3, 0)=0 and n(3, 1)=0, and transmits n(3, 0) and n(3, 1).

A default position of time is time 5. Hence, the transmitting apparatus sets o(3, 0)=1 and o(3, 1)=0, and transmits o(3, 0) and o(3, 1).

Moreover, a number of pieces of time to be used is 8. Hence, the transmitting apparatus sets p(3, 0)=1 and p(3, 1)=0, and transmits p(3, 0) and p(3, 1).

Third Example

A control information transmitting method which is different from the control information transmitting method of the second example when a frame configuration of a modulated signal to be transmitted by the transmitting apparatus in FIG. 1 is a configuration in FIG. 44 will be described.

In FIG. 44, each data symbol group has, for example, a number of carriers of 4×A (A is an integer equal to or more than 1) (the number of carriers to be used by each data symbol group is a multiple of 4 (but, except 0 (zero))), and has a number of pieces of time of 4×B (B is a natural number equal to or more than 1) (the number of pieces of time to be used by each data symbol group is a multiple of 4 (but, except 0 (zero))). However, the number of carriers to be used by each data symbol group is not limited to a multiple of 4, and may be a multiple of C (C is an integer equal to or more than 2) except 0 (zero). Moreover, the number of pieces of time to be used by each data symbol group is not limited to a multiple of 4, and may be a multiple of D (D is an integer equal to or more than 2) except 0 (zero).

Figure 45:
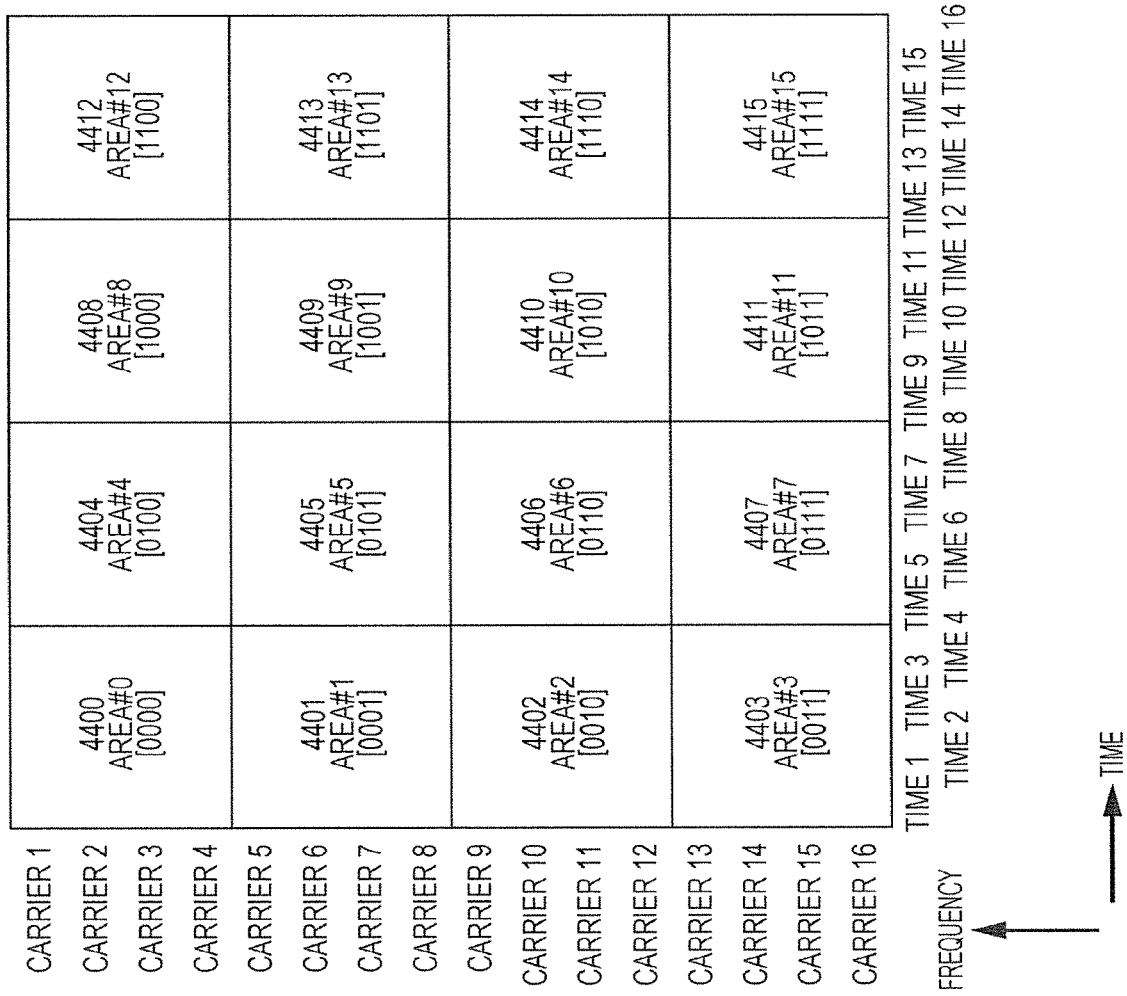
FIG. 45 is a view illustrating an example of area decomposition in a frequency direction and a time direction.

Hence, area decomposition is performed as illustrated in FIG. 45. In FIG. 45, a vertical axis indicates a frequency, and a horizontal axis indicates time. Then, there are carrier 1 to carrier 16, and there are time 1 to time 16 in accordance with FIG. 44. Note that in FIG. 45, each area is configured with an area of 4×4=16 symbols of 4 carriers in a carrier direction and 4 pieces of time in time direction (in a case of generalization using C and D as described above, each area is configured with an area of C×D symbols of C carriers in the carrier direction and D pieces of time in the time direction).

In FIG. 45, area 4400 configured with carrier 1 to carrier 4 and time 1 to time 4 is referred to as area #0.

Area 4401 configured with carrier 5 to carrier 8 and time 1 to time 4 is referred to as area #1.

Area 4402 configured with carrier 9 to carrier 12 and time 1 to time 4 is referred to as area #2.

Area 4403 configured with carrier 13 to carrier 16 and time 1 to time 4 is referred to as area #3.

Area 4404 configured with carrier 1 to carrier 4 and time 5 to time 8 is referred to as area #4.

Area 4405 configured with carrier 5 to carrier 8 and time 5 to time 8 is referred to as area #5.

Area 4406 configured with carrier 9 to carrier 12 and time 5 to time 8 is referred to as area #6.

Area 4407 configured with carrier 13 to carrier 16 and time 5 to time 8 is referred to as area #7.

Area 4408 configured with carrier 1 to carrier 4 and time 9 to time 12 is referred to as area #8.

Area 4409 configured with carrier 5 to carrier 8 and time 9 to time 12 is referred to as area #9.

Area 4410 configured with carrier 9 to carrier 12 and time 9 to time 12 is referred to as area #10.

Area 4411 configured with carrier 13 to carrier 16 and time 9 to time 12 is referred to as area #11.

Area 4412 configured with carrier 1 to carrier 4 and time 13 to time 16 is referred to as area #12.

Area 4413 configured with carrier 5 to carrier 8 and time 13 to time 16 is referred to as area #13.

Area 4414 configured with carrier 9 to carrier 12 and time 13 to time 16 is referred to as area #14.

Area 4415 configured with carrier 13 to carrier 16 and time 13 to time 16 is referred to as area #15.

In this case, the transmitting apparatus in FIG. 1 transmits control information as in an example described below, in order to transmit information of frequency and time resources being used by each data symbol group to the receiving apparatus.

When data symbol group #1 in FIG. 44 is subjected to the area decomposition as illustrated in FIG. 45, data (information) is transmitted by using area #0 (4400), area #1 (4401), area #4 (4404), area #5 (4405), area #8 (4408), area #9 (4409), area #12 (4412) and area #13 (4413). Hence, the transmitting apparatus in FIG. 1 transmits as data symbol group #1 the control information indicating that "area #0 (4400), area #1 (4401), area #4 (4404), area #5 (4405), area #8 (4408), area #9 (4409), area #12 (4412) and area #13 (4413) are used."

In this case, the control information includes information of the areas (area #0 (4400), area #1 (4401), area #4 (4404), area #5 (4405), area #8 (4408), area #9 (4409), area #12 (4412) and area #13 (4413)).

Similarly, the transmitting apparatus in FIG. 1 transmits as data symbol group #2 in FIG. 44 the control information indicating that "area #2 (4402) is used."

In this case, the control information includes information of the area (area #2 (4402)).

The transmitting apparatus in FIG. 1 transmits as data symbol group #3 in FIG. 44 the control information indicating that "area #3 (4403), area #7 (4407), area #11 (4411) and area #15 (4415) are used." In this case, the control information includes information of the areas (area #3 (4403), area #7 (4407), area #11 (4411) and area #15 (4415)).

The transmitting apparatus in FIG. 1 transmits as data symbol group #4 in FIG. 44 the control information indicating that "area #6 (4406) and area #10 (4410) are used." In this case, the control information includes information of the areas (area #6 (4406) and area #10 (4410)).

The transmitting apparatus in FIG. 1 transmits as data symbol group #5 in FIG. 44 the control information indicating that "area #14 (4414) is used."

In this case, the control information includes information of the area (area #14 (4414)).

As described above, in <second example> and <third example> there is an advantage that it is possible to transmit a small number of bits of information of time and frequency resources being used.

Meanwhile, in <first example> there is an advantage that it is possible to more flexibly allocate time and frequency resources to a data symbol group.

<Case where Time (Temporal) Division is Performed>

An example of generation of control information related to frequency resources and time resources to be used by each data symbol group in a case where time (temporal) division is performed will be described.

Fourth Example

Even in a case where time (temporal) division is performed, control information is transmitted in the same way as a case where frequency division is performed. Hence, the above-described <first example> is carried out.

Fifth Example

Even in a case where time (temporal) division is performed, control information is transmitted in the same way as a case where frequency division is performed. Hence, the above-described <second example> is carried out.

Sixth Example

Even in a case where time (temporal) division is performed, control information is transmitted in the same way as a case where frequency division is performed. Hence, the above-described <third example> is carried out.

Seventh Example $e(X, Y)$ described in the second exemplary embodiment is transmitted as control information. That is, information related to a number of symbols in a frame of data symbol group #j is $e(j, 0)$ and $e(j, 1)$.

In this case, for example, when a number of symbols in a frame of data symbol group #(j=K) is of 256 symbols, the transmitting apparatus sets $e(K, 0)=0$ and $e(K, 1)=0$ and transmits $e(K, 0)$ and $e(K, 1)$.

When the number of symbols in the frame of data symbol group #0=K) is of 512 symbols, the transmitting apparatus sets $e(K, 0)=1$ and $e(K, 1)=0$ and transmits $e(K, 0)$ and $e(K, 1)$.

When the number of symbols in the frame of data symbol group #0=K) is of 1024 symbols, the transmitting apparatus sets $e(K, 0)=0$ and $e(K, 1)=1$ and transmits $e(K, 0)$ and $e(K, 1)$.

When the number of symbols in the frame of data symbol group #0=K) is of 2048 symbols, the transmitting apparatus sets $e(K, 0)=1$ and $e(K, 1)=1$ and transmits $e(K, 0)$ and $e(K, 1)$.

Note that the setting of the number of symbols is not limited to the four settings, and the transmitting apparatus only needs to be able to set one or more types of the number of symbols.

Eighth Example

The transmitting apparatus transmits information of a number of pieces of time to be necessary for each data symbol, to the receiving apparatus, and the receiving apparatus obtains this information and thus can learn frequency/time resources to be used by each data symbol.

For example, information related to a number of pieces of time to be used in a frame of data symbol group #j is $q(j, 0)$, $q(j, 1)$, $q(j, 2)$ and $q(j, 3)$.

When a number of pieces of time to be used by data symbol group #(j=K) is 1, the transmitting apparatus sets $q(K, 0)=0$, $q(K, 1)=0$, $q(K, 2)=0$ and $q(K, 3)=0$, and transmits $q(K, 0)$, $q(K, 1)$, $q(K, 2)$ and $q(K, 3)$.

When the number of pieces of time to be used by data symbol group #0=K) is 2, the transmitting apparatus sets $q(K, 0)=1$, $q(K, 1)=0$, $q(K, 2)=0$ and $q(K, 3)=0$, and transmits $q(K, 0)$, $q(K, 1)$, $q(K, 2)$ and $q(K, 3)$.

When the number of pieces of time to be used by data symbol group #0=K) is 3, the transmitting apparatus sets $q(K, 0)=0$, $q(K, 1)=1$, $q(K, 2)=0$ and $q(K, 3)=0$, and transmits $q(K, 0)$, $q(K, 1)$, $q(K, 2)$ and $q(K, 3)$.

When the number of pieces of time to be used by data symbol group #0=K) is 4, the transmitting apparatus sets q(K, 0)=1, q(K, 1)=1, q(K, 2)=0 and q(K, 3)=0, and transmits q(K, 0), q(K, 1), q(K, 2) and q(K, 3).

When the number of pieces of time to be used by data symbol group #0=K) is 5, the transmitting apparatus sets q(K, 0)=0, q(K, 1)=0, q(K, 2)=1 and q(K, 3)=0, and transmits q(K, 0), q(K, 1), q(K, 2) and q(K, 3).

When the number of pieces of time to be used by data symbol group #(j=K) is 6, the transmitting apparatus sets q(K, 0)=1, q(K, 1)=0, q(K, 2)=1 and q(K, 3)=0, and transmits q(K, 0), q(K, 1), q(K, 2) and q(K, 3).

When the number of pieces of time to be used by data symbol group #(j=K) is 7, the transmitting apparatus sets q(K, 0)=0, q(K, 1)=1, q(K, 2)=1 and q(K, 3)=0, and transmits q(K, 0), q(K, 1), q(K, 2) and q(K, 3).

When the number of pieces of time to be used by data symbol group #0=K) is 8, the transmitting apparatus sets q(K, 0)=1, q(K, 1)=1, q(K, 2)=1 and q(K, 3)=0, and transmits q(K, 0), q(K, 1), q(K, 2) and q(K, 3).

When the number of pieces of time to be used by data symbol group #0=K) is 9, the transmitting apparatus sets q(K, 0)=0, q(K, 1)=0, q(K, 2)=0 and q(K, 3)=1, and transmits q(K, 0), q(K, 1), q(K, 2) and q(K, 3).

When the number of pieces of time to be used by data symbol group #0=K) is 10, the transmitting apparatus sets q(K, 0)=1, q(K, 1)=0, q(K, 2)=0 and q(K, 3)=1, and transmits q(K, 0), q(K, 1), q(K, 2) and q(K, 3).

When the number of pieces of time to be used by data symbol group #0=K) is 11, the transmitting apparatus sets q(K, 0)=0, q(K, 1)=1, q(K, 2)=0 and q(K, 3)=1, and transmits q(K, 0), q(K, 1), q(K, 2) and q(K, 3).

When the number of pieces of time to be used by data symbol group #(j=K) is 12, the transmitting apparatus sets q(K, 0)=1, q(K, 1)=1, q(K, 2)=0 and q(K, 3)=1, and transmits q(K, 0), q(K, 1), q(K, 2) and q(K, 3).

When the number of pieces of time to be used by data symbol group #(j=K) is 13, the transmitting apparatus sets q(K, 0)=0, q(K, 1)=0, q(K, 2)=1 and q(K, 3)=1, and transmits q(K, 0), q(K, 1), q(K, 2) and q(K, 3).

When the number of pieces of time to be used by data symbol group #(j=K) is 14, the transmitting apparatus sets q(K, 0)=1, q(K, 1)=0, q(K, 2)=1 and q(K, 3)=1, and transmits q(K, 0), q(K, 1), q(K, 2) and q(K, 3).

When the number of pieces of time to be used by data symbol group #(j=K) is 15, the transmitting apparatus sets q(K, 0)=0, q(K, 1)=1, q(K, 2)=1 and q(K, 3)=1, and transmits q(K, 0), q(K, 1), q(K, 2) and q(K, 3).

When the number of pieces of time to be used by data symbol group #(j=K) is 16, the transmitting apparatus sets q(K, 0)=1, q(K, 1)=1, q(K, 2)=1 and q(K, 3)=1, and transmits q(K, 0), q(K, 1), q(K, 2) and q(K, 3).

Figure 46:
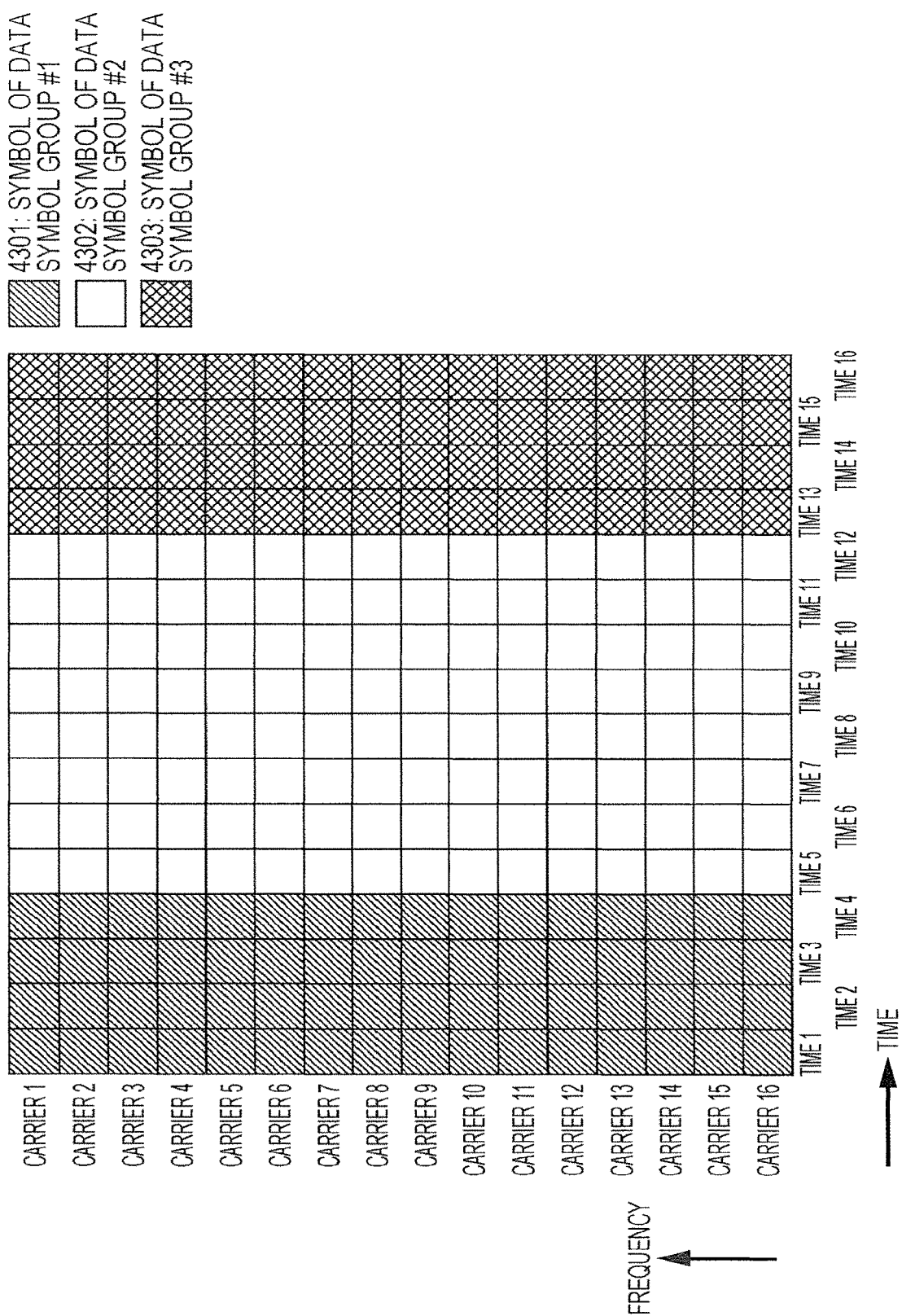
FIG. 46 is a view illustrating an example of the symbol arranging method.

FIG. 46 illustrates an example where a data symbol group is subjected to time (temporal) division in a frame of a modulated signal to be transmitted by the transmitting apparatus in FIG. 1. In FIG. 46, a vertical axis indicates a frequency, and a horizontal axis indicates time. Note that as with the first exemplary embodiment to the fourth exemplary embodiment, a data symbol group may be of symbols of any method of an SISO method (SIMO method), an MIMO method and an MISO method.

In FIG. 46, symbol 4301 of data symbol group #1, and data symbol group #1 (4301) is transmitted by using carrier 1 to carrier 16 (all carriers which can be allocated as data symbols are used. (When there are carriers for arranging a pilot symbol and carriers for transmitting control information, such carriers are excluded.)), and data symbol group #1 (4301) is transmitted by using time 1 to time 4 (however, a first index of a carrier is assumed to be "carrier 1" but is not limited to "carrier 1," and also a first index of time is assumed to be "time 1" but is not limited to "time 1").

FIG. 46 illustrates symbol 4302, of data symbol group #2, and data symbol group #2 (4302) is transmitted by using carrier 1 to carrier 16 (all carriers which can be allocated as data symbols are used. (When there are carriers for arranging a pilot symbol and carriers for transmitting control information, such carriers are excluded.)), and data symbol group #2 (4302) is transmitted by using time 5 to time 12.

FIG. 46 illustrates symbol 4303 of data symbol group #3, and data symbol group #3 (4303) is transmitted by using carrier 1 to carrier 16 (all carriers which can be allocated as data symbols are used. (When there are carriers for arranging a pilot symbol and carriers for transmitting control information, such carriers are excluded.)), and data symbol group #3 (4303) is transmitted by using time 13 to time 16.

For example, data symbol group #2 is transmitted by using time 5 to time 12, that is, a number of pieces of time is 8. Hence, the transmitting apparatus sets q(2, 0)=1, q(2, 1)=1, q(2, 2)=1, and q(2, 3)=0, and transmits q(2, 0), q(2, 1), q(2, 2) and q(2, 3).

Control information may also be generated for data symbol group #1 and data symbol #3 in the same way, and the transmitting apparatus in FIG. 1 transmits q(1, 0), q(1, 1), q(1, 2) and q(1, 3), and q(2, 0), q(2, 1), q(2, 2) and q(2, 3), and q(3, 0), q(3, 1), q(3, 2) and q(3, 3).

The receiving apparatus in FIG. 23 receives q(1, 0), q(1, 1), q(1, 2) and q(1, 3), and q(2, 0), q(2, 1), q(2, 2) and q(2, 3), and q(3, 0), q(3, 1), q(3, 2) and q(3, 3), and learns frequency/time resources being used by data symbol groups. In this case, when it is assumed that the transmitting apparatus and the receiving apparatus share arrangement, for example, such that "data symbol group #1 is temporarily arranged first, and subsequently, data symbol group #2, data symbol group #3, data symbol group #4, data symbol group #5, . . . " are arranged, the transmitting apparatus and the receiving apparatus can learn frequency/time resources being used by each data symbol group from learning a number of pieces of time to be used by each data symbol group (it becomes unnecessary for the transmitting apparatus to transmit information of the first time at which each data symbol group is arranged. Consequently, data transmission efficiency improves).

Ninth Example

Unlike <eighth example>, each data symbol group has, for example, a number of pieces of time of 4×B (B is a natural number equal to or more than 1) (the number of pieces of time to be used by each data symbol group is a multiple of 4 (but, except 0 (zero))). However, the number of pieces of time to be used by each data symbol group is not limited to a multiple of 4, and may be a multiple of D (D is an integer equal to or more than 2) except 0 (zero).

FIG. 46 illustrates symbol 4301 of data symbol group #1, and data symbol group #1 (4301) is transmitted by using carrier 1 to carrier 16 (all carriers which can be allocated as data symbols are used. (When there are carriers for arranging a pilot symbol and carriers for transmitting control information, such carriers are excluded.)), and data symbol group #1 (4301) is transmitted by using time 1 to time 4 (the number of pieces of time is 4, a multiple of 4) (however, a first index of a carrier is assumed to be "carrier 1" but is not limited to "carrier 1," and also a first index of time is assumed to be "time 1" but is not limited to "time 1").

FIG. 46 illustrates symbol 4302 of data symbol group #2, and data symbol group #2 (4302) is transmitted by using carrier 1 to carrier 16 (all carriers which can be allocated as data symbols are used. (When there are carriers for arranging a pilot symbol and carriers for transmitting control information, such carriers are excluded.)), and data symbol group #2 (4302) is transmitted by using time 5 to time 12 (the number of pieces of time is 8, a multiple of 4).

FIG. 46 illustrates symbol 4303 of data symbol group #3, and data symbol group #3 (4303) is transmitted by using carrier 1 to carrier 16 (all carriers which can be allocated as data symbols are used. (When there are carriers for arranging a pilot symbol and carriers for transmitting control information, such carriers are excluded.)), and data symbol group #3 (4303) is transmitted by using time 13 to time 16 (the number of pieces of time is 8, a multiple of 4).

When each data symbol group is allocated to a frame according to such rules, it is possible to reduce a number of bits of the above-described "information related to the number of pieces of time to be used in the frame of data symbol group #j," and it is possible to improve data (information) transmission efficiency.

In this case, it is possible to define the control information as follows.

The information related to the number of pieces of time to be used in the frame of data symbol group #j is q(j, 0) and q(j, 1).

When a number of pieces of time to be used by data symbol group #(j=K) is 4, the transmitting apparatus sets q(K, 0)=0 and q(K, 1)=0, and transmits q(K, 0) and q(K, 1).

When the number of pieces of time to be used by data symbol group #(j=K) is 8, the transmitting apparatus sets q(K, 0)=1 and q(K, 1)=0, and transmits q(K, 0) and q(K, 1).

When the number of pieces of time to be used by data symbol group #(j=K) is 12, the transmitting apparatus sets q(K, 0)=0 and q(K, 1)=1, and transmits q(K, 0) and q(K, 1).

When the number of pieces of time to be used by data symbol group #(=K) is 16, the transmitting apparatus sets q(K, 0)=1 and q(K, 1)=1, and transmits q(K, 0) and q(K, 1).

For example, data symbol group #2 in FIG. 46 is transmitted by using time 5 to time 12, that is, the number of pieces of time is 8. Hence, the transmitting apparatus sets q(2, 0)=1 and q(2, 1)=0, and transmits q(2, 0) and q(2, 1).

Control information may also be generated for data symbol group #1 and data symbol #3 in the same way, and the transmitting apparatus in FIG. 1 transmits q(1, 0) and q(1, 1), and q(2, 0) and q(2, 1), and q(3, 0) and q(3, 1).

The receiving apparatus in FIG. 23 receives q(1, 0) and q(1, 1), and q(2, 0) and q(2, 1), and q(3, 0) and q(3, 1), and learns frequency/time resources being used by data symbol groups. In this case, when it is assumed that the transmitting apparatus and the receiving apparatus share arrangement, for example, such that "data symbol group #1 is temporarily arranged first, and subsequently, data symbol group #2, data symbol group #3, data symbol group #4, data symbol group #5, . . . " are arranged, the transmitting apparatus and the receiving apparatus can learn frequency/time resources being used by each data symbol group from learning the number of pieces of time to be used by each data symbol group (it becomes unnecessary for the transmitting apparatus to transmit information of the first time at which each data symbol group is arranged. Consequently, data transmission efficiency improves).

Tenth Example

Unlike <eighth example>, each data symbol group has, for example, a number of pieces of time of 4×B (B is a natural number equal to or more than 1) (the number of pieces of time to be used by each data symbol group is a multiple of 4 (but, except 0 (zero))) (the same as in <ninth example> applies). However, the number of pieces of time to be used by each data symbol group is not limited to a multiple of 4, and may be a multiple of D (D is an integer equal to or more than 2) except 0 (zero).

Figure 47:
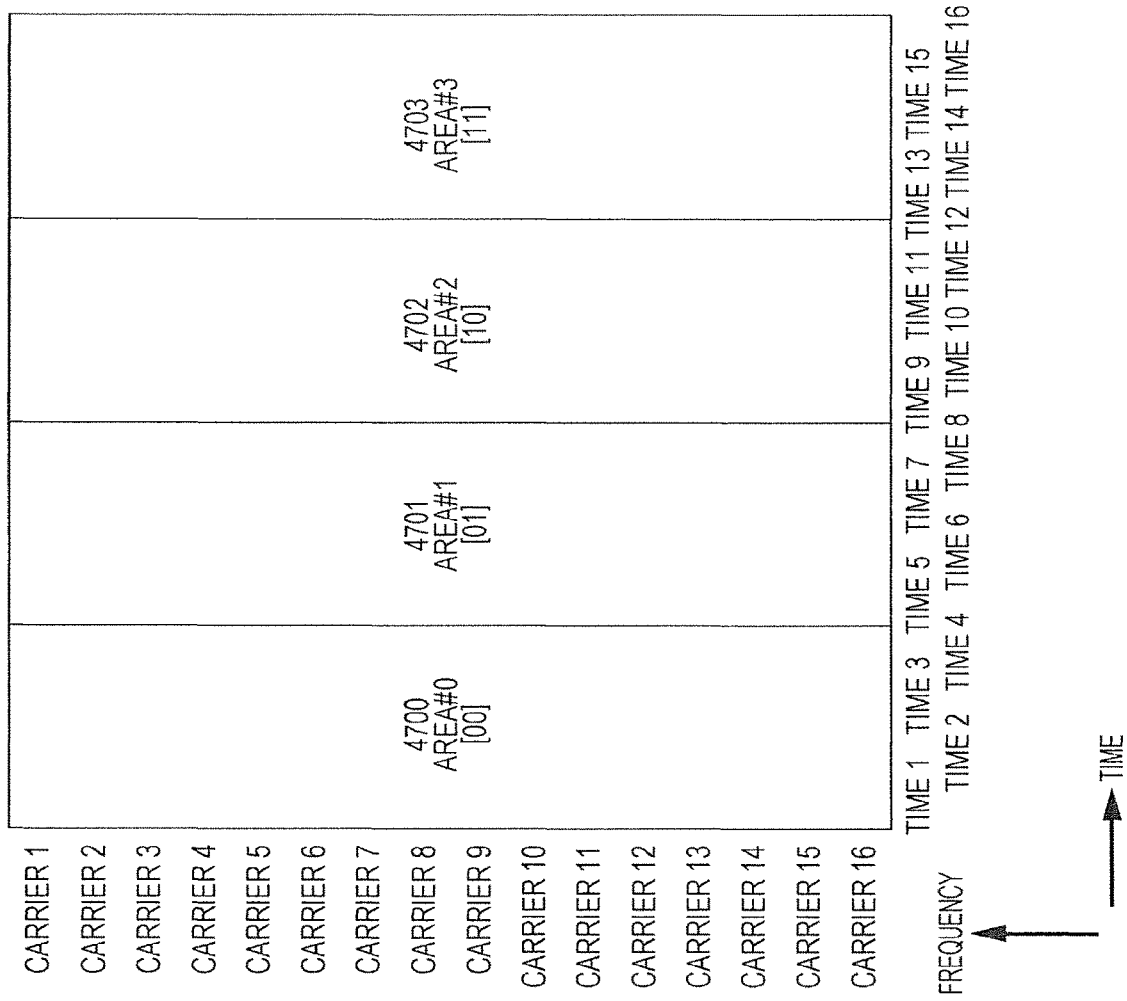
FIG. 47 is a view illustrating an example of area decomposition in the time direction.

Hence, area decomposition is performed as illustrated in FIG. 47. In FIG. 47, a vertical axis indicates a frequency, and a horizontal axis indicates time. Then, there are carrier 1 to carrier 16, and there are time 1 to time 16 in accordance with FIG. 46. Note that in FIG. 47, each area is configured with an area of 16×4=64 symbols of 16 carriers in a carrier direction, and 4 pieces of time in a time direction (in a case of generalization using C and D as described above, each area is configured with an area of C×D symbols of C carriers in the carrier direction and D pieces of time in the time direction).

In FIG. 47, area 4700 configured with time 1 to time 4 is referred to as area #0.

Area 4701 configured with time 5 to time 8 is referred to as area #1.

Area 4702 configured with time 9 to time 12 is referred to as area #2.

Area 4703 configured with time 13 to time 16 is referred to as area #3.

In this case, the transmitting apparatus in FIG. 1 transmits control information as in an example described below, in order to transmit information of frequency and time resources being used by each data symbol group to the receiving apparatus.

When data symbol group #1 in FIG. 46 is subjected to the area decomposition as in FIG. 47, data (information) is transmitted by using area #0 (4700). Hence, the transmitting apparatus in FIG. 1 transmits as data symbol group #1 the control information indicating that "area #0 (4700) is used."

In this case, the control information includes information of the area (area #0 (4700)).

Similarly, the transmitting apparatus in FIG. 1 transmits as data symbol group #2 in FIG. 46 the control information indicating that "area #1 (4701) and area #2 (4702) are used."

In this case, the control information includes information of the areas (area #1 (4701) and area #2 (4702)).

The transmitting apparatus in FIG. 1 transmits as data symbol group #3 in FIG. 46 the control information indicating that "area #3 (4703) is used."

In this case, the control information includes information of the area (area #3 (4703)).

The control information during time (temporal) division is described in <fourth example> to <tenth example>. For example, when <fourth example>, <fifth example> and <sixth example> are used, the control information of frequency division and the control information during time (temporal) division can be configured in the same way.

Meanwhile, in a case of <seventh example> to <tenth example>, the transmitting apparatus transmits "control information related to use of time/frequency resources during frequency division, and control information related to use of time/frequency resources during time (temporal) division" having different configurations, by using the first preamble and/or the second preamble.

Note that for example, in a case of the frame configuration in FIG. 5, first preamble 201 and/or second preamble 202 include control information related to use of time/frequency resources during frequency division, and a configuration may be made such that first preamble 501 and/or second preamble 502 include control information related to use of time/frequency resources during time (temporal) division.

Similarly, in a case of the frame configuration in FIGS. 25, 28 and 32, first preamble 201 and/or second preamble 202 include control information related to use of time/frequency resources during frequency division, and a configuration may be made such that first preamble 501 and/or second preamble 502 include control information related to use of time/frequency resources during time (temporal) division.

Moreover, in a case of the frame configuration in FIG. 36, first preambles 201 and 501 and/or second preambles 202 and 502 include control information related to use of time/frequency resources during frequency division, and a configuration may be made such that first preamble 3601 and/or second preamble 3602 include control information related to use of time/frequency resources during time (temporal) division.

As described above, in <fifth example><sixth example>, <ninth example> and <tenth example>, there is an advantage that it is possible to transmit a small number of bits of information of time/frequency resources being used.

Meanwhile, in <fourth example>, <seventh example> and <eighth example>, there is an advantage that it is possible to more flexibly allocate time/frequency resources to a data symbol group.

As in the examples described above, the transmitting apparatus transmits the control information related to use of the time/frequency resources during frequency division and the control information related to use of the time/frequency resources during time (temporal) division, and thus the receiving apparatus can learn a use status of the time/frequency resources of data symbol groups and can accurately demodulate/decode data.

Sixth Exemplary Embodiment

Some examples of a frame configuration of a modulated signal to be transmitted by the transmitting apparatus in FIG. 1 are described in the first exemplary embodiment to the fifth exemplary embodiment. A frame configuration different from the frame configurations described in the first exemplary embodiment to the fifth exemplary embodiment will be described in the present exemplary embodiment.

Figure 48:
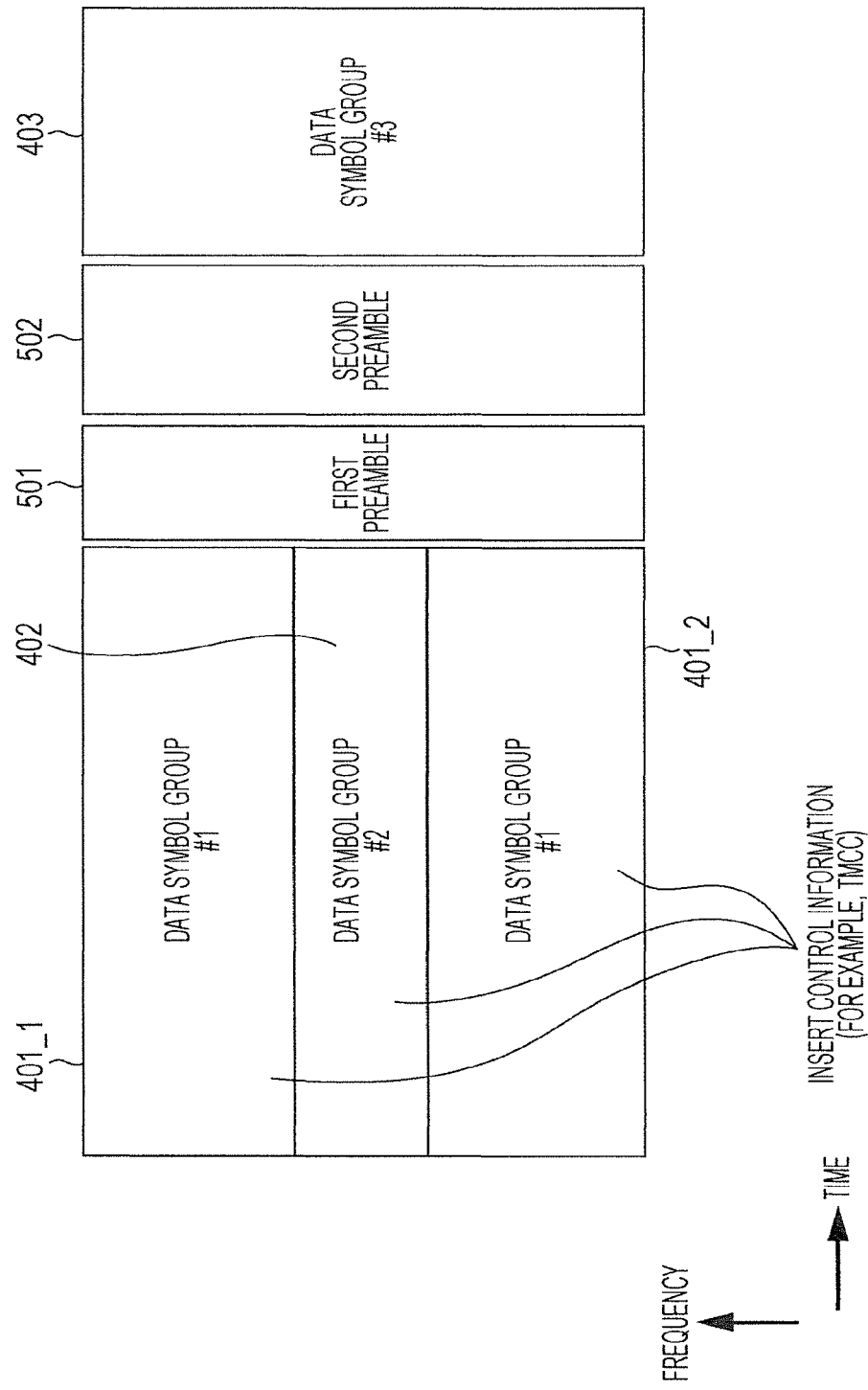
FIG. 48 is a view illustrating an example of a frame configuration.

FIG. 48 illustrates an example of a frame configuration of a modulated signal to be transmitted by the transmitting apparatus in FIG. 1. Elements operating in the same way as in FIG. 5 are assigned the same reference numerals in FIG. 48. Moreover, in FIG. 48, a vertical axis indicates a frequency, and a horizontal axis indicates time. Note that as with the first exemplary embodiment to the fifth exemplary embodiment, a data symbol group may be of symbols of any of an SISO method (SIMO method), an MIMO method and an MISO method.

A difference of FIG. 48 from FIG. 5 is that first preamble 201 and second preamble 202 in FIG. 5 do not exist. Then, the control information symbols (for example, TMCC (Transmission Multiplexing Configuration Control)) are arranged on data symbol groups #1 (401_1 and 401_2) and data symbol group #2 (402) in a frequency direction. Note that the control information symbols include, for example, a symbol for frame synchronization, frequency synchronization and time synchronization, a symbol for notifying of frequency/time resources to be used by each data symbol group described in the fifth exemplary embodiment, information related to a modulating method for generating a data symbol group, and information related to an error correction method for generating a data symbol group (information related to a code, information related to a code length, information related to a coding rate, and the like).

Figure 49:
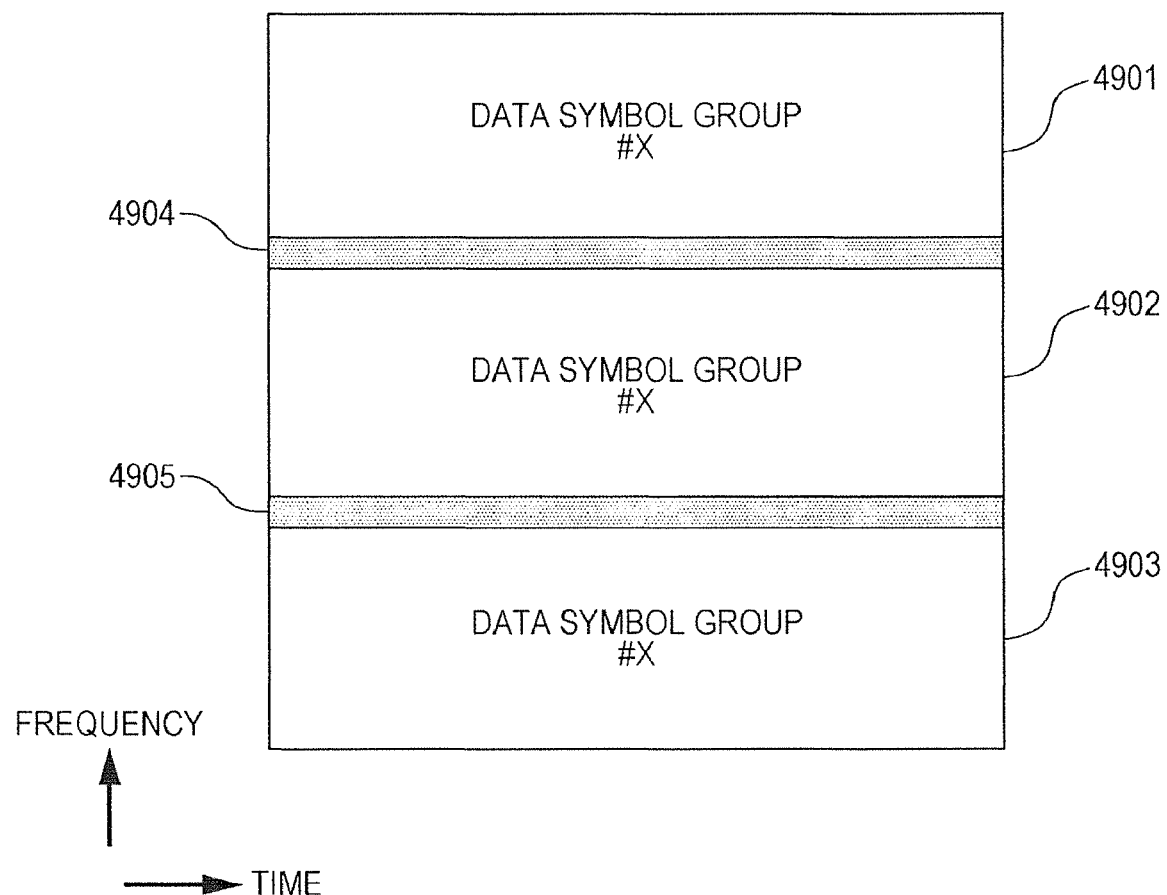
FIG. 49 is a view illustrating an example of a control symbol arranging method.

FIG. 49 illustrates an example of a configuration in a case where the control information symbols (for example, TMCC (Transmission Multiplexing Configuration Control)) are arranged on data symbol groups #1 (401_1 and 401_2) and data symbol group #2 (402) in a frequency direction.

In FIG. 49, a vertical axis indicates a frequency, and a horizontal axis indicates time. FIG. 49 illustrates data symbol groups #X (X is 1 or 2 in FIG. 48.) 4901, 4902 and 4903, and control information symbols 4904 and 4905 (for example, TMCC (Transmission Multiplexing Configuration Control)).

As illustrated in FIG. 49, control information symbols (4904 and 4905) are arranged on certain specific carriers (subcarriers) (frequency) (note that these specific carriers may include or may not include symbols other than the control information symbols).

For example, X=1 holds in FIG. 49. Then, as illustrated in FIG. 49, the control information symbols are arranged on certain specific carriers (subcarriers) (frequency) of data symbol group #1.

Similarly, X=2 holds in FIG. 49. Then, as illustrated in FIG. 49, the control information symbols are arranged on certain specific carriers (subcarriers) (frequency) of data symbol group #2.

Note that when there are, for example, carrier #1 to carrier #100 in a case where frequency division is performed as in FIG. 48 to arrange control information symbols in a frequency/time area in which a data symbol group is arranged, the control information symbols may be arranged on specific carriers such as carrier #5, carrier #25, carrier #40, carrier #55, carrier #70 and carrier #85, or the control information symbols may be arranged according to arrangement of data symbol groups.

Next, an advantage in a case of the frame configuration in FIG. 48 will be described.

In a case of the frame configuration in FIG. 5, the receiving apparatus needs to obtain first preamble 201 and second preamble 202, in order to demodulate/decode data symbol group #1 and data symbol group #2 and to obtain information. For this reason, the receiving apparatus needs to obtain a modulated signal of a frequency band for receiving first preamble 201 and second preamble 202.

In such a circumstance, when there is a terminal which needs only data symbol group #2, a frame configuration for enabling demodulation/decoding of data symbol group #2 only with a frequency band occupied by data symbol group #2 is desired in order to enable flexible terminal design, and in a case of the frame configuration in FIG. 48, it is possible to realize this frame configuration.

When a frame is configured as in FIG. 48, control information symbols (for example, TMCC (Transmission Multiplexing Configuration Control)) are inserted to data symbol group #2 in the frequency direction as illustrated in FIG. 49. For this reason, the receiving apparatus can demodulate/decode data symbol group #2 by obtaining modulated signals of the frequency band of only data symbol group #2. Hence, flexible terminal design becomes possible.

Next, a case where a frame configuration of a modulated signal to be transmitted by the transmitting apparatus in FIG. 1 is a frame configuration in FIG. 50 will be described. Elements operating in the same way as in FIG. 25 are assigned the same reference numerals in FIG. 50. Moreover, in FIG. 50, a vertical axis indicates a frequency, and a horizontal axis indicates time. Note that as with the first exemplary embodiment to the fifth exemplary embodiment, a data symbol group may be of symbols of any of an SISO method (SIMO method), an MIMO method and an MISO method.

Figure 50:
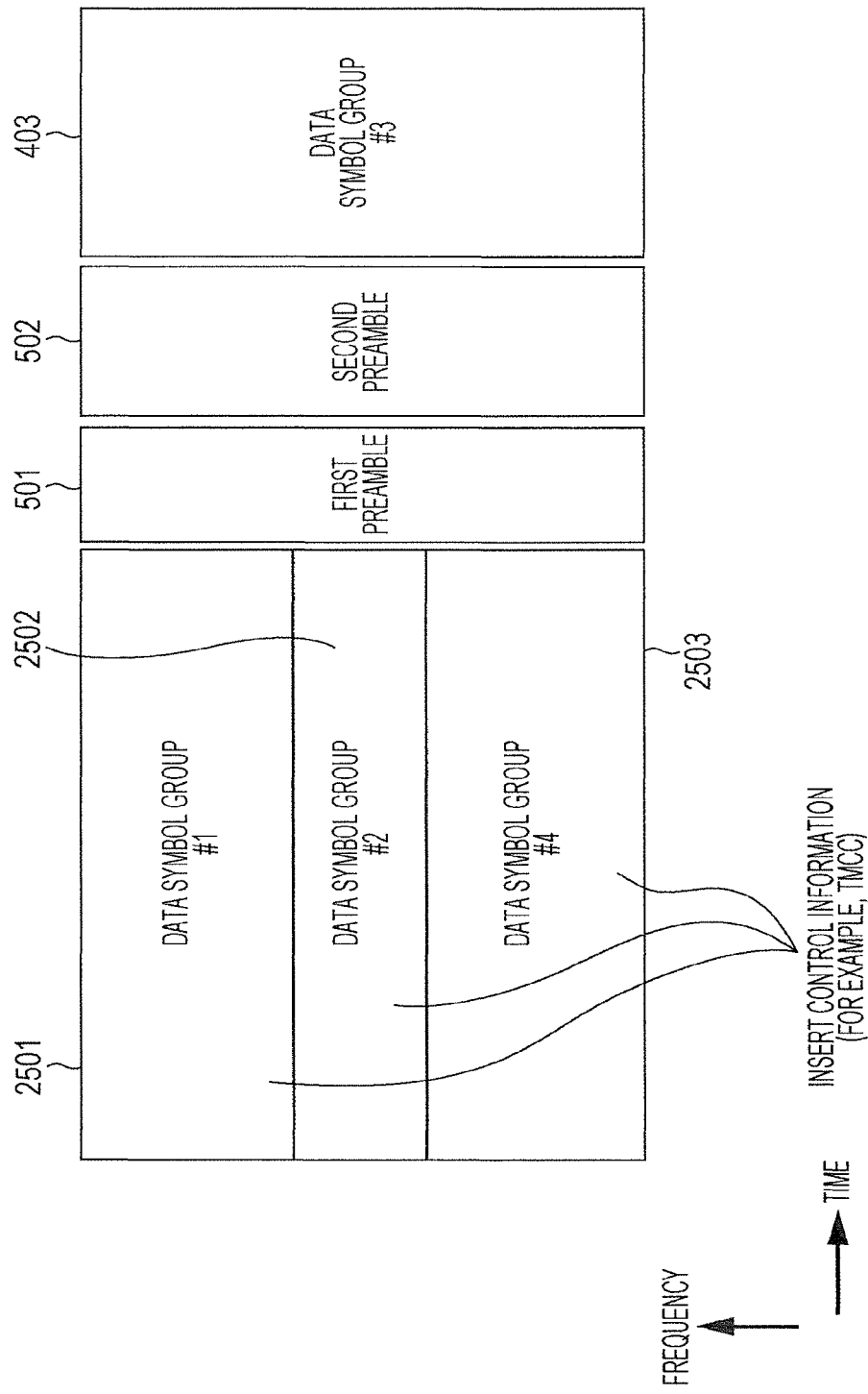
FIG. 50 is a view illustrating an example of a frame configuration.

A difference of FIG. 50 from FIG. 25 is that first preamble 201 and second preamble 202 in FIG. 25 do not exist. Then, the control information symbols (for example, TMCC (Transmission Multiplexing Configuration Control)) are arranged on data symbol group #1 (2501), data symbol group #2 (2502) and data symbol group #4 (2503) in a frequency direction. Note that the control information symbols include, for example, a symbol for frame synchronization, frequency synchronization and time synchronization, a symbol for notifying of frequency/time resources to be used by each data symbol group described in the fifth exemplary embodiment, information related to a modulating method for generating a data symbol group, and information related to an error correction method for generating a data symbol group (information related to a code, information related to a code length, information related to a coding rate, and the like).

FIG. 49 illustrates an example of a configuration in a case where the control information symbols (for example, TMCC (Transmission Multiplexing Configuration Control)) are arranged on data symbol group #1 (2501), data symbol group #2 (2502) and data symbol group #4 (2503) in a frequency direction.

In FIG. 49, a vertical axis indicates a frequency, and a horizontal axis indicates time. FIG. 49 illustrates data symbol groups #X (X is 1, 2 or 4 in FIG. 50.) 4901, 4902 and 4903, and control information symbols 4904 and 4905 (for example, TMCC (Transmission Multiplexing Configuration Control)).

As illustrated in FIG. 49, control information symbols (4904 and 4905) are arranged on certain specific carriers (subcarriers) (frequency) (note that these specific carriers may include or may not include symbols other than the control information symbols).

For example, X=1 holds in FIG. 49. Then, as illustrated in FIG. 49, the control information symbols are arranged on certain specific carriers (subcarriers) (frequency) of data symbol group #1.

Similarly, X=2 holds in FIG. 49. Then, as illustrated in FIG. 49, the control information symbols are arranged on certain specific carriers (subcarriers) (frequency) of data symbol group #2.

X=4 holds in FIG. 49. Then, as illustrated in FIG. 49, the control information symbols are arranged on certain specific carriers (subcarriers) (frequency) of data symbol group #4.

Note that when there are, for example, carrier #1 to carrier #100 in a case where frequency division is performed as in FIG. 50 to arrange control information symbols in a frequency/time area in which a data symbol group is arranged, the control information symbols may be arranged on specific carriers such as carrier #5, carrier #25, carrier #40, carrier #55, carrier #70 and carrier #85, or the control information symbols may be arranged according to arrangement of data symbol groups.

Next, an advantage in a case of the frame configuration in FIG. 50 will be described.

In a case of the frame configuration in FIG. 25, the receiving apparatus needs to obtain first preamble 201 and second preamble 202, in order to demodulate/decode data symbol group #1, data symbol group #2 and data symbol group #4 and to obtain information. For this reason, the receiving apparatus needs to obtain a modulated signal of a frequency band for receiving first preamble 201 and second preamble 202.

In such a circumstance, when there is a terminal which needs only data symbol group #2, a frame configuration for enabling demodulation/decoding of data symbol group #2 only with a frequency band occupied by data symbol group #2 is desired in order to enable flexible terminal design, and in a case of the frame configuration in FIG. 50, it is possible to realize this frame configuration.

When a frame is configured as in FIG. 50, control information symbols (for example, TMCC (Transmission Multiplexing Configuration Control)) are inserted to data symbol group #2 in the frequency direction as illustrated in FIG. 49. For this reason, the receiving apparatus can demodulate/decode data symbol group #2 by obtaining modulated signals of the frequency band of only data symbol group #2. Hence, flexible terminal design becomes possible.

Next, a case where a frame configuration of a modulated signal to be transmitted by the transmitting apparatus in FIG. 1 is a frame configuration in FIG. 51 will be described. Elements operating in the same way as in FIG. 28 are assigned the same reference numerals in FIG. 51. Moreover, in FIG. 51, a vertical axis indicates a frequency, and a horizontal axis indicates time. Note that as with the first exemplary embodiment to the fifth exemplary embodiment, a data symbol group may be of symbols of any of an SISO method (SIMO method), an MIMO method and an MISO method.

Figure 51:
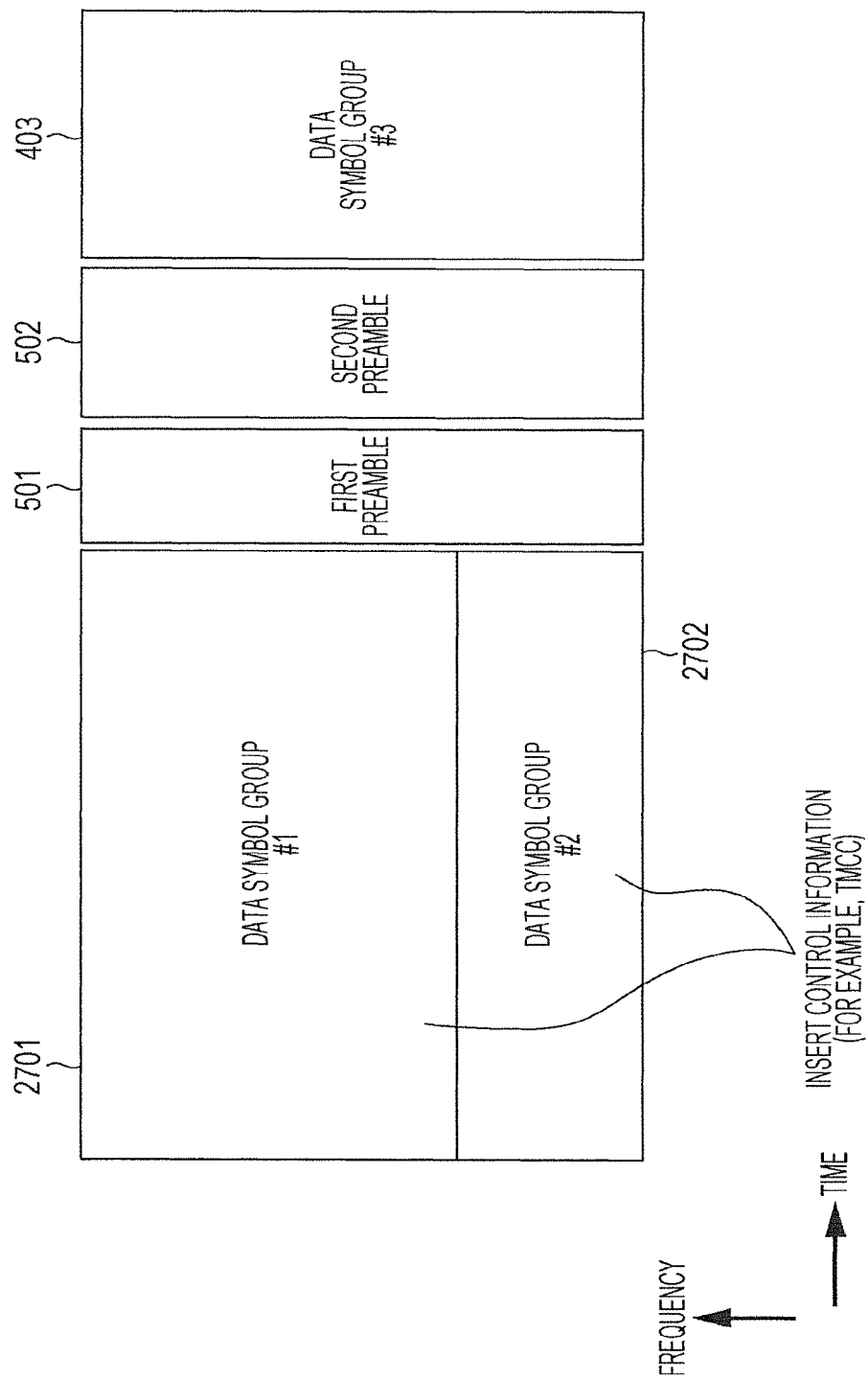
FIG. 51 is a view illustrating an example of a frame configuration.

A difference of FIG. 51 from FIG. 28 is that first preamble 201 and second preamble 202 in FIG. 28 do not exist. Then, the control information symbols (for example, TMCC (Transmission Multiplexing Configuration Control)) are arranged on data symbol group #1 (2701) and data symbol group #2 (2702) in a frequency direction. Note that the control information symbols include, for example, a symbol for frame synchronization, frequency synchronization and time synchronization, a symbol for notifying of frequency/time resources to be used by each data symbol group described in the fifth exemplary embodiment, information related to a modulating method for generating a data symbol group, and information related to an error correction method for generating a data symbol group (information related to a code, information related to a code length, information related to a coding rate, and the like).

FIG. 49 illustrates an example of a configuration in a case where the control information symbols (for example, TMCC (Transmission Multiplexing Configuration Control)) are arranged on data symbol group #1 (2701) and data symbol group #2 (2702) in a frequency direction.

In FIG. 49, a vertical axis indicates a frequency, and a horizontal axis indicates time. FIG. 49 illustrates data symbol groups #X (X is 1 or 2 in FIG. 51.) 4901, 4902 and 4903, and control information symbols 4904 and 4905 (for example, TMCC (Transmission Multiplexing Configuration Control)).

As illustrated in FIG. 49, control information symbols (4904 and 4905) are arranged on certain specific carriers (subcarriers) (frequency) (note that these specific carriers may include or may not include symbols other than the control information symbols).

For example, X=1 holds in FIG. 49. Then, as illustrated in FIG. 49, the control information symbols are arranged on certain specific carriers (subcarriers) (frequency) of data symbol group #1.

Similarly, X=2 holds in FIG. 49. Then, as illustrated in FIG. 49, the control information symbols are arranged on certain specific carriers (subcarriers) (frequency) of data symbol group #2.

Note that when there are, for example, carrier #1 to carrier #100 in a case where frequency division is performed as in FIG. 51 to arrange control information symbols in a frequency/time area in which a data symbol group is arranged, the control information symbols may be arranged on specific carriers such as carrier #5, carrier #25, carrier #40, carrier #55, carrier #70 and carrier #85, or the control information symbols may be arranged according to arrangement of data symbol groups.

Next, an advantage in a case of the frame configuration in FIG. 51 will be described.

In a case of the frame configuration in FIG. 28, the receiving apparatus needs to obtain first preamble 201 and second preamble 202, in order to demodulate/decode data symbol group #1 and data symbol group #2 and to obtain information. For this reason, the receiving apparatus needs to obtain a modulated signal of a frequency band for receiving first preamble 201 and second preamble 202.

In such a circumstance, when there is a terminal which needs only data symbol group #2, a frame configuration for enabling demodulation/decoding of data symbol group #2 only with a frequency band occupied by data symbol group #2 is desired in order to enable flexible terminal design, and in a case of the frame configuration in FIG. 51, it is possible to realize this frame configuration.

When a frame is configured as in FIG. 51, control information symbols (for example, TMCC (Transmission Multiplexing Configuration Control)) are inserted to data symbol group #2 in the frequency direction as illustrated in FIG. 49. For this reason, the receiving apparatus can demodulate/decode data symbol group #2 by obtaining modulated signals of the frequency band of only data symbol group #2. Hence, flexible terminal design becomes possible.

Next, a case where a frame configuration of a modulated signal to be transmitted by the transmitting apparatus in FIG. 1 is a frame configuration in FIG. 52 will be described. Elements operating in the same way as in FIG. 32 are assigned the same reference numerals in FIG. 52. Moreover, in FIG. 52, a vertical axis indicates a frequency, and a horizontal axis indicates time. Note that as with the first exemplary embodiment to the fifth exemplary embodiment, a data symbol group may be of symbols of any of an SISO method (SIMO method), an MIMO method and an MISO method.

Figure 52:
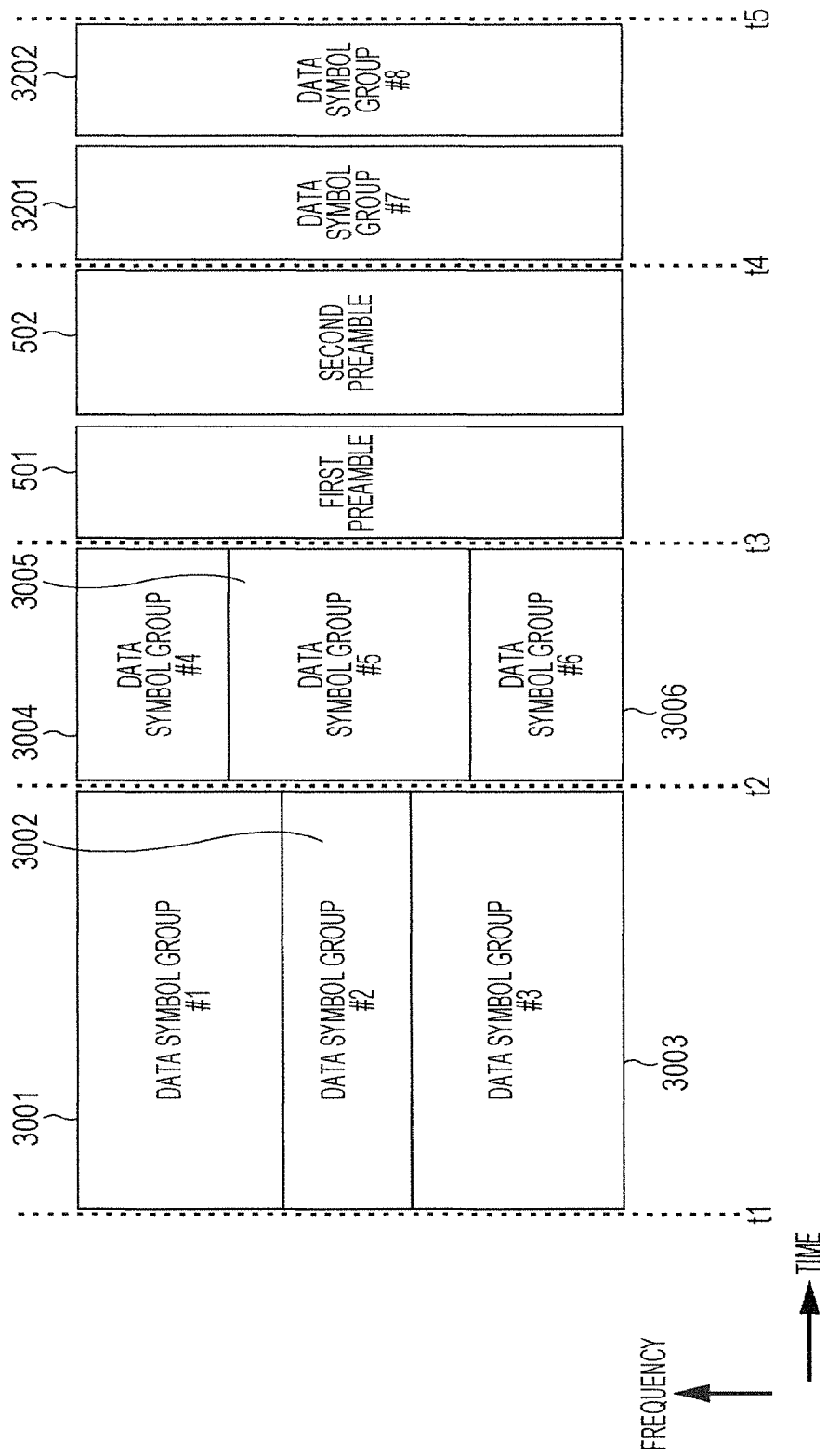
FIG. 52 is a view illustrating an example of a frame configuration.

A difference of FIG. 52 from FIG. 32 is that first preamble 201 and second preamble 202 in FIG. 32 do not exist. Then, the control information symbols (for example, TMCC (Transmission Multiplexing Configuration Control)) are arranged on data symbol group #1 (3001), data symbol group #2 (3002), data symbol group #3 (3003), data symbol group #4 (3004), data symbol group #5 (3005) and data symbol group #6 (3006) in a frequency direction. Note that the control information symbols include, for example, a symbol for frame synchronization, frequency synchronization and time synchronization, a symbol for notifying of frequency/time resources to be used by each data symbol group described in the fifth exemplary embodiment, information related to a modulating method for generating a data symbol group, and information related to an error correction method for generating a data symbol group (information related to a code, information related to a code length, information related to a coding rate, and the like).

However, the control information symbols are not necessarily arranged on all of data symbol group #1 (3001), data symbol group #2 (3002), data symbol group #3 (3003), data symbol group #4 (3004), data symbol group #5 (3005) and data symbol group #6 (3006) in the frequency direction. This point will be described with reference to FIG. 53.

Figure 53:
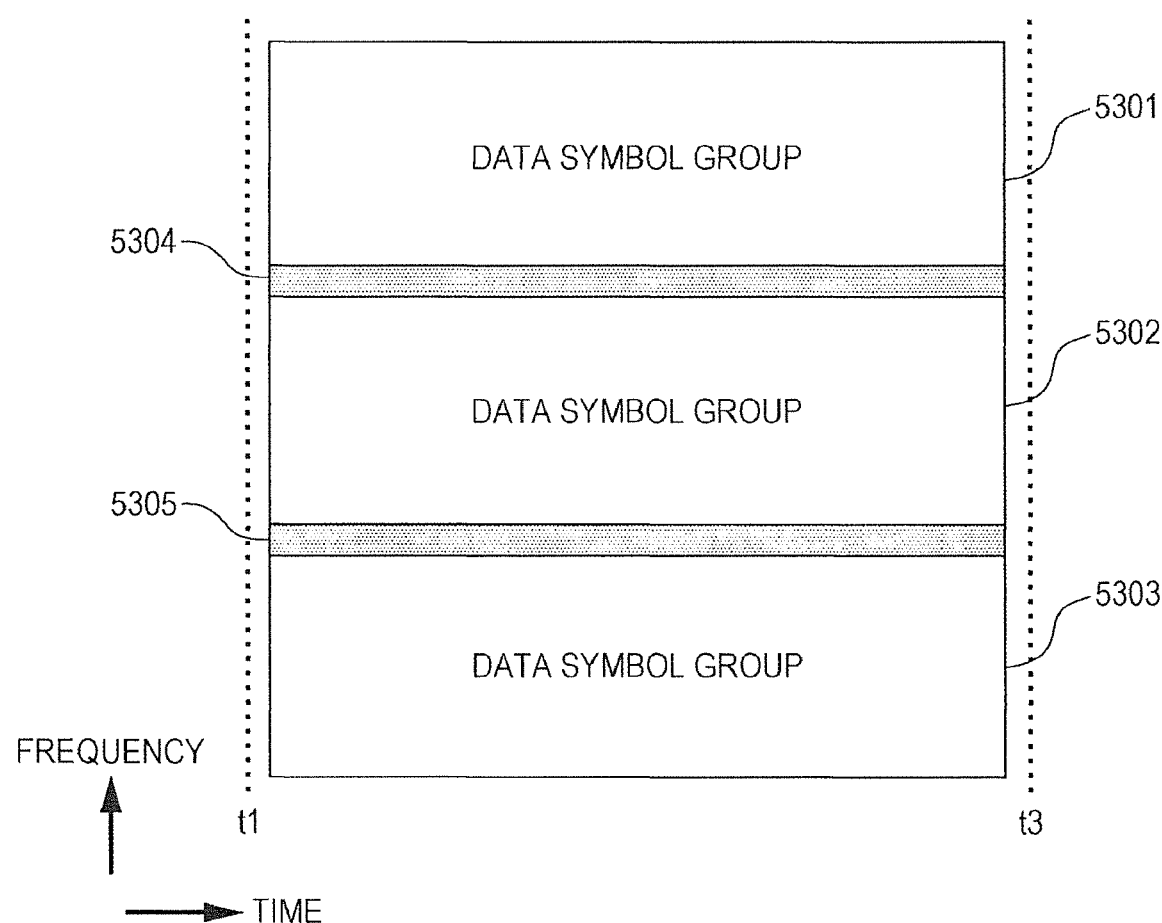
FIG. 53 is a view illustrating an example of the control symbol arranging method.

FIG. 53 illustrates an example of arrangement of control information symbols at time t1 to time t3 in FIG. 52. In a case of FIG. 52, data symbol groups 5301, 5302 and 5303 each include any of data symbol group #1 (3001), data symbol group #2 (3002), data symbol group #3 (3003), data symbol group #4 (3004), data symbol group #5 (3005) and data symbol group #6 (3006).

FIG. 53 illustrates control information symbols 5304 and 5305, and the control information symbols (for example, TMCC (Transmission Multiplexing Configuration Control)) are arranged in a frequency direction. Control information symbol 5304 is arranged on a specific carrier as illustrated in FIG. 53. Moreover, control information symbol 5305 is arranged on a specific carrier (subcarrier) (frequency) as illustrated in FIG. 53 (note that this specific carrier may include or may not include symbols other than the control information symbols).

When there are, for example, carrier #1 to carrier #100 in a case where frequency division is performed as in FIG. 52 to arrange control information symbols in a frequency/time area in which a data symbol group is arranged, the control information symbols may be arranged on specific carriers such as carrier #5, carrier #25, carrier #40, carrier #55, carrier #70 and carrier #85, or the control information symbols may be arranged according to arrangement of data symbol groups.

Next, an advantage in a case of the frame configuration in FIG. 52 will be described.

In a case of the frame configuration in FIG. 32, the receiving apparatus needs to obtain first preamble 201 and second preamble 202, in order to demodulate/decode data symbol group #1 (3001), data symbol group #2 (3002), data symbol group #3 (3003), data symbol group #4 (3004), data symbol group #5 (3005) and data symbol group #6 (3006) and to obtain information. For this reason, the receiving apparatus needs to obtain a modulated signal of a frequency band for receiving first preamble 201 and second preamble 202.

In such a circumstance, when there is a terminal which needs only data symbol group #2, a frame configuration for enabling demodulation/decoding of data symbol group #2 only with a frequency band occupied by data symbol group #2 is desired in order to enable flexible terminal design, and in a case of the frame configuration in FIG. 52, it is possible to realize this frame configuration.

When a frame is configured as in FIG. 52, the control information symbols (for example, TMCC (Transmission Multiplexing Configuration Control)) are inserted to a data symbol group in the frequency direction as illustrated in FIG. 53. For this reason, the receiving apparatus can demodulate/decode data symbol group #2 by obtaining modulated signals of the frequency bands around data symbol group #2. Hence, flexible terminal design becomes possible.

Next, a case where a frame configuration of a modulated signal to be transmitted by the transmitting apparatus in FIG. 1 is a frame configuration in FIG. 54 will be described. Elements operating in the same way as in FIG. 36 are assigned the same reference numerals in FIG. 54. Moreover, in FIG. 54, a vertical axis indicates a frequency, and a horizontal axis indicates time. Note that as with the first exemplary embodiment to the fifth exemplary embodiment, a data symbol group may be of symbols of any of an SISO method (SIMO method), an MIMO method and an MISO method.

Figure 54:
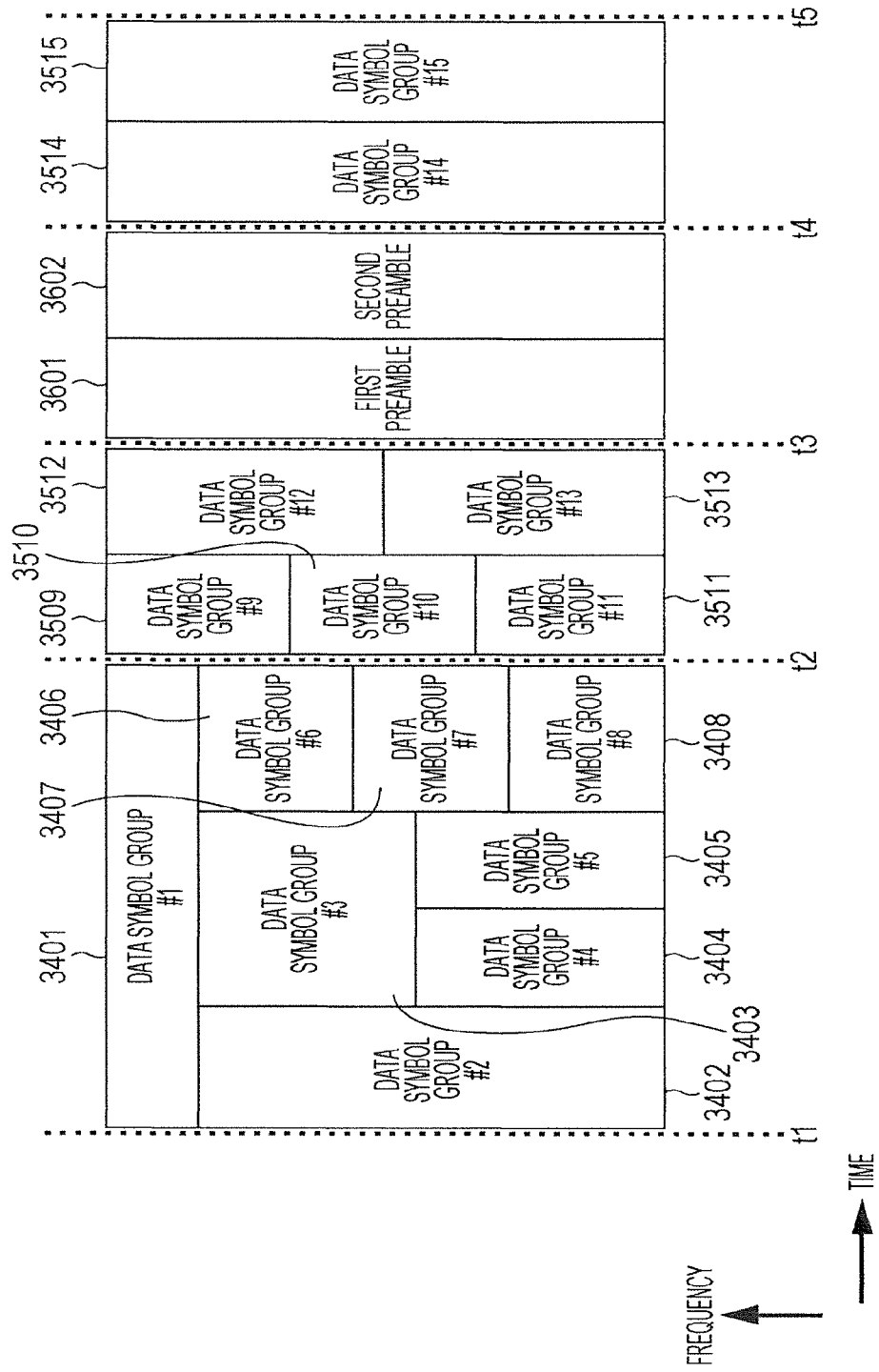
FIG. 54 is a view illustrating an example of a frame configuration.

A difference of FIG. 54 from FIG. 36 is that first preamble 201 and second preamble 202, and first preamble 501 and second preamble 502 in FIG. 36 do not exist. Then, the control information symbols (for example, TMCC (Transmission Multiplexing Configuration Control)) are arranged on data symbol group #1 (3401), data symbol group #2 (3402), data symbol group #3 (3403), data symbol group #4 (3404), data symbol group #5 (3405), data symbol group #6 (3406), data symbol group #7 (3407), data symbol group #8 (3408), data symbol group #9 (3509), data symbol group #10 (3510), data symbol group #11 (3511), data symbol group #12 (3512), and data symbol group #13 (3513) in a frequency direction. Note that the control information symbols include, for example, a symbol for frame synchronization, frequency synchronization and time synchronization, a symbol for notifying of frequency/time resources to be used by each data symbol group described in the fifth exemplary embodiment, information related to a modulating method for generating a data symbol group, and information related to an error correction method for generating a data symbol group (information related to a code, information related to a code length, information related to a coding rate, and the like).

However, control information symbols are not necessarily arranged on all of data symbol group #1 (3401), data symbol group #2 (3402), data symbol group #3 (3403), data symbol group #4 (3404), data symbol group #5 (3405), data symbol group #6 (3406), data symbol group #7 (3407), data symbol group #8 (3408), data symbol group #9 (3509), data symbol group #10 (3510), data symbol group #11 (3511), data symbol group #12 (3512), and data symbol group #13 (3513) in the frequency direction. This point will be described with reference to FIG. 53.

FIG. 53 illustrates an example of arrangement of control information symbols at time t1 to time t3 in FIG. 54. In a case of FIG. 54, data symbol groups 5301, 5302 and 5303 each include any of data symbol group #1 (3401), data symbol group #2 (3402), data symbol group #3 (3403), data symbol group #4 (3404), data symbol group #5 (3405), data symbol group #6 (3406), data symbol group #7 (3407), data symbol group #8 (3408), data symbol group #9 (3509), data symbol group #10 (3510), data symbol group #11 (3511), data symbol group #12 (3512), and data symbol group #13 (3513).

FIG. 53 illustrates control information symbols 5304 and 5305, and the control information symbols (for example, TMCC (Transmission Multiplexing Configuration Control)) are arranged in a frequency direction. Control information symbol 5304 is arranged on a specific carrier as illustrated in FIG. 53. Moreover, control information symbol 5305 is arranged on a specific carrier (subcarrier) (frequency) as illustrated in FIG. 53 (note that this specific carrier may include or may not include symbols other than the control information symbols).

When there are, for example, carrier #1 to carrier #100 in a case where frequency division is performed as in FIG. 54 to arrange control information symbols in a frequency/time area in which a data symbol group is arranged, the control information symbols may be arranged on specific carriers such as carrier #5, carrier #25, carrier #40, carrier #55, carrier #70 and carrier #85, or the control information symbols may be arranged according to arrangement of data symbol groups.

Next, an advantage in a case of the frame configuration in FIG. 54 will be described.

In a case of the frame configuration in FIG. 36, the receiving apparatus needs to obtain first preamble 201, second preamble 202, first preamble 501 and second preamble 502, in order to demodulate/decode data symbol group #1 (3401), data symbol group #2 (3402), data symbol group #3 (3403), data symbol group #4 (3404), data symbol group #5 (3405), data symbol group #6 (3406), data symbol group #7 (3407), data symbol group #8 (3408), data symbol group #9 (3509), data symbol group #10 (3510), data symbol group #11 (3511), data symbol group #12 (3512), and data symbol group #13 (3513) and to obtain information. For this reason, the receiving apparatus needs to obtain a modulated signal of a frequency band for receiving first preamble 201, second preamble 202, first preamble 501 and second preamble 502.

In such a circumstance, when there is a terminal which needs only data symbol group #2, a frame configuration for enabling demodulation/decoding of data symbol group #2 only with a frequency band occupied by data symbol group #2 is desired in order to enable flexible terminal design, and in a case of the frame configuration in FIG. 54, it is possible to realize this frame configuration.

When a frame is configured as in FIG. 54, the control information symbols (for example, TMCC (Transmission Multiplexing Configuration Control)) are arranged on a data symbol group in the frequency direction as illustrated in FIG. 53. For this reason, the receiving apparatus can demodulate/decode data symbol group #2 by obtaining modulated signals of the frequency bands around data symbol group #2. Hence, flexible terminal design becomes possible.

As in the above-described example, when a data symbol group is arranged by using frequency division, control information symbols are arranged in the frequency direction, and thus it is possible to obtain an effect of enabling flexible terminal design. Note that the control information symbols related to a data symbol group arranged by using time (temporal) division are contained in the first preamble and the second preamble as illustrated in FIGS. 48, 50, 51, 52 and 54.

Note that control information related to a data symbol group subjected to frequency division may be contained in the first preamble and the second preamble, or control information related to a data symbol group subjected to time (temporal) division may be contained in control information symbols (4904, 4905, 5304 and 5305) illustrated in FIGS. 49 and 53.

Seventh Exemplary Embodiment

The case where phase change is performed on a modulated signal is described in the first exemplary embodiment to the sixth exemplary embodiment (the first exemplary embodiment in particular). In the present exemplary embodiment, a method for performing phase change on a data symbol group subjected to frequency division will be described in particular.

The first exemplary embodiment describes the phase change that is performed on both of baseband signal s1(t) (s1(i)) and baseband signal s2(t) (s2(i)) or one of baseband signal s1(t) (s1(i)) and baseband signal s2(t) (s2(i)). As features of the present method, phase change is not performed on, for example, pilot symbols (a reference symbol, a unique word and a postamble), a first preamble, a second preamble and control information symbols other than symbols for transmitting baseband signal s1(t) and baseband signal s2(t) in a transmission frame.

Then, there are the following cases in a method for performing phase change on a data symbol group subjected to frequency division, which includes "performing phase change on both of baseband signal s1(t) (s1(i)) and baseband signal s2(t) (s2(i)) or one of baseband signal s1(t) (s1(i)) and baseband signal s2(t) (s2(i))."

First Case:

A first case will be described with reference to FIG. 55. In FIG. 55, a vertical axis indicates time, and a horizontal axis indicates a frequency. Part (A) of FIG. 55 illustrates a frame configuration of modulated signal $z_1$(t) ($z_1$(i)) in the first exemplary embodiment. Part (B) of FIG. 55 illustrates a frame configuration of modulated signal z2(t) (z2(i)) in the first exemplary embodiment. A symbol of modulated signal z1(t) (z1(i)) and a symbol of modulated signal z2(t) (z2(i)) of the same time and the same frequency (the same carrier number) are transmitted from different antennas.

In FIG. 55, symbols described as "P" are pilot symbols, and as described above, phase change is not performed on the pilot symbols. In (A) and (B) of FIG. 55, symbols other than the symbols described as "P" are symbols (data symbols) for transmitting data. Note that in (A) and (B) of FIG. 55, a frame is configured with the data symbols and the pilot symbols, but this configuration is only an example, and as described above, symbols such as control information symbols may be contained. In this case, phase change is not performed on the control information symbols, for example.

Part (A) of FIG. 55 illustrates area 5501 on which data symbols belonging to data symbol group #1 are arranged, and area 5502 on which data symbols belonging to data symbol group #2 are arranged. Then, (B) of FIG. 55 illustrates area 5503 on which data symbols belonging to data symbol group #1 are arranged, and area 5504 on which data symbols belonging to data symbol group #2 are arranged. As a result, in the examples in FIG. 55, the data symbol groups are subjected to frequency division and are arranged.

In the data symbol groups in FIG. 55, there are 7 cycles of phase change, and any phase change of 7 types of "phase change $0, phase change $1, phase change $2, phase change $3, phase change $4, phase change $5 and phase change $6" is performed.

In symbols of data symbol group #1 in area 5501 in (A) of FIG. 55, there is, for example, a symbol described as "#0 $0." In this case, "#0" means a "0th symbol" of data symbol group #1. Then, "$0" means performing phase change of "phase change $0."

Moreover, there is a symbol described as "#1 $1." In this case, "#1" means a "1st symbol" of data symbol group #1. Then, "$1" means performing phase change of "phase change $1."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 5502 in (A) of FIG. 55, there is, for example, a symbol described as "%0 $0." In this case, "%0" means a "0th symbol" of data symbol group #2. Then, "$0" means performing phase change of "phase change $0."

Moreover, there is a symbol described as "%1 $1." In this case, "%1" means a "1st symbol" of data symbol group #2. Then, "$1" means performing phase change of "phase change $1."

Hence, there are symbols described as "%X $Y" (X is an integer equal to or more than 0, and Y is an integer equal to or more than 0 and equal to or less than 6). In this case, "%X" means an "Xth symbol" of data symbol group #2. Then, "$Y" means performing phase change of "phase change $Y."

In symbols of data symbol group #1 in area 5503 in (B) of FIG. 55, there is, for example, a symbol described as "#0 $0." In this case, "#0" means a "0th symbol" of data symbol group #1. Then, "$0" means performing phase change of "phase change $0."

Moreover, there is a symbol described as "#1 $1." In this case, "#1" means a "1st symbol" of data symbol group #1. Then, "$1" means performing phase change of "phase change $1."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 5504 in (B) of FIG. 55, there is, for example, a symbol described as "%0 $0." In this case, "%0" means a "0th symbol" of data symbol group #2. Then, "$0" means performing phase change of "phase change $0."

Moreover, there is a symbol described as "%1 $1." In this case, "%1" means a "1st symbol" of data symbol group #2. Then, "$1" means performing phase change of "phase change $1."

Hence, there are symbols described as "%X $Y" (X is an integer equal to or more than 0, and Y is an integer equal to or more than 0 and equal to or less than 6). In this case, "%X" means an "Xth symbol" of data symbol group #2. Then, "$Y" means performing phase change of "phase change $Y."

In this case, 7 cycles of phase change are performed in a data symbol of modulated signal $z_1$. For example, "phase change of (2×0×π)/14 radians is performed as phase change $0," "phase change of (2×1×π)/14 radians is performed as phase change $1," "phase change of (2×2×π)/14 radians is performed as phase change $2," "phase change of (2×3×π)/14 radians is performed as phase change $3," "phase change of (2×4×π)/14 radians is performed as phase change $4," "phase change of (2×5×π)/14 radians is performed as phase change $5," and "phase change of (2×6×π)/14 radians is performed as phase change $6" (however, a phase change value is not limited to these values).

Then, 7 cycles of phase change are performed in a data symbol of modulated signal z2. For example, "phase change of −(2×0×π)/14 radians is performed as phase change $0," "phase change of −(2×1×π)/14 radians is performed as phase change $1," "phase change of −(2×2×π)/14 radians is performed as phase change $2," "phase change of −(2×3×π)/14 radians is performed as phase change $3," "phase change of −(2×4×π)/14 radians is performed as phase change $4," "phase change of −(2×5×π)/14 radians is performed as phase change $5," and "phase change of −(2×6×π)/14 radians is performed as phase change $6" (however, a phase change value is not limited to these values).

(Note that as described above, phase change may be performed on modulated signal z1, and may not be performed on modulated signal z2. Moreover, phase change may not be performed on modulated signal z1, and phase change may be performed on modulated signal z2).

Features of the first case are such that "7 cycles of phase change are performed in data symbol group #1 together with data symbol group #2" (that is, 7 cycles of phase change are performed in data symbols of an entire frame, regardless of a belonging data symbol group).

Second Case:

A second case will be described with reference to FIG. 56. In FIG. 56, a vertical axis indicates time, and a horizontal axis indicates a frequency. Part (B) of FIG. 56 illustrates a frame configuration of modulated signal z1(t) (z1(i)) in the first exemplary embodiment. Part (B) of FIG. 56 illustrates a frame configuration of modulated signal z2(t) (z2(i)) in the first exemplary embodiment. A symbol of modulated signal z1(t) (z1(i)) and a symbol of modulated signal z2(t) (z2(i)) of the same time and the same frequency (the same carrier number) are transmitted from different antennas.

In FIG. 56, symbols described as "P" are pilot symbols, and as described above, phase change is not performed on the pilot symbols. In (A) and (B) of FIGS. 56, symbols other than the symbols described as "P" are symbols (data symbols) for transmitting data. Note that in (A) and (B) of FIG. 56, a frame is configured with the data symbols and the pilot symbols, but this configuration is only an example, and as disclosed above, symbols such as control information symbols may be contained. In this case, phase change is not performed on the control information symbols, for example.

Part (A) of FIG. 56 illustrates area 5501 on which data symbols belonging to data symbol group #1 are arranged, and area 5502 on which data symbols belonging to data symbol group #2 are arranged. Then, (B) of FIG. 56 illustrates area 5503 on which data symbols belonging to data symbol group #1 are arranged, and area 5504 on which data symbols belonging to data symbol group #2 are arranged. As a result, in the example in FIG. 56, the data symbol groups are subjected to frequency division and are arranged.

In data symbol group #1 in FIG. 56, there are 7 cycles of phase change, and any phase change of 7 types of "phase change $0, phase change $1, phase change $2, phase change $3, phase change $4, phase change $5 and phase change $6" is performed. Then, in data symbol group #2 in FIG. 56, there are 5 cycles of phase change, and any phase change of 5 types of "phase change ♭0, phase change ♭1, phase change ♭2, phase change ♭3 and phase change ♭4" is performed.

In symbols of data symbol group #1 in area 5501 in (A) of FIG. 56, there is, for example, a symbol described as "#0 $0." In this case, "#0" means a "0th symbol" of data symbol group #1. Then, "$0" means performing phase change of "phase change $0."

Moreover, there is a symbol described as "#1 $1." In this case, "#1" means a "1st symbol" of data symbol group #1. Then, "$1" means performing phase change of "phase change $1."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 5502 in (A) of FIG. 56, there is, for example, a symbol described as "%0 ♭0." In this case, "%0" means a "0th symbol" of data symbol group #2. Then, "♭0" means performing phase change of "phase change ♭0."

Moreover, there is a symbol described as "%1 ♭1." In this case, "%1" means a "1st symbol" of data symbol group #2. Then, "♭1" means performing phase change of "phase change ♭i".

Hence, there are symbols described as "% X ♭Y" (X is an integer equal to or more than 0, and Y is an integer equal to or more than 0 and equal to or less than 4). In this case, "% X" means an "Xth symbol" of data symbol group #2. Then, "♭Y" means performing phase change of "phase change ♭Y."

In symbols of data symbol group #1 in area 5503 in (B) of FIG. 56, there is, for example, a symbol described as "#0 $0." In this case, "#0" means a "0th symbol" of data symbol group #1. Then, "$0" means performing phase change of "phase change $0."

Moreover, there is a symbol described as "#1 $1." In this case, "#1" means a "1st symbol" of data symbol group #1. Then, "$1" means performing phase change of "phase change $1."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 5504 in (B) of FIG. 56, there is, for example, a symbol described as "%0 ♭0." In this case, "%0" means a "0th symbol" of data symbol group #2. Then, "♭0" means performing phase change of "phase change ♭0."

Moreover, there is a symbol described as "%1 ♭1." In this case, "%1" means a "1st symbol" of data symbol group #2. Then, "♭1" means performing phase change of "phase change ♭i".

Hence, there are symbols described as "% X ♭Y" (X is an integer equal to or more than 0, and Y is an integer equal to or more than 0 and equal to or less than 4). In this case, "% X" means an "Xth symbol" of data symbol group #2. Then, "♭Y" means performing phase change of "phase change ♭Y."

In this case, 7 cycles of phase change are performed in data symbol group #1 of modulated signal $z_1$. For example, "phase change of $(2 \times 0 \times \pi)/14$ radians is performed as phase change $0," "phase change of $(2 \times 1 \times \pi)/14$ radians is performed as phase change $1," "phase change of $(2 \times 2 \times \pi)/14$ radians is performed as phase change $2," "phase change of $(2 \times 3 \times \pi)/14$ radians is performed as phase change $3," "phase change of $(2 \times 4 \times \pi)/14$ radians is performed as phase change $4," "phase change of $(2 \times 5 \times \pi)/14$ radians is performed as phase change $5," and "phase change of $(2 \times 6 \times \pi)/14$ radians is performed as phase change $6" (however, a phase change value is not limited to these values).

Then, 7 cycles of phase change are performed in data symbol group #1 of modulated signal z2. For example, "phase change of $-(2 \times 0 \times \pi)/14$ radians is performed as phase change $0," "phase change of $-(2 \times 1 \times \pi)/14$ radians is performed as phase change $1," "phase change of $-(2 \times 2 \times \pi)/14$ radians is performed as phase change $2," "phase change of $-(2 \times 3 \times \pi)/14$ radians is performed as phase change $3," "phase change of $-(2 \times 4 \times \pi)/14$ radians is performed as phase change $4," "phase change of $-(2 \times 5 \times \pi)/14$ radians is performed as phase change $5," and "phase change of $-(2 \times 6 \times \pi)/14$ radians is performed as phase change $6" (however, a phase change value is not limited to these values).

(Note that as described above, phase change may be performed in data symbol group #1 of modulated signal $z_1$, and may not be performed in data symbol group #1 of modulated signal z2. Moreover, phase change may not be performed in data symbol group #1 of modulated signal $z_1$, and phase change may be performed in data symbol group #1 of modulated signal z2.)

Then, 5 cycles of phase change are performed in data symbol group #2 of modulated signal $z_1$. For example, "phase change of $(2 \times 0 \times \pi)/10$ radians is performed as phase change ♭0," "phase change of $(2 \times 1 \times \pi)/10$ radians is performed as phase change ♭1," "phase change of (2×2×π)/10 radians is performed as phase change ♭2," "phase change of (2×3×π)/10 radians is performed as phase change ♭3," and "phase change of (2×4×π)/10 radians is performed as phase change ♭4" (however, a phase change value is not limited to these values).

Then, 5 cycles of phase change are performed in data symbol group #2 of modulated signal z2. For example, "phase change of −(2×0×π)/10 radians is performed as phase change ♭0," "phase change of −(2×1×π)/10 radians is performed as phase change ♭1," "phase change of −(2×2×π)/10 radians is performed as phase change ♭2," "phase change of −(2×3×π)/10 radians is performed as phase change ♭3," and "phase change of −(2×4×π)/10 radians is performed as phase change ♭4" (however, a phase change value is not limited to these values).

(Note that as described above, phase change may be performed in data symbol group #2 of modulated signal z1, and may not be performed in data symbol group #2 of modulated signal z2. Moreover, phase change may not be performed in data symbol group #2 of modulated signal z1, and phase change may be performed in data symbol group #2 of modulated signal z2).

Features of the second case are such that "7 cycles of phase change are performed in data symbol group #1, and also 5 cycles of phase change are performed in data symbol group #2" (that is, unique phase change is performed in each data symbol group. However, the same phase change may be performed in different data symbols).

Figure 57:
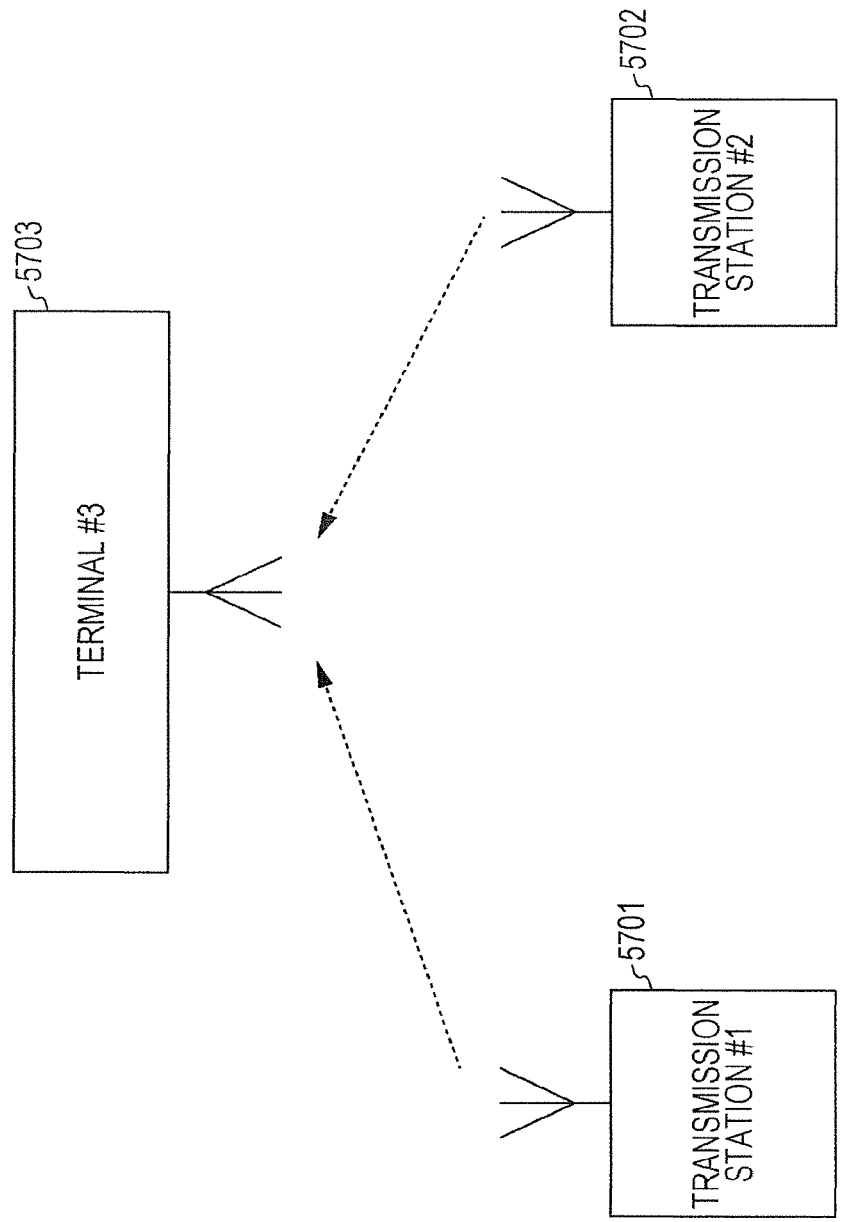
FIG. 57 is a view illustrating an example of a relationship between a transmission station and a terminal.

Third Case:

FIG. 57 illustrates a relationship between a transmission station and a terminal in a case of a third case. Terminal #3 (5703) can receive modulated signal #1 to be transmitted by transmission station #1 (5701), and modulated signal #2 to be transmitted by transmission station #2 (5702). For example, in frequency band A, the same data is transmitted in modulated signal #1 and modulated signal #2. That is, when a baseband signal mapped on a data sequence by a certain modulating method is s1(t, f) (where t represents time and f represents a frequency.), transmission station #1 and transmission station #2 both transmit modulated signals based on s1 (t, f).

Hence, terminal #3 (5703) receives both of the modulated signal transmitted by transmission station #1 and the modulated signal transmitted by transmission station #2 in frequency band A, and demodulates/decodes data.

Figure 58:
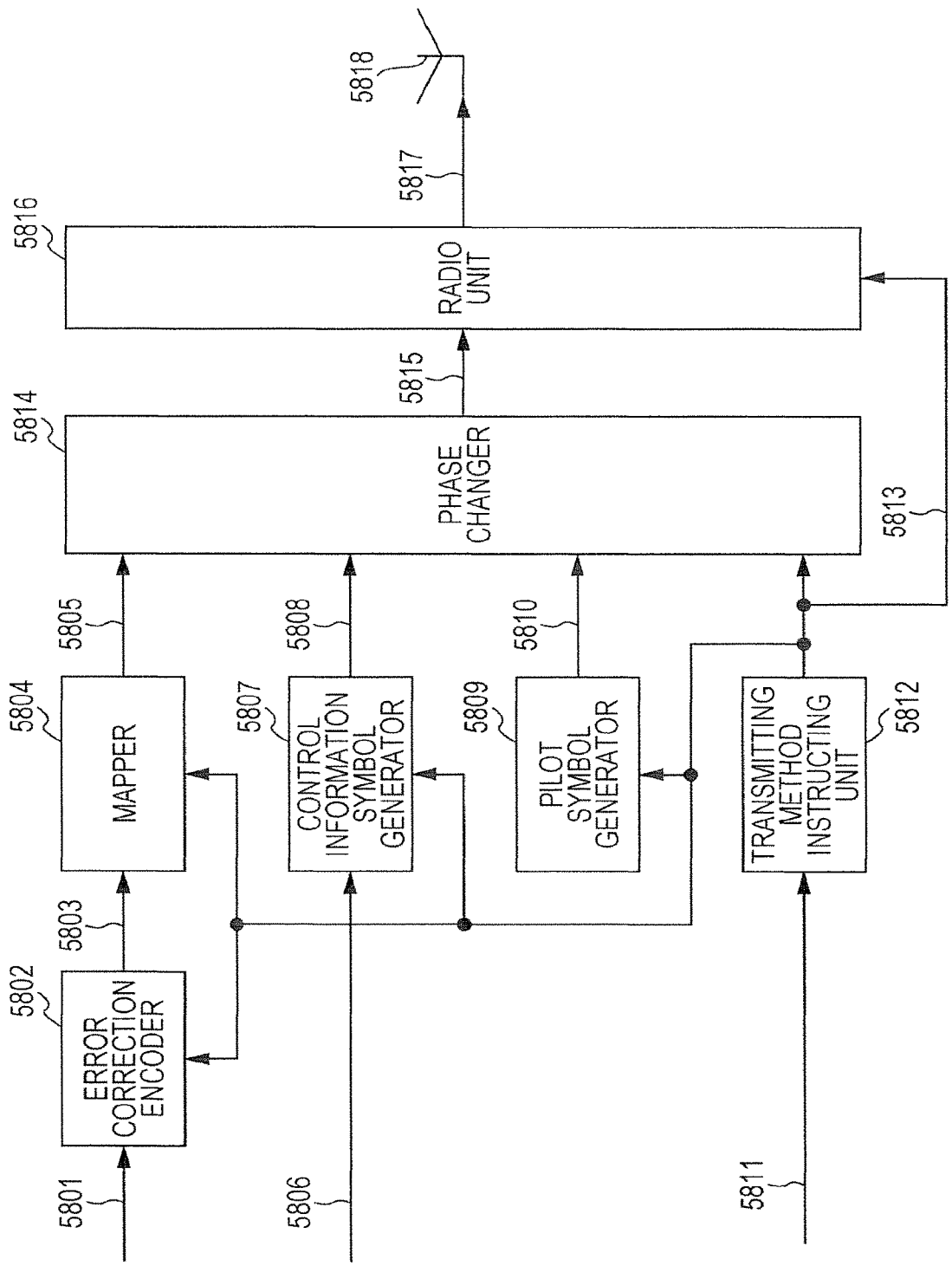
FIG. 58 is a view illustrating an example of a configuration of a transmitting apparatus.

FIG. 58 is an example of a configuration of transmission station #1 and transmission station #2. A case where transmission station #1 and transmission station #2 both transmit modulated signals based on s1 (t, f) as in frequency band A as described above will be discussed.

Error correction encoder 5802 receives an input of information 5801 and signal 5813 related to a transmitting method. Error correction encoder 5802 performs error correction coding based on information related to an error correction coding method and contained in signal 5813 related to the transmitting method. Error correction encoder 5802 outputs data 5803.

Mapper 5804 receives an input of data 5803 and signal 5813 related to the transmitting method. Mapper 5804 performs mapping based on information related to the modulating method and contained in signal 5813 related to the transmitting method. Mapper 5804 outputs baseband signal 5805 (s1(t, f)) (note that data interleaving (data order rearrangement) may be performed between error correction encoder 5802 and mapper 5804).

Control information symbol generator 5807 receives an input of control information 5806, and information 5813 related to the transmitting method. Control information symbol generator 5807 generates a control information symbol based on information related to the transmitting method and contained in signal 5813 related to the transmitting method. Control information symbol generator 5807 outputs baseband signal 5808 of the control information symbol.

Pilot symbol generator 5809 receives an input of signal 5813 related to the transmitting method. Pilot symbol generator 5809 generates a pilot symbol based on signal 5813. Pilot symbol generator 5809 outputs baseband signal 5810 of a pilot symbol.

Transmitting method instructing unit 5812 receives an input of transmitting method instruction information 5811. Transmitting method instructing unit 5812 generates and outputs signal 5813 related to the transmitting method.

Phase changer 5814 receives an input of baseband signal 5805 (s1(t, f)), baseband signal 5808 of the control information symbol, baseband signal 5810 of the pilot symbol, and signal 5813 related to the transmitting method. Phase changer 5814 performs phase change based on information of a frame configuration contained in signal 5813 related to the transmitting method, and based on information related to phase change. Phase changer 5814 outputs baseband signal 5815 based on a frame configuration. Note that details will be described below with reference to FIGS. 59 and 60.

Radio unit 5816 receives an input of baseband signal 5815 based on the frame configuration, and signal 5813 related to the transmitting method. Radio unit 5816 performs processing such as interleaving, inverse Fourier transform and frequency conversion based on signal 5813 related to the transmitting method. Radio unit 5816 generates and outputs transmission signal 5817. Transmission signal 5817 is output as a radio wave from antenna 5818.

Figure 59:
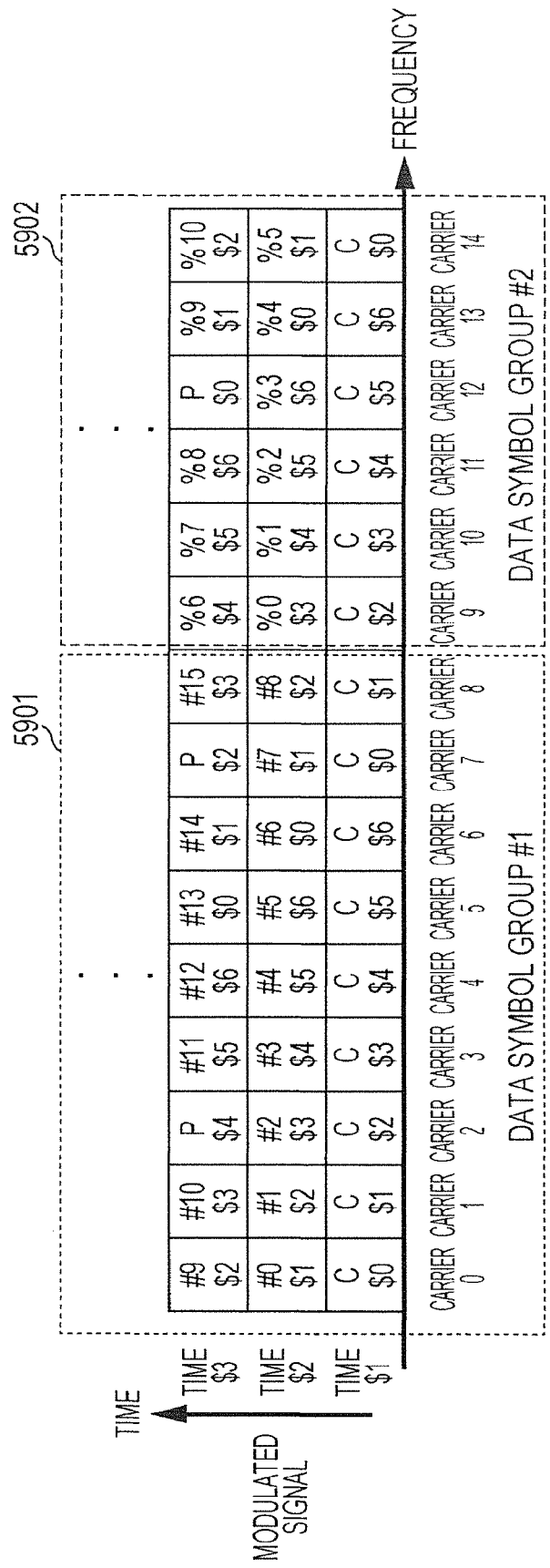
FIG. 59 is a view illustrating an example of the symbol arranging method.

FIG. 59 illustrates an example of a frame configuration of a modulated signal (transmission signal) to be transmitted by the transmission station in FIG. 58. In FIG. 59, a vertical axis indicates time, and a horizontal axis indicates a frequency. In FIG. 59, symbols described as "P" are pilot symbols, and as features of the third case, phase change is performed on the pilot symbols. Moreover, symbols described as "C" are control information symbols, and as features of the third case, phase change is performed on the control information symbols. Note that FIG. 59 is an example in a case where control information symbols are arranged in a time axis direction.

In a frame in FIG. 59, there are 7 cycles of phase change, and any phase change of 7 types of "phase change $0, phase change $1, phase change $2, phase change $3, phase change $4, phase change $5 and phase change $6" is performed.

In symbols of data symbol group #1 in area 5901 in FIG. 59, there is, for example, a symbol described as "#0 $1." In this case, "#0" means a "0th symbol" of data symbol group #1. Then, "$1" means performing phase change of "phase change $1."

Moreover, there is a symbol described as "#1 $2." In this case, "#1" means a "1st symbol" of data symbol group #1. Then, "$2" means performing phase change of "phase change $2."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 5902 in FIG. 59, there is, for example, a symbol described as "%0 $3." In this case, "%0" means a "0th symbol" of data symbol group #2. Then, "$3" means performing phase change of "phase change $3."

Moreover, there is a symbol described as "%1 $4." In this case, "%1" means a "1st symbol" of data symbol group #2. Then, "$4" means performing phase change of "phase change $4."

Hence, there are symbols described as "% X $Y" (X is an integer equal to or more than 0, and Y is an integer equal to or more than 0 and equal to or less than 6). In this case, "% X" means an "Xth symbol" of data symbol group #2. Then, "$Y" means performing phase change of "phase change $Y."

Moreover, in FIG. 59, there is a symbol described as "C $0." In this case, "C" means a control information symbol, and "$0" means performing phase change of "phase change $0."

Hence, there are symbols described as "C $Y" (Y is an integer equal to or more than 0 and equal to or less than 6). In this case, "C" means a control information symbol, and "$Y" means performing phase change of "phase change $Y."

Moreover, in FIG. 59, there are symbols described as "P $0," for example. In this case, "P" means a pilot symbol, and "$0" means performing phase change of "phase change $0."

Hence, there are symbols described as "P $Y" (Y is an integer equal to or more than 0 and equal to or less than 6). In this case, "P" means a pilot symbol, and "$Y" means performing phase change of "phase change $Y."

In this case, 7 cycles of phase change are performed in a data symbol of a modulated signal. For example, "phase change of $(2\times0\times\pi)/7$ radians is performed as phase change $0$," "phase change of $(2\times1\times\pi)/7$ radians is performed as phase change $1$," "phase change of $(2\times2\times\pi)/7$ radians is performed as phase change $2$," "phase change of $(2\times3\times\pi)/7$ radians is performed as phase change $3$," "phase change of $(2\times4\times\pi)/7$ radians is performed as phase change $4$," "phase change of $(2\times5\times\pi)/7$ radians is performed as phase change $5$," and "phase change of $(2\times6\times\pi)/7$ radians is performed as phase change $6$" (however, a phase change value is not limited to these values).

Note that in modulated signal #1 to be transmitted by transmission station #1 (5701) and modulated signal #2 to be transmitted by transmission station #2 (5702) in FIG. 57, phase change may be performed on both of modulated signal #1 and modulated signal #2 (however, different types of phase change may be performed on modulated signal #1 and modulated signal #2 (phase change values may be different, and a cycle of the phase change of modulated signal #1 and a cycle of the phase change of modulated signal #2 may be different). Moreover, phase change may be performed on modulated signal #1, and may not be performed on modulated signal #2. Then, phase change may not be performed on modulated signal #1, and phase change may be performed on modulated signal #2).

Figure 60:
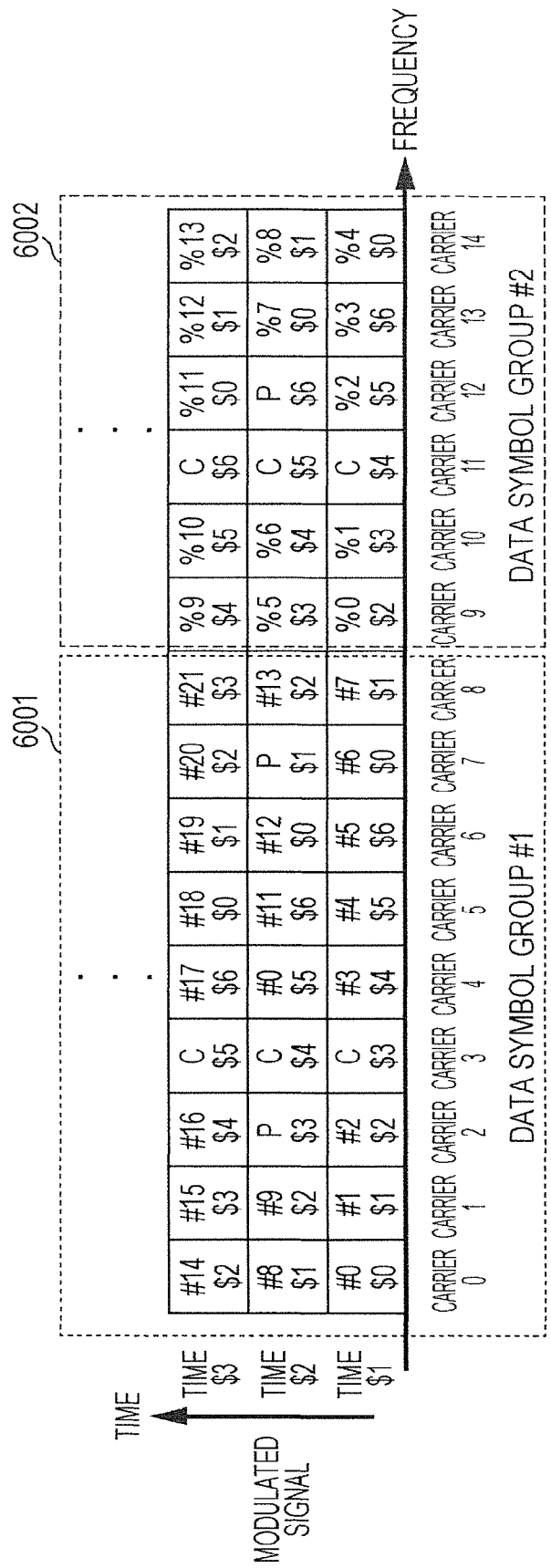
FIG. 60 is a view illustrating an example of the symbol arranging method.

FIG. 60 illustrates an example of a frame configuration of a modulated signal (transmission signal) to be transmitted by the transmission station in FIG. 58. In FIG. 60, a vertical axis indicates time, and a horizontal axis indicates a frequency. In FIG. 60, symbols described as "P" are pilot symbols, and as features of the third case, phase change is performed on the pilot symbols. Moreover, symbols described as "C" are control information symbols, and as features of the third case, phase change is performed on the control information symbols. Note that FIG. 60 is an example in a case where control information symbols are arranged in a frequency axis direction.

In a frame in FIG. 60, there are 7 cycles of phase change, and any phase change of 7 types of "phase change $0, phase change $1, phase change $2, phase change $3, phase change $4, phase change $5 and phase change $6" is performed.

In symbols of data symbol group #1 in area 6001 in FIG. 60, there is, for example, a symbol described as "#0 $0." In this case, "#0" means a "0th symbol" of data symbol group #1. Then, "$0" means performing phase change of "phase change $0."

Moreover, there is a symbol described as "#1 $1." In this case, "#1" means a "1st symbol" of data symbol group #1. Then, "$1" means performing phase change of "phase change $1."

Hence, there are symbols described as "#X $Y" (X is an integer equal to or more than 0, and Y is an integer equal to or more than 0 and equal to or less than 6). In this case, "#X" means an "Xth symbol" of data symbol group #1. Then, "$Y" means performing phase change of "phase change $Y."

In symbols of data symbol group #2 in area 6002 in FIG. 60, there is, for example, a symbol described as "%0 $2." In this case, "%0" means a "0th symbol" of data symbol group #2. Then, "$2" means performing phase change of "phase change $2."

Moreover, there is a symbol described as "%1 $3." In this case, "%1" means a "1st symbol" of data symbol group #2. Then, "$3" means performing phase change of "phase change $3."

Hence, there are symbols described as "% X $Y" (X is an integer equal to or more than 0, and Y is an integer equal to or more than 0 and equal to or less than 6). In this case, "% X" means an "Xth symbol" of data symbol group #2. Then, "$Y" means performing phase change of "phase change $Y."

Moreover, in FIG. 60, there is a symbol described as "C $3," for example. In this case, "C" means a control information symbol, and "$3" means performing phase change of "phase change $3."

Hence, there are symbols described as "C $Y" (Y is an integer equal to or more than 0 and equal to or less than 6). In this case, "C" means a control information symbol, and "$Y" means performing phase change of "phase change $Y."

Moreover, in FIG. 59, there is a symbol described as "P $3," for example. In this case, "P" means a pilot symbol, and "$3" means performing phase change of "phase change $3."

Hence, there are symbols described as "P $Y" (Y is an integer equal to or more than 0 and equal to or less than 6). In this case, "P" means a pilot symbol, and "$Y" means performing phase change of "phase change $Y."

In this case, 7 cycles of phase change are performed in a data symbol of a modulated signal. For example, "phase change of $(2\times0\times\pi)/7$ radians is performed as phase change $0$," "phase change of $(2\times1\times\pi)/7$ radians is performed as phase change $1$," "phase change of $(2\times2\times\pi)/7$ radians is performed as phase change $2$," "phase change of $(2\times3\times\pi)/7$ radians is performed as phase change $3$," "phase change of $(2\times4\times\pi)/7$ radians is performed as phase change $4$," "phase change of $(2\times5\times\pi)/7$ radians is performed as phase change $5$," and "phase change of $(2\times6\times\pi)/7$ radians is performed as phase change $6$" (however, a phase change value is not limited to these values).

Note that in modulated signal #1 to be transmitted by transmission station #1 (5701) and modulated signal #2 to be transmitted by transmission station #2 (5702) in FIG. 57, phase change may be performed on both of modulated signal #1 and modulated signal #2 (however, different types of phase change may be performed on modulated signal #1 and modulated signal #2 (phase change values may be different, and a cycle of the phase change of modulated signal #1 and a cycle of the phase change of modulated signal #2 may be different). Moreover, phase change may be performed on modulated signal #1, and may not be performed on modulated signal #1. Then, phase change may not be performed on modulated signal #1, and phase change may be performed on modulated signal #1).

FIGS. 59 and 60 each illustrate the 7 cycles of phase change, as an example. However, a value of the cycle is not limited to this example and may be another value. Moreover, the cycle of phase change may be formed in the frequency axis direction or in the time direction.

Moreover, when phase change is performed for each symbol in FIGS. 59 and 60, there may be no cycle of phase change.

Note that the configuration of transmission stations #1 and #2 in FIG. 57 is not limited to the configuration in FIG. 58. Another configuration example will be described with reference to FIG. 61.

Figure 61:
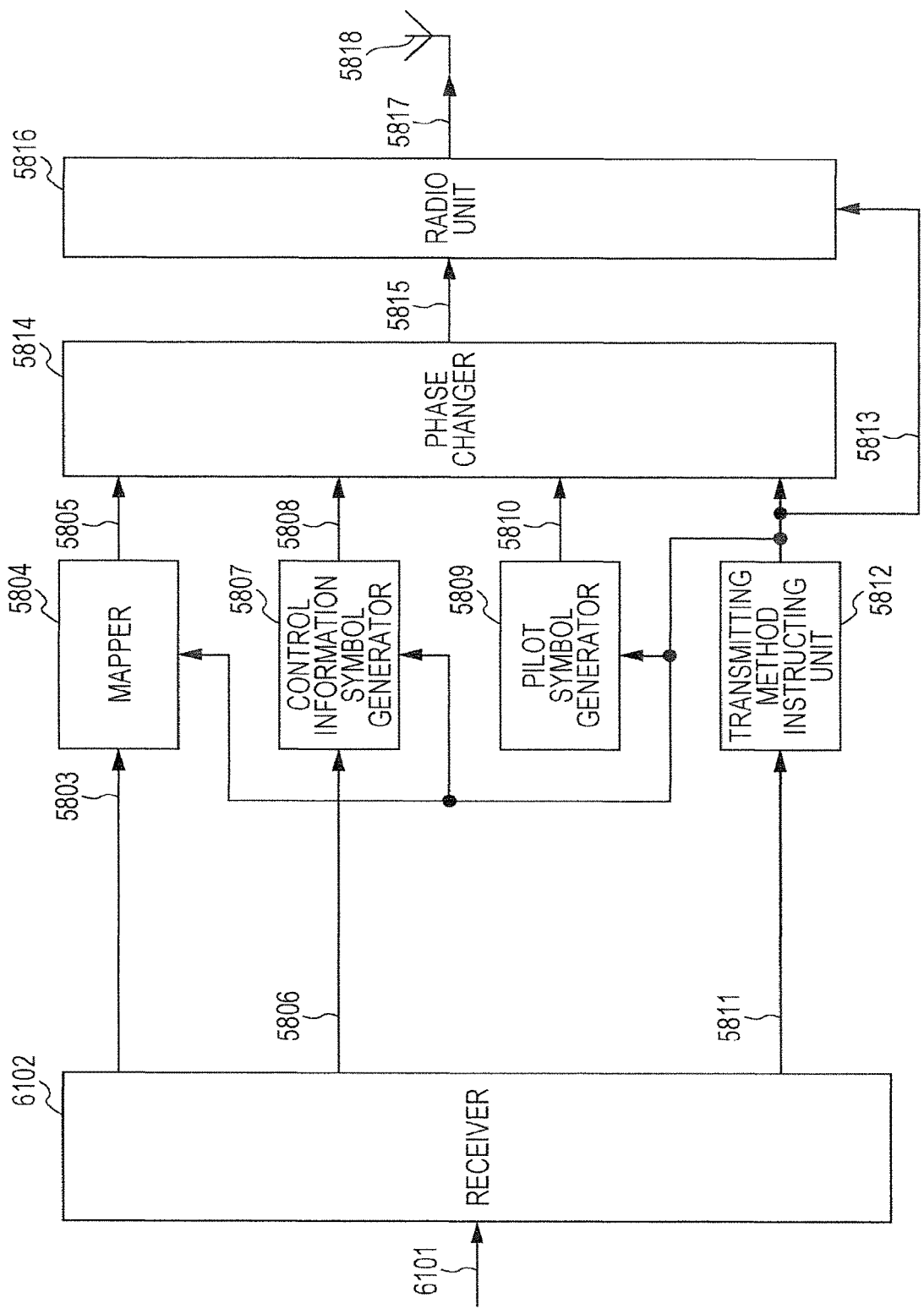
FIG. 61 is a view illustrating an example of a configuration of a transmitting apparatus.

Elements operating in the same way as in FIG. 58 are assigned the same reference numerals in FIG. 61, and will not be described. Features of FIG. 61 are such that another apparatus transmits data 5803, control information 5806 and transmitting method instruction information 5811, and receiver 6102 in FIG. 61 performs demodulation/decoding to obtain data 5803, control information 5806 and transmitting method instruction information 5811. Hence, receiver 6102 receives a modulated signal transmitted by another apparatus, receives an input of received signal 6101, and demodulates and decodes received signal 6101 to output data 5803, control information 5806, and transmitting method instruction information 5811.

Features of the third case are such that "7 cycles of phase change are performed in data symbol group #1 together with data symbol group #2 and symbols other than data symbols (the symbols other than data symbols are control information symbols and pilot symbols in a case of FIGS. 59 and 60, but there may be symbols other than control information symbols and pilot symbols.)" (that is, 7 cycles of phase change are performed in symbols of an entire frame).

For example, the transmitting apparatus (transmission station) in FIG. 1 selects and carries out any of the above-described first case, second case and third case (as a matter of course, the transmitting apparatus in FIG. 1 performs the operations described with reference to FIGS. 58 and 61 when the transmitting apparatus selects the third case).

As described above, the transmitting apparatus can favorably obtain a diversity effect in each data symbol group by carrying out an appropriate phase change method in each transmitting method. For this reason, the receiving apparatus can obtain an effect of making it possible to obtain good data reception quality.

Note that as a matter of course, the transmitting apparatus (transmission station) may carry out any of the above-described first case, second case and third case alone.

Exemplary Embodiment A

Figure 63:
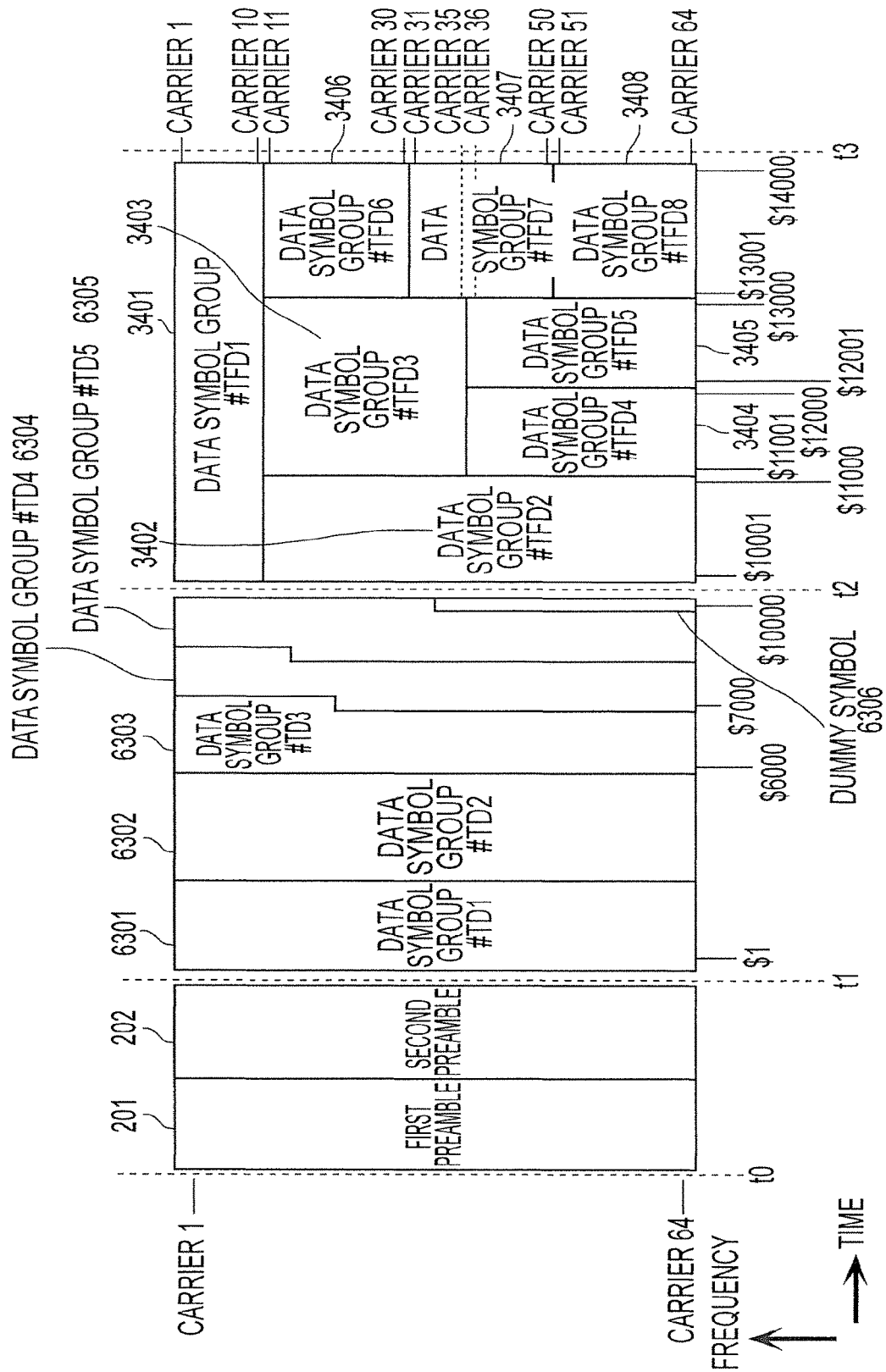
FIG. 63 is a view illustrating an example of a frame configuration.

FIG. 63 illustrates an example of a frame configuration when the horizontal axis indicates time and the vertical axis indicates frequency, and the same reference numerals are assigned to elements operating in the same way as those in FIGS. 2 and 34.

Preambles are transmitted in a period from time t0 to time t1, symbol groups subjected to time division (time division multiplexing (TDM)) are transmitted in a period from time t1 to time t2, and symbol groups subjected to time-frequency division multiplexing (TFDM) are transmitted in a period from time t2 to time t3.

In the case of TDM, the number of symbols (or slots) included in each data symbol group #TDX is the number of symbols (or slots) in which data corresponding to an integral multiple of an FEC block (having a block length of an error correction code (a code length of an error correction code)) is fitted.

For example, when the block length of an error correction code is 64800 bits and the number of bits for transmitting each symbol of a data symbol group is 4 (the number of bits for transmitting each symbol is 4 when the single-input single-output (SISO) method and 16QAM are used), the number of symbols necessary to transmit 64800 bits that indicate the block length of the error correction code is 16200 symbols. Accordingly, in such a case, the number of symbols of data symbol group #TDX is 16200×N (N is an integer greater than or equal to 1).

In another example, when the block length of an error correction code is 64800 bits and the number of bits for transmitting each symbol of a data symbol group is 6 (when the SISO method and 64QAM are used, the number of bits for transmitting each symbol is 6), the number of symbols necessary to transmit 64800 bits that indicate the block length of the error correction code is 10800 symbols. Accordingly, in such a case, the number of symbols of data symbol group #TDX is 10800×N (N is an integer greater than or equal to 1).

In yet another example, when the block length of an error correction code is 64800 bits, and the number of bits for transmitting each slot of a data symbol group is 8 (when the MIMO method is used, the modulation method for stream 1 is 16QAM, and the modulation method for stream 2 is 16QAM, the number of bits for transmitting each slot which includes one symbol of stream 1 and one symbol of stream 2 is 8), the number of slots necessary to transmit 64800 bits that indicate the block length of the error correction code is 8100. Accordingly, in such a case, the number of slots of data symbol group #TDX is 8100×N (N is an integer greater than or equal to 1).

Among symbol groups subjected to time division in a period from time t1 to time t2 in FIG. 63, data symbol group #TD1, data symbol group #TD2, data symbol group #TD3, data symbol group #TD4, and data symbol group #TD5 each satisfy that the number of symbols (slots) included in a data symbol group is the number of symbols (slots) in which data corresponding to an integral multiple of an FEC block (having a block length of an error correction code (a code length of an error correction code)) is fitted, as described above. The symbol groups are arranged in the time axis direction.

In FIG. 63, the number of carriers along the frequency axis is 64. Accordingly, carriers from carrier 1 to carrier 64 are present.

For example, with regard to data symbol group #TD1, the arrangement of data symbols starts from "time $1, carrier 1", and subsequently, data symbols are arranged at "time $1, carrier 2", "time $1, carrier 3", "time $1, carrier 4", . . . , "time $1, carrier 63", "time $1, carrier 64", "time $2, carrier 1", "time $2, carrier 2", "time $2, carrier 3", "time $2, carrier 4", . . . , "time $2, carrier 63", "time $2, carrier 64", "time $3, carrier 1", and so on.

With regard to data symbol group #TD3, the arrangement of data symbols starts from "time $6000, carrier 1", and subsequently data symbols are arranged at "time $6000, carrier 2", "time $6000, carrier 3", "time $6000, carrier 4", . . . , "time $6000, carrier 63", "time $6000, carrier 64", "time $6001, carrier 1", "time $6001, carrier 2", "time $6001, carrier 3", "time $6001, carrier 4", . . . , "time $6001, carrier 63", "time $6001, carrier 64", "time $6002, carrier 1", and so on, and the arrangement of symbols is completed when a symbol is arranged at "time $7000, carrier 20."

Then, with regard to data symbol group #TD4, the arrangement of data symbols starts from "time $7000, carrier 21."

Furthermore, data symbols in data symbol groups #TD4 and TD #5 are arranged in accordance with the same rule, and the last symbol of data symbol group #TD5 which is the last data symbol group is arranged at time $10000 at carrier 32.

Then, dummy symbols are arranged at carriers from carrier 33 to carrier 64 at time $10000. Accordingly, symbols at carrier 1 to carrier 64 are to be transmitted also at time $10000. Note that each of the dummy symbols has a certain value for in-phase component I and also a certain value for quadrature component Q.

For example, in-phase component I of a dummy symbol may be generated using a pseudo-random sequence which includes "0" and "1", and quadrature component Q of the dummy symbol may be 0. In this case, a pseudo-random sequence is initialized at a position of a first dummy symbol, and in-phase component I may be converted into one of the values+1 and −1, based on in-phase component I=2 (½−pseudo-random sequence).

Alternatively, quadrature component Q of a dummy symbol may be generated using a pseudo-random sequence which includes "0" and "1", and quadrature component I of the dummy symbol may be 0. In this case, a pseudo-random sequence is initialized at a position of a first dummy symbol, and quadrature component Q may be converted into one of the values+1 and −1, based on quadrature component Q=2 (½−pseudo-random sequence).

Furthermore, an in-phase component of a dummy symbol may be set to a real number other than zero, and a quadrature component of the dummy symbol may be set to a real number other than zero.

A method for generating a dummy symbol is not limited to the above. The description with regard to a dummy symbol here is also applicable to dummy symbols later described.

According to the above rule, dummy symbols are arranged in a time section (from time t1 to time t2 in FIG. 63) in which time division is performed.

The time-frequency division multiplexing (TFDM) method is to be described with reference to FIG. 63.

A period from time t2 to time t3 in FIG. 63 shows an example of a frame configuration in which time-frequency division multiplexing is performed.

At time $10001, data symbol group #TFD1 (3401) and data symbol #TFD2 (3402) are subjected to frequency division multiplexing, and data symbol group #TFD2 (3402), data symbol group #TFD3 (3403), and data symbol group #TFD6 (3406) are subjected to time division multiplexing at carrier 11. Accordingly, a period from time t2 to time t3 includes a portion on which frequency division is performed and a portion on which time division multiplexing is performed, and thus the method is named "time-frequency division multiplexing", here.

Data symbol group #TFD1 (3401) is present at time $10001 to time $14000, i is greater than or equal to 10001 and less than or equal to 14000, and data symbols are present at carrier 1 to carrier 10 at time i which satisfies the above.

Data symbol group #TFD2 (3402) is present at time $10001 to time $11000, i is greater than or equal to 10001 and less than or equal to 11000, and data symbols are present at carrier 11 to carrier 64 at time i which satisfies the above.

Data symbol group #TFD3 (3403) is present at time $11001 to time $13000, i is greater than or equal to 11001 and less than or equal to 13000, and data symbols are present at carrier 11 to carrier 35 at time i which satisfies the above.

Data symbol group #TFD4 (3404) is present at time $11001 to time $12000, i is greater than or equal to 11001 and less than or equal to 12000, and data symbols are present at carrier 36 to carrier 64 at time i which satisfies the above.

Data symbol group #TFD5 (3405) is present at time $12001 to time $13000, i is greater than or equal to 12001 and less than or equal to 13000, and data symbols are present at carrier 36 to carrier 64 at time i which satisfies the above.

Data symbol group #TFD6 (3406) is present at time $13001 to time $14000, i is greater than or equal to 13001 and less than or equal to 14000, and data symbols are present at carrier 11 to carrier 30 at time i which satisfies the above.

Data symbol group #TFD7 (3407) is present at time $13001 to time $14000, i is greater than or equal to 13001 and less than or equal to 14000, and data symbol are present at carrier 31 to carrier 50 at time i which satisfies the above.

Data symbol group #TFD8 (3408) is present at time $13001 to time $14000, i is greater than or equal to 13001 and less than or equal to 14000, and data symbols are present at carrier 51 to carrier 64 at time i which satisfies the above.

The time-frequency division multiplexing method has a feature that the carrier number of an occupied carrier is the same for a data symbol group in all the time sections in which data symbols of the data symbol group are present.

The number of symbols (or the number of slots) included in data symbol group #TFDX is U. U is an integer greater than or equal to 1.

First, "V (which is an integer greater than or equal to 1) which denotes the number of symbols (or the number of slots) in which data having an integral multiple of a block length of an error correction code (a code length of an error correction code) is fitted" is secured. Note that U−α+1≤V≤U is to be satisfied (a denotes the number of symbols (or the number of slots) necessary to transmit a block having a block length (a code length) of an error correction code (unit: bits), and is an integer greater than or equal to 1).

When U−V≠0, dummy symbols (or dummy slots) of U−V symbols (or U−V slots) are added. Thus, data symbol group #TFDX includes data symbols that are V symbols (or V slots) and dummy symbols that are U−V symbols (or U−V slots) (each dummy symbol has a certain value for in-phase component I, and also a certain value for quadrature component Q).

All the data symbol groups subjected to time-frequency division multiplexing each satisfy that "a data symbol group includes data symbols that are V symbols (or V slots) and dummy symbols that are U−V symbols (or U−V slots)".

Specifically, when data symbol groups subjected to time-frequency division multiplexing needs to have dummy symbols (or dummy slots), dummy symbols (dummy slots) are inserted in data symbol groups separately.

Figure 64:
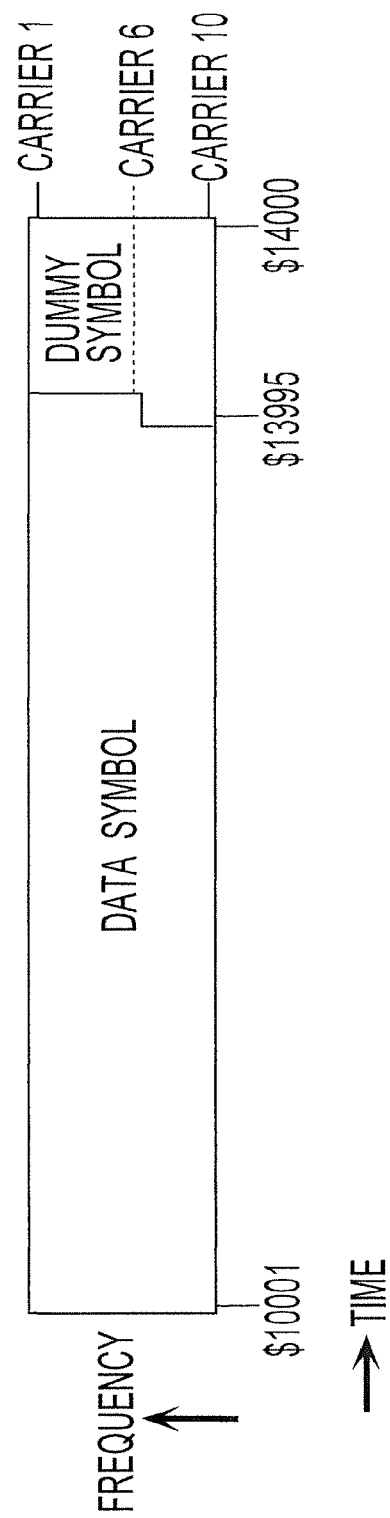
FIG. 64 is a view illustrating an example of inserted dummy symbols (dummy slots).

FIG. 64 illustrates an example of a state in which dummy symbols (or dummy slots) are inserted in, for example, data symbol group #TFD1 (3401) in FIG. 63.

In data symbol group #TFD1 (3401), data symbols are arranged preferentially from a position having a smaller time index. A rule that if data symbols are arranged at all the occupied carriers at a certain time, data symbols are arranged at carriers at a time subsequent to the certain time is adopted.

For example, with regard to data symbol group #TFD1 (3401), a data symbol is arranged at carrier 1 at time $10001, and thereafter data symbols are arranged at carrier 2 at time $10001, carrier 3 at time $10001, . . . , carrier 9 at time $10001, and carrier 10 at time $10001, as illustrated in FIG. 64. Then, moving on to time $10002, data symbols are arranged at carrier 1 at time $10002, carrier 2 at time $10002, and so on.

With regard to data symbol arrangement at time $13995, data symbols are arranged at carrier 1 at time $13995, carrier 2 at time $13995, carrier 3 at time $13995, carrier 4 at time $13995, carrier 5 at time $13995, and carrier 6 at time $13995. This completes arrangement of data symbols.

However, there are symbols as data symbol group #TFD1 (3401) at carrier 7, carrier 8, carrier 9, and carrier 10 at time $13995, carrier 1 to carrier 10 at time $13996, carrier 1 to carrier 10 at time $13997, carrier 1 to carrier 10 at time $13998, carrier 1 to carrier 10 at time $13999, and carrier 1 to carrier 10 at time $14000. Thus, dummy symbols are arranged at carrier 7, carrier 8, carrier 9, and carrier 10 at time $13995, carrier 1 to carrier 10 at time $13996, carrier 1 to carrier 10 at time $13997, carrier 1 to carrier 10 at time $13998, carrier 1 to carrier 10 at time $13999, and carrier 1 to carrier 10 at time $14000.

Following the same method as described above, dummy symbols are arranged if necessary also in data symbol group #TFD2 (3402), data symbol group #TFD3 (3403), data symbol group #TFD4 (3404), data symbol group #TFD5 (3405), data symbol group #TFD6 (3406), data symbol group #TFD7 (3407), and data symbol group #TFD8 (3408) in FIG. 63.

As described above, dummy symbols are inserted using different methods for a frame subjected to time division multiplexing and a frame subjected to time-frequency division multiplexing, and thus a receiving apparatus can readily sort out data symbols, and demodulate/decode data. Furthermore, an advantageous effect of preventing fall of a data transmission rate due to dummy symbols can be achieved.

Note that a frame configuration in which "preambles", "symbols subjected to time division", and "symbols subjected to time-frequency division" are arranged in this order along the time axis is described based on the example in FIG. 63, yet the present disclosure is not limited to this. For example, a frame configuration in which "preambles", "symbols subjected to time-frequency division, and "symbols subjected to time division" are arranged in this order may be adopted, and may also include symbols other than the symbols illustrated in FIG. 63.

For example, in FIG. 63, "preambles" may be inserted between "symbols subjected to time division" and "symbols subjected to time-frequency division", or other symbols may be inserted between "symbols subjected to time division" and "symbols subjected to time-frequency division".

Figure 65:
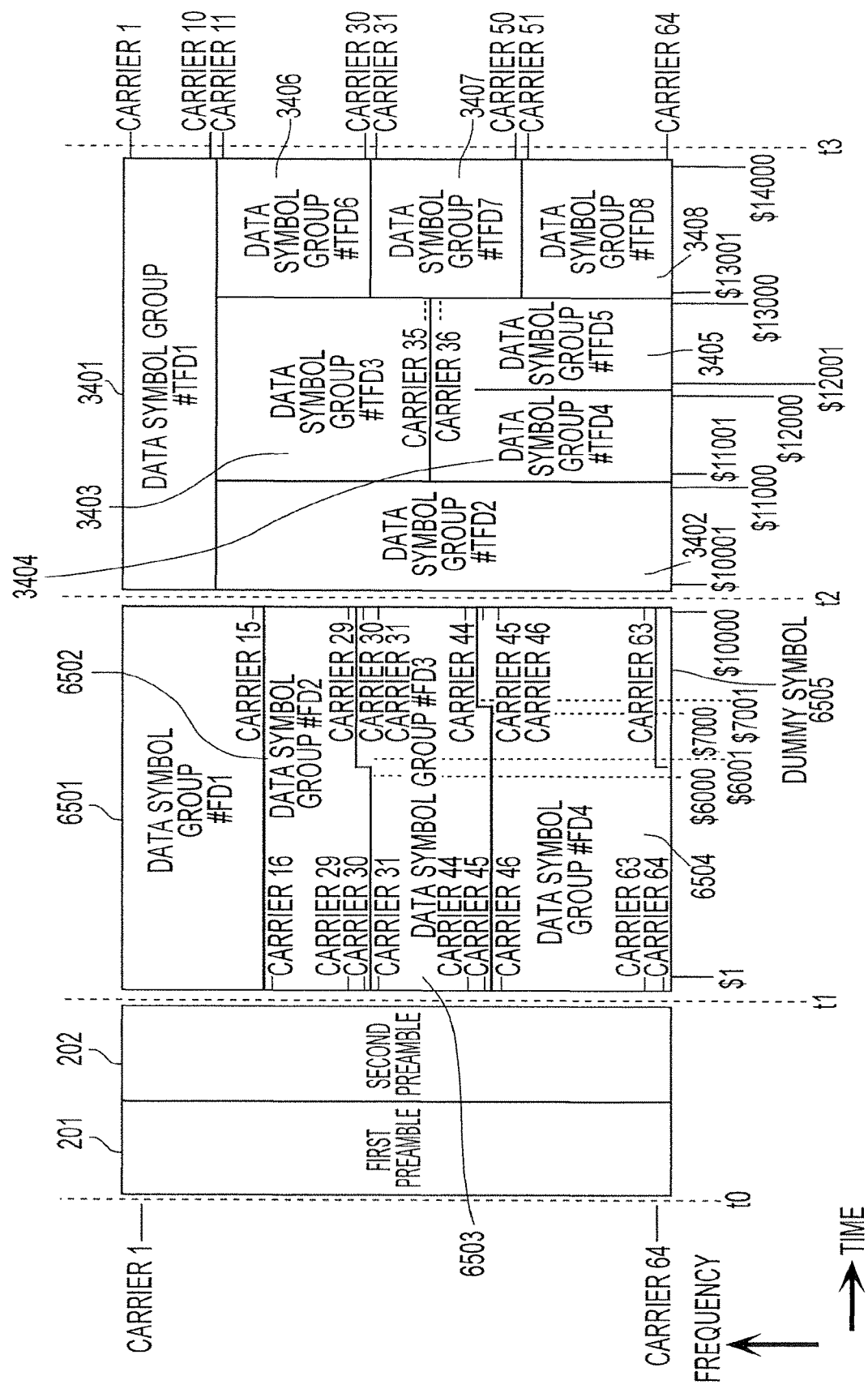
FIG. 65 is a view illustrating an example of a frame configuration.

FIG. 65 illustrates an example of a frame configuration in which the horizontal axis indicates time and the vertical axis indicates frequency, and the same reference numerals are assigned to elements operating in the same way as those in FIGS. 2 and 34.

Preambles are transmitted in a period from time t0 to time t1, symbol groups subjected to frequency division (frequency division multiplexing (FDM)) are transmitted in a period from time t1 to time t2, and symbol groups subjected to time-frequency division multiplexing (TFDM) are transmitted in a period from time t2 to time t3.

In the case of FDM, the number of symbols (or the number of slots) included in each data symbol group #FDX is the number of symbols (or the number of slots) in which data corresponding to an integral multiple of a FEC block (having a block length of an error correction code (a code length of an error correction code)) is fitted.

For example, when the block length of an error correction code is 64800 bits and the number of bits for transmitting each symbol of a data symbol group is 4 (when the single-input single-output (SISO) method and 16QAM are used, the number of bits for transmitting each symbol is 4), the number of symbols necessary to transmit 64800 bits that indicate the block length of an error correction code is 16200 symbols. Accordingly, in such a case, the number of symbols included in data symbol group #FDX is 16200×N (N is an integer greater than or equal to 1).

In another example, when the block length of an error correction code is 64800 bits and the number of bits for transmitting each symbol of a data symbol group is 6 (when the SISO method and 64QAM are used, the number of bits for transmitting each symbol is 6), the number of symbols necessary to transmit 64800 bits that indicate the block length of an error correction code is 10800. Accordingly, in such a case, the number of symbols of data symbol group #FDX is 10800×N (N is an integer greater than or equal to 1).

In yet another example, when the block length of an error correction code is 64800 bits and the number of bits for transmitting each slot of a data symbol group is 8 (when the MIMO method is used and a modulation method for stream 1 is 16QAM, whereas a modulation method for stream 2 is 16QAM, the number of bits for transmitting each slot which includes one symbol of stream 1 and one symbol of stream 2 is 8), the number of slots necessary to transmit 64800 bits that indicate the block length of an error correction code is 8100. Thus, in such a case, the number of slots of data symbol group #FDX is 8100×N (N is an integer greater than or equal to 1).

In a period from time t1 to time t2 in FIG. 65, the number of symbols (or the number of slots) in each of data symbol group #FD1, data symbol group #FD2, data symbol group #FD3, and data symbol group #FD4 subjected to frequency division satisfies "the number of symbols (or the number of slots) in which data corresponding to an integral multiple of a FEC block (having a block length of an error correction code (a code length of an error correction code)) is fitted", as described above. Symbol groups are arranged along the frequency axis.

In FIG. 65, the number of carriers along the frequency axis is 64. Accordingly, carrier 1 to carrier 64 are present.

For example, data symbol group #FD1 includes data symbols at carrier 1 to carrier 15 from time $1 to time $10000.

Data symbol group #FD2 includes data symbols at carrier 16 to carrier 29 from time $1 to time $10000, and data symbols at carrier 30 from time $1 to time $6000.

Data symbol group #FD3 includes data symbols at carrier 30 from time $6001 to time $10000, data symbols at carrier 31 to carrier 44 from time $1 to time 10000, and data symbols at carrier 45 from time $1 to time $7000.

Data symbol group #FD4 includes data symbols at carrier 45 from time $7001 to time $10000, data symbols at carrier 46 to carrier 63 from time $1 to time $10000, and data symbols at carrier 64 from time $1 to time $6000.

The last data symbol group among data symbol groups arranged along the frequency axis is data symbol group #4, and the last symbol is at carrier 64 at time $6000.

Then, arrangement of dummy symbols starts at time $6001 at carrier 64. Thus, dummy symbols are arranged at carrier 64 from time $6001 to time $10000. Note that each dummy symbol has a certain value for in-phase component I, and also has a certain value for quadrature component Q.

According to the above rule, dummy symbols are arranged in a section subjected to frequency division (from time t1 to time t2 in FIG. 65).

The above has described that data symbols are allocated preferentially from a position having a smaller frequency index, yet data symbols are preferentially arranged from a position having a smaller time index. This point is to be described.

In data symbol group #FD1 (6501), data symbols are preferentially arranged from a position having a smaller time index. A rule that if data symbols are arranged at all the occupied carriers at a certain time, data symbols are arranged at carriers at a time subsequent to the certain time is adopted.

For example, in data symbol group #FD1 (6501), as illustrated in FIG. 65, a data symbol is arranged at carrier 1 at time $1, and thereafter data symbols are arranged at carrier 2 at time $1, carrier 3 at time $1, . . . , carrier 14 at time $1, and carrier 15 at time $1. Then, moving onto time $2, data symbols are arranged at carrier 1 at time $2, carrier 2 at time $2, carrier 3 at time $2, . . . , carrier 14 at time $2, and carrier 15 at time $2.

Thereafter, data symbols are arranged also at time $3 in the same manner, and data symbols are arranged up to time $10000 in the same manner.

In data symbol group #FD2 (6502), as illustrated in FIG. 65, a data symbol is arranged at carrier 16 at time $1, and thereafter data symbols are arranged at carrier 17 at time $1, carrier 18 at time $1, . . . , carrier 29 at time $1, and carrier 30 at time $1. Then, moving onto time $2, data symbols are arranged at carrier 17 at time $2, carrier 18 at time $2, carrier 19 at time $2, . . . , carrier 29 at time $2, and carrier 30 at time $2. Thereafter, data symbols are arranged also at time $3 in the same manner, and data symbols are arranged up to time $6000 in the same manner.

A data symbol is arranged at carrier 16 at time $6001, and thereafter data symbols are arranged at carrier 17 at time $6001, carrier 18 at time $6001, . . . , carrier 28 at time $6001, and carrier 29 at time $6001. Then, moving onto time $6002, data symbols are arranged at carrier 17 at time $6002, carrier 18 at time $6002, carrier 19 at time $6002, . . . , carrier 28 at time $6002, and carrier 29 at time $6002. Thereafter, data symbols are arranged also at time $6003 in the same manner, and data symbols are arranged up to time $10000 in the same manner.

In data symbol group #FD3 (6503), as illustrated in FIG. 65, a data symbol is arranged at carrier 31 at time $1, and thereafter, data symbols are arranged at carrier 32 at time $1, carrier 33 at time $1, . . . , carrier 44 at time $1, and carrier 45 at time $1. Moving onto time $2, data symbols are arranged at carrier 31 at time $2, carrier 32 at time $2, carrier 33 at time $2, . . . , carrier 44 at time $2, and carrier 45 at time $2. Thereafter, data symbols are arranged also at time $3 in the same manner, and data symbols are arranged up to time $6000 in the same manner.

A data symbol is arranged at carrier 30 at time $6001, and thereafter, data symbols are arranged at carrier 31 at time $6001, carrier 32 at time $6001, . . . carrier 44 at time $6001, and carrier 45 at time $6001. Then, moving onto time $6002, data symbols are arranged at carrier 31 at time $6002, carrier 32 at time $6002, carrier 33 at time $6002, . . . , carrier 44 at time $6002, and carrier 45 at time $6002. Data symbols are arranged also at time $6003 in the same manner, and data symbols are arranged up to time $7000 in the same manner.

Then, a data symbol is arranged at carrier 30 at time $7001, and thereafter data symbols are arranged at carrier 31 at time $7001, carrier 32 at time $7001, . . . , carrier 43 at time $7001, and carrier 44 at time $7001. Then, moving onto time $7002, data symbols are arranged at carrier 30 at time $7002, carrier 31 at time $7002, carrier 32 at time $7002, . . . , carrier 43 at time $6002, and carrier 44 at time $6002. Thereafter, data symbols are arranged also at time $7003 in the same manner, and then data symbols are arranged up to time $10000 in the same manner.

Data symbols are arranged also for data symbol group #FD4 (6504) in the same manner.

Note that the arrangement described here means "a method of arranging generated data symbols in order", or "a method of rearranging generated data symbols, and arranging the rearranged data symbols in order".

Arranging data symbols in such a manner gives the receiving apparatus an advantage that a less storage capacity is used for storing data symbols (if data symbols are arranged in the frequency direction, it may be difficult to start the next processing until data symbols at time $10000 are received).

Data symbol groups #TFDX (3401 to 3408) in FIG. 65 operate in the same way as those in FIG. 64, and thus description thereof is omitted.

As described above, dummy symbols are inserted using different methods for a frame subjected to frequency division multiplexing and a frame subjected to time-frequency division multiplexing, whereby a receiving apparatus can readily sort out data symbols, and demodulate/decode data. Furthermore, an advantageous effect of preventing fall of a data transmission rate due to dummy symbols can be achieved.

Note that a frame configuration in which "preambles", "symbols subjected to frequency division", and "symbols subjected to time-frequency division" are arranged in the order along the time axis is described based on the example in FIG. 65, yet the present disclosure is not limited to this, and for example, a frame configuration in which "preambles", "symbols subjected to time-frequency division, and "symbols subjected to frequency division" are arranged in the order may be adopted.

The frame configuration may also include symbols other than the symbols illustrated in FIG. 65. As an example, a method of including in the frame configuration "preambles", "symbols subjected to frequency division, "symbols subjected to time-frequency division", and "symbols subjected to time division" is described.

For example, in FIG. 65, "preambles" may be inserted between "symbols subjected to frequency division" and "symbols subjected to time-frequency division", and other symbols may be inserted between "symbols subjected to frequency division" and "symbols subjected to time-frequency division".

Figure 66:
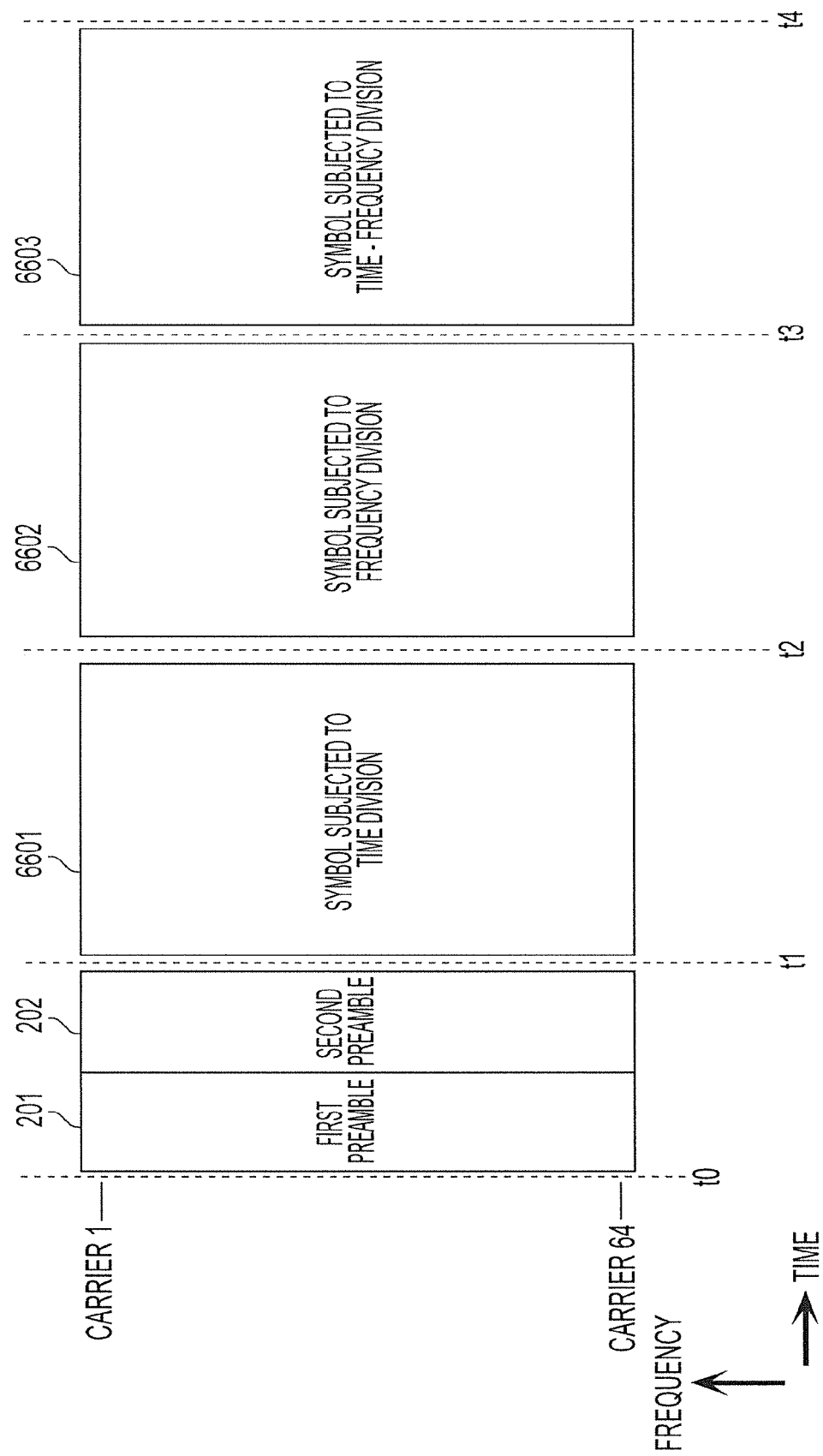
FIG. 66 is a view illustrating an example of a frame configuration.

FIG. 66 illustrates an example of a frame configuration in which the horizontal axis indicates time and the vertical axis indicates frequency, and the same reference numerals are assigned to elements operating in the same way as those in FIG. 2.

Symbols 6601 subjected to time division are transmitted in a section from time t1 to t2. Note that an example of a configuration of symbols subjected to time division is as illustrated in FIG. 63, and symbols 6601 subjected to time division include, for example, data symbol group #TD1 (6301), data symbol group #TD2 (6302), data symbol group #TD3 (6303), data symbol group #TD4 (6304), data symbol group #TD5 (6305), and dummy symbols 6306.

In a section from time t2 to time t3, symbols 6602 subjected to frequency division are transmitted. Note that an example of a configuration of symbols subjected to frequency division is as illustrated in FIG. 65, and symbols 6602 subjected to frequency division include data symbol group #FD1 (6501), data symbol group #FD2 (6502), data symbol group #FD3 (6503), data symbol group #FD4 (6504), and dummy symbols (6505), for example.

In a section from time t3 to time t4, symbols 6603 subjected to time-frequency division are transmitted. Note that an example of a configuration of symbols subjected to time-frequency division is as illustrated in FIGS. 63 and 65, and symbols 6703 subjected to time-frequency division include, for example, data symbol group #TFD1 (3401), data symbol group #TFD2 (3402), data symbol group #TFD3 (3403), data symbol group #TFD4 (3404), data symbol group #TFD5 (3405), data symbol group #TFD6 (3406), data symbol group #TFD7 (3407), and data symbol group #TFD8 (3408).

At this time, a method of inserting dummy symbols to symbols 6601 subjected to time division is the same as the method described above, a method of inserting dummy symbols to symbols 6602 subjected to frequency division is also the same as the method described above, and a method of inserting dummy symbols to symbols 6603 subjected to time-frequency division is also the same as the method described above.

As described above, dummy symbols are inserted using different methods for a frame subjected to time division, a frame subjected to frequency division multiplexing, and a frame subjected to time-frequency division multiplexing, whereby a receiving apparatus can readily sort out data symbols, and demodulate/decode data. Furthermore, an advantageous effect of preventing fall of a data transmission rate due to dummy symbols can be achieved.

Note that a frame configuration in which "preambles", "symbols subjected to time division", "symbols subjected to frequency division", and "symbols subjected to time-frequency division" are arranged in the order along the time axis is described based on the example in FIG. 66, yet the present disclosure is not limited to this, and for example, "symbols subjected to time division", "symbols subjected to frequency division", and "symbols subjected to time-frequency division" may be transmitted in any (temporal) order subsequently to "preambles". The frame configuration may also include symbols other than the symbols illustrated in FIG. 66.

For example, in FIG. 66, "preambles" may be inserted between "symbols subjected to time division" and "symbols subjected to frequency division", and other symbols may be inserted between "symbols subjected to time division" and "symbols subjected to frequency division". In addition, "preambles" may be inserted between "symbols subjected to frequency division" and "symbols subjected to time-frequency division", and other symbols may be inserted between "symbols subjected to frequency division" and "symbols subjected to time-frequency division".

Note that the present disclosure can be achieved even by partially combining and executing the present disclosure.

(Supplementary Note)

The broadcast (or communication) system according to the present disclosure is described according to the above-described exemplary embodiments. However, the present disclosure is not limited to the above-described exemplary embodiments.

As a matter of course, the present disclosure may be carried out by combining a plurality of the exemplary embodiments and other contents described herein.

Moreover, each exemplary embodiment and the other contents are only examples. For example, while a "modulating method, an error correction coding method (an error correction code, a code length, a coding rate and the like to be used), control information and the like" are exemplified, it is possible to carry out the present disclosure with the same configuration even when other types of a "modulating method, an error correction coding method (an error correction code, a code length, a coding rate and the like to be used), control information and the like" are applied.

As for a modulating method, even when a modulating method other than the modulating methods described herein is used, it is possible to carry out the exemplary embodiments and the other contents described herein. For example, APSK (Amplitude Phase Shift Keying) (such as 16APSK, 64APSK, 128APSK, 256APSK, 1024APSK and 4096APSK), PAM (Pulse Amplitude Modulation) (such as 4PAM, 8PAM, 16PAM, 64PAM, 128PAM, 256PAM, 1024PAM and 4096PAM), PSK (Phase Shift Keying) (such as BPSK, QPSK, 8PSK, 16PSK, 64PSK, 128PSK, 256PSK, 1024PSK and 4096PSK), and QAM (Quadrature Amplitude Modulation) (such as 4QAM, 8QAM, 16QAM, 64QAM, 128QAM, 256QAM, 1024QAM and 4096QAM) may be applied, or in each modulating method, uniform mapping or non-uniform mapping may be performed (any mapping may be performed).

Moreover, a method for arranging 16 signal points, 64 signal points or the like on an I-Q plane (a modulating method having 16 signal points, 64 signal points or the like) is not limited to a signal point arranging method of the modulating methods described herein. Hence, a function of outputting an in-phase component and a quadrature component based on a plurality of bits is a function in a mapper.

Moreover, herein, when there is a complex plane, a phase unit such as an argument is a "radian."

When the complex plane is used, display in a polar form can be made as display by polar coordinates of a complex number. When point (a, b) on the complex plane is associated with complex number $z=a+jb$ (a and b are both actual numbers, and j is a unit of an imaginary number), and when this point is expressed by $[r, \theta]$ in polar coordinates, $a=r\times\cos\theta$ and $b=r\times\sin\theta$

[Equation 61]

$$r=\sqrt{a^2+b^2} \qquad (61)$$

hold, r is an absolute value of $z(r=|z|)$, and $\theta$ is an argument. Then, $z=a+jb$ is expressed by $r\times e^{j\theta}$.

The present disclosure described herein is applicable to a multi-carrier transmitting method such as the OFDM method, and is also applicable to a single carrier transmitting method. (For example, in a case of a multi-carrier method, symbols are arranged in a frequency axis, but in a case of a single carrier, symbols are arranged only in a time direction.) Moreover, a spread spectrum communication method is also applicable to baseband signals by using spreading codes.

Different modulating methods may be used for pieces of data s0, s1, s2 and s3 in the above-described exemplary embodiments, respectively.

Herein, a receiving apparatus of a terminal and an antenna may be configured separately. For example, the receiving apparatus includes an interface which receives through a cable an input of a signal received at the antenna or a signal obtained by performing frequency conversion on a signal received at the antenna, and the receiving apparatus performs subsequent processing. Moreover, data/information obtained by the receiving apparatus is subsequently converted into a video or a sound, and a display (monitor) displays the video or a speaker outputs the sound. Further, the data/information obtained by the receiving apparatus may be subjected to signal processing related to a video or a sound (signal processing may not be performed), and may be output from an RCA terminal (a video terminal or an audio terminal), a USB (Universal Serial Bus), a USB 2, a USB 3, an HDMI (registered trademark) (High-Definition Multimedia Interface), an HDMI (registered trademark) 2, a digital terminal or the like of the receiving apparatus. Moreover, the data/information obtained by the receiving apparatus is modulated by using a wireless communication method (Wi-Fi (registered trademark) (IEEE 802.11 a, IEEE 802.11 b, IEEE 802.11 g, IEEE 802.11 n, IEEE 802.11ac, IEEE 802.11ad and the like), WiGiG, Bluetooth (registered trademark) and the like) or a wired communication method (optical communication, power line communication and the like), and these pieces of information may be transmitted to other apparatuses. In this case, a terminal includes a transmitting apparatus for transmitting information (in this case, the terminal may transmit data including the data/information obtained by the receiving apparatus, or may generate modified data from the data/information obtained by the receiving apparatus and transmit the modified data).

Herein, it can be considered that a communication and broadcast apparatuses such as a broadcast station, a base station, an access point, a terminal and a mobile phone includes the transmitting apparatus. In this case, it can be considered that a communication apparatus such as a television, a radio, a terminal, a personal computer, a mobile phone, an access point and a base station includes the receiving apparatus. Moreover, it can also be considered that each of the transmitting apparatus and the receiving apparatus according to the present disclosure is an apparatus having communication functions and has a form connectable via any interface to an apparatus for executing an application such as a television, a radio, a personal computer and a mobile phone.

Moreover, in the present exemplary embodiment, symbols other than data symbols, for example, pilot symbols (preambles, unique words, postambles, reference symbols and the like), and control information symbols may be arranged in frames in any way. Then, these symbols are named a pilot symbol and a control information symbol here, but may be named in any way, and a function itself is important.

As a result, for example, a symbol is named a preamble herein, but the name of the symbol is not limited to this name, and the symbol may be named another name such as a control information symbol and a control channel. This symbol is a symbol for transmitting control information such as information of a transmitting method (for example, a transmitting method, a modulating method, a coding rate of an error correction code, a code length of an error correction code, a frame configuring method and a Fourier transform method (size)).

Moreover, the pilot symbol only needs to be a known symbol modulated by using PSK modulation in a transmitting apparatus and a receiving apparatus (or the receiving apparatus may be able to learn a symbol transmitted by the transmitting apparatus by establishing synchronization.).

The receiving apparatus performs frequency synchronization, time synchronization, channel estimation (of each modulated signal) (estimation of CSI (Channel State Information)), signal detection and the like by using this symbol.

Moreover, the control information symbol is a symbol for transmitting information that is used for realizing communication other than data communication (such as application communication) and that needs to be transmitted to a communicating party (the information such as a modulating method used for communication, an error correction coding method, a coding rate of the error correction coding method and setting information in an upper layer).

In the frame configurations herein, another symbol (for example, a pilot symbol and a null symbol (an in-phase component of the symbol is 0 (zero, and a quadrature component is 0 (zero)))) may be inserted to the first preamble. Similarly, a symbol such as a pilot symbol and a null symbol (an in-phase component of the symbol is 0 (zero, and a quadrature component is 0 (zero))) may be inserted to the second preamble. Moreover, a preamble is configured with the first preamble and the second preamble. However, the preamble configuration is not limited to this configuration. The preamble may be configured with the first preamble (first preamble group) alone or may be configured with two or more preambles (preamble groups). Note that in regard to the preamble configuration, the same also applies to frame configurations of other exemplary embodiments.

Moreover, the data symbol group is indicated in the frame configurations herein. However, another symbol (for example, a pilot symbol, a null symbol (an in-phase component of the symbol is 0 (zero, and a quadrature component is 0 (zero))), and a control information symbol) may be inserted. Note that in this regard, the same also applies to frame configurations of other exemplary embodiments. Then, another symbol (for example, a pilot symbol, a null symbol (an in-phase component of the symbol is 0 (zero, and a quadrature component is 0 (zero))), a control information symbol and a data symbol) may be inserted in a pilot symbol.

Moreover, some of the frame configurations of modulated signals to be transmitted by the transmitting apparatus are described herein. In this case, the above describes the point that "time division (temporal division) is performed." However, when two data symbol groups are connected, there is a portion subjected to frequency division at a seam portion. This point will be described with reference to FIG. 39.

FIG. 39 illustrates symbol 3901 of data symbol group #1 and symbol 3902 of data symbol group #2. As illustrated at time t0 in FIG. 39, the symbol of data symbol group #1 ends with carrier 4. In this case, the symbol of data symbol group #2 is arranged from carrier 5 at time t0. Then, only a portion at time t0 is exceptionally subjected to frequency division. However, there is only the symbol of data symbol group #1 before time t0, and there is only the symbol of data symbol group #2 after time t0. At this point, time division (temporal division) is performed.

FIG. 40 illustrates another example. Note that the same reference numerals as those in FIG. 39 are assigned. As illustrated at time t0 in FIG. 40, the symbol of data symbol group #1 ends with carrier 4. Then, as illustrated at time t1, the symbol of data symbol group #1 ends with carrier 5. Then, the symbol of data symbol group #2 is arranged from carrier 5 at time t0, and the symbol of data symbol group #2 is arranged from carrier 6 at time t1. Then, portions at time t0 and time t1 are exceptionally subjected to frequency division. However, there is only the symbol of data symbol group #1 before time t0, and there is only the symbol of data symbol #2 after time t1. At this point, time division (temporal division) is performed.

As illustrated in FIGS. 39 and 40, there is a case where, except for the exceptional portions, there are time at which there is no data symbol other than the symbol of data symbol group #1 (there may be a pilot symbol or the like.) and time at which there is no data symbol other than the symbol of data symbol group #2 (there may be a pilot symbol or the like). This case will be referred to as "time division (temporal division) is performed" (hence, an exceptional time existing method is not limited to FIGS. 39 and 40).

Note that the present disclosure is not limited to each exemplary embodiment, and can be carried out with various modifications. For example, the case where the present disclosure is performed as a communication apparatus is described in each exemplary embodiment. However, the present disclosure is not limited to this case, and this communication method can also be used as software.

Transmission antennas of transmission stations and base stations, reception antennas of terminals and one antenna described in the drawings may be configured with a plurality of antennas.

The following are included as various aspects of the embodiments according to the present disclosure.

A transmission method according to a first disclosure includes: configuring a frame using a plurality of orthogonal frequency-division multiplexing (OFDM) symbols, by allocating time resources and frequency resources to a plurality of transmission data; and transmitting the frame, wherein the frame includes a first period in which a preamble which includes information on a frame configuration of the frame is transmitted, a second period in which a plurality of transmission data are transmitted by time division, a third period in which a plurality of transmission data are transmitted by frequency division, and a fourth period in which a plurality of transmission data are transmitted by time division and frequency division.

A transmission method according to a second disclosure is the transmission method according to the first disclosure, and in the fourth period, the frame includes a time at which first transmission data and second transmission data are transmitted by frequency division, and a frequency at which the first transmission data and third transmission data are transmitted by time division.

A receiving method according to a third disclosure includes: receiving a frame generated using a plurality of orthogonal frequency-division multiplexing (OFDM) symbols, by allocating time resources and frequency resources to a plurality of transmission data, the frame including a first period in which a preamble is transmitted, a second period in which a plurality of transmission data are transmitted by time division, a third period in which a plurality of transmission data are transmitted by frequency division, and a fourth period in which a plurality of transmission data are transmitted by time division and frequency division; obtaining information on a frame configuration of the frame from the preamble; and demodulating, based on the information on the frame configuration, at least one of the plurality of transmission data transmitted in the second period, the plurality of transmission data transmitted in the third period, and the plurality of transmission data transmitted in the fourth period.

A transmitting method according to a fourth disclosure is the receiving method according to a third disclosure, and in the fourth period, the received frame includes a time at which first transmission data and second transmission data are transmitted by frequency division, and a frequency at which the first transmission data and third transmission data are transmitted by time division.

A transmitting apparatus according to a fifth disclosure includes: a frame configuring unit configured to configure a frame using a plurality of orthogonal frequency-division multiplexing (OFDM) symbols, by allocating time resources and frequency resources to a plurality of transmission data; and a transmitter which transmits the frame, wherein the frame includes a first period in which a preamble which includes information on a frame configuration of the frame is transmitted, a second period in which a plurality of transmission data are transmitted by time division, a third period in which a plurality of transmission data are transmitted by frequency division, and a fourth period in which a plurality of transmission data are transmitted by time division and frequency division.

The transmitting apparatus according to a sixth disclosure is the transmitting apparatus according to the fifth disclosure, and in the fourth period, the frame includes a time at which first transmission data and second transmission data are transmitted by frequency division, and a frequency at which the first transmission data and third transmission data are transmitted by time division.

A receiving apparatus according to a seventh disclosure includes: a receiver which receives a frame generated using a plurality of orthogonal frequency-division multiplexing (OFDM) symbols, by allocating time resources and frequency resources to a plurality of transmission data, the frame including a first period in which a preamble is transmitted, a second period in which a plurality of transmission data are transmitted by time division, a third period in which a plurality of transmission data are transmitted by frequency division, and a fourth period in which a plurality of transmission data are transmitted by time division and frequency division; a preamble processor which obtains information on a frame configuration of the frame from the preamble; and a demodulator which demodulates, based on the information on the frame configuration, at least one of the plurality of transmission data transmitted in the second period, the plurality of transmission data transmitted in the third period, and the plurality of transmission data transmitted in the fourth period.

A receiving apparatus according to an eighth disclosure is the receiving apparatus according to the seventh disclosure, and in the fourth period, the received frame includes a time at which first transmission data and second transmission data are transmitted by frequency division, and a frequency at which the first transmission data and third transmission data are transmitted by time division.

Note that a program for executing the above-described communication method may be stored in a ROM (Read Only Memory) in advance to cause a CPU (Central Processor Unit) to operate this program.

Moreover, the program for executing the communication method may be stored in a computer-readable storage medium to record the program stored in the recording medium in a RAM (Random Access Memory) of a computer, and to cause the computer to operate according to this program.

Then, each configuration of each of the above-described exemplary embodiments and the like may be realized as an LSI (Large Scale Integration) which is typically an integrated circuit having an input terminal and an output terminal. These integrated circuits may be formed as one chip separately, or may be formed as one chip so as to include the entire configuration or part of the configuration of each exemplary embodiment. The LSI is described here, but the integrated circuit may also be referred to as an IC (Integrated Circuit), a system LSI, a super LSI and an ultra LSI depending on a degree of integration. Moreover, a circuit integration technique is not limited to the LSI, and may be realized by a dedicated circuit or a general purpose processor. After manufacturing of the LSI, a programmable FPGA (Field Programmable Gate Array) or a reconfigurable processor which is reconfigurable in connection or settings of circuit cells inside the LSI may be used.

Further, when development of a semiconductor technology or another derived technology provides a circuit integration technology which replaces the LSI, as a matter of course, functional blocks may be integrated by using this technology. There may be biotechnology adaptation or the like as a possibility.

The present disclosure is widely applicable to a wireless system which transmits different modulated signals from a plurality of antennas, respectively. Moreover, the present disclosure is also applicable to a case where MIMO transmission is performed in a wired communication system having a plurality of transmission portions (for example, a PLC (Power Line Communication) system, an optical communication system, and a DSL (Digital Subscriber Line) system).

Note that the first exemplary embodiment is described by using baseband signals s1(t) (s1(i)) and s2(t) (s2(i)). In this case, data to be transmitted with s1(t) (s1(i)) and data to be transmitted with s2(t) (s2(i)) may be the same.

Moreover, s1(t)=s2(t) (s1(i)=s2(i)) may hold. In this case, a modulated signal of one stream is transmitted from a plurality of antennas.

INDUSTRIAL APPLICABILITY

The present disclosure is widely applicable to a wireless system which transmits different modulated signals from a plurality of antennas, respectively. Moreover, the present disclosure is also applicable to a case where MIMO transmission is performed in a wired communication system having a plurality of transmission portions (for example, a PLC (Power Line Communication) system, an optical communication system, and a DSL (Digital Subscriber Line) system).

REFERENCE MARKS IN THE DRAWINGS 102 data generator
105 second preamble generator
108 control signal generator
110 frame configuring unit
112 signal processor
114 pilot insertion unit
116 IFFT unit
118 PAPR reduction unit
120 guard interval insertion unit
122 first preamble insertion unit
124 wireless processor
126 antenna

The invention claimed is:

1. A transmitting apparatus comprising:
at least one processor configured to:
generate a frame by mapping first modulated signals of a first Physical Layer Pipe (PLP) and second modulated signals of a second PLP onto time-frequency resources used for data transmission;
insert pilot signals into the frame; and
perform an Inverse Fast Fourier Transform (IFFT) processing on the pilot inserted frame to generate an orthogonal frequency-division multiplexing (OFDM) signal; and
a transmitter configured to transmit the OFDM signal, wherein
the time-frequency resources include first resources and second resources that are provided for a first OFDM symbol and a second OFDM symbol, respectively, the first resources being arranged in a frequency direction and corresponding to respective OFDM subcarriers for data transmission, the second resources being arranged in the frequency direction and corresponding to the respective OFDM subcarriers for data transmission, the first resources being adjacent to the second resources in a time direction,
the first modulated signals include a first sequence of first modulated signals and a second sequence of first modulated signals following the first sequence,
the first sequence is mapped onto the first resources only within a first range in the frequency direction,
the second sequence is mapped onto the second resources only within the first range,
the second modulated signals include a third sequence of second modulated signals and a fourth sequence of second modulated signals following the third sequence,
the third sequence is mapped onto the first resources only within a second range in the frequency direction, the second range being not overlapped with the first range,
the fourth sequence is mapped onto the second resources only within the second range,
the time-frequency resources include a resource onto which no modulated signal is mapped and which is provided for a dummy signal,
the dummy signal being generated based on a pseudo-random coefficient, and
the dummy signal includes symbols having an in-phase component of 1 or −1, and a quadrature component that can only be a fixed value of 0.

2. The transmitting apparatus according to claim 1, wherein
a last modulated signal of the first sequence is mapped onto a resource among the first resources corresponding to a highest frequency in the first range, and
an initial modulated signal of the second sequence is mapped onto a resource among the second resources corresponding to a lowest frequency in the first range.

3. The transmitting apparatus according to claim 1, wherein the first range is adjacent to the second range in the frequency direction.

* * * * *